US009291450B2

(12) United States Patent
Takahashi

(10) Patent No.: US 9,291,450 B2
(45) Date of Patent: Mar. 22, 2016

(54) MEASUREMENT MICROSCOPE DEVICE, IMAGE GENERATING METHOD, MEASUREMENT MICROSCOPE DEVICE OPERATION PROGRAM, AND COMPUTER-READABLE RECORDING MEDIUM

(71) Applicant: Keyence Corporation, Osaka (JP)

(72) Inventor: Shinya Takahashi, Osaka (JP)

(73) Assignee: Keyence Corporation, Osaka (JP)

( * ) Notice: Subject to any disclaimer, the term of this patent is extended or adjusted under 35 U.S.C. 154(b) by 401 days.

(21) Appl. No.: 14/042,998

(22) Filed: Oct. 1, 2013

(65) Prior Publication Data
US 2014/0152794 A1 Jun. 5, 2014

(30) Foreign Application Priority Data
Nov. 30, 2012 (JP) .................. 2012-263871

(51) Int. Cl.
H04N 9/47 (2006.01)
H04N 7/18 (2006.01)
G01B 11/24 (2006.01)
G01B 9/04 (2006.01)
G02B 21/00 (2006.01)
G02B 21/36 (2006.01)
G06K 9/20 (2006.01)
G01B 11/25 (2006.01)
G06K 9/00 (2006.01)
G06K 9/46 (2006.01)

(52) U.S. Cl.
CPC ...... *G01B 11/24* (2013.01); *G01B 9/04* (2013.01); *G01B 11/2531* (2013.01); *G02B 21/0016* (2013.01); *G02B 21/367* (2013.01); *G06K 9/00134* (2013.01); *G06K 9/00214* (2013.01); *G06K 9/2036* (2013.01); *G06K 9/4638* (2013.01); *G01B 2210/52* (2013.01)

(58) Field of Classification Search
CPC ...... G01B 11/24; G01B 11/2531; G01B 9/04; G01B 2210/52; G01B 11/25; G01B 11/2513; G01B 11/254; G06K 9/00134; G06K 9/00214; G06K 9/4638; G06K 9/2036; G02B 21/367; G02B 21/0016
USPC ........................................... 348/79, 135, 136
See application file for complete search history.

(56) References Cited

PUBLICATIONS

Bergmann, D., "New approach for automatic surface reconstruction with coded light," Remote Sensing and Reconstruction for Three-Dimensional Objects and Scenes, Proceedings, The International Society for Optical Engineering, vol. 2572, Jul. 9-10, 1995, pp. 2-9.
Guhring, J., "Dense 3-D surface acquisition by structured light using off-the-shelf components," Videometrics and Optical Methods for 3D Shape Measurement, Proceedings of SPIE, The International Society for Optical Engineering, vol. 4309, Jan. 22-23, 2001, pp. 220-231.

*Primary Examiner* — Andy Rao
*Assistant Examiner* — Jared Walker
(74) *Attorney, Agent, or Firm* — Kilyk & Bowersox, P.L.L.C.

(57) ABSTRACT

An image with a wide visual field can be captured without causing deterioration in measurement accuracy. There are provided: a stage on which an object is placed; a display unit for displaying a height image or an observation image; a measurement unit for performing measurement on the height image; an image connecting unit configured to, by moving the stage and capturing a different region, acquire a plurality of height images, and connect the obtained plurality of height images and observation images to generate a connected image; a measurement error region display unit configured to superimpose and display a measurement error region, on an image of the object; and a measurement-image imaging condition setting unit for adjusting an imaging condition for a striped image required for generation of the height image to reduce the measurement error region.

18 Claims, 84 Drawing Sheets

FIG. 42

MEASUREMENT CONDITION

| ITEM | CONTENTS |
|---|---|
| MEASUREMENT DATE/TIME | 2012/10/31 13:07:54 |
| CAMERA | LOW MAGNIFICATION |
| MAGNIFICATION | 12x |
| SHOOTING MODE OF TEXTURE IMAGE | NORMAL (1 IMAGE) |
| HEIGHT MEASUREMENT MODE | STANDARD |

RP

2-POINT SPECIFICATION 1 – MAIN IMAGE

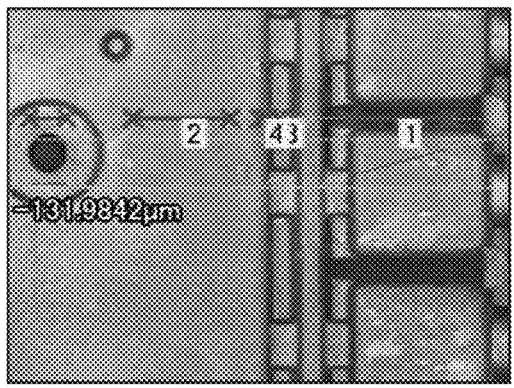

2-POINT SPECIFICATION 1 – 3D IMAGE

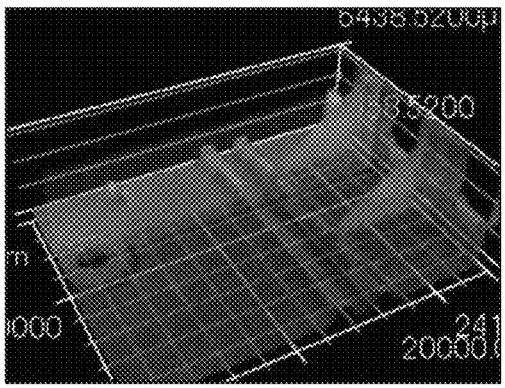

2-POINT SPECIFICATION 1 – PROFILE

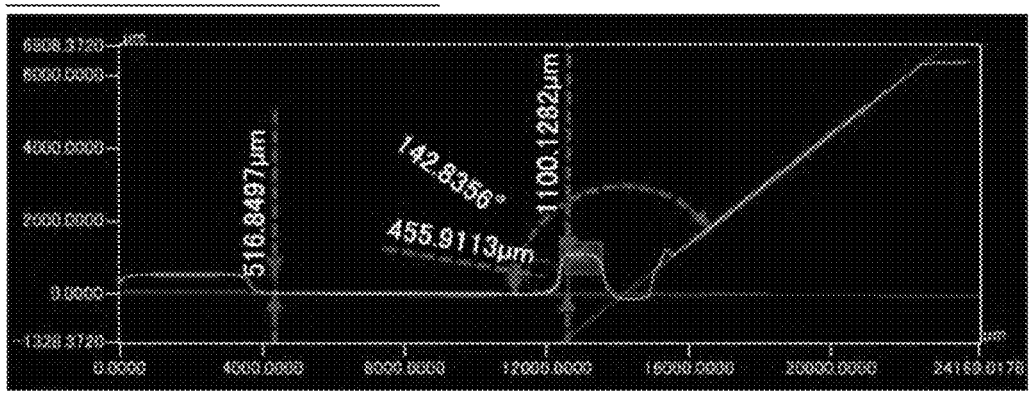

2-POINT SPECIFICATION 1 – MEASUREMENT RESULT

| No. | MEASUREMENT NAME | MEASURED VALUE | UNIT |
|---|---|---|---|
| 1 | ANGLE 1 | 142.8356 | ° |
| 2 | LINE-LINE 1 | 5165.8497 | μm |
| 3 | LINE-POINT 1 | 1100.1282 | μm |
| 4 | CIRCULAR ARC R1 | 455.9113 | μm |

MEASUREMENT MICROSCOPE DEVICE, IMAGE GENERATING METHOD, MEASUREMENT MICROSCOPE DEVICE OPERATION PROGRAM, AND COMPUTER-READABLE RECORDING MEDIUM

CROSS-REFERENCE TO RELATED APPLICATIONS

The present application claims foreign priority based on Japanese Patent Application No. 2012-263871, filed Nov. 30, 2012, the contents of which is incorporated herein by reference.

BACKGROUND OF THE INVENTION

1. Field of the Invention

The present invention relates to a measurement microscope device provided with a measurement function, an image generating method, an operation program for operating this measurement microscope device, and a computer-readable recording medium.

2. Description of Related Art

There has been developed a measurement device using triangulation as a measurement device for measuring an object. As shown in FIG. 84, such a device is previously set with an angle α between an optical axis of measurement light emitted from a light projecting section 110 and an optical axis of measurement light incident on a light receiving section 120 (an optical axis of the light receiving section 120). When an object S is not placed on a stage 140, the measurement light emitted from the light projecting section 110 is reflected by a point O on a placing surface of the stage 140 and incident on the light receiving section 120. On the other hand, when the object S is placed on the stage 140, the measurement light emitted from the light projecting section 110 is reflected by a point A on the surface of the object S and incident on the light receiving section 120. A distance d between the point O and the point A in an X-direction is measured, and based on this distance d, a height h of the point A on the surface of the object S is calculated. Calculating the heights of all points on the surface of the object S allows measurement of a three-dimensional shape of the object S. In order to irradiate all the points on the surface of the object S with the measurement light, the measurement light is emitted from the light projecting section 110 in accordance with a predetermined structured measurement light pattern, and a three-dimensional shape of the object S is efficiently measured by a stripe projection method using striped measurement light.

In such a measurement device capable of capturing image data in the three-dimensional shape, an imageable visual field range is restricted by performance of an imaging element or the like. It is desirable that a three-dimensional image is captured with a visual field as wide as possible for efficiently performing the measurement, but when a wide visual field is to be captured, resolution of the obtained image decreases to cause deterioration in measurement accuracy. In the meantime, when the measurement accuracy is to be improved, the visual field becomes narrower. As described above, the visual field and the accuracy have a trade-off relation where, when one is taken as important, the other is neglected, and it has thus been difficult to make the both favorable in the past.

On the other hand, it is considered that a plurality of images are captured while an imaged position is changed with high accuracy, and these plurality of images are connected to obtain an image with a wide visual field. In this case, a large number of images need to be captured, and it thus takes a long time. In order to reduce the time for capturing one image, for example, it is considered that the irradiation direction is limited to one direction. In this case, a measurement result of the measurement by the stripe projection method depends in principle on a shape and material properties of the object. For example, an object having a shape close to flat can be captured by one-side illumination, whereas an object having an unevenness surface is shaded by one-side illumination and cannot be measured, and hence both-side illumination is more suitable. Meanwhile, when the object is like an opaque resin, penetration of projected light occurs, and further, when the object is a metal body, multiple reflection may occur. Hence there has been a problem of not being able to successfully perform measurement in a standard measurement mode.

Moreover, in the measurement by the stripe projection method, the measurement time varies widely from the order of three seconds to one minute by changing the measurement method (measurement mode) or the illumination direction. The measurement mode and the measurement direction are desired to be set as safely as possible so as to prevent failure in measurement, but in this case, the measurement of each image takes a long time.

As described above, when the imaging conditions such as the measurement direction, the measurement mode and the measurement brightness are fixed and then measurement is performed, the measurement may fail in part of images depending on the shape and the material properties of the object. However, when measurement is performed in a highest-class measurement mode, it blindly takes time. As described above, there has been a problem in that the measurement time is difficult to reduce when images captured by the stripe projection method are to be connected.

SUMMARY OF THE INVENTION

The present invention has been made for solving the conventional problems described above. An object of the present invention is to provide a measurement microscope device, an image generating method, a measurement microscope device operation program, and a computer-readable recording medium, which allow an image to be captured with a wide visual field without causing deterioration in measurement accuracy.

In order to achieve the above object, a measurement microscope device according to one embodiment of the invention may include: a first measurement light projecting unit configured to irradiate an object with first measurement light from a first direction, the unit being a measurement light projecting unit for projecting measurement light as predetermined pattern structured illumination to the object from an oblique direction; an observation illumination light source for generating illumination light when capturing an observation image; an imaging unit for acquiring measurement light projected by the first measurement light projecting unit and reflected by the object to capture a plurality of striped images, and using the observation illumination light source to capture an observation image having texture information; a height image acquiring unit for acquiring a height image having height information based on the plurality of striped images; a stage on which the object is placed; a display unit for displaying the height image or the observation image; a measurement unit for performing measurement on the height image displayed on the display unit; an image connecting unit configured to, by moving the stage and capturing a different region including a connection margin by the imaging unit, acquire a plurality of height images for connection and observation images for connection, and connect the obtained plurality of height images for connection and observation images for connection to generate a connected image; a measurement error region display unit configured to superimpose and display a measurement error region, where a result of measurement of the height is error, on an image of the object corresponding to each region to be connected by the image connecting unit; and a measurement-image imaging condition setting unit for adjusting an imaging condition for a striped image required for generation of the height image to reduce the measurement error region in a state where the measurement error region is displayed. With the above configuration, a plurality of images each having high accuracy but a narrow imageable visual field are captured while these images are connected, whereby it is possible to obtain an image with a wide visual field and high accuracy. In particular, by changing the imaging condition of the measurement image not used as the texture image rather than the observation image used as a texture image, it is possible to avoid a state where the appearance of the connected image changes significantly with respect to each area, while eliminating the measurement error region, so as to obtain a high quality connected image.

Further, in a measurement microscope device according to another embodiment of the invention, the connected image or the image for connection may be a three-dimensional composite image formed by combining an observation image captured using the observation illumination light source and a height image captured using the measurement light projecting unit.

Further, in a measurement microscope device according to still another embodiment of the invention, the image connecting unit may specify a predetermined region of the object as a connected region to divide the connected region into a plurality of sub regions, while respectively capturing by the imaging unit a height image for connection and an observation image for connection including the connection margin with respect to each of the sub regions, and may connect the obtained plurality of height images for connection and observation images for connection, to generate a connected image showing the connected region.

Moreover, a measurement microscope device according to yet another embodiment of the invention may further include a second measurement light projecting unit, as the measurement light projecting unit, configured to irradiate the object with second measurement light from a second direction different from the first direction, wherein the imaging conditions set by the measurement-image imaging condition setting unit include a measurement direction indicating a direction of the measurement light and brightness of a measurement image. With the above configuration, the direction of the measurement light and the brightness of the measurement image are adjusted separately from the observation image, whereby it is possible to seek for high accuracy in height information without affecting the appearance of the connected image.

Further, in a measurement microscope device according to yet another embodiment of the invention, the measurement error region display unit may be configured to superimpose and display a measurement error region, where a result of measurement of the height by at least one of the first measurement light projecting unit and the second measurement light projecting unit is error in a state where the height image for connection formed by projecting the measurement light in the predetermined pattern is displayed on the display unit.

Further, in a measurement microscope device according to yet another embodiment of the invention, the imaging conditions for the plurality of observation images for connection may be held uniform. With the above configuration, the imaging condition of the measurement image is changed as appropriate while the imaging condition of the observation image is held constant, whereby it is possible to obtain a connected image having height information with high accuracy while reducing a change in appearance.

Further, in a measurement microscope device according to yet another embodiment of the invention, the stage may be configured to be manually movable. With the above configuration, it is possible to reliably capture the images for connection individually while manually moving the stage. Moreover, it is possible to capture the image for connection while allowing the user to check the image each time, so as to reduce an error in capturing the image for connection.

Further, a measurement microscope device according to yet another embodiment of the invention may further include a stage driving unit for automatically driving the stage. With the above configuration, it is possible to obtain an advantage of avoiding a state where the user is required to stay beside the measurement microscope device during the stage moving operation, so as to seek labor saving and automation of the operation. In particular, the operation of capturing a large number of images for connection for obtaining the connected image can be significantly reduced.

Further, in a measurement microscope device according to yet another embodiment of the invention, an automatic image connection mode may be executable in which the image connecting unit moves the stage by the stage driving unit, and automatically captures a plurality of height images for connection and observation images for connection, to generate a connected image. With the above configuration, in capturing a plurality of images for connection, it is possible to obtain an advantage of automating the stage moving operation which takes time and avoiding a state where the user is required to spend a long time beside the measurement microscope device, so as to significantly save labor in capturing the connected image.

Further, in a measurement microscope device according to yet another embodiment of the invention, when the measurement error region is included in any of the images for connection captured in the automatic image connection mode, a recovery mode for changing the measurement-image imaging condition and recapturing all or part of the images for connection may be executable. With the above configuration, in the automatic image connection, even if capturing of the measurement image of the image for connection partially fails, recapturing only the measurement error region allows generation of the connected image.

Further, in a measurement microscope device according to yet another embodiment of the invention, the image connecting unit may be configured to specify a starting point and an end point of the connected region in order to divide the connected region into a plurality of sub regions.

Further, in a measurement microscope device according to yet another embodiment of the invention, the image connecting unit may be configured to specify a starting point of the connected region and a longitudinal length and a lateral length of the connected region in order to divide the connected region into a plurality of sub regions.

Further, in a measurement microscope device according to yet another embodiment of the invention, the image connecting unit may be configured to specify a starting point of the connected region and the numbers of observation images for connection and height images for connection in order to divide the connected region into a plurality of sub regions.

Further, in a measurement microscope device according to yet another embodiment of the invention, the measurement error region display unit may be configured to display an area with insufficient measurement light without measuring the height in a state where the measurement image formed by projecting the measurement light in the predetermined pattern is displayed on the display unit. With the above configuration, the user can perform the measurement after changing the imaging condition so as to measure a place of interest.

Further, in a measurement microscope device according to yet another embodiment of the invention, the measurement error region display unit may be configured to distinguish and display an area with insufficient measurement light by implementing measurement on the height in a state where the measurement image formed by projecting the measurement light in the predetermined pattern is displayed on the display unit. With the above configuration, after the height measurement has been implemented and the measurement result thereof has been checked, only when the place of interest has not been properly measured, the imaging condition is changed and remeasurement can be performed.

Further, in a measurement microscope device according to yet another embodiment of the invention, the measurement-image imaging condition may be adjusted in a state where the measurement error region is displayed by the measurement error region display unit on the observation image or the measurement image displayed on the display unit, and in a state where a height image acquired on the adjusted measurement-image imaging condition is further displayed on the display unit, the measurement error region is displayed by the measurement error region display unit on the height image, and the measurement-image imaging condition is readjusted, to generate the height image again.

Further, in accordance with yet another embodiment of the invention, there is provided an image generating method using a measurement microscope device which includes a first measurement light projecting unit configured to irradiate an object with first measurement light from a first direction, the unit being a measurement light projecting unit for projecting measurement light as predetermined pattern structured illumination to the object from an oblique direction, an observation illumination light source for generating illumination light when capturing an observation image, an imaging unit for acquiring measurement light projected by the first measurement light projecting unit and reflected by the object to capture a plurality of striped images, and using the observation illumination light source to capture an observation image having texture information, a height image acquiring unit for acquiring a height image having height information based on the plurality of striped images, a stage on which the object is placed, a display unit for displaying the height image or the observation image, and a measurement unit for performing measurement on the height image displayed on the display unit, and the method may include the steps of: moving the stage and capturing a different region including a connection margin by the imaging unit to acquire a height image for connection and an observation image for connection; superimposing and displaying a measurement error region, where a result of measurement of the height is error, on an image of the object corresponding to each region for connecting the height images for connection to one another; prompting, as necessary, adjustment of an imaging condition to an imaging condition that reduces the measurement error region in a state where the measurement error region is displayed; acquiring a height image for connection and an observation image for connection on the set imaging condition; and connecting the obtained plurality of height images for connection and observation images for connection, to generate a connected image. Accordingly, a plurality of images each having high accuracy but a narrow imageable visual field are captured while these images are connected, whereby it is possible to obtain an image with a wide visual field and high accuracy. In particular, by changing the imaging condition of the measurement image not used as the texture image rather than the observation image used as a texture image, it is possible to avoid a state where the appearance of the connected image changes significantly with respect to each area, while eliminating the measurement error region, so as to obtain a high quality connected image.

Further, in accordance with yet another embodiment of the invention, there is provided an operation program for a measurement microscope device which includes a first measurement light projecting unit configured to irradiate an object with first measurement light from a first direction, the unit being a measurement light projecting unit for projecting measurement light as predetermined pattern structured illumination to the object from an oblique direction, an observation illumination light source for generating illumination light when capturing an observation image, an imaging unit for acquiring measurement light projected by the first measurement light projecting unit and reflected by the object to capture a plurality of striped images, and using the observation illumination light source to capture an observation image having texture information, a height image acquiring unit for acquiring a height image having height information based on the plurality of striped images, and a stage on which the object is placed, wherein the program may cause a computer to realize: a display function for displaying the height image or the observation image; a measurement function for performing measurement on the height image displayed by the display function; an image connection function of moving the stage and capturing a different region including a connection margin by the imaging unit to acquire a height image for connection and an observation image for connection, and connecting the obtained plurality of height images for connection and observation images for connection to generate a connected image; a measurement error region display function of superimposing and displaying a measurement error region, where a result of measurement of the height is error, on an image of the object corresponding to each region for connecting the height images for connection to one another; and a function of prompting, as necessary, adjustment of an imaging condition to an imaging condition that reduces the measurement error region as necessary in a state where the measurement error region is displayed by the measurement error region display function. With the above configuration, the operability in alignment of a comparison reference image and a comparison target image is improved, and hence it is possible to facilitate the alignment, while facilitating arrangement of a profile line as a reference for performing a reference measurement in the same position, so as to improve the operability in comparison measurement.

A computer-readable recording medium according to yet another embodiment of the invention stores the above program. The recording medium includes a magnetic disk, an optical disk, a magneto-optical disk, a semiconductor memory, and the other medium capable of storing the program, such as a CD-ROM, a CD-R, a CD-RW, a flexible disk, a magnetic tape, an MO, a DVD-ROM, a DVD-RAM, a DVD-R, a DVD+R, a DVD-RW, a DVD+RW, a Blu-ray (trade name), and an HD-DVD (AOD). Further, the program includes, other than the program stored into the above recording medium and distributed, the program in the form of being distributed by downloading through a network line such as the Internet. Moreover, the recording medium includes equipment capable of recording the program, such as generalpurpose or dedicated equipment mounted with the program in the state of being executable in the form of software, firmware or the like. Furthermore, each process and function included in the program may be executed by program software executable by a computer, or a process of each section may be realized by a predetermined gate array (FPGA, ASIC, DSP) or in a mixed form of hardware such as program software and a partial hardware module that realizes an element of part of hardware.

BRIEF DESCRIPTION OF THE DRAWINGS

FIG. 42 is an image view showing one example of a report;

DETAILED DESCRIPTION OF PREFERRED EMBODIMENTS

Hereinafter, an embodiment of the present invention will be described based on the drawings. However, the embodiment shown below is to illustrate a measurement microscope device, an image generating method, a measurement microscope device operation program, and a computer-readable recording medium, for embodying a technical idea of the present invention, and the present invention does not specify a measurement microscope device, an image generating method, a measurement microscope device operation program, and a computer-readable recording medium to those described below. Further, the present specification is not to specify materials shown in the claims to material in the embodiment. In particular, dimensions, material properties, a shape, a relative arrangement and the like of constituent components described in the embodiment are not aimed at limiting the range of the present invention thereto, but are mere examples as long as a specific description is not particularly provided. Note that a size and a positional relation of a material shown in each figure may be emphasized for clarifying the description. Further, in the following description, the same name or numeral indicates an identical material or materials having the same properties, and a detailed description thereof will be omitted as appropriate. Moreover, each element constituting the present invention may be in an aspect where a plurality of elements are configured by the same material and the one material is thus used as the plurality of element, or on the contrary, each element can be realized by a function of one material being shared by a plurality of materials.

Moreover, in the present specification, a "height image" is used in the meaning of an image including height information, and for example, a three-dimensional composite image formed by pasting an observation image as texture information to a height image is also used in the meaning of an image included in the height image. Furthermore, a display form of the height image in the present specification is not limited to one displayed in a two-dimensional form, but includes one displayed in a three-dimensional form. For example, it is possible to convert the height information to a luminance or the like to display the height image as a two-dimensional image, or display the height information as Z-axis information to display the height image in a three-dimensional form.

First Embodiment

Figure 1:
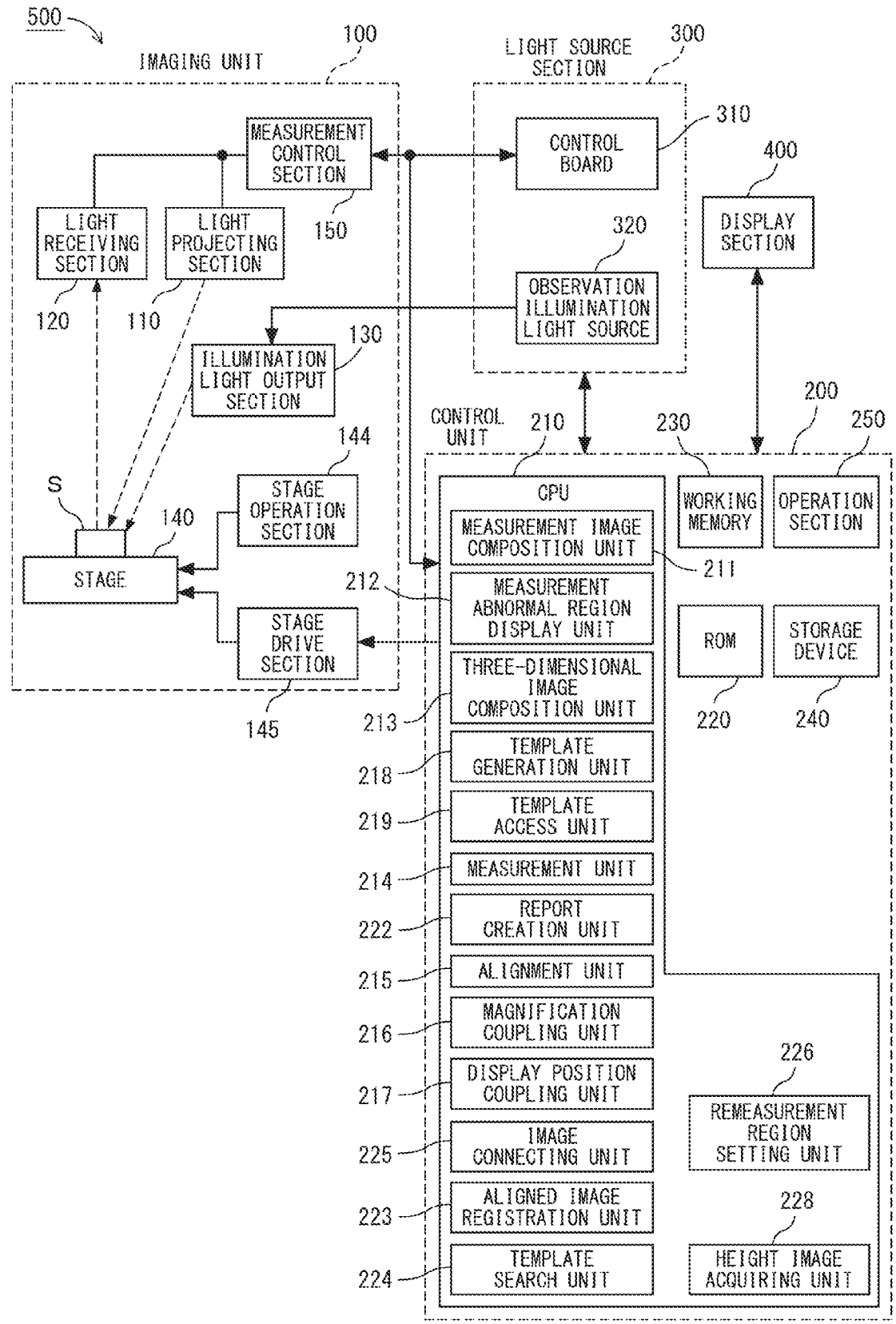
FIG. 1 is a block diagram showing a measurement microscope device according to one embodiment of the present invention.

FIG. 1 is a block diagram showing a configuration of a measurement microscope device according to a first embodiment of the present invention. As shown in FIG. 1, a measurement microscope device 500 is provided with an imaging unit 100, a control unit 200, a light source section 300 and a display section 400.

(Imaging Unit 100)

Figure 2:
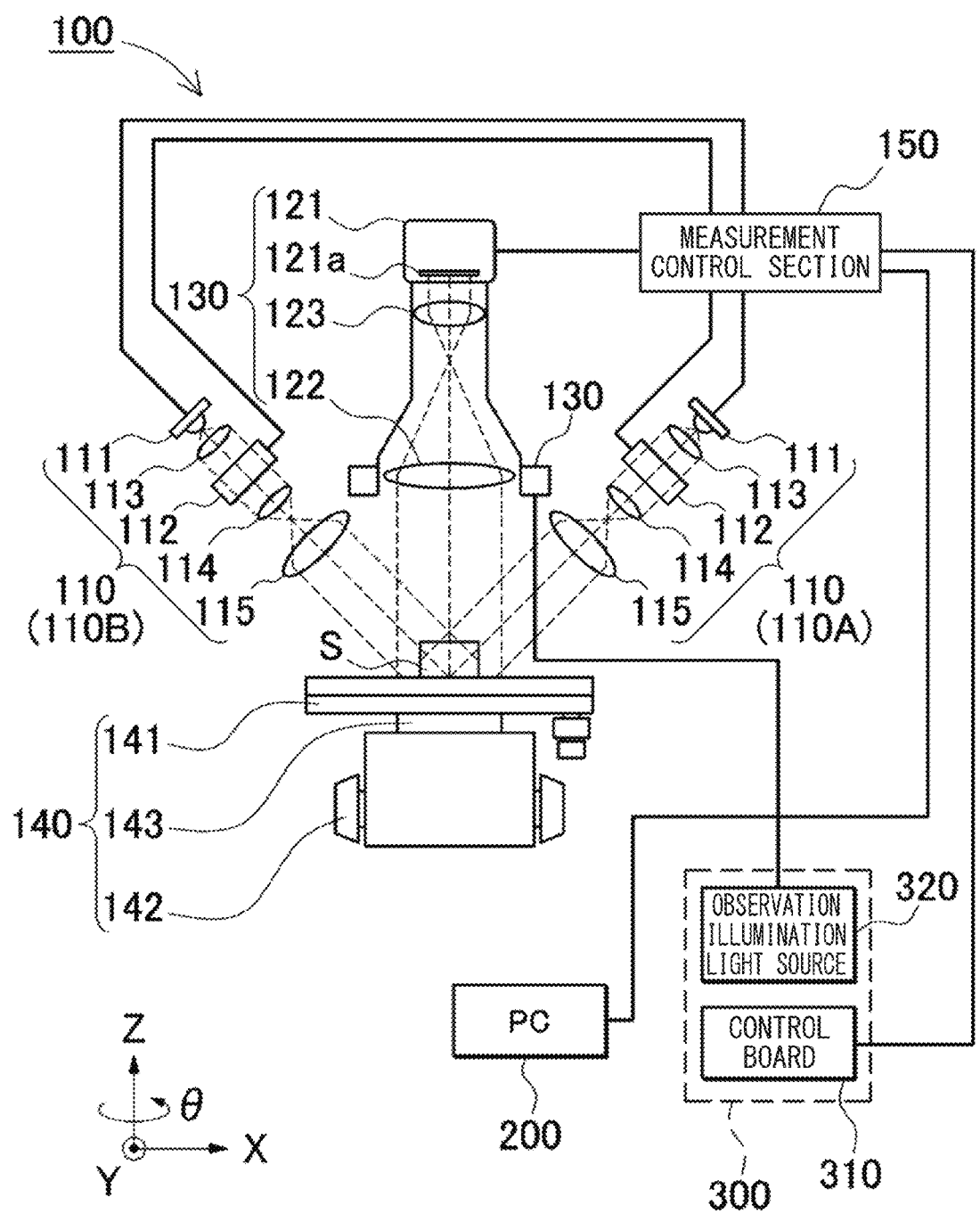
FIG. 2 is a block diagram showing a configuration of an imaging unit of FIG. 1.

A configuration of the imaging unit 100 of the measurement microscope device 500 of FIG. 1 is shown in a block diagram of FIG. 2. The imaging unit 100 is, for example, a microscope and includes a light projecting section 110, a light receiving section 120, an illumination light output section 130, a stage 140 and a measurement control section 150. The light projecting section 110 includes a measurement light source 111, a pattern generating section 112, and a plurality of lenses 113, 114 and 115. The light receiving section 120 includes a camera 121 and a plurality of lenses 122 and 123. An object S is placed on the stage 140.

(Light Projecting Section 110)

The light projecting section 110 is arranged obliquely above the stage 140. The imaging unit 100 may include a plurality of light projecting sections 110. In the example of FIG. 2, the imaging unit 100 includes two light projecting sections 110. Here, there are arranged a first measurement light projecting section 110A (right side in FIG. 2) capable of irradiating the object S with measurement illumination light from a first direction, and a second measurement light projecting section 110B (left side in FIG. 2) capable of irradiating the object S with measurement illumination light from a second direction different from the first direction. The first measurement light projecting section 110A and the second measurement light projecting section 110B are arranged symmetrically with an optical axis of the light receiving section therebetween. In addition, it is also possible to provide three or more light projecting sections, or relatively move the project section and the stage so as to project light with illumination directions thereof made different even by use of the common light projecting section. Further, although an illumination angle of the illumination light with respect to the vertical direction in which the light projecting section projects light is fixed in this example, this angle can be made variable.

(Measurement Light Source 111)

The measurement light source 111 of each of the first measurement light projecting section 110A and the second measurement light projecting section 110B is, for example, a halogen lamp which emits white light. The measurement light source 111 may be another light source such as a white LED (light-emitting diode) which emits white light. Light (hereinafter referred to as "measurement light") emitted from the measurement light source 111 is appropriately collected by a lens 113, and then incident on the pattern generating section 112.

The pattern generating section 112 is, for example, a DMD (digital micromirror device). The pattern generating section 112 may be an LCD (liquid crystal display), an LCOS (Liquid Crystal on Silicon: reflection liquid crystal element) or a mask. The measurement light incident on the pattern generating section 112 is converted into a previously set pattern and a previously set intensity (brightness), and then emitted. The measurement light emitted by the pattern generating section 112 is converted by the plurality of lenses 114 and 115 into light having a larger diameter than a visual field where the light receiving section 120 can be observed and measured, and then applied to the object S on the stage 140.

(Light Receiving Section 120)

The light receiving section 120 is arranged above the stage 140. The measurement light reflected by the object S to above the stage 140 is collected to form an image by the plurality of lenses 122 and 123 in the light receiving section 120, and then received by the camera 121.

(Camera 121)

The camera 121 is, for example, a CCD (charge-coupled device) camera including an imaging element 121a and a lens. The imaging element 121a is, for example, a monochrome CCD (charge-coupled device). The imaging element 121a may be another imaging element such as a CMOS (complementary metal oxide semiconductor) image sensor. Measurement resolution of a color imaging element is low as compared with that of the monochromic image element due to the need for making respective pixels correspond to light reception for red, green and blue, and the sensitivity deteriorates due to the need for providing a color filter in each pixel. Hence, in the present embodiment, the monochrome CCD is adopted as the imaging element and capturing is performed by irradiation with illumination respectively corresponding to RGB in a time-division manner from a below-mentioned illumination light output section 130, to thereby acquire a color image. With such a configuration, it is possible to acquire a color image of the measured object without deterioration in measurement accuracy.

Needless to say, the color imaging element may naturally be used as the imaging element 121a. In this case, although the measurement accuracy and the sensitivity deteriorate, there is no need for the time-division irradiation with illumination corresponding to respective RGB from the illumination light output section 130, and a color image can be acquired only by irradiation with white light, to thereby simply configure the illumination optical system. An analog electric signal (hereinafter referred to as "light-receiving signal") corresponding to a received light amount is outputted from each pixel of the imaging element 121a to the measurement control section 150.

(Measurement Control Section 150)

An A/D converter (analog/digital converter) and a FIFO (First In First Out) memory, not shown, are mounted on the measurement control section 150. A light-receiving signal outputted from the camera 121 is sampled in a fixed sampling period and converted into a digital camera by the A/D converter on the measurement control section 150 based on control by the light source section 300. Digital signals outputted from the A/D converter are sequentially stored into the FIFO memory. The digital signals stored into the FIFO memory are sequentially transferred to the control unit 200 as pixel data.

(Control Unit 200)

As shown in FIG. 1, the control unit 200 includes a CPU (Central Processing Unit) 210, a ROM (Read Only Memory) 220, a working memory 230, a storage device 240, and an operation section 250. A PC (personal computer) or the like is used as the control unit 200. Further, the operation section 250 includes a keyboard and a pointing device. As the pointing device, a mouse, a joystick or the like is used.

A system program is stored into the ROM 220. The working memory 230 is configured by a RAM (Random Access Memory), and used for processing various types of data. The storage device 240 is configured by a hard disk or the like. A measurement microscope device operation program and a three-dimensional image measurement program are stored into the storage device 240. Further, the storage device 240 is used for saving various types of data such as pixel data provided from the measurement control section 150.

Further, a storage device functions as a relative position storage unit. The relative position storage unit stores relative position information in a plane direction of a plane measurement tool with respect to an alignment image and relative position information in a plane direction and a height direction of a height measurement tool with respect to an alignment image.

The CPU 210 generates image data based on the pixel data provided from the measurement control section 150. Further, the CPU 210 performs a variety of processing on the generated image data by use of the working memory 230, and displays an image based on the image data on the display section 400. Moreover, the CPU 210 gives a driving pulse to a below-mentioned stage drive section 145. Further, this CPU can also realize a height image acquiring unit 228, a measurement image composition unit 211, a measurement error region display unit 212, a three-dimensional image composition unit 213, an alignment unit 215, a magnification coupling unit 216, a display position coupling unit 217, a template generation unit 218, a template calling unit 219, a report creation unit 222, an aligned image registration unit 223, a template search unit 224, an image connecting unit 225, and a remeasurement region setting unit 226, which will be described later.

Here, the height image acquiring unit 228 acquires a height image having height information based on a plurality of striped images. Further, the measurement image composition unit 211 combines a height image that is calculated from a first measurement image captured using the first measurement light projecting unit and a height image that is calculated from a second measurement image captured using the second measurement light projecting unit, with respect to the same object, to generate one composite height image. Further, the measurement error region display unit 212 is a material for superimposing and displaying a measurement error region where a measurement result is error, in a state where a measurement image is displayed on the display unit. Moreover, the alignment unit 215 is a material for moving or rotating an image such that a comparison target image and a comparison reference image have the same postures on the display section 400. On the other hand, the magnification coupling unit 216 is a material to serve such that, when a display magnification of one of the comparison reference image and the comparison target image is changed, a display magnification of the other image is similarly changed along with the above change. The display position coupling unit 217 is a material to serve such that, when a display position of one of the comparison reference image and the comparison target image is changed, a display position of the other image is similarly changed along with the above change. The template generation unit 218 is a material for saving as a template a measurement-image imaging condition held into the working memory 230. The template calling unit 219 is a material for selecting one or more desired templates saved in a template storage unit. The report creation unit 222 is a material for automatically creating a report displaying a measurement result of a measurement process performed on the height image by a measurement unit 214. The aligned image registration unit 223 is a material for registering as an alignment image a predetermined region in a template, which is the basis of a template generated by the template generation unit 218, at the time of saving this template in the template storage unit. The template search unit 224 is a material for searching a template consistent with or approximate to a predetermined condition out of a plurality of templates saved in the template storage unit. The image connecting unit 225 is a material for connecting a plurality of images captured in different positions to generate a connected image showing a wider connected region. The remeasurement region setting unit 226 is a material for changing a measurement-image imaging condition to make the setting for recapturing the whole or part of the images for connection which has failed to be captured.

As described above, the CPU 210 uses different units for realizing a variety of functions. Needless to say, it is not limited to the configuration of one material serving as a plurality of units, and it is possible to provide a plurality of materials, or respectively separate materials, for realizing respective units and functions.

(Display Section 400)

The display section 400 is a material for displaying a striped image acquired by the imaging unit 100, a height image generated by the height image acquiring unit 228 based on the striped image, or an observation image captured by the imaging unit 100. The display section 400 is configured, for example, by an LCD panel or an organic EL (electroluminescent) panel.

(Stage 140)

In FIG. 2, two directions, which are orthogonal to each other within a plane (hereinafter referred to as "placing surface") on the stage 140 to be placed with the object S, are defined as an X-direction and a Y-direction and respectively indicated by arrows X and Y. A direction orthogonal to the placing surface of the stage 140 is defined as a Z-direction and indicated as an arrow Z. A direction rotating around an axis parallel to the Z-direction is defined as a θ-direction, and indicated by an arrow θ.

The stage 140 includes an XY stage 141, a Z stage 142 and a θ stage 143. The XY stage 141 has an X-directional movement mechanism and a Y-directional movement mechanism. The Z stage 142 has a Z-directional movement mechanism. The θ stage 143 has a θ-directional rotation mechanism. The stage 140 is configured by the XY stage 141, the Z stage 142 and the θ stage 143. Moreover, the stage 140 further includes a fixed material (cramp), not shown, which fixes the object S to the placing surface. The stage 140 may further include a tilt stage having a mechanism rotatable around an axis parallel to the placing surface.

Stepping motors are used respectively for the X-directional movement mechanism, the Y-directional movement mechanism, the Z-directional movement mechanism and the θ-directional rotation mechanism of the stage 140. The X-directional movement mechanism, the Y-directional movement mechanism, the Z-directional movement mechanism and the θ-directional rotation mechanism of the stage 140 may be driven by a stage operation section 144 or a stage drive section 145 of FIG. 1.

By manually operating the stage operation section 144, the user can move the placing surface of the stage 140 in the X-direction, the Y-direction or the Z-direction, or rotate it in the θ-direction, relatively to the light receiving section 120. The stage drive section 145 supplies a current to the stepping motor of the stage 140 based on a driving pulse given from the control unit 200, and can thereby move the placing surface of the stage 140 in the X-direction, the Y-direction or the Z-direction, or rotate it in the θ-direction, relatively to the light receiving section 120.

Here, as shown in FIG. 2, a relative positional relation of the light receiving section 120, the light projecting section 110 and the stage 140 is set such that a central axis of each of the right-side and left-side light projecting sections 110 and a central axis of the light receiving section 120 intersect with each other on a focused flat surface of the stage 140 where light is most focused. Further, since the center of the rotational axis in the θ-direction agrees with the central axis of the light receiving section 120, when the stage 140 is rotated in the θ-direction, the object S is rotated around the rotational axis within the visual field without deviating from the visual field. Moreover, the X, Y, and θ-directional movement/rotation mechanisms and the tilt movement mechanism are supported with respect to the Z-directional movement mechanism. That is, it is configured that the central axis of the light receiving section 120 and the movement axis in the Z-direction are not displaced even when the stage 140 is in the state of being rotated in the θ-direction or being tilted. With this stage mechanism, even in a state where the position or the posture of the object S has been changed, it is possible to move the stage 140 in the Z-direction and capture a plurality of images at different focus points, so as to combine the images. While the description has been given by taking as one example the electric stage drivable by the stepping motor in the present embodiment, the stage may be a manual stage that can be moved only by hand.

(Light Source Section 300)

The light source section 300 includes a control board 310 and an observation illumination light source 320. The control board 310 is mounted with a CPU, not shown. The CPU of the control board 310 controls the light projecting section 110, the light receiving section 120 and the measurement control section 150 based on a command from the CPU 210 of the control unit 200. Note that this configuration is one example, and another configuration may be formed. For example, the light projecting section 110 and the light receiving section 120 may be controlled by the measurement control section 150, or the light projecting section 110 or the light receiving section 120 may be controlled by the control unit 200, and the control board may be omitted. Alternatively, this light source section 300 can be provided with a power supply circuit for driving the imaging unit 100.

(Observation Illumination Light Source 320)

The observation illumination light source 320 includes three colors of LEDs that emit red light, green light and blue light, for example. Controlling a luminance of light emitted from each LED allows generation of light of an arbitrary color from the observation illumination light source 320. Light (hereinafter referred to as "illumination light") generated from the observation illumination light source 320 is outputted from an illumination light output section 130 of the imaging unit 100 through the light-guiding material (light guide). Note that, as the observation illumination light source, a light source other than the LED, such as a semiconductor laser (LD), halogen light or an HID, may be used as appropriate. In particular, when an element imageable in color is used as the imaging element, a white light source can be used for the observation illumination light source.

The object S is irradiated with the illumination light outputted from the illumination light output section 130 by switching among the red light, the green light and the blue light in a time-division manner. It is thereby possible to combine observation images respectively captured by these RGB light, so as to obtain a color observation image and display it in the display section 400.

In displaying the color observation image as described above, when a switch frequency for switching the color of the illumination light is matched with a frame rate at the time of updating display contents (rewriting the screen) on the display section 400, flickering becomes obvious in the case of the frame rate being low (e.g. the order of several Hz). In particular, when the color is conspicuously switched among the RGB primary colors, this may annoy the user. The problem like this can be avoided by making a switch frequency, with which the RGB illumination light is switched, a high speed to such a degree as to be unrecognizable by the user with the eyes (e.g. several hundred Hz). The color of the illumination light is switched by the illumination light output section 130 or the like. Further, the timing for actually capturing the object S by the imaging unit 100 while switching RGB of the illumination light at a high speed is the timing for updating the display contents of the display section 400. That is, the timing for capturing the observation image and the timing for switching the illumination light need not to be completely matched with each other, but may be linked to each other to such a degree that the RGB observation images can be captured by the imaging element, in other words, such that a switching period for the RGB illumination light is a multiple of an imaging period. With this method, it is possible to accelerate the timing for switching the illumination light, so as to reduce annoyance of the user without improving the frame rate processible by the imaging element 121*a*.

In the example of FIG. 1, the observation illumination light source 320 is arranged in the light source section 300, as an external attachment to the imaging unit 100. This facilitates improvement in quality of observed light supplied from the observation illumination light source 320. For example, since light distribution property among the LEDs of RGB constituting the observation illumination light source 320 is different, when the RGB observation images are respectively captured by the monochrome imaging element 121*a*, color irregularities occur within a visual field if nothing is done. Threat, dedicated optical systems in accordance with the light distribution properties of the respective LEDs are individually prepared and combined, to absorb the difference in light distribution property and generate uniform white illumination without color irregularities, which can then be introduced to the imaging unit 100. Further, it is possible to avoid a state where heat generation of the observation illumination light source 320 affects the optical system of the imaging unit 100. It is also possible to provide the observation illumination light source in the imaging unit by using an observation illumination light source with a small heating value, or providing an appropriate heat radiation mechanism on the imaging unit side, or by some other way. In this case, it is possible to obtain the advantage of eliminating the need for a light-guiding material for optically connecting the light source section with the imaging unit, so as to simplify the configuration.

Although the measurement light projecting unit is integrated with the measurement light source in the example of FIG. 1, the light source of the measurement light projecting unit is not limited to the configuration of being provided in the imaging unit, but can be an external attachment. For example, the light source of the measurement light projecting unit and the observation illumination light source can be arranged together in the light source section.

The illumination light output section 130 of FIG. 2 has a ring shape, and is arranged above the stage 140 so as to surround the light receiving section 120. The object S is irradiated with illumination light in the ring shape from the illumination light output section 130 such that a shadow is not generated.

(Example of GUI of Measurement Microscope Device Operation Program)

Figure 3:
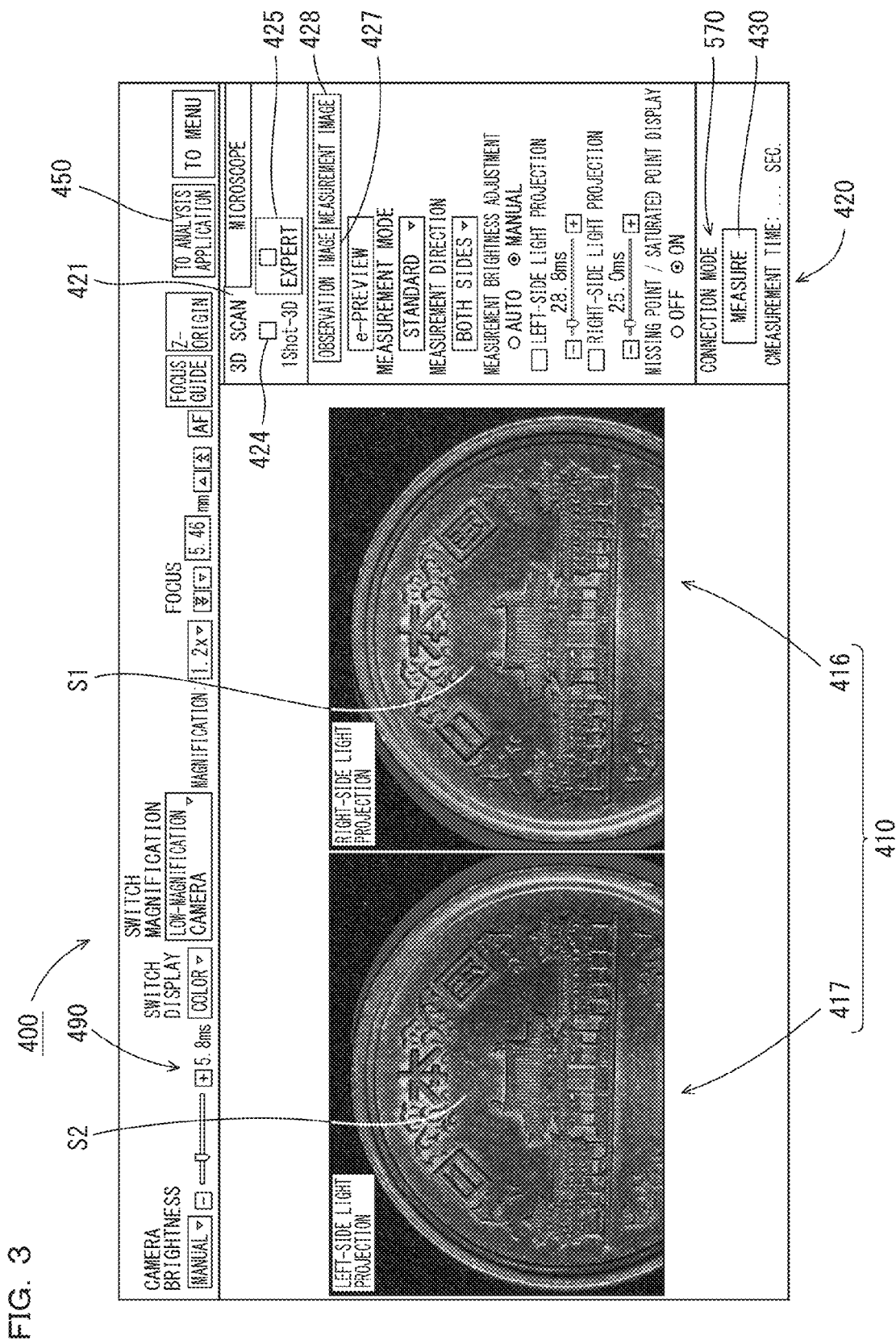
FIG. 3 is an image view showing one example of a GUI of a measurement microscope device operation program.

In the measurement microscope device, an operation program for operating the measurement microscope device 500 has been installed in the PC as the control unit 200. A GUI (Graphical User Interface) for operating the measurement microscope device operation program is displayed on the display section 400. FIG. 3 shows one example of such a GUI screen. In this example, in the display section 400, a first measurement image S1 of the object S irradiated with the first measurement light from the first measurement light projecting section 110A and a second measurement image S2 of the object S irradiated with the second measurement light from the second measurement light projecting section 110B are displayed so as to be arranged side by side. These first measurement image S1 and second measurement image S2 are images based on which the height image is computed and generated by the height image acquiring unit 228, and do not yet have height information at this time. In this example, a first display region 416 and a second display region 417 are provided respectively on the right side and the left side of an image display region 410 provided on the left side of the display section 400. With such a two-screen display, the states of the measurement images obtained by the respective measurement light, in particular, shaded regions and the like, can be checked as being compared with each other. Note that the example of dividing the image display region is not limited to the configuration of images displayed on the right and left as described above, but an arbitrary configuration can be used as appropriate, such as a configuration of vertically aligned images or a configuration of images as being different screens.

(Measurement Light Brightness Individual Adjustment Unit 442)

In an operation region 420 of the display section 400, two brightness adjustment sliders 444 and 446 are provided as a measurement light brightness individual adjustment unit 442. The brightness adjustment sliders 444 and 446 adjust brightness of the respective measurement light projecting units by means of sliders respectively movable in the horizontal direction. Here, the first measurement light projecting section 110A and the second measurement light projecting section 110B are made individually adjustable by the brightness adjustment sliders 444 and 446, respectively. A position of the brightness adjustment slider 444 corresponds to brightness of the measurement light emitted from the first measurement light projecting section 110A or camera exposure time at the time of shooting an image by the measurement light from the first measurement light projecting section 110A. Further, a position of the brightness adjustment slider 446 corresponds to brightness of the measurement light emitted from the second measurement light projecting section 110B or camera exposure time at the time of shooting an image by the measurement light from the second measurement light projecting section 110B. By operating the operation region 420 provided in the GUI by means of the operation section 250 of the control unit 200 of FIG. 1 to move the brightness adjustment slider 444 in the horizontal direction, the user can change the brightness of the measurement light emitted from the first measurement light projecting section 110A or the camera exposure time corresponding to the first measurement light projecting section 110A. Similarly, by operating the operation section 250 to move the brightness adjustment slider 446 in the horizontal direction, the user can change the brightness of the measurement light emitted from the second measurement light projecting section 110B or the camera exposure time corresponding to the second measurement light projecting section 110B.

As described above, in the image display regions 410, images of the object S in the case of being irradiated with the measurement light respectively from the first measurement light projecting section 110A and the second measurement light projecting section 110B can be displayed so as to be arranged side by side. Hence, by respectively moving the positions of the brightness adjustment sliders 444 and 446 while viewing the images of the object S displayed on the image display region 410, the user can appropriately adjust the brightness of the measurement light emitted from each of the first measurement light projecting section 110A and the second measurement light projecting section 110B or the camera exposure time corresponding to each of the light projecting sections.

Further, there may be a correlation between the appropriate brightness of the measurement light emitted from each of the first measurement light projecting section 110A and the second measurement light projecting section 110B and the appropriate brightness of the illumination light emitted from the illumination light output section 130, or between the camera exposure time corresponding to each of the illumination. In this case, the brightness of the measurement light emitted from each of the first measurement light projecting section 110A and the second measurement light projecting section 110B or the camera exposure time corresponding to each of the light projecting sections may be automatically adjusted based on the brightness of the illumination light emitted from the illumination light output section 130 or the camera exposure time corresponding to the illumination light.

Alternatively, an adjustment guide may be displayed on the display section 400, the guide serving to make the brightness of the measurement light emitted from each of the first measurement light projecting section 110A and the second measurement light projecting section 110B or the camera exposure time corresponding to each of the light projecting sections appropriate based on the brightness of the illumination light emitted from the illumination light output section 130 or the camera exposure time corresponding to the illumination light. In this case, by respectively moving the positions of the brightness adjustment sliders 444 and 446 based on the adjustment guide, the user can appropriately adjust the brightness of the measurement light emitted from each of the first measurement light projecting section 110A and the second measurement light projecting section 110B or the camera exposure time corresponding to each of the light projecting sections.

When the light irradiation direction varies, the light reflection direction also varies, and hence the brightness of the image obtained as a result varies depending on the light irradiation direction even when the same area is irradiated. That is, the brightness of the measurement light or the exposure time for the imaging element, which is suitable for the measurement, varies depending on the irradiation direction. In the present embodiment, the brightness of each of the images which have been captured by irradiation with the light from the plurality of light projecting sections, the first measurement light projecting section 110A and the second measurement light projecting section 110B, is made individually adjustable. Hence, it is possible to set the appropriate brightness of the measurement light or exposure time with respect to each irradiation direction. Further, since the image with its brightness under adjustment is displayed while being updated in the image display region 410, it is possible to adjust the brightness while checking the image after the adjustment. At this time, it is also possible to more clearly display whether or not the brightness has been adjusted appropriately for the user by distinguishably displaying a portion being so bright as to be over-exposed and a portion being so dark as to be under-exposed in the image displayed on the image display region 410.

(Measurement Image Composition Unit 211)

Returning to FIG. 1, the measurement image composition unit 211 of the control unit 200 combines the first measurement image acquired by the imaging unit 100 by use of the first measurement light projecting section 110A and the second measurement image acquired by the imaging unit 100 by use of the second measurement light projecting section 110B, with respect to the same object S, to generate one composite height image. As a method for generating the composite height image, for example, the image can be configured using a pixel of a higher pixel value out of pixels to which the first measurement image and the second measurement image correspond (maximum measurement image). Alternatively, the image may be configured using an average of pixel values of the pixels to which the first measurement image and the second measurement image correspond (average measurement image). Alternatively, the image can also be configured using a pixel of a lower pixel value out of the pixels to which the first measurement image and the second measurement image correspond (minimum measurement image).

(Measurement Error Region Display Unit 212)

The measurement error region display unit 212 superimposes and displays a measurement error region where a measurement result obtained by either the first measurement light projecting section 110A and the second measurement light projecting section 110B is error, in a state where the composite height image generated by the measurement image composition unit 211 is displayed on the display section 400 (see FIG. 8 and the like described later).

(Measurement Error Region)

Here, the measurement error region includes an unmeasurable region where a height measurement itself cannot be performed, a saturated region where the measurement can be performed but the obtained data is saturated and the accuracy is thus poor, and an interpolation region which cannot be measured but can be interpolated by means of ambient information. As opposed to this, a region where the height information is measurable is referred to as a normal region.

(Unmeasurable Region)

The unmeasurable region refers to a region which is shaded by the measurement light by either measurement light projecting unit and in which data, namely, the luminance of the reflected light, cannot be acquire by the imaging unit 100. By distinguishing the region from the normal region in this manner, the region not measurable by either measurement light projecting unit can be grasped as distinguished from the region measurable by either measurement light projecting unit, so as to contribute to the user performing the setting operation for the measurement-image imaging condition.

(Saturated Region)

Further, the saturated region refers to a region where the luminance of the reflected light of the measurement light which is detected by the imaging unit 100 is saturated by either measurement light projecting unit. Note that, even if the luminance level of the reflected light is saturated, some degree of the measurement result is obtained when turning-on/off of the reflected light can be distinguished. However, the data reliability is inferior as compared with a point where the luminance is not saturated. This may cause deterioration in accuracy at the time of the measurement, and hence the region is distinguished from the normal region.

(Interpolation Region)

Moreover, the interpolation region refers to a region where the height information is not measurable but the interpolation is possible using luminance information of other pixels located around the pixel. In addition, to what degree of range the ambient pixels are used is previously defined. Further, for example, the user may be allowed to arbitrarily specify the number of ambient pixels to be used.

Although the interpolation region and the saturated region are both inferior to the normal region in terms of reliability of the height information, the height information of a sort can be obtained therein, and hence these regions can be used depending on the purpose of the use. Further, not only when the measurement is performed but when a measurement image is displayed, for example, these regions can be used as appropriate since displaying an image of some sort facilitates grasping of the image rather than displaying a partially missing image.

Moreover, the unmeasurable region is not limited to these regions, but may be a region including multiple reflection, penetration of light, or the like. It should be noted that in the present specification, the "region" is not necessarily limited to a linear shape or a planar shape having a certain area, but may be used in the meaning of including a point or a set of points.

Moreover, the measurement error region display unit 212 is capable of highlighting the unmeasurable region, the saturated region or the interpolation region in each different aspect, and superimposing and displaying it on the display section 400. Hence the region where the measurement is not possible, the region where the measurement is possible but saturation occurs and the accuracy is thus poor, or the interpolated region can be visually grasped as distinguished from the normal region, so as to contribute to the user performing the setting operation for the measurement-image imaging condition. Even when a shadow or a saturated measurement error point is identified by means of one measurement light projecting unit, it has not hitherto been possible to distinguish whether it is a case where there is no problem of forming a composite height image and leaving the measurement error point as it is since it can be properly measured by the other measurement light projecting unit, or a case where it cannot be measured by the other measurement light projecting unit and cannot be properly measured even using the composite height image. As opposed to this, according to the present embodiment, when a plurality of measurement light projecting units are used, it is possible to specifically identify on the composite height image on one screen which part has become measurable and which part remains unmeasurable, while reducing a region that becomes unmeasurable, thereby facilitating adjustment of the measurement-image imaging condition so as to reduce the unmeasurable region and dramatically improving the usability of the user. The measurement error region display unit 212 can superimpose and display as the saturated region a region where data measured by the first measurement light projecting section 110A or the second measurement light projecting section 110B is saturated in a different aspect from the unmeasurable region, in a state where the composite height image generated by the measurement image composition unit 211 is displayed on the display section 400.

As described above, information regarding the region measurable by a plurality of measurement light projecting units and the region unmeasurable thereby can be gathered on one screen and displayed in the aspect of facilitating visual grasping, so as to contribute to the setting and adjustment of the measurement-image imaging condition.

Although the example has been described where the measurement error region is superimposed and displayed by the measurement error region display unit 212 on a composite height image SG, the present invention is not limited thereto, and the measurement error region can be superimposed and displayed on each of the first measurement image and the second measurement image. For example, in a below-mentioned example of FIG. 9, the unmeasurable region and the saturated region are superimposed and displayed on the first measurement image S1 obtained only by the second measurement light projecting section 110B. As described above, other than simply displaying the unmeasurable region and the saturated region generated by the single measurement light projecting unit, a measurement result obtained by the other measurement light projecting unit is also added and only the region unmeasurable or saturated by either measurement light projecting unit can be highlighted and displayed as in the case of the above composite height image, so as to facilitate appropriate adjustment of the setting of the measurement-image imaging condition.

Further, although the example has been described above where the unmeasurable region or the saturated region is superimposed and displayed on the measurement image by the measurement error region display unit 212, the present invention is not limited thereto, and the unmeasurable region or the saturated region can be similarly superimposed and displayed on the observation image.

Moreover, although the region having become an unmeasurable point, a saturated point or an interpolated point due to either measurement light projecting unit is displayed as the unmeasurable region or the saturated region in the above example, this can also be displayed while distinguishing which measurement light projecting unit has caused the region to become the unmeasurable point or the saturated point. For example, a first unmeasurable region made unmeasurable by the first measurement light projecting section 110A is displayed in light red, and a second unmeasurable region made unmeasurable by the second measurement light projecting section 110B is displayed in dark red. Similarly, the measurement image is colored by the measurement error region display unit 212 such that a first saturated region saturated by the first measurement light projecting section 110A is displayed in light yellow, and a second saturated region saturated by the second measurement light projecting section 110B is displayed in dark yellow. Moreover, such a highlighting process where the measurement light projecting units are distinguished can be performed on the composite height image SG other than being performed on the first measurement image and the second measurement image. In this manner, the unmeasurable region and the saturated region can be visually distinguished, and can be referenced in adjustment of how to place the object S or how to apply the measurement light, and the like.

For example, at the time of adjusting the brightness of the first measurement image by the first measurement light projecting section 110A, by respectively displaying the first unmeasurable region and the first saturated region which are shaded and saturated due to the first measurement light projecting section 110A in dark red and dark yellow, while respectively displaying the second unmeasurable region and the second saturated region due to the second measurement light projecting section 110B in light red and light yellow, a region measurable by the other measurement light projecting unit (here the second measurement light projecting section 110B), in other words, a region that compensates the defect of the first measurement image, is added, and an environment is provided which facilitates adjustment to optimize the measurement-image imaging condition so as to reduce the unmeasurable or saturated region.

Needless to say, each of the colors colored by the measurement error region display unit 212 in the foregoing embodiment is one example, and other colors can be used as appropriate. Further, the measurement error region display unit 212 is not limited to the aspect of highlighting the measurement error region, but is also capable of making the region invisible. Although the measurement image composition unit 211, the measurement error region display unit 212 and the below-mentioned three-dimensional image composition unit 213 are the units of the CPU in the control unit 200 in the example of FIG. 1, the present invention is not limited to this configuration, and these units can be configured by dedicated materials.

(Measurement Microscope Device Operation Program)

Figure 4:
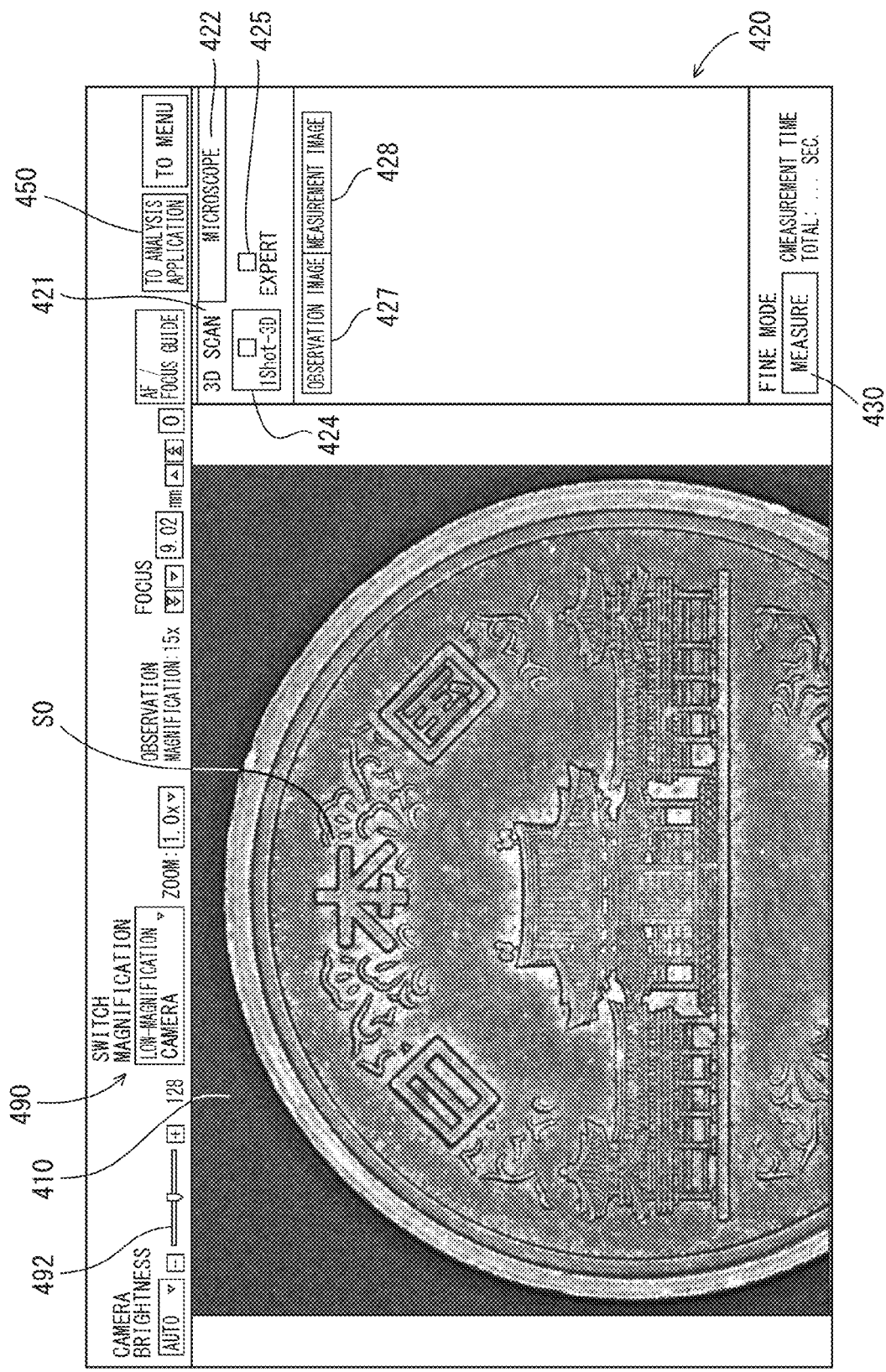
FIG. 4 is an image view showing a state where a simple mode has been selected in the GUI of the measurement microscope device operation program.
Figure 5:
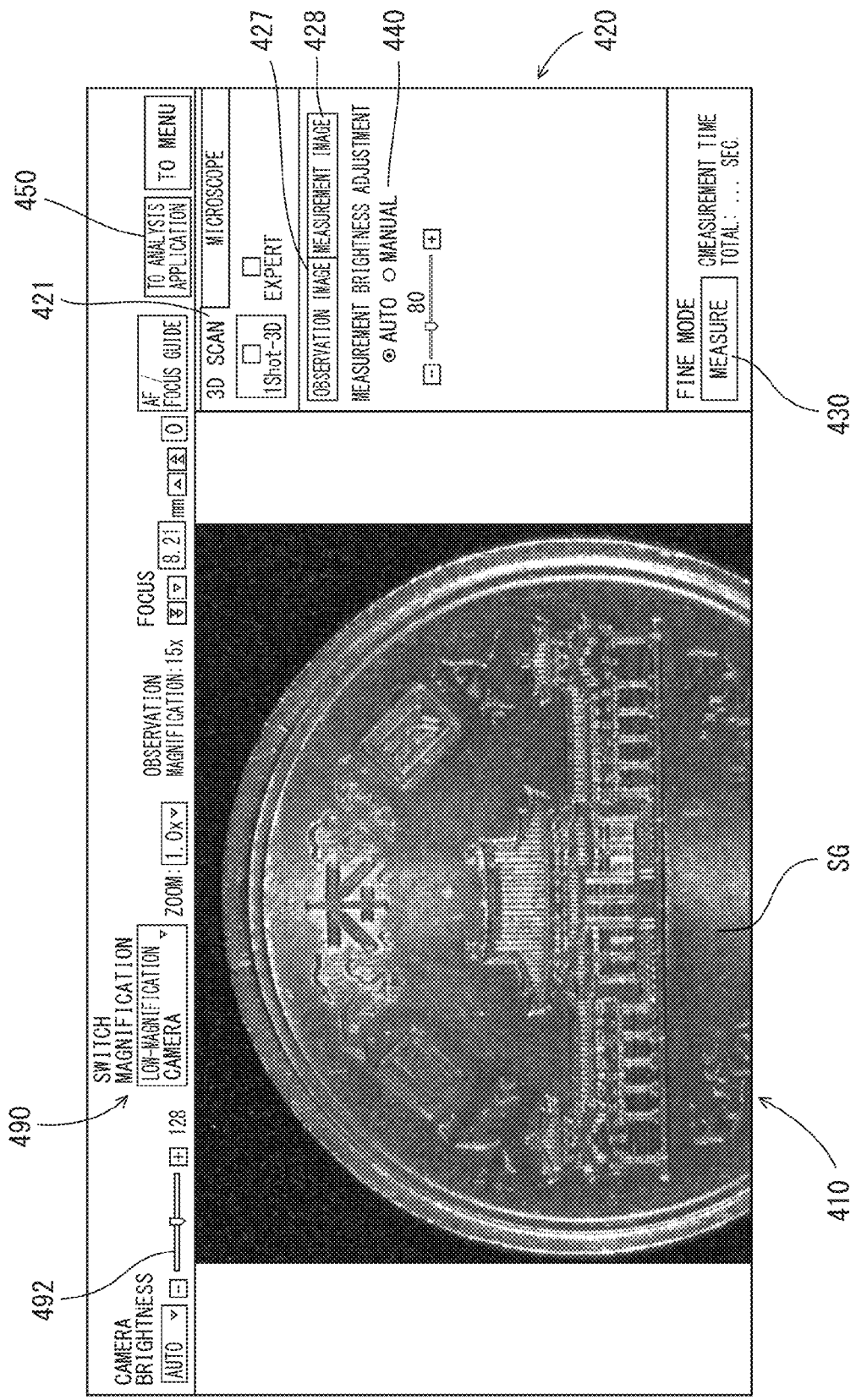
FIG. 5 is an image view showing a state where a "Measurement Image" button has been pressed in the state of FIG. 4.
Figure 6:
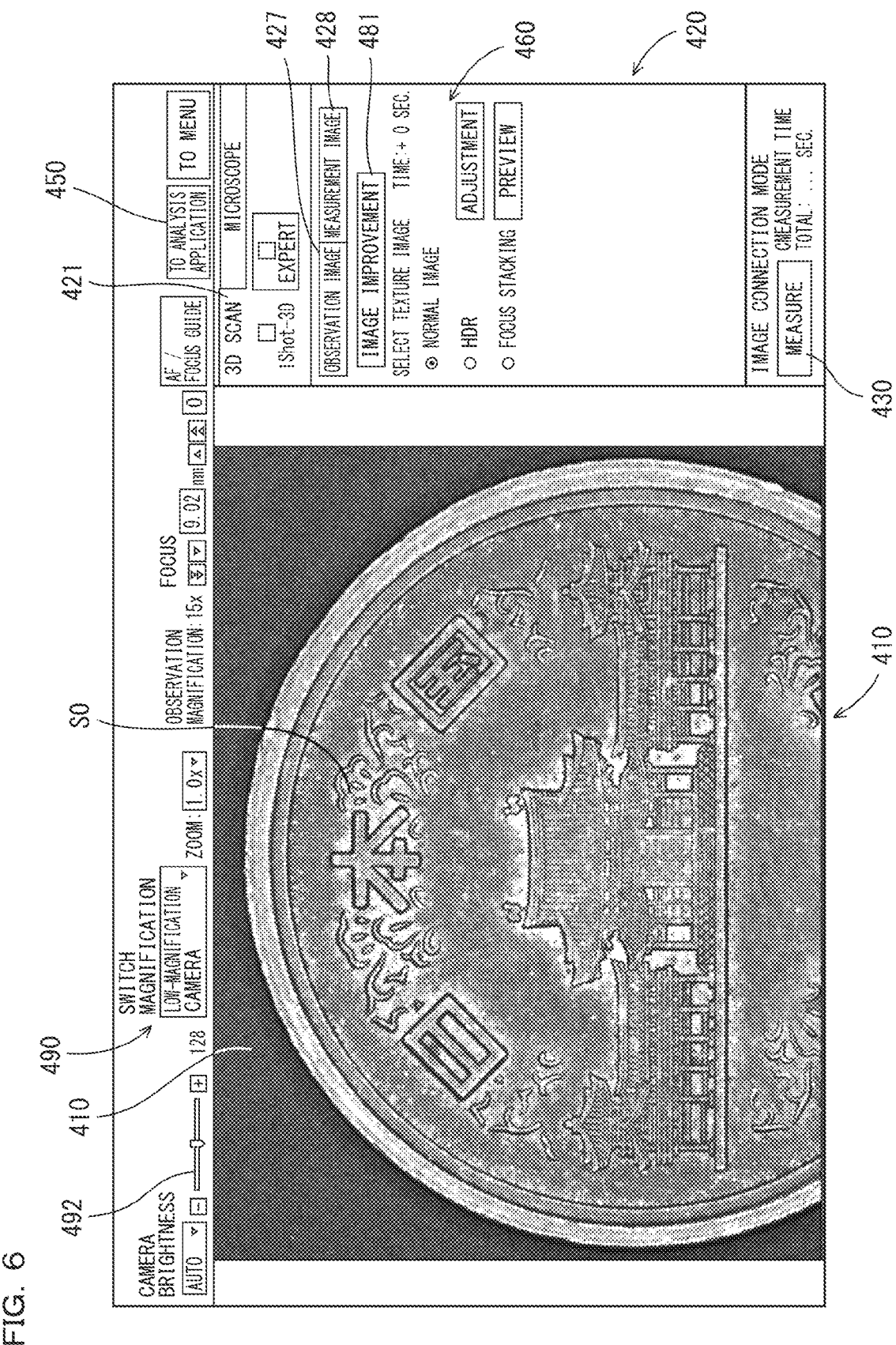
FIG. 6 is an image view showing a state where an application mode has been selected in the state of FIG. 4.
Figure 7:
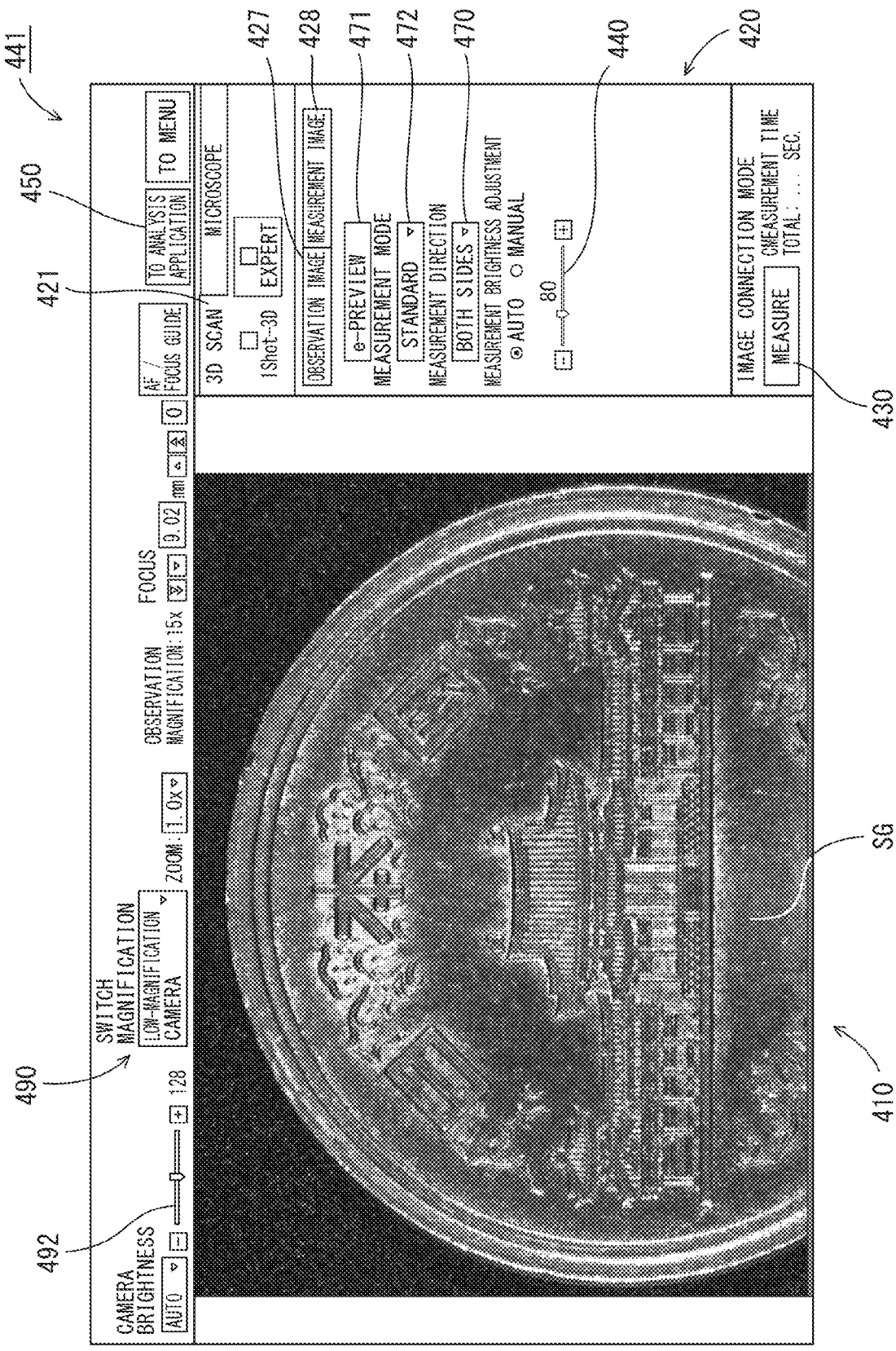
FIG. 7 is an image view showing a state where the "Measurement Image" button has been pressed in the state of FIG. 4.

As described above, in the example of FIG. 1, the operation program for operating the measurement microscope device 500 has been installed in the PC as the control unit 200. In a state where this measurement microscope device operation program is executed and a GUI screen thereof is displayed on the display section 400, the user operates a mouse or a keyboard as an operation section to set a variety of conditions, and can thus acquire a height image having height information. FIGS. 3 and 4 to 9 each show a user interface (GUI) screen of the measurement microscope device operation program. In these figures, FIG. 4 is an image view showing a state where a simple mode has been selected in the GUI of the measurement microscope device operation program, FIG. 5 is an image view showing a state where a "Measurement Image" button 428 has been pressed in the state of FIG. 4, FIG. 6 is an image view showing a state where an application mode has been selected in the state of FIG. 4, FIG. 7 is an image view showing a state where the "Measurement Image" button 428 has been pressed in the state of FIG. 6, FIG. 8 is an image view showing a state where the image display region 410 is divided and displayed in the state of FIG. 7, and FIG. 9 is an image view showing a state where a measurement direction, "Only Left-Side", has been selected in the state of FIG. 7. Moreover, on each GUI screen, the image display region 410 for displaying the measurement image, the height image and the observation image is provided, and on the right side of the image display region 410, the operation region 420 is provided which collectively includes buttons for performing a variety of operations and the like.

(Image Display Region 410)

On the image display region 410, the observation image, the measurement image and the height image can be displayed. In particular, other than displaying the acquired and captured height image and the observation image with high resolutions, it is possible to simply capture a preview image of an observation image which is to be obtained in the case of capturing the object S as the object to be captured on the currently set observation-image imaging condition, or computing a preview image of a height image which is to be obtained in the case of capturing the object S on the currently set measurement-image imaging condition, and display the preview image on the display section 400. Further, when a change is made in the observation-image imaging condition or the measurement-image imaging condition, the preview image is updated in real time in accordance with the change, and hence the user can perform the setting operation for the observation-image imaging condition or the measurement-image imaging condition while comparing and referencing to changes in height image and observation image displayed on the image display region 410 before and after the setting. That is, as being able to immediately reflect and check the currently set parameter and a picture image which is to be obtained when captured at the position of the object S, it is possible to facilitate setting of the observation-image imaging condition or the measurement-image imaging condition visually in line with a picture image desired by the user.

Here, the observation image in the present specification means a simply captured preview image and an image captured on a normal condition. On the other hand, as for the height image, a plurality of striped images are captured by the stripe projection method using striped measurement light projected in accordance with a predetermined structured measurement light pattern and these images are analyzed by the height image acquiring unit 228, to generate a height image having height information. Here, in order to obtain a high-definition height image, it is necessary to obtain a striped image in a state where the object is irradiated with the measurement light at all points of the surface thereof to the extent possible. In other words, it is desirable to bring the image into a state where generation of shadows is minimized while the measurement light is projected. For this reason, in order to estimate a shadow generated region, all-projection, which is projection of light to the object with all pixels in an on-state, is performed by the pattern generating section 112, to obtain a measurement image, and the obtained image is displayed on the display section. This measurement image is a preview image only for checking how the shadow is generated and the like so as to properly capture the striped image and further to properly acquire the height image. Moreover, the measurement image itself does not have height information since it is in a state before normal imaging. However, it is effective as the preview image for properly obtaining the height image. In particular, since a shadow is hard to view in the single striped image due to its striped pattern and the like, at the time of capturing a striped image required for generating the height image, it is effective to display the measurement image and check the imaging condition in accordance with how the image is viewed. Since the imaging condition for capturing the striped image is substituted by the measurement image at the time of generating the height image, it is herein referred to as a measurement-image imaging condition.

(Division Display Function)

Further, the display section 400 is provided with a division display function, and the image display region 410 can be divided into two or more screens other than the aspect of displaying one image. For example, in the example of FIG. 8, a first division display region 411 having a slightly wider area is provided on the left side of the image display region 410, and the right side of the image display region 410 having a slightly narrower area is vertically divided into two sections, i.e., a second division display region 412 and a third division display region 413. An aspect ratio of each of the first division display region 411 to the third division display region 413 is preferably the same. Further, at this time, the first division display region 411 is provided with masks on the top and the bottom so as to adjust the aspect ratio thereof to be the same as the aspect ratios of the second division display region 412 and the third division display region 413.

In order to divide and display the image display region 410, for example, as shown in FIG. 7, a "3D Scan" tab 421 is selected by an image mode switching unit, an "Expert" button 425 is selected by a measurement image acquiring mode selection unit, and a "Manual" button in a "Measurement Brightness Adjustment" field 440 is selected in the state where "Both Sides" is selected in a "Measurement Direction" selection field 470. Hence, the screen is divided into three screens and displayed as shown in FIG. 8. Further, when an "Auto" button is selected in the "Measurement Brightness Adjustment" field 440, the division display is canceled, and the image display region 410 returns to the one-screen display as shown in FIG. 7. Further, each division region can be added with a type display field 415 displaying a type of an image on display. In the example of FIG. 8, a type such as "Right/Left Composition", "Left-Side Light Projection" or "Right-Side Light Projection" is displayed in characters as the type display field 415 in the upper left of each division display region, to facilitate identification of each image. Further, an icon indicating the direction of the measurement light may be displayed on the type display field 415 on top of, or in place of, the character string. In the example of FIG. 8, on the left side of the character string, the icon is displayed which illustrates the measurement light projecting unit and extension of the measurement light projected therefrom, thus facilitating the user's visual understanding of display contents of each division display region.

Note that the aspect of dividing the image display region into three sections is not limited to the foregoing example, and a variety of aspects can be used as appropriate, such as uniformly dividing the image display region into three sections to respectively display the composite height image, the first measurement image and the second measurement image, or displaying the respective measurement images in separate windows.

Figure 8:
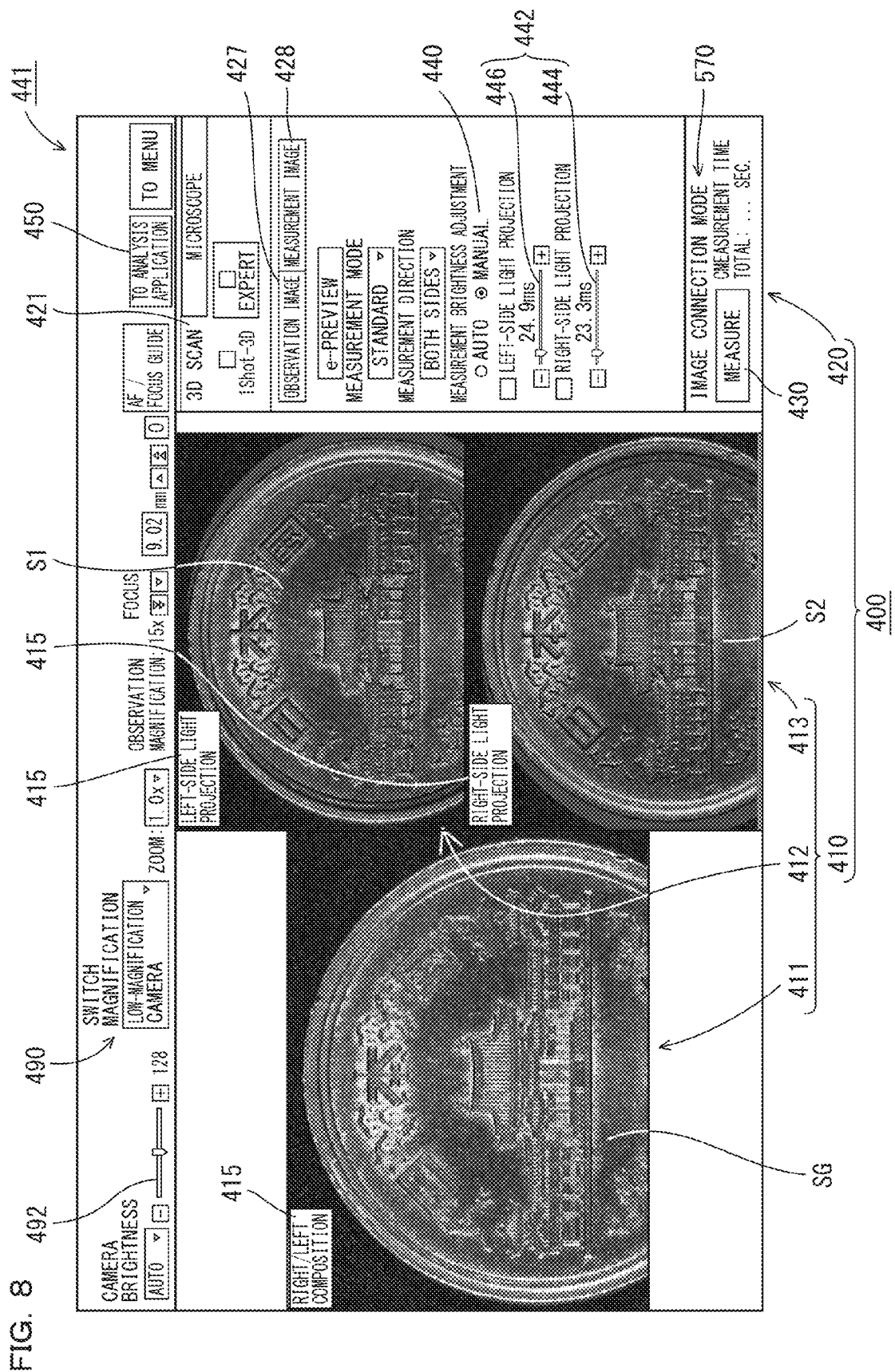
FIG. 8 is an image view showing a state where an image display region is divided and displayed in the state of FIG. 7.
Figure 9:
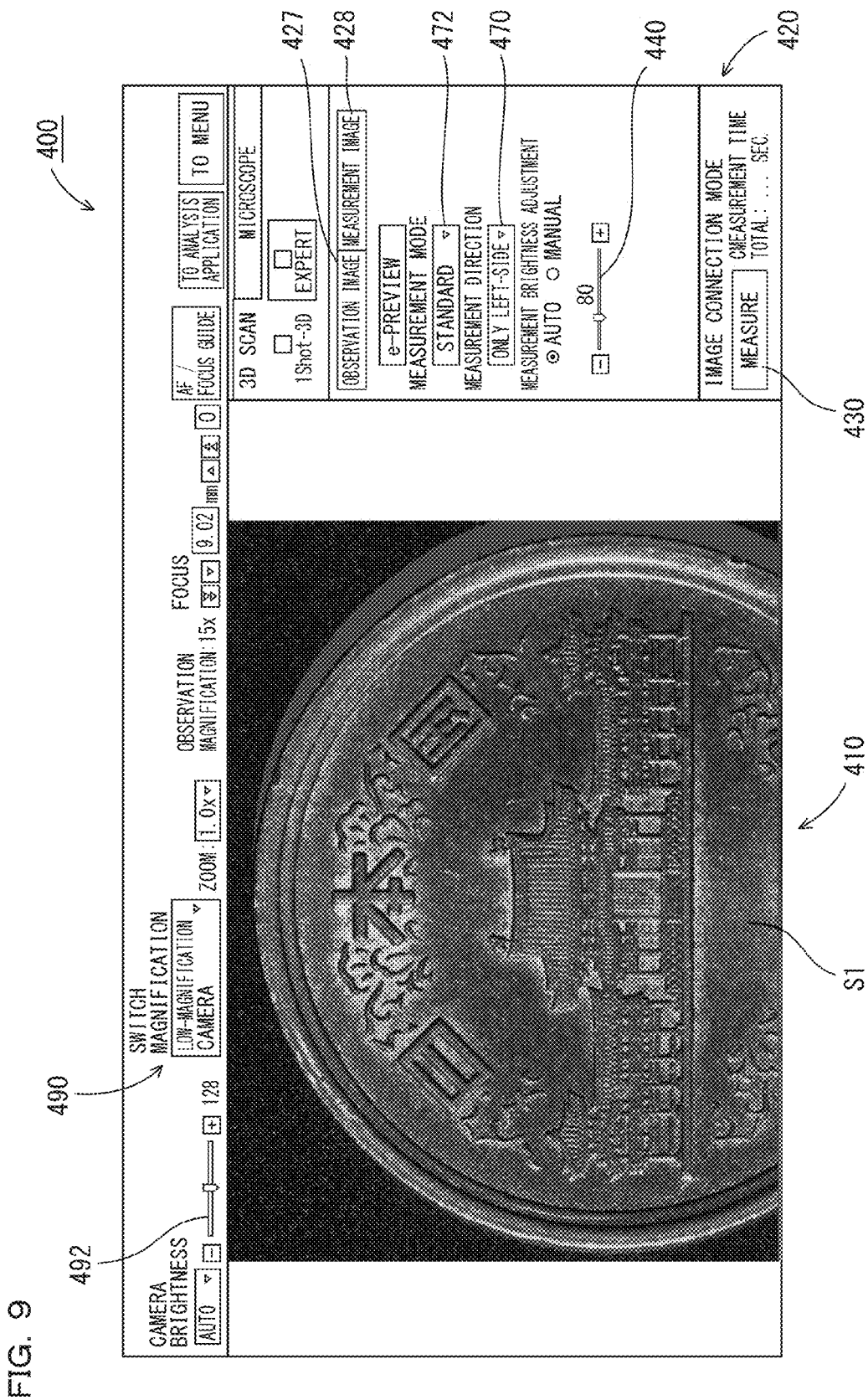
FIG. 9 is an image view showing a state where a measurement direction, "Only Left-Side", has been selected in the state of FIG. 7.

In the example of FIG. 8, the composite height image SG of the object S is displayed on the first division display region 411, and the second measurement image S2 and the first measurement image S1 of the same object S are respectively displayed on the second division display region 412 and the third division display region 413. In order to display each image while updating it in real time, the object S is alternatively irradiated with the measurement light from the first measurement light projecting section 110A and the second measurement light projecting section 110B so as to switch the measurement light. An image of the object S in the case of irradiation with the measurement light from the second measurement light projecting section 110B is displayed on the second division display region 412. An image of the object S in the case of irradiation with the measurement light from the first measurement light projecting section 110A is displayed on the third division display region 413. This allows the user to distinguish and identify the images of the object S in the case of irradiation with the measurement light respectively from the first measurement light projecting section 110A and the second measurement light projecting section 110B. The frequency of switching of the measurement light is, for example, in the order of several Hz to several tens of Hz.

(Operation Region 420)

The operation region 420 is provided with buttons, slide bars, input fields and the like for performing a variety of settings and operations. Further, selecting and changing a variety of modes can change buttons displayed in accordance therewith. Note that arrangements of buttons shown below are exemplary, and the buttons can be arranged in arbitrary aspects.

(Image Mode Switching Unit)

In the measurement microscope device operation program, switching is possible by the image mode switching unit between an observation image acquiring mode for capturing the observation image of the object S and a measurement image acquiring mode for acquiring the measurement image of the object S. In this example, a "Microscope" tab 422 collectively including buttons regarding the observation image acquiring mode and a "3D Scan" tab 421 collectively including buttons regarding the measurement image acquiring mode are provided as the image mode switching unit, and by selecting a desired tab, the image mode can be switched to the observation image acquiring mode or the measurement image acquiring mode.

(Measurement Image Acquiring Mode Selection Unit)

In this measurement microscope device operation program, setting of the measurement-image imaging condition can be switched between a simple mode for allowing even a novice user to easily set the measurement-image imaging condition and an application mode for allowing the user to set a more detailed measurement-image imaging condition. Therefore, the measurement image acquiring mode selection unit for selecting the simple mode or the application mode is provided in the upper section of a tab of each image mode in the operation region 420. In the example of FIG. 4, as the measurement image acquiring mode selection unit, a "1 Shot-3D" button 424 for selecting the simple mode and an "Expert" button 425 for selecting the application mode are provided.

(Image Switching Unit)

Further, an image switching unit capable of switching the image on display between the observation image and the measurement image is provided in the lower section of the measurement image acquiring mode selection unit. In this example, when an "Observation Image" button 427 is pressed as the image switching unit, the observation image which has been captured using the observation illumination light source is displayed on the image display region 410, or when the "Measurement Image" button 428 is pressed as the image switching unit, the measurement image which has been acquired using the measurement light projecting unit is displayed on the image display region 410. Here, the parameter for changing the brightness of the measurement light is camera exposure time.

(Procedure for Acquiring Height Image)

Hereinafter, there will be described a procedure for acquiring the height image with reference to the measurement image by use of the operation program for the measurement microscope device based on a flowchart of FIG. 10. First, the object S is set on the stage 140 in step S1, to display an initial image. In this stage, for example, the observation image is used as the initial image since the height image has not been acquired. Here, the brightness of the illumination light at the time of capturing the observation image is automatically adjusted. In the example shown in FIG. 4, an observation image SO is displayed on the image display region 410 in real time. Further, an all-projection image by structured illumination, which has been acquired by projecting a pattern of structured illumination of the measurement light projected from the measurement light projecting unit is projected from all points, can be used as the initial image. The brightness of the measurement light in this case is also automatically adjusted.

In next step S2, the measurement image acquiring mode is selected from the measurement image acquiring mode selection unit. Here, either the simple mode or the application mode is selectable by the measurement image acquiring mode selection unit. In the example of FIG. 4, the simple mode is selected when the "1 Shot-3D" button 424 is pressed, and the application mode is selected when the "Expert" button 425 is pressed.

(Simple Mode)

(Measurement Light Brightness Adjusting Unit)

When the simple mode is selected in step S2, the process proceeds to step S3, and an observation image as shown in FIG. 4 is displayed. Here, when a "Measurement" button 430 provided below the operation region 420 on the right side of the screen of FIG. 4 is pressed, the process proceeds to step 4, where after automatic adjustment of the brightness of the measurement light (camera exposure time or light amount), measurement is started to capture a plurality of striped images, and thereafter a height image is generated by the height image acquiring unit 228 by computing from the striped images.

(Height Image Acquiring Unit 228)

The height image acquiring unit 228 generates a height image having height information from the plurality of striped images. Here, the CPU 210 processes the plurality of striped images with a predetermined measurement algorithm, to generate the height image.

Further, when the "Measurement Image" button 428 is pressed in the state of FIG. 4, an image to which the light is projected by a measurement light projection unit is displayed on the image display region 410 as shown in FIG. 5. In this state, the brightness of the measurement image is automatically adjusted, but the brightness of the measurement light (camera exposure time or light amount) can also be manually adjusted by the user by use of the measurement light brightness adjusting unit (step S4).

(Three-dimensional Image Composition Unit 213)

When the "Measurement" button 430 provided below the operation region 420 is pressed in the state where the brightness is adjusted as described above, a normal height image is acquired (step S5). Further, a composite image ST formed by combining the observation image SO and the height image is generated by the three-dimensional image composition unit 213 and displayed on the display section 400. The three-dimensional image composition unit 213 combines the observation image captured using the observation illumination light source and the height image generated based on the measurement image captured using the measurement light projecting unit, to generate the three-dimensional composite image ST. That is, with the use of the height information of the height image, it is possible to generate a stereoscopic image formed by providing unevenness to the texture information obtained by the observation image. In the example shown in FIG. 11, the composite image ST formed by combining the observation image as the texture image through use of the height information of the height image is stereoscopically displayed on the image display region 410. The composite image ST has a three-dimensional form, and its position, posture and angle can be arbitrarily changed. For example, the composite image ST can be moved and rotated on the image display region 410 by being dragged with the mouse or the like.

(Texture Ratio Adjusting Unit 452)

Figure 11:
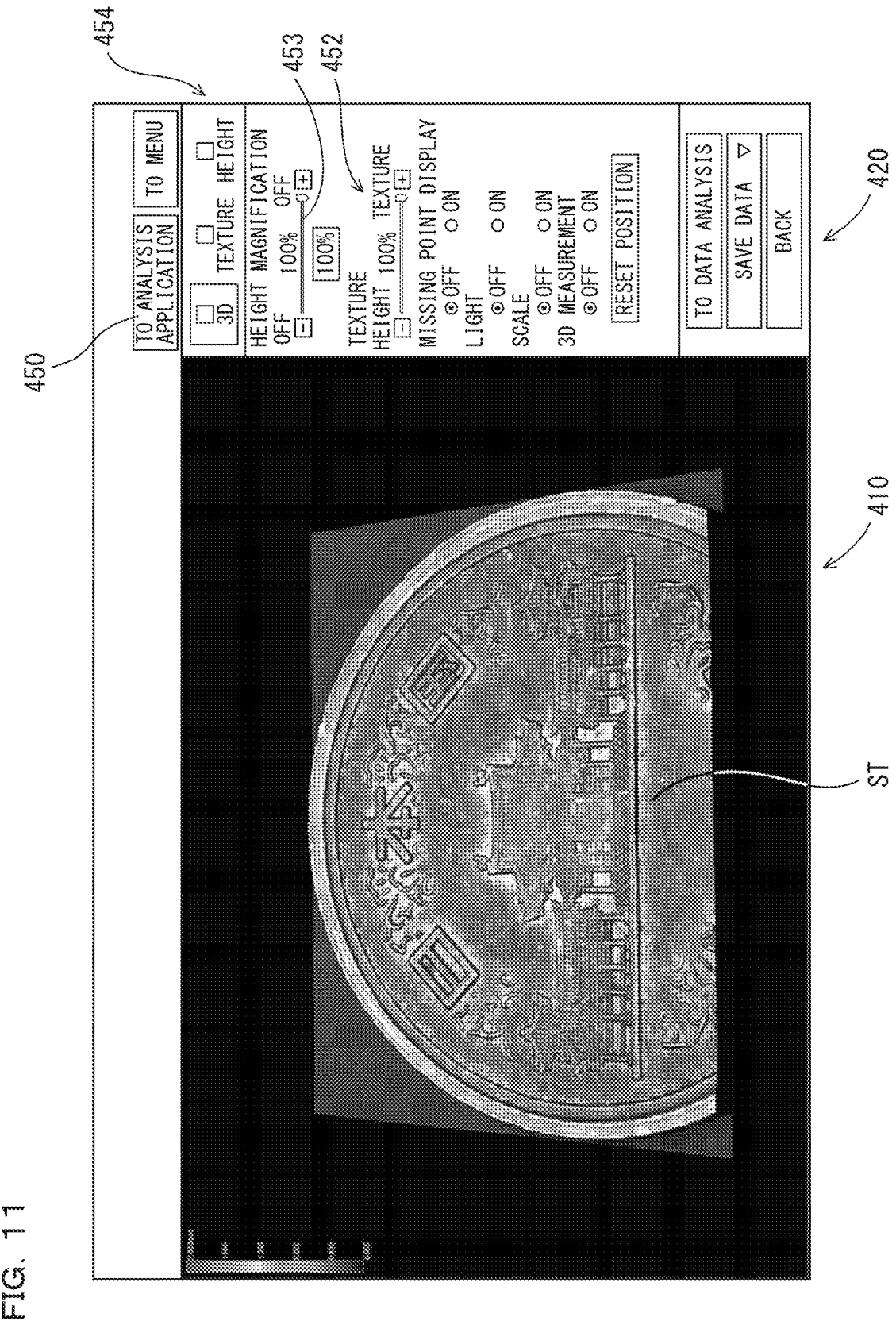
FIG. 11 is an image view showing an example of displaying a composite image with a ratio of an observation image being 100%.

A ratio of the height image and the observation image in the composite image ST is adjusted by a texture ratio adjustment unit 452. The texture ratio adjustment unit 452 is configured in a slider form, for example, and can successively change the ratio of the height image (distance image) and the observation image (texture image) by moving the slider to the right or left. Further, the ratio can be specified by an arbitrary method such as a method of inputting a ratio with a numeric value, or a method of selecting a specified numeric value (e.g., 0%, 25%, 50%, 75%, 100%, or 0:1, 0.5:1, 1:1, 2:1, 3:1, 4:1, etc.) by means of a drop box or a combo button. In the example of FIG. 11, the ratio of the height image (height) and the observation image (texture) of the composite image ST is shown by a percentage of the observation image (texture), and here, the ratio of the observation image (texture) is set to 100% by the texture ratio adjustment unit 452. When the ratio of the observation image (texture) is set to 0%, namely, the ratio of the height image is set to 100%, by the texture ratio adjustment unit 452, the display is switched to that shown in FIG. 12. The display of the composite image ST in the image display region 410 is updated in real time in response to adjustment of the texture ratio adjustment unit 452. The user can adjust the ratio of the height image and the observation image to a desired value by the texture ratio adjustment unit 452 while referencing to the composite image ST displayed on the image display region 410. Note that, in this example, although an initial value of the texture ratio adjustment unit 452 after generation of the composite image ST is set to 100% of the observation image (texture), a default value may be set to an arbitrary value, e.g., 50%.

Further, the height image can also be color-coded and displayed. For example, in a contour form, a region with a small height is colored blue, a region with a large height is colored red, and a region with a height therebetween is colored so as to be successively changed like blue→green→yellow→orange→red, which can facilitate visual recognition of the heights. The colored color, a separator of the height for making the colors different, and the like can be arbitrarily set. Alternatively, the height of the object can be expressed as gradation of a plurality of colors, or can also be expressed by the light and shade of a single color. In this example, a scale color-coded with respect to each height is displayed in the upper left of the image display region 410, to facilitate the user to visually grasp the relation between the color and the height.

Further, buttons and the like for performing a variety of processes on the composite image ST are provided in the operation region 420. For example, when a height magnification slide bar 453 is adjusted, a magnification of a height direction of the composite image ST can be adjusted. This can help emphasizing and displaying fine unevenness, or conversely smoothing the fine unevenness to grasp the whole shape. Moreover, a variety of operation can be performed from the operation region 420, such as superimposing and displaying a measurement error point on the composite image ST, arranging the light source in an arbitrary position and changing a shadow to emphasize a three dimension, or displaying a scale in a grid form to perform a simple dimensional measurement.

Figure 12:
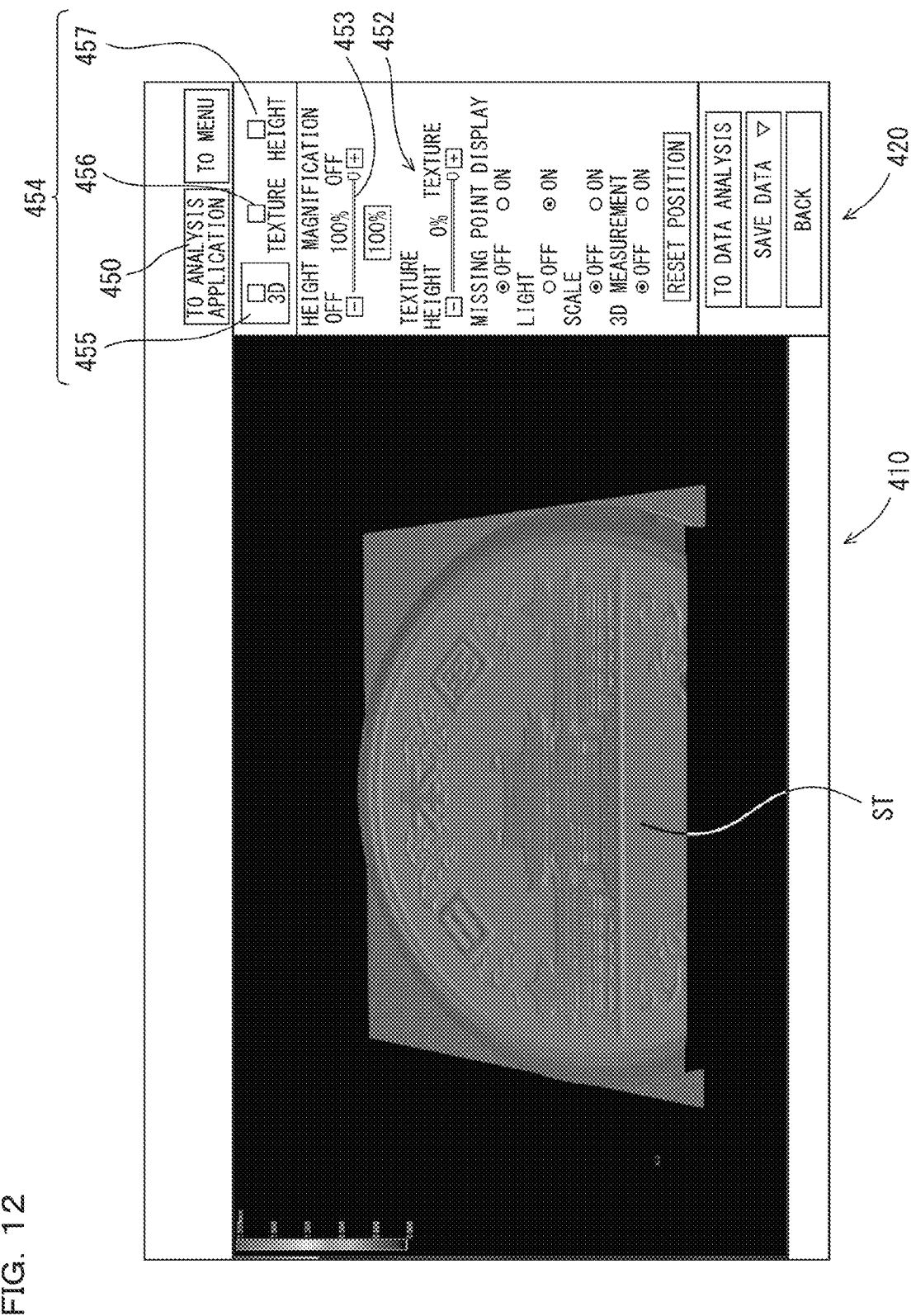
FIG. 12 is an image view showing an example of displaying a composite image with a ratio of a height image being 100%.
Figure 13:
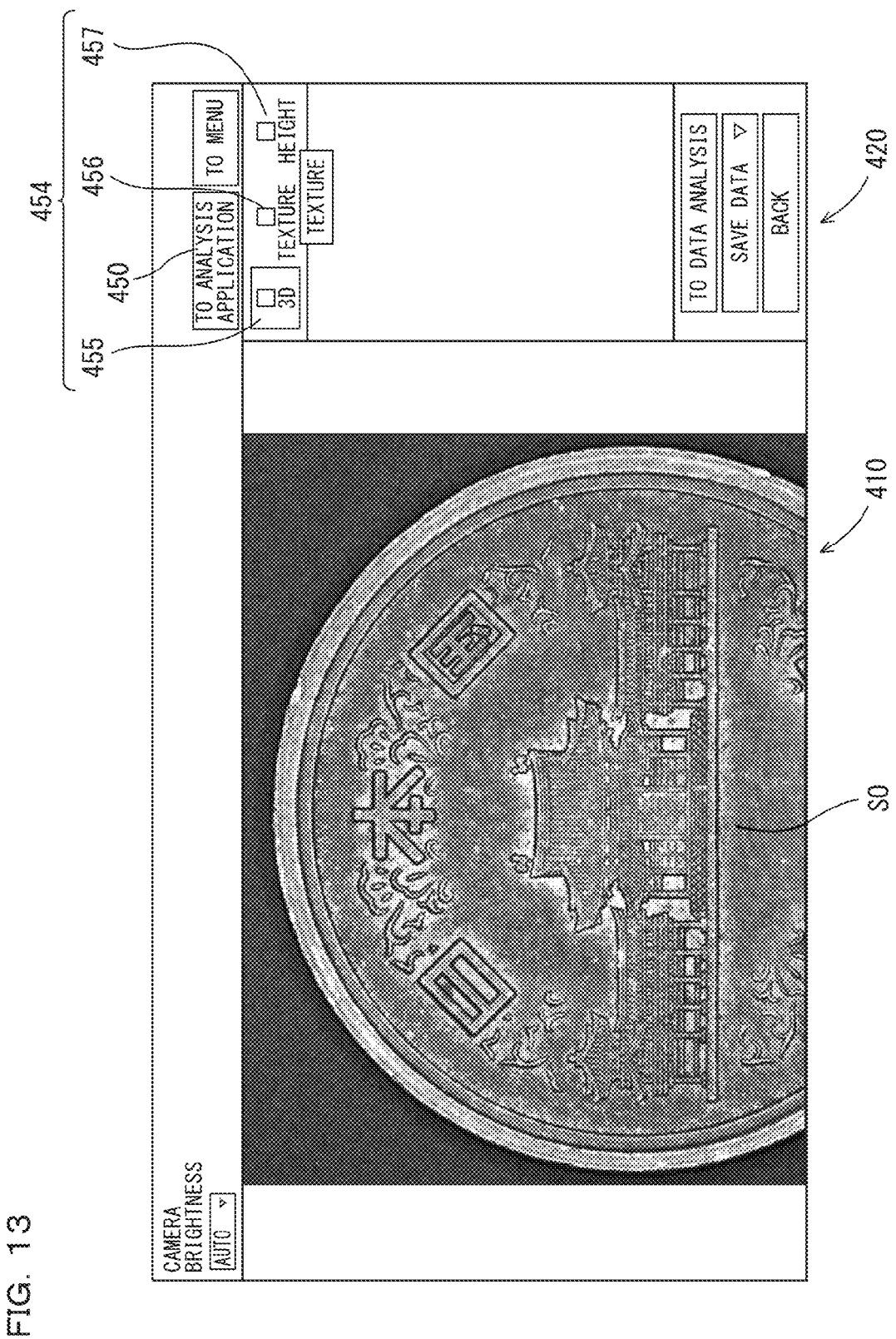
FIG. 13 is an image view showing a state where the display has been switched from the state of FIG. 11 to the height image.

Furthermore, even after the generation of the composite image ST, the display of the display section 400 can be switched to the height image or the observation image. In the examples of FIGS. 11 and 12, the display of the image display region 410 is switchable with a single touch of a button by an image display switching unit 454 provided in the upper section of the operation region 420. In the examples of FIGS. 11 and 12, a "3D" button 455 in the image display switching unit 454 has been selected, and when a "Texture" button 456 is pressed in this state, the screen is switched to that shown in FIG. 13, and the observation image is displayed on the image display region 410. Similarly, when a "Height" button 457 is pressed in the image display switching unit 454, the display of the image display region 410 is switched to the height image. The user can perform a variety of operations on the composite image ST as thus obtained in accordance with the need. Further, in order to switch to an analysis program for the composite image ST or the height image, a "To Analysis Application" button 450 provided in the upper portion of the operation region 420 is pressed. Hence, a below-mentioned three-dimensional image measurement program shown in FIG. 26 or the like is activated.

As described above, according to the simple mode, the three-dimensional composite image can be almost automatically acquired by pressing the "Measurement" button without particular awareness of set items regarding the three-dimensional measurement.

(Application Mode)

Figure 14:
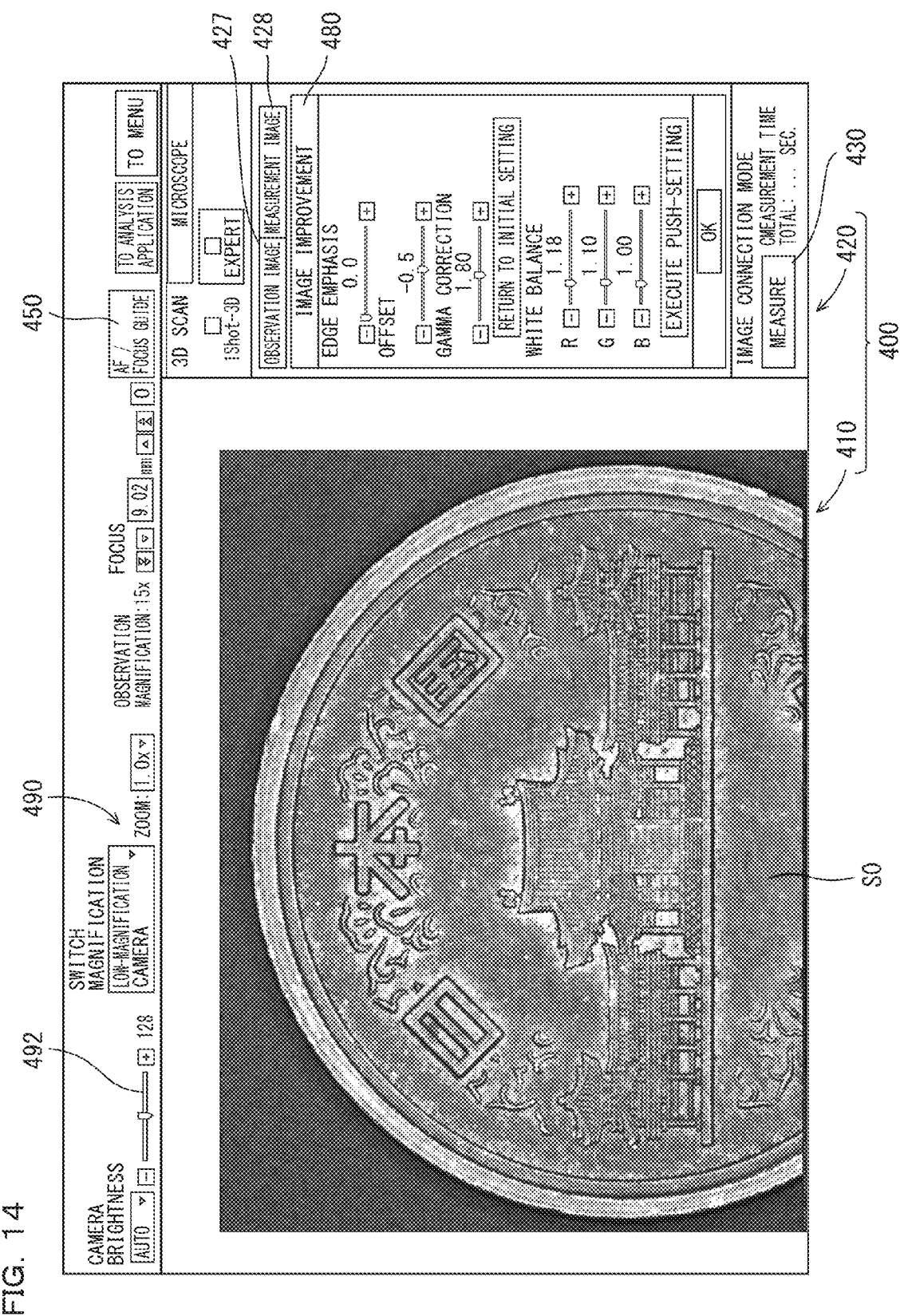
FIG. 14 is an image view showing an example where an image improvement panel is displayed.

On the other hand, when the application mode is selected in step S2, the process proceeds to step S6, where the measurement light is manually adjusted. Here, as shown in FIG. 6, the observation image is displayed as the initial image on the image display region 410 as in FIG. 4. On this screen, it is possible to select the texture image as the composite image ST to be attached to the later acquired height image. Further, when an "Image Improvement" button 481 is pressed, an image improvement panel 480 is displayed on the operation region 420 as shown in FIG. 14. From an image improvement panel 480, an edge emphasis, an offset, a gamma correction, a white balance and the like of the observation image can be adjusted.

(Texture Image)

A texture image is selected by a texture image selection unit 460. In the example of FIG. 6, other than the normal observation image, either an HDR image or a focus stacking image can be selected by a radio button. Here, the HDR (high dynamic range) image is generated by capturing a plurality of observation images as changing the camera exposure time, and thereafter performing high dynamic range (HDR) composition on these images. The focus stacking image is an image obtained by extracting focused portions out of observation images individually captured as the height directions are made different, when a difference in height of a measuring target portion of the object S exceeds a depth of field, and then combining the extracted portions.

As described above, when the texture image is selected, the "Measurement Image" button 428 is pressed from the image switching unit provided in the operation region 420 in FIG. 6, to switch the screen to that shown in FIG. 7. This screen is a measurement-image imaging condition setting screen 441 for setting the measurement-image imaging condition, and a variety of materials for setting the measurement-image imaging condition are arranged in the operation region 420. In this example, an "e-Preview" button 471, a "Measurement Mode" selection field 472, a "Measurement Direction" selection field 470, and the "Measurement Brightness Adjustment" field 440 are separately provided in this order from above. On this screen, the brightness of the measurement light is adjusted while the measurement-image imaging condition is checked.

("Measurement Mode" Selection Field 472)

Figure 15:
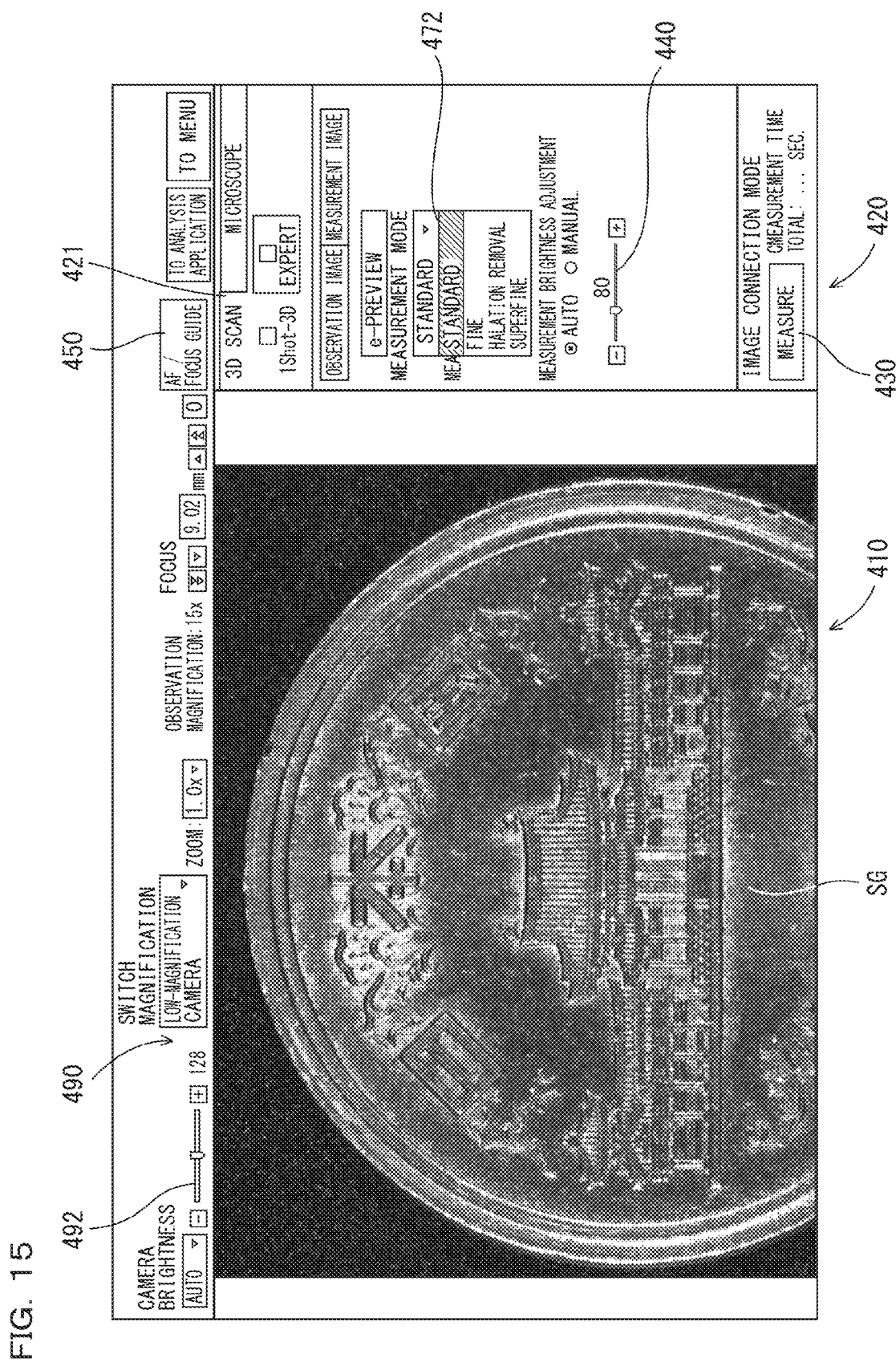
FIG. 15 is an image view showing the state of selecting an image quality of the height image in a "Measurement Mode" selection field.

The measurement method (striped pattern) is selectable in the "Measurement Mode" selection field 472. "Standard" has been selected in this example, and other than this, "Fine Mode" for removing indirect light or "Halation Removal" is also selectable. When the "Halation Removal" is selected, a plurality of images are captured as the camera exposure time is changed, and these images are then combined, to compensate an over-exposed portion and an under-exposed portion with other images. Further, with "Superfine", measurement can be performed while indirect light is removed and halation is removed. In the example of FIG. 15, any of "Standard", "Fine", "Halation Removal" and "Superfine" can be selected by a pull-down menu from the "Measurement Mode" selection field 472.

("Measurement Direction" Selection Field 470)

Further, the measurement light projecting unit is selected in the "Measurement Direction" selection field 470. Here, either the first measurement light projecting section 110A or the second measurement light projecting section 110B is selectable. In the screen example of FIG. 16, when "Only Left-Side" is selected from a pull-down menu of the "Measurement Direction" selection field 470, the second measurement light projecting section 110B is selected as the measurement light projecting unit, and the second measurement image S2, obtained by irradiating the object S with the second measurement light from the left side, is displayed on the image display region 410. Similarly, when "Only Right-Side" is selected, the first measurement light projecting section 110A is selected, and the display contents of the image display region 410 are switched to those of the first measurement image S1 obtained by irradiating the object S with the first measurement light from the right side. Further, when "Both Sides" is selected, the composite height image SG formed by combining these second measurement image and first measurement image is displayed on the image display region 410.

(Measurement Light Brightness Adjusting Unit)

Further, as the measurement light brightness adjustment unit, the "Measurement Brightness Adjustment" field 440 is provided in the middle section of the operation region 420 on the right side of FIG. 7. The brightness of the measurement light is adjusted by the camera exposure time or the light amount. Here, when "Auto" is selected in the "Measurement Brightness Adjustment" field 440, a slider provided therebelow is adjusted to the right or left, and hence the brightness of the left and right measurement light is varied in a simultaneous and successive manner. This slider displays the brightness of the measurement light with a numeric value in the upper portion. Further, the brightness of the measurement light can be made directly inputtable with a numeric value. When the brightness of the measurement light is adjusted by the measurement light brightness adjustment unit in this manner, the brightness of the measurement image displayed on the image display region 410 is updated to a changed state, and the user can thus adjust the brightness in real time while checking the adjustment result.

In the above example, the brightness in the composite height image SG is adjusted by the measurement light brightness adjustment unit. That is, as shown in FIG. 7, "Both Sides" is selected in the "Measurement Direction" selection field 470, and the "Measurement Brightness Adjustment" field 440 is displayed as the measurement light brightness adjustment unit in the operation region 420 in the state where the composite height image SG is displayed on the image display region 410. This "Measurement Brightness Adjustment" field 440 similarly adjusts the light amounts of the first measurement light projecting section 110A and the second measurement light projecting section 110B which are the measurement light projecting unit. Further, when "Only Left-Side" or "Only Right-Side" is selected in the "Measurement Direction" selection field 470, the measurement image captured by each selected measurement light projecting unit is displayed on the image display region 410 as described above, and hence the light amount of the second measurement light projecting section 110B or the first measurement light projecting section 110A can each be adjusted in the "Measurement Brightness Adjustment" field 440.

(Measurement Light Brightness Individual Adjustment Unit 442)

On the other hand, the light amounts of the first measurement light projecting section 110A and the second measurement light projecting section 110B can be individually adjusted. As shown in FIG. 7, when "Manual" is selected in the "Measurement Brightness Adjustment" field 440 in the state where "Both Sides" has been selected in the "Measurement Direction" selection field 470, the screen is switched to that shown in FIG. 8, and the measurement light brightness individual adjustment unit 442, capable of individually adjusting the brightness of the first measurement light projecting section 110A and the brightness of the second measurement light projecting section 110B, is displayed on the operation region 420. Here, the measurement light brightness individual adjustment unit 442 is configured in the slider form capable of adjusting the brightness with respect to each measurement light projecting unit. In this example, the brightness adjustment slider 446 for the second measurement light projecting section 110B and the brightness adjustment slider 444 for the first measurement light projecting section 110A are vertically arranged. By individually moving these brightness adjustment sliders 444 and 446 to the right or left, the intensities of the brightness of the respective measurement images can be individually adjusted. Further, as described above, the display of the measurement image in the image display region 410 is updated in accordance with the value adjusted in the measurement light brightness individual adjustment unit 442, and the user can adjust the brightness to desired brightness while checking the measurement image in real time. Although the adjustment of the light amount of the measurement light projecting section has been described herein for convenience of description, since its purpose is to adjust the brightness of the first measurement image and the brightness of the second measurement image, it is possible not only to actually adjust the light amount of the measurement light projecting unit, but also to adjust the brightness by adjusting the camera exposure time, or the like, as described above.

(Image Connection Mode)

Further, as one aspect of the below-mentioned image connecting unit 225, a "Connection Mode" selection field 570 is provided in the lower section of the operation region 420. When this "Connection Mode" selection field 570 is turned on, the image connection mode is selected, and data is successively measured while the stage is longitudinally and laterally moved, to thereby allow connection of the data into one measurement data (detailed later).

Figure 16:
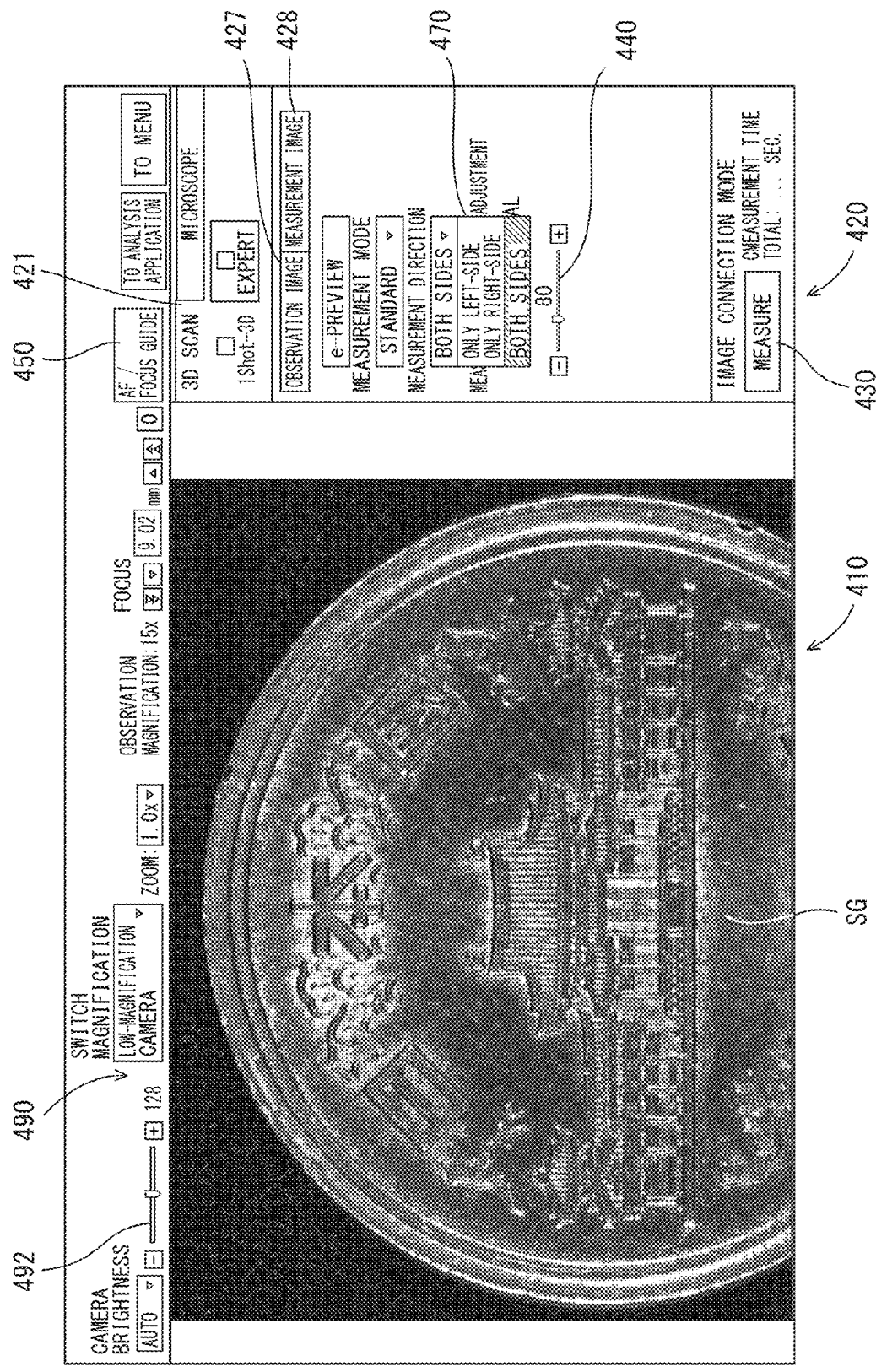
FIG. 16 is an image view showing the state of selecting measurement light in a "Measurement Direction" selection field.

As described above, the direction of the measurement light is selectable in the "Measurement Direction" selection field 470. In this example, as shown in FIG. 16, any of "Both Sides", "Only Left-Side" and "Only Right-Side" can be selected, and the contents are switched to one corresponding to the indicated contents of the image display region 410 according to the selected item. For example, in the example of FIG. 9, "Only Left-Side" has been selected, and the second measurement image S2 obtained by the second measurement light projecting section 110B as the left-side measurement light projecting unit is displayed on the image display region 410. Further, at this time, the unmeasurable region where the measurement light projected by the second measurement light projecting section 110B is shaded to make measurement impossible is displayed in red and the saturated region is displayed in yellow by the measurement error region display unit 212 in the second measurement image S2.

In this state, when the selection is switched to "Both Sides", the screen is switched to that shown in FIG. 7, and the composite height image SG formed by combining the first measurement image S1 and the second measurement image S2 obtained by both measurement light projecting units, namely, the first measurement light projecting section 110A and the second measurement light projecting section 110B, is displayed on the image display region 410. Further, at this time, the unmeasurable region where the measurement light projected by either the first measurement light projecting section 110A or the second measurement light projecting section 110B is shaded to make measurement impossible is displayed in red and the saturated region is displayed in yellow by the measurement error region display unit 212 in the composite height image SG.

As obvious by comparison between FIGS. 7 and 9, either the unmeasurable region or the saturated region is smaller in the composite height image SG. That is, in the obtained composite height image SG, the unmeasurable error region is actually narrower to a considerable degree than the unmeasurable region or the saturated region which becomes obvious from one measurement light projecting unit, and it is thus understood that adjusting the measurement-image imaging condition so as to make the measurement error region narrow on the basis of the composite height image SG as in FIG. 7 is more appropriate and easier.

Further, as necessary, the image display region 410 is divided and the composite height image SG and each measurement image which is the basis of the composite height image SG can be simultaneously displayed on one screen. That is, on the screen of FIG. 7, when "Manual" is selected in the "Measurement Brightness Adjustment" field 440 in the operation region 420, the image display region 410 is divided into three sections as shown in FIG. 8. The composite height image SG is displayed on the first division display region 411, the second measurement image S2 is displayed on the second division display region 412, and the first measurement image S1 is displayed on the third division display region 413.

Accordingly, the measurement error regions due to the respective measurement light projecting units can be checked as compared with each other, whereby excellent listability is obtained to further facilitate adjustment of the measurement-image imaging conditions such as the position and posture of the object S and the brightness of the measurement light. Additionally, on the screen of FIG. 8, the brightness of each measurement light is individually adjustable by use of the measurement light brightness individual adjustment unit 442 as described above.

Also in the foregoing simple mode, it is possible to check the unmeasurable point and the saturated point as described above. For example, in step S3, displaying the "measurement image" allows displays of the unmeasurable point and the saturated point in the both-side composite image.

As described above, the setting and adjustment of the measurement-image imaging condition are performed in the application mode. Then, in step S7 of the flowchart of FIG. 10, the user is prompted to determine whether or not the brightness of the measurement light is appropriate, and when it is appropriate, the process proceeds to step S9. On the other hand, when the brightness of the measurement light is not yet appropriate, the process proceeds to step S8, where the selection of the measurement mode and the measurement brightness are adjusted.

When the measurement light is appropriately set as described above, the process proceeds to step S9, where the user is prompted to determine whether or not the setting of the texture image is necessary. When it is necessary, the texture image is set in step S10. Here, the texture image is selected using a texture image selection unit 460 on the screen of FIG. 6.

(Observation-image Imaging Condition Setting Unit 490)

Figure 17:
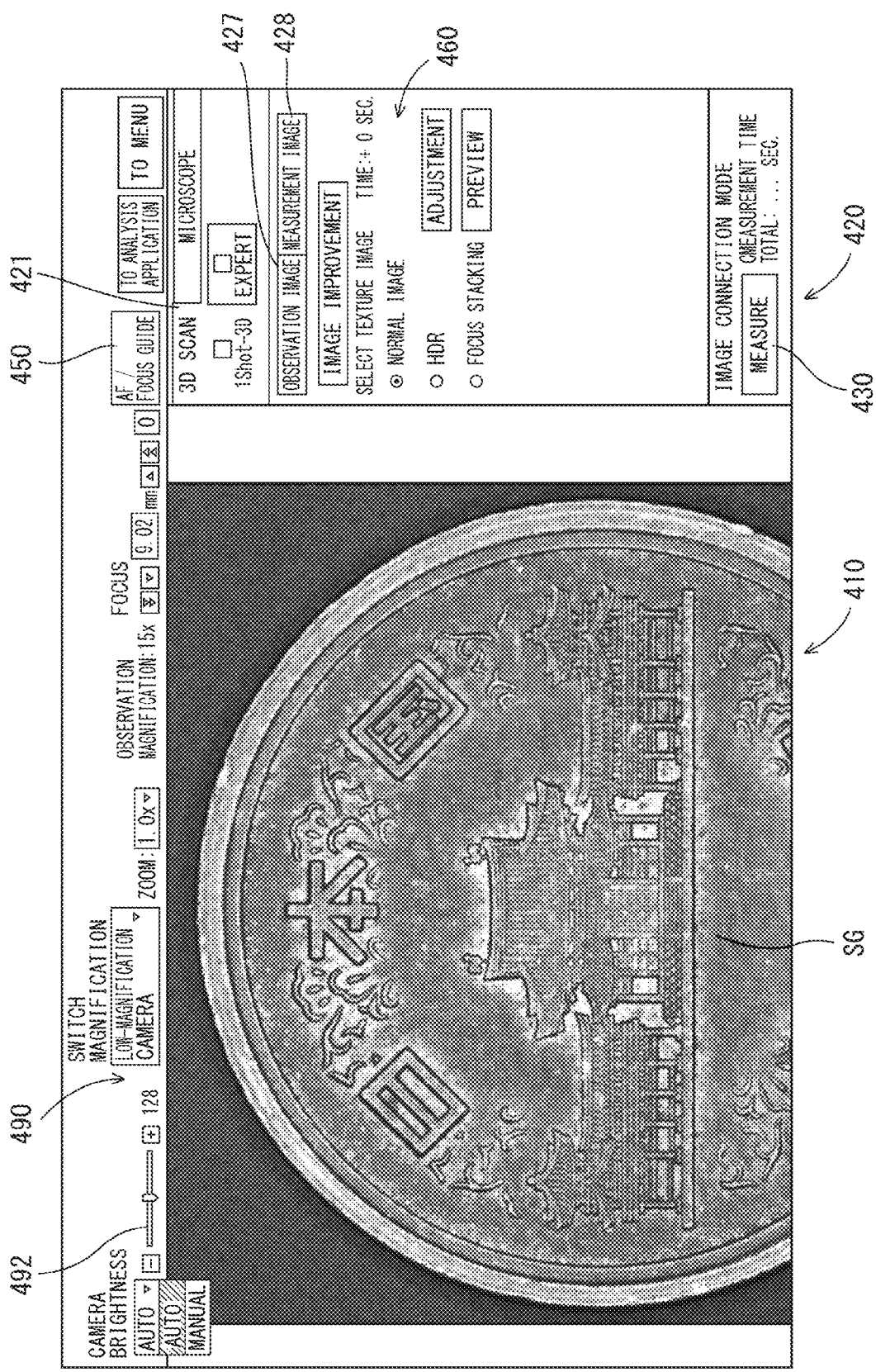
FIG. 17 is an image view showing the state of setting an imaging condition of the observation image by an observation-image imaging condition setting unit.

Moreover, the observation-image imaging condition is set as necessary. In the upper section of the image display region 410 of FIG. 6, the observation-image imaging condition setting unit 490 for setting such an observation-image imaging condition is provided. The observation-image imaging condition setting unit 490 includes the setting such as switching of a shutter speed at which the observation image is captured and adjustment of a magnification and a focus in capturing. In the example shown in FIG. 17, "Auto" or "Manual" is selected as the brightness of the imaging unit. When "Manual" is selected, the brightness of the imaging unit is adjusted by a camera brightness adjustment slider 492. Further, the setting of the observation-image imaging condition as described above can also be performed in the simple mode. For example, in FIG. 4, similarly to the above, the observation-image imaging condition setting unit 490 is set in the upper section of the image display region 410, from which adjustments of the magnification and the focus, switching of the shutter speed, and the like can be performed.

Figure 10:
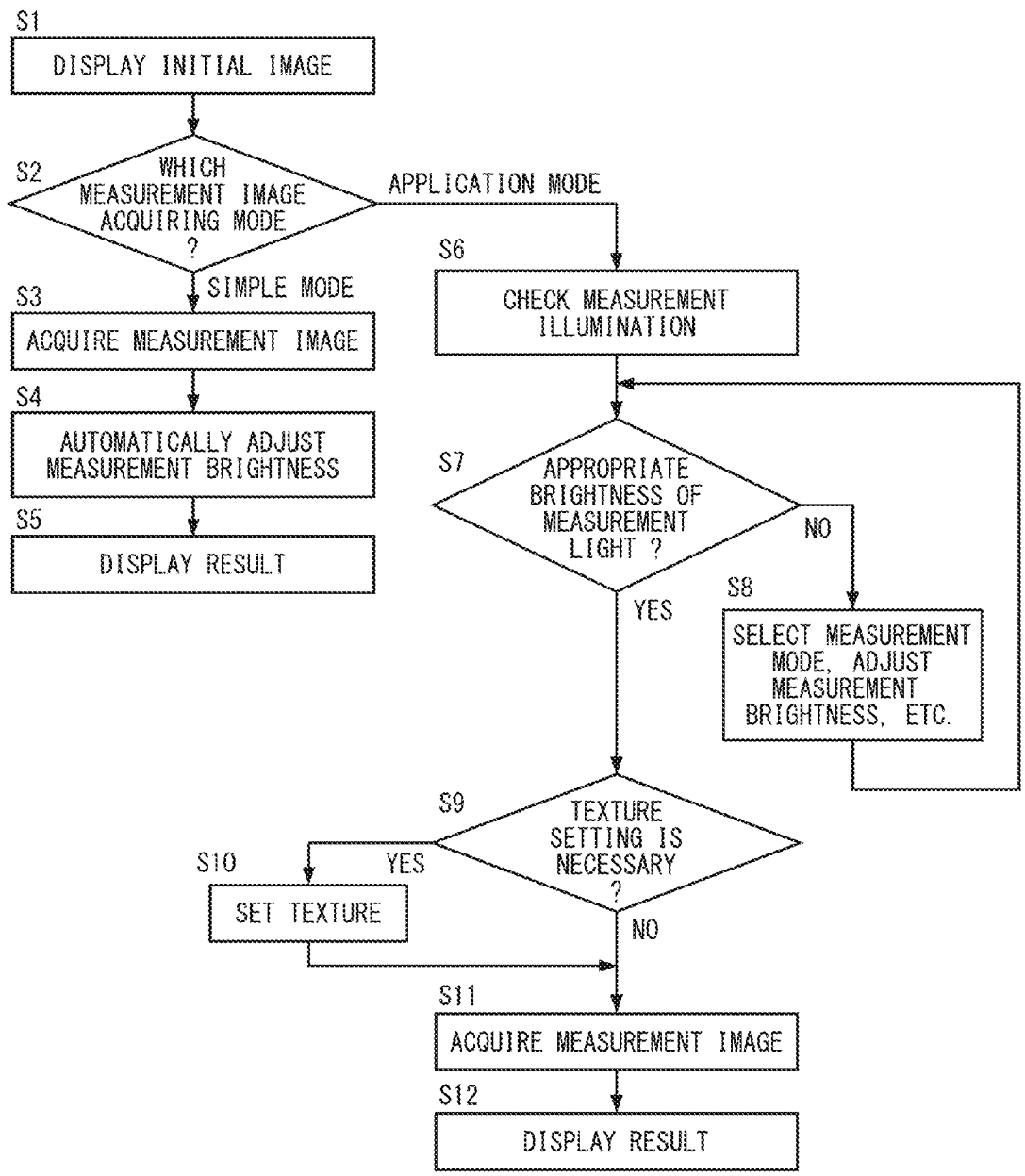
FIG. 10 is a flowchart showing a procedure for acquiring a height image by use of the measurement microscope device operation program.

Note that the observation image is arbitrarily captured in acquiring the height image, and for example, in the case of not requiring the composite height image or the observation image, steps S9 and S10 can be omitted in the flowchart of FIG. 10.

When the setting of all imaging conditions are completed in this manner, the process proceeds to step S11, where a height image is acquired. Here, when the "Measurement" button 430 is pressed from the screen of FIG. 8 or the like, the height image is acquired, and further, a composite image formed by further adding the texture image to the height image is displayed on the image display region 410 (step S9). The user continuously performs the measurement operation as necessary. For switching the program to the measurement program, the "To Analysis Application" button 450 provided in the upper portion of the operation region 420 is pressed, to activate the three-dimensional image measurement program shown in FIG. 26 or the like described later.

As described above, the user can adjust a more detailed condition regarding acquirement of the height image in the application mode. This allows the user familiar with the operation to set a desired condition. On the other hand, the user not familiar with the operation is provided with the foregoing simple mode, and thus allowed to automatically perform a series of setting. As described above, set items which are provided are changed between the simple mode and the application mode, and parameters settable by the user are thus made different therebetween, whereby it is possible to provide the operation environment in accordance with the skill level and requirement of the user.

(Procedure from Acquirement of Image to Measurement)

Hereinafter, with reference to the block diagram of the measurement microscope device shown in FIG. 1 and the block diagram of the imaging unit 100 shown in FIG. 2, an outline of a procedure for capturing the observation image and the height image and measuring these will be described based on a flowchart of FIG. 18. In step S1801, the user first arranges an object desired to be measured on the stage 140. Next in step S1802, the focus, visual field position, brightness and the like are adjusted while the observation image displayed on the display section 400 is viewed, to set the observation-image imaging condition for capturing the observation image (e.g., FIG. 6). As illumination used at this time, while uniform illumination may be applied from the measurement light projecting unit, the illumination light output section 130 is used herein.

(Acquirement of Height Image)

Next, in step S1803, the measurement-image imaging condition for acquiring the height image is set. Specifically, for example, on the measurement-image imaging condition setting screen 441 of FIG. 7, the illumination is switched from the illumination light output section 130 to the measurement light projecting unit, to adjust the brightness of the measurement light. Since the illumination by the measurement light is obliquely applied, a shadow is generated due to the shape of the object. Further, when an angle at which the illumination is applied is more inclined, the visibility of the object may become more favorable depending on the surface state thereof. As described above, in order to suppress the influence exerted by the shadow or the surface state, the position and posture of the object are adjusted as necessary.

Here, when the object is moved in the adjustment by the measurement light projecting unit, rechecking of the visibility of the object by the illumination light output section 130, readjustment of the brightness of the illumination light output section 130 and the like are performed in step S1804. These operations can be omitted when not necessary, for example, when the object has not been moved. When the observation-image imaging condition and the height-image imaging condition are respectively set as described above, the user is prompted to check whether or not there is a problem with the visibility in step S1805, and when there is a problem, the process returns to step S1802, where necessary resetting or adjustment of the imaging condition is performed. When there is no problem, the process proceeds to step S1806, where acquirement of the measurement image is started. This checking operation can also be omitted.

When the posture and the position of and the focus on the object and the illumination conditions for the measurement are determined as described above, starting to capture the observation image and the measurement image is instructed in step S1806. Here, the user is made to press the "Measurement" button 430 provided in the GUI for the measurement microscope device operation program (e.g., FIG. 7). Thereby, a command for measurement is transmitted from the measurement microscope device operation program installed in the PC constituting the control unit 200 to the imaging unit 100 via a USB.

Upon receipt of this instruction, the height image, the observation image and the composite image formed by combining these images are captured in steps S1807 to S1810. In addition, the order of each step can be altered as appropriate. Here, a plurality of striped images are first acquired in step S1807. In this example, upon receipt of the command for measurement, the imaging unit 100 synchronously controls the pattern generating section 112 in the measurement light projecting unit and the camera 121, and acquires a plurality of striped images of the object by the camera 121 while projecting a plurality of striped patterns, followed by performing an appropriate process on the acquired images in the measurement control section 150, and transmitting the images to the control unit 200 via the USB. Note that the present step can be repeated a plurality of times for the purpose of improving light projection from right and left, the HDR process and other performance.

Subsequently, the observation image is acquired in step S1808. Here, the illumination light output section 130 is lighted, to acquire the observation image of the object as the texture image for the composite image. That is, the observation image (texture image) of the surface state of the object is acquired by uniform illumination by the illumination light output section 130 or the measurement light projecting unit (all-white by all-projection), and transmitted to the control unit 200

Further, in step S1809, the height image is generated. Here, the height image acquiring unit 228 processes the plurality of striped images with a predetermined measurement algorithm, to generate the height image as stereoscopic shape data.

Then, the composite image is generated in step S1810. Here, by mapping the texture image onto the stereoscopic shape data, a three-dimensional composite image having height information is generated. Specifically, the image data received by the control unit 200 is appropriately subjected to image processing and an analysis with a measurement algorithm in the measurement microscope device operation program, to generate the three-dimensional composite image.

Each image obtained as described above is displayed on the display section 400 in step S1811. Further, in step S1812, the user is prompted to determine whether or not the image data desired by the user has been properly acquired, and when it has not been properly acquired, the process returns to step S1803 or the like to repeat the above procedure. When it has been properly acquired, the process proceeds to step S1813, where a variety of measurements and analyses are executed. Here, the composite image formed by mapping the texture image onto the foregoing composite image by the measurement microscope device operation program is displayed on the display section 400, and thereafter the data is transmitted to a dedicated three-dimensional image measurement program, to perform desired measurement and analysis. In this manner, the image is acquired and measured.

Figure 18:
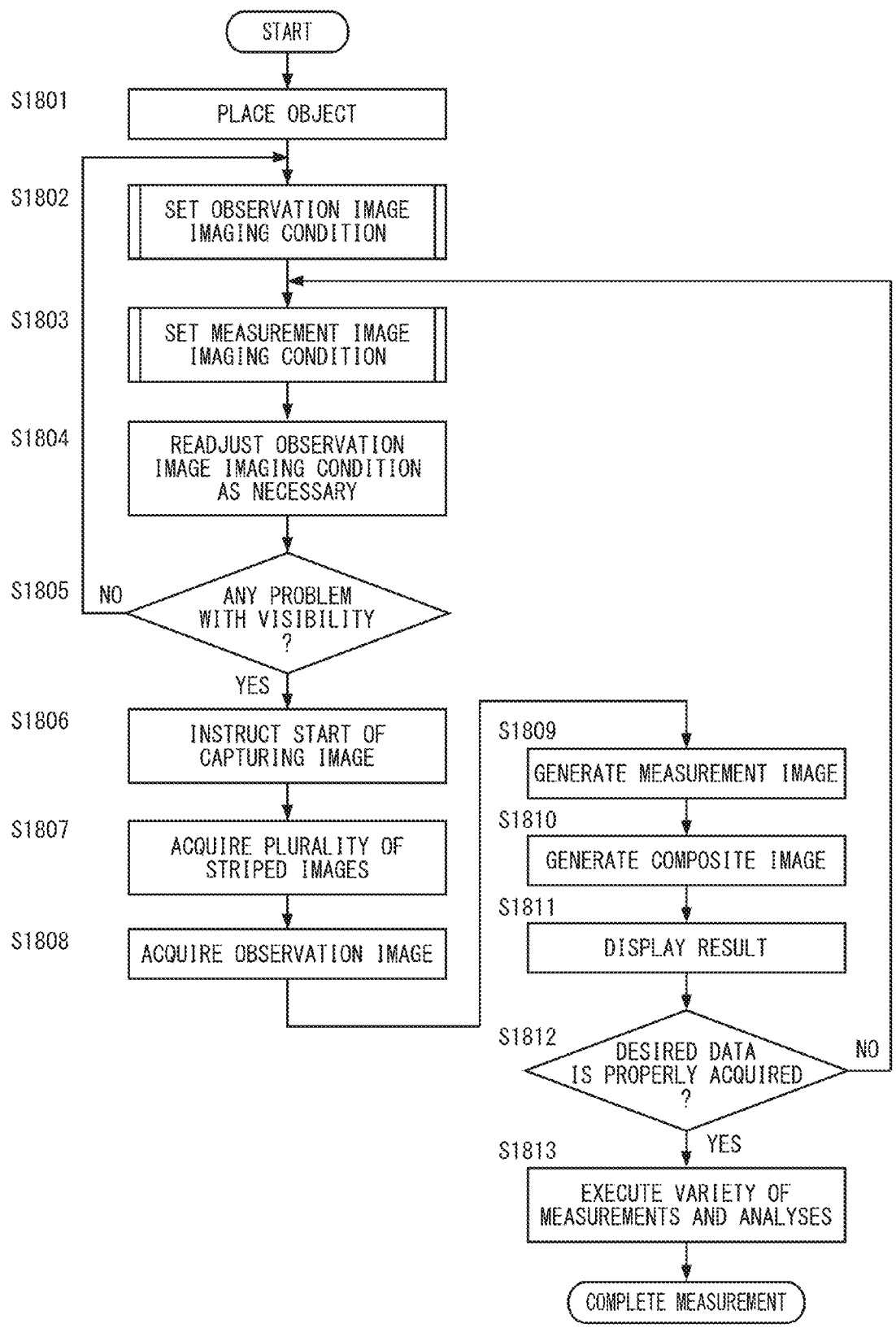
FIG. 18 is a flowchart showing a procedure for performing measurement by use of the measurement microscope device.

Note that the order of steps S1802 and S1803 of FIG. 18 can be altered. In this case, firstly in the setting of the measurement-image imaging condition (step S1803), the posture and the position of and the focus on the object are adjusted, and in the setting of the observation-image imaging condition (step S1802), the posture and the position of and the focus on the object are not touched and only selections of the brightness of the illumination light output section 130, the type of the texture and the like are performed.

Figure 19:
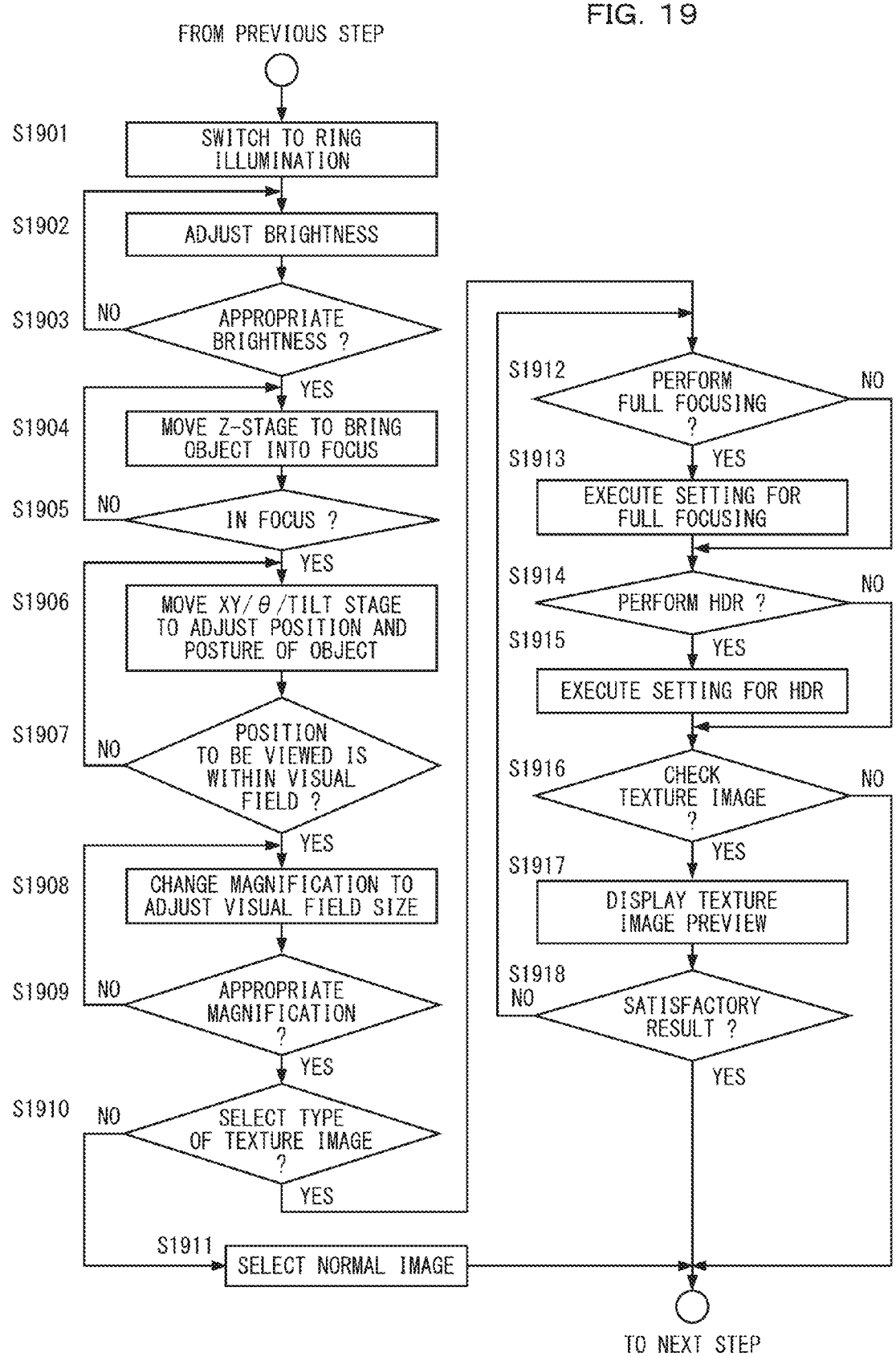
FIG. 19 is a flowchart showing a detail of a procedure for setting the observation-image imaging condition.
Figure 20:
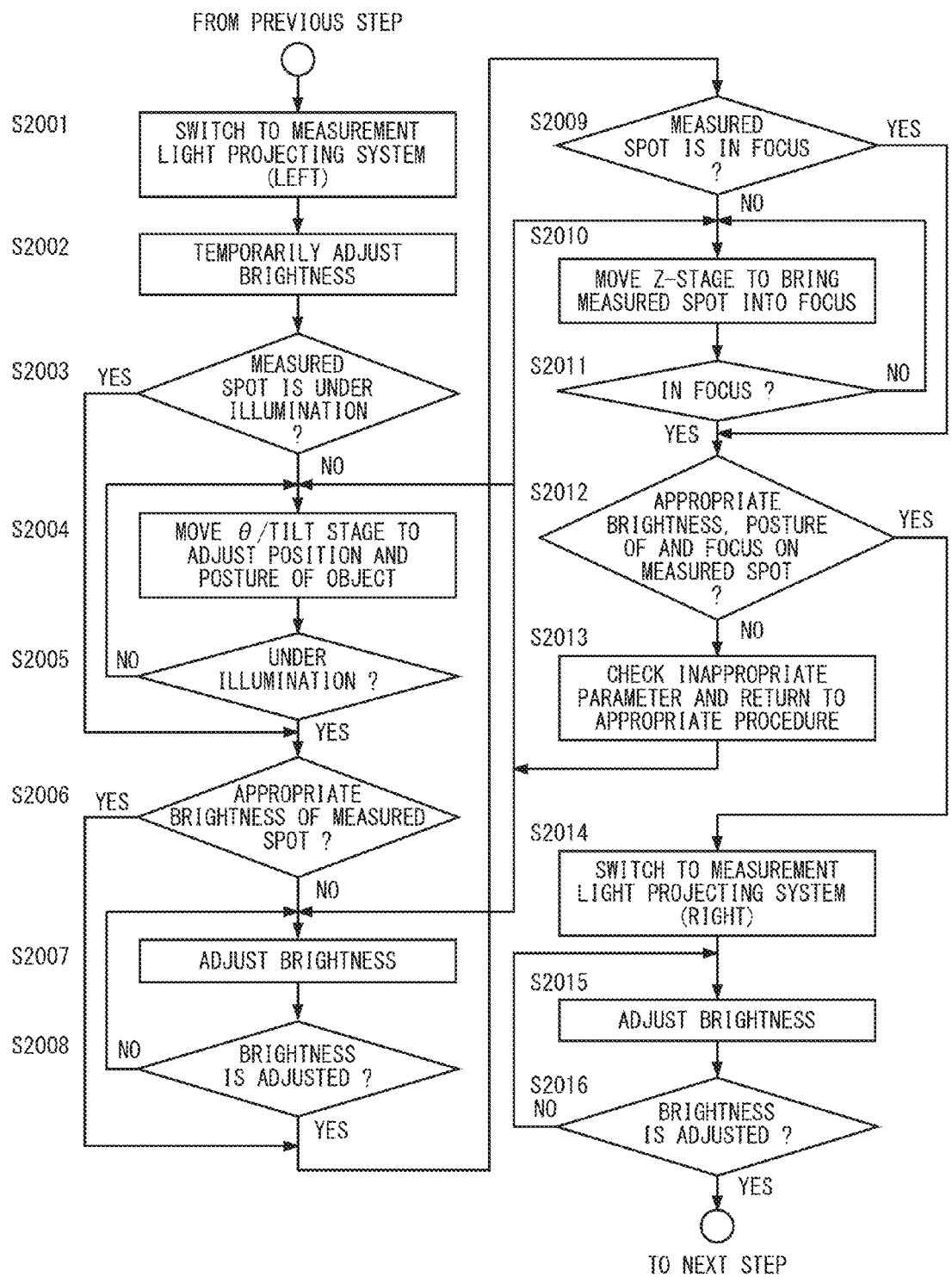
FIG. 20 is a flowchart showing a detail of the procedure for setting the measurement-image imaging condition.

Here, FIG. 19 shows a detail of a procedure for setting the observation-image imaging condition for acquiring the observation image in step S1802, and a flowchart of FIG. 20 shows a detail of a procedure for setting the measurement-image imaging condition for capturing the measurement image in step S1803, while the respective procedures are described with reference to these figures.

(Setting of Observation-image Imaging Condition)

First, the procedure for setting the observation-image imaging condition (step S1802 of FIG. 18) will be described with reference to FIG. 19. First in step S1901, the illumination is switched to the illumination light output section 130, and subsequently in step S1902, the brightness of the illumination light output section 130 is adjusted. Then, in step S1903, the user is prompted to determine whether or not the brightness is appropriate, and the process returns to step S1902 when it is not appropriate, to repeat the brightness adjustment. When it is appropriate, the process proceeds to step S1904, where a Z stage is moved to bring the object into focus. The focus can also be automatically adjusted by means of auto focusing other than being manually adjusted by the user. The process then proceeds to step S1905, to prompt the user to determine whether or not the object is in focus, and when it is not in focus, the process returns to step S1904 to repeat the focus adjustment. When it is in focus the process proceeds to step S1906, where the XY/θ/tilt stages are moved to adjust the position and the posture of the object. When the movement of the stage 140 has been automated, other than this operation being manually operated by the user, alignment is performed by pattern matching, edge detection or the like, and based on this result, the electric stage can be moved to a predetermined position. Further, in step S1907, the user is prompted to determine whether or not a position where the observation image capturing the object is desired to be seen is held within the visual field of the display section 400, and when it has not been held within the visual field, the process returns to step S1906 to repeat the position adjustment of the stage 140. On the other hand, when it has been held within the visual field, the process proceeds to step S1908, where the magnification is adjusted. A size of the visual field is adjusted by the magnification adjustment. Thereafter, in step S1909, the user is prompted to determine whether or not the magnification is appropriate, and when it is not appropriate, the process returns to step S1908 to repeat the magnification adjustment operation. When the visual field is appropriate, the process proceeds to step S1910, where the user is prompted to determine whether or not to select the type of the observation image, namely, select whether or not to perform a further process on the observation image. Here, when the type of the observation image (texture image) is not selected, namely, when the obtained observation image is used, the process proceeds to step S1911, where the process for acquiring the observation image is completed and subsequently the process proceeds to step S1803 of FIG. 18 which is a process for setting the imaging condition of the measurement image.

On the other hand, in the case of selecting the type of the observation image, namely, in the case of further performing an additional process on the obtained observation image, the process proceeds to steps S1912 to S1918. Here, as the additional process regarding the observation image, the full focusing process and the HDR process can be selected. In this example, the process first proceeds to step S1912, where it is determined whether or not to perform the full focusing process. The full focusing process is a process of capturing a plurality of images as the focal position is changed by moving the stage 140 in the height (Z-axis) direction, or the like, and the images in focus are combined to obtain a full-focused image which is in focus as a whole. Only points in focus in the group image are extracted to compose an all-focus image in real time. In the case of performing the full focusing process, the process proceeds to step S1913, where the full focusing setting is executed, and the process then proceeds to step S1914. Further, In the case of not performing the full focusing process, the process proceeds directly to step S1914. In step S1914, the user is prompted to determine whether or not to perform the HDR process, and in the case of performing it, the process proceeds to step S1915, where the setting of the HDR is executed and the process then proceeds to step S1916, and in the case of not performing the process, the process proceeds directly to step S1916. Further, in step S1916, the user is prompted to determine whether or not to perform identification of the texture image, and in the case of performing the identification, where a preview of the texture image is displayed, and the process then proceeds to step S1917. In the case of not performing the identification, the process proceeds directly to step S1917. In step S1917, the user is prompted to determine whether or not the image obtained by the full focusing process, the HDR process or the like is satisfactory, and when it is not satisfactory, the process returns to step S1912, to perform the process on the observation image again. When the satisfactory image has been obtained, the process for acquiring the observation image is completed, and the process subsequently proceeds to step S1803 of FIG. 18 which is the process for setting the imaging condition of the measurement image. It goes without saying that the order of steps S1912 to S1918 is one example, and can be altered as appropriate. Further, the process on the observation image is not limited to the HDR process and the full focusing process, but can be changed to or added with another known process.

(Setting of Measurement-image Imaging Condition)

Next, the procedure for setting the measurement-image imaging condition for acquiring the measurement image (step S1803 of FIG. 18) will be described with reference to FIG. 20. First in step S2001, the illumination is switched to the measurement light projecting unit (e.g., left-side). Next, in step S2002, the brightness of the measurement light projecting unit is temporarily adjusted. Further, in step S2003, the user is prompted to determine whether the illumination is applied to a spot desired to be measured, and when it is applied, the process jumps to step S2006. On the other hand, when it is not applied, a rotation angle (θ) and an inclined angle (tilt) within the horizontal plane of the stage 140 are adjusted and the position and the posture of the object are adjusted in step S2004. In step S2005, the user is again prompted to check whether or not the illumination is appropriately applied. When it has not been applied, the process again returns to step S2004 to repeat the adjustment, and when it is has been applied, the process proceeds to step S2006.

Subsequently in step S2006, the user is prompted to determine whether or not the brightness of the measured spot is appropriate, and when it is determined to be appropriate, the process jumps to step S2009. When it is determined not to be appropriate, the brightness is adjusted in step S2007. Then, in step S2008, the user is again prompted to determine whether or not the brightness is appropriate, and when it is not appropriate, the process returns to step S2007 to repeat the brightness adjustment. On the other hand, when the brightness is determined to be appropriate, the process proceeds to step S2009, where the user is prompted to determine whether the measured spot is in focus. When it is determined to be appropriate, the process jumps to step S2012, whereas when it is not determined to be appropriate, the stage 140 is moved in the height direction (Z-axis direction) to bring the measured spot into focus in step S2010. Then, in step S2011, the user is again prompted to check whether or not it has been brought into focus, and when it has not, the process again returns to step S2010 to repeat the adjustment, and when there is no problem with the focus, the process proceeds to step S2012.

Then, in step S2012, the user is prompted to make an overall determination of the obtained measurement image. Here, it is determined whether or not each of the brightness and the posture of and the focus on the measured spot is appropriate, and when it is determined not to be appropriate, an inappropriate parameter is checked in step S2013, and the process returns to a step in accordance with the corresponding parameter (e.g., step S2007 for adjustment of the brightness, step S2010 for adjustment of the focus, etc.), to continue the adjustment. On the other hand, when it is determined to be appropriate, the process proceeds to step S2014, where the illumination is switched to the measurement light projecting unit (e.g., right-side) as next illumination light. Then, similarly to the above, the brightness is adjusted in step S2015, and the user is prompted to determine whether or not the brightness is appropriate in subsequent step S2016. When it is determined not to be appropriate, the process returns to step S2015, to repeat the brightness adjustment. On the other hand, when the brightness is determined to be appropriate, it is determined that a satisfactory measurement image has been acquired, and the measurement-image imaging condition setting process in step S1803 of FIG. 18 is completed. The process then proceeds to next step S1804. It should be noted that the order of the position adjustment, the posture adjustment, the focus adjustment and the brightness adjustment can be altered as appropriate. In this manner, the imaging conditions of the observation image and the measurement image are respectively set.

(Procedure for Capturing Image of Object)

Next shown is one example of procedures for acquiring the height image and the three-dimensional composite image of the object by use of the measurement microscope device. Note that the following description is merely one example, and the present invention is not limited to the data acquiring method, the type and the number of set parameters, the measurement mode, the GUI and the like to those described herein.

(Full-auto Mode)

As described above, as the mode for performing capturing by use of the measurement microscope device operation program, a plurality of imaging condition setting modes can be prepared in which the user himself changes a settable item in accordance with a skill level of the user. In an example of the measurement microscope device operation program of FIG. 21, the simple mode (1 Shot-3D mode) for the novice user and the application mode (expert mode) for the advanced user are prepared. These can be selected by switching the "1 Shot-3D" button 424 for selecting the simple mode and the "Expert" button 425 for selecting the application mode as one aspect of the measurement image acquiring mode selection unit. In the simple mode, on/off of "Full-Auto" is further switchable by the full-auto switching unit 426. Here, the "full-auto" mode as the simple mode will be described.

Figure 21:
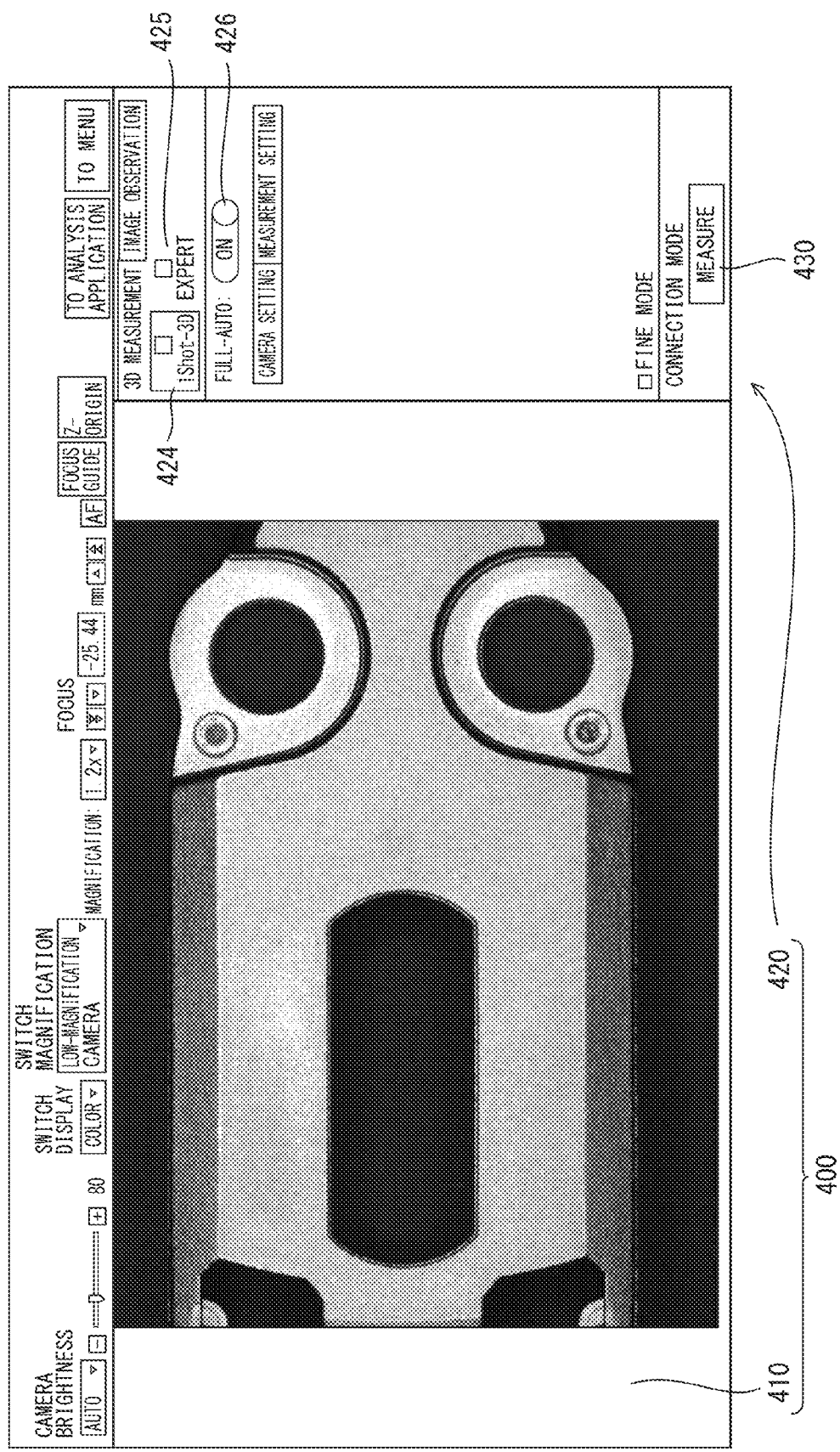
FIG. 21 is an image view showing a GUI screen of a full-auto measurement screen of the measurement microscope device operation program.

When the object is arranged on the stage 140 of the measurement microscope device, the observation image of the object is displayed on the image display region 410 of the measurement microscope device operation program as shown in FIG. 21. The user adjusts the focus on the object and the position, the angle and the like thereof to a desired state while viewing this image. FIG. 21 is an example of the "full-auto" mode in the simple mode in which the all imaging conditions are automatically adjusted on the device side, and the texture image by the illumination light output section 130 is displayed on the image display region 410. When this mode has been selected, after deciding the focus on the object, the magnification and the observation visual field, the user may only press the measurement button in the lower right of the screen. Subsequently, the parameters are automatically adjusted optimally, to acquire data. It should be noted that, when the focus setting is also set to be auto focus, this operation can also be automated.

(Full-auto Cancel Simple Mode)

Figure 22:
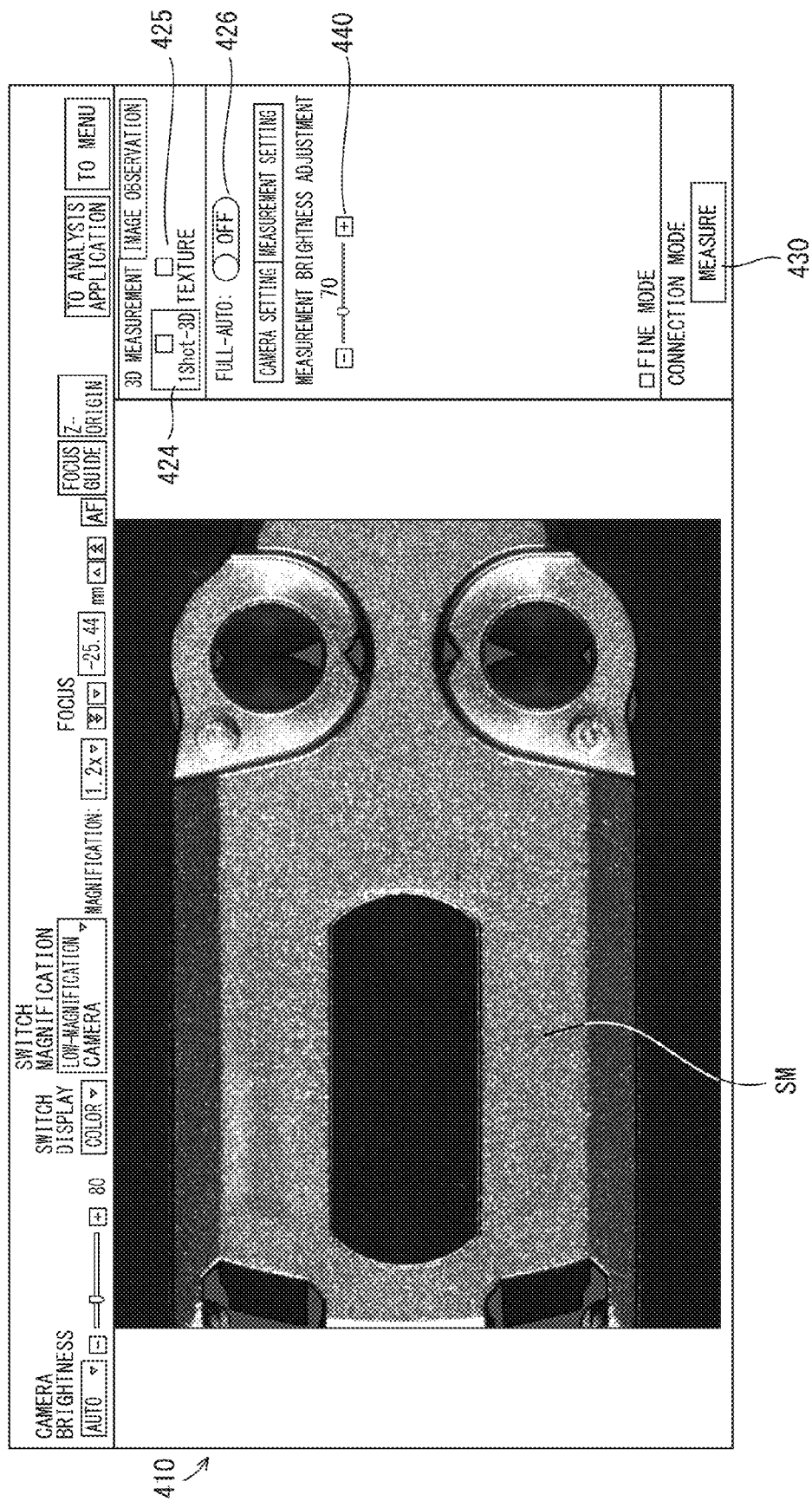
FIG. 22 is an image view showing a GUI screen where the full-auto function of FIG. 21 has been canceled.

In a semi-auto mode where the full-auto mode has been canceled in the simple mode, the "Measurement Brightness Adjustment" field 440 where the brightness condition for measuring the object is adjustable by the user is displayed on the operation region 420 as shown in FIG. 22. For example, in such a case as not to be dealt well in the full-auto mode, e.g., when only a specific region in the image display region 410 is desired to be made brighter or made darker, the mode is set to the semi-auto simple mode where the full-auto mode has been canceled, to thereby allow the user to manually adjust the brightness. In the example of FIG. 22, a measurement image SM is displayed on the image display region 410, and the brightness is adjusted to be appropriate brightness while the measurement image SM is viewed. Since the adjusted brightness is reflected into the image display region 410 in real time, the user can adjust the brightness to desired brightness while referencing to the screen.

(Application Mode)

Figure 23:
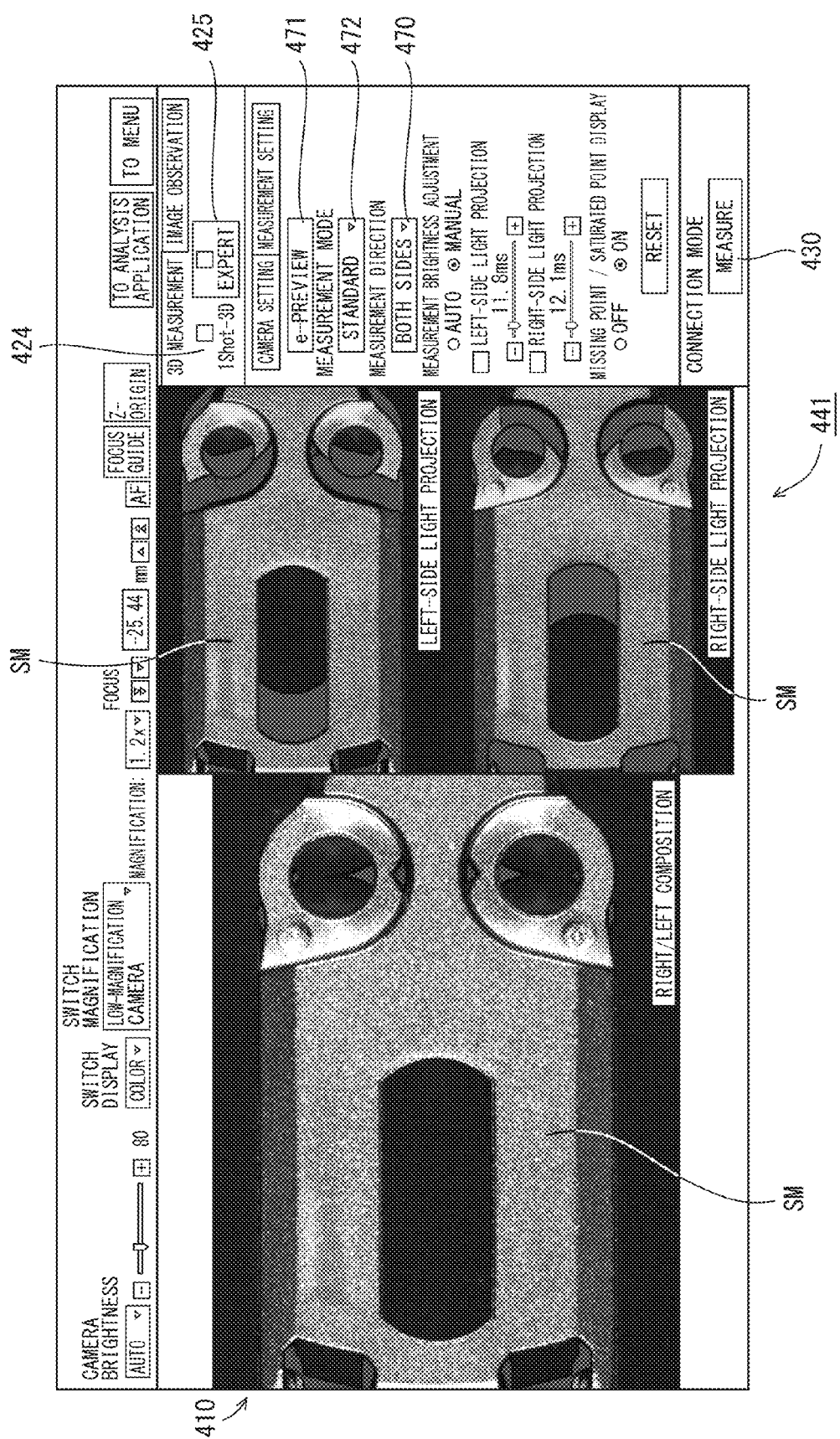
FIG. 23 is an image view showing a GUI screen of the application mode.

Further, when the user desires to set a more detailed imaging condition by himself, the user can switch the mode from the simple mode to the application mode, to perform a variety of adjustments and settings. FIG. 23 shows one example of the measurement-image imaging condition setting screen 441 as one aspect of the measurement-image imaging condition setting unit for setting the measurement-image imaging condition. As shown in this figure, the mode can be switched from the simple mode to the application mode by pressing the "Expert" button 425. In this example, the respective measurement images by the left-side light projection image and the right-side light projection image and the measurement image SM formed by combining both images are displayed in a three-division manner in the image display region 410, and the brightness of the right and left measurement light projecting units can be individually adjusted while the measurement images SM are each checked.

(Measurement Mode)

The direction of the measurement light can be selected in the "Measurement Direction" selection field 470 provided in the operation region 420. For example, it is possible to select only the right or left measurement light projecting unit for reducing the measurement time. Further, the measurement mode includes a standard measurement mode, a fine measurement mode, a halation removal measurement mode, a superfine measurement mode and the like, and those can be selected from the "Measurement Mode" selection field 472 provided in the operation region 420 of FIG. 23. Here, describing a feature of each measurement mode and the time required for capturing, the standard measurement mode is a normal measurement mode, and the time required for capturing is short in this mode.

Further, the halation removal measurement mode is a measurement mode in which the projection pattern is the same as that in the standard mode, but the exposure time or the projected light amount of the measurement light is changed to expand a dynamic range and measurement is performed. This can be effective in suppressing under-exposure and over-exposure of the object having a significant difference between the brightness and darkness. For example, it is effective on such an object being formed of a metal body filled with a black resin. The time required for the measurement becomes longer than that in the standard measurement mode.

Further, the fine measurement mode is a measurement mode in which the projection pattern of the measurement light is made finer than that in the standard measurement mode, to exclude penetrated light and indirect light components such as multiple reflection and diffused reflection.

This measurement mode is highly effective when the object is a translucent body such as an opaque resin or an uneven metal body such as a screw. The time required for the measurement becomes longer than that in the standard measurement mode.

Moreover, the superfine measurement mode is a combination of the fine measurement mode and the halation removal measurement mode described above, where the accuracy can be improved most, but the time required for measurement becomes the longest accordingly.

(e-Preview)

Figure 24:
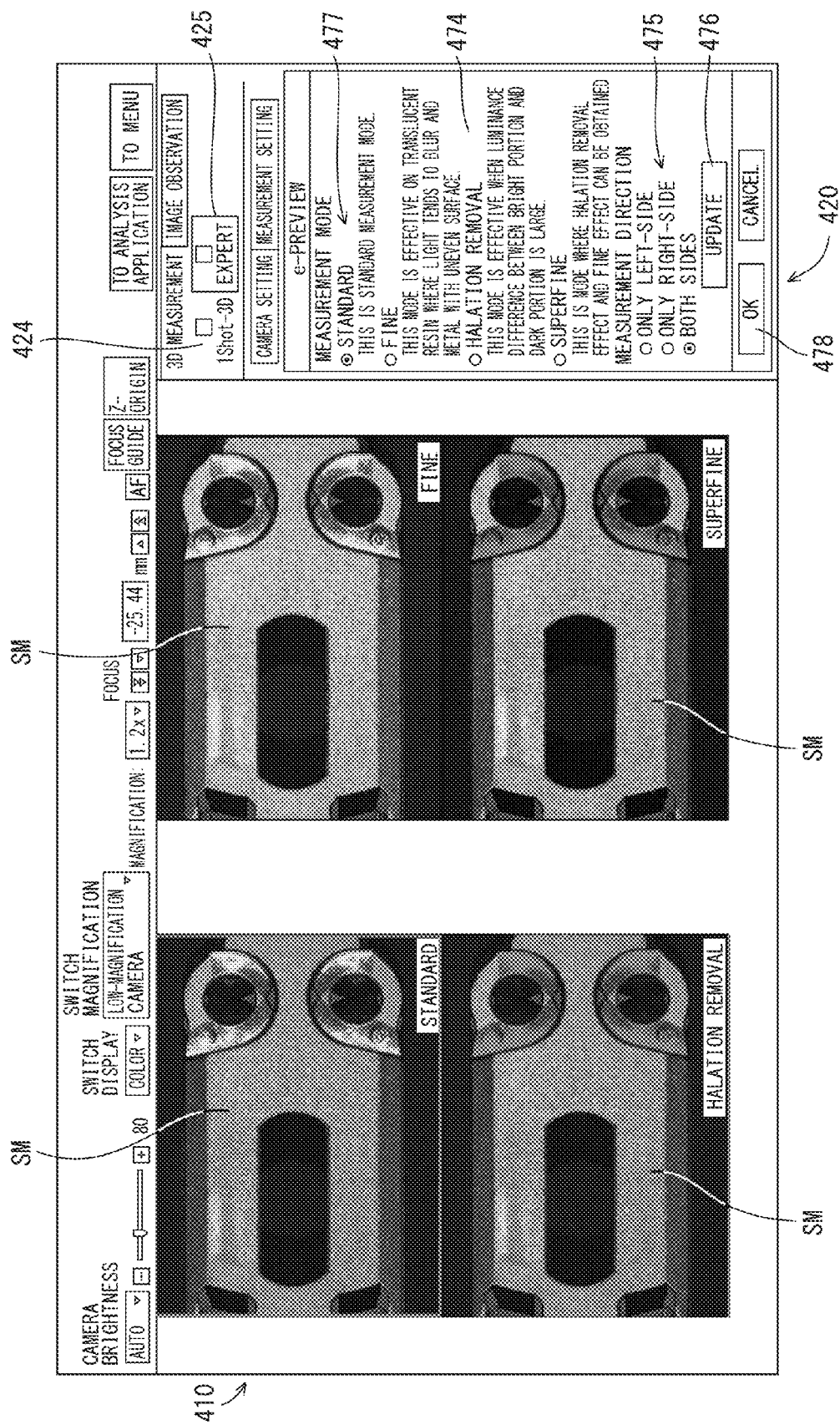
FIG. 24 is an image view showing a GUI screen of an e-preview.

Further, the measurement microscope device operation program is also provided with an e-preview function of checking a preview image, estimating measurement results in these plurality of measurement modes, on a list image before the measurement. The e-preview function is executed by pressing the "e-Preview" button 471 provided in the operation region 420 of FIG. 23, and an e-preview screen 473 shown in FIG. 24 is displayed. Here, the image display region 410 is divided into four sections, and in the measurement image SM to be obtained in each measurement mode, a portion to become an unmeasurable place or a saturated place is estimated, and an overlaid image is displayed on each region. A caption indicating the measurement mode is displayed in the lower right of each divided region. This allows the user to compare what kind of measurement image is obtained in each measurement mode and then make a selection. The user can select the measurement light projecting unit from any of "Only Left-Side", "Only Right-Side" and "Both Sides" from a measurement direction selection field 475 provided in the lower section of an e-preview setting field 474 in the operation region 420, and when an "Update" button 476 is pressed, each preview image displayed on the image display region 410 is updated in accordance with the selection. Further, a predetermined measurement mode can be selected from an e-preview measurement mode selection field 477 provided in the upper section of the operation region 420. When an "OK" button 478 is pressed in a state where the measurement mode has been selected, the selected measurement mode is selected in the "measurement mode" selection field 472.

(Three-dimensional Composite Image)

Figure 25:
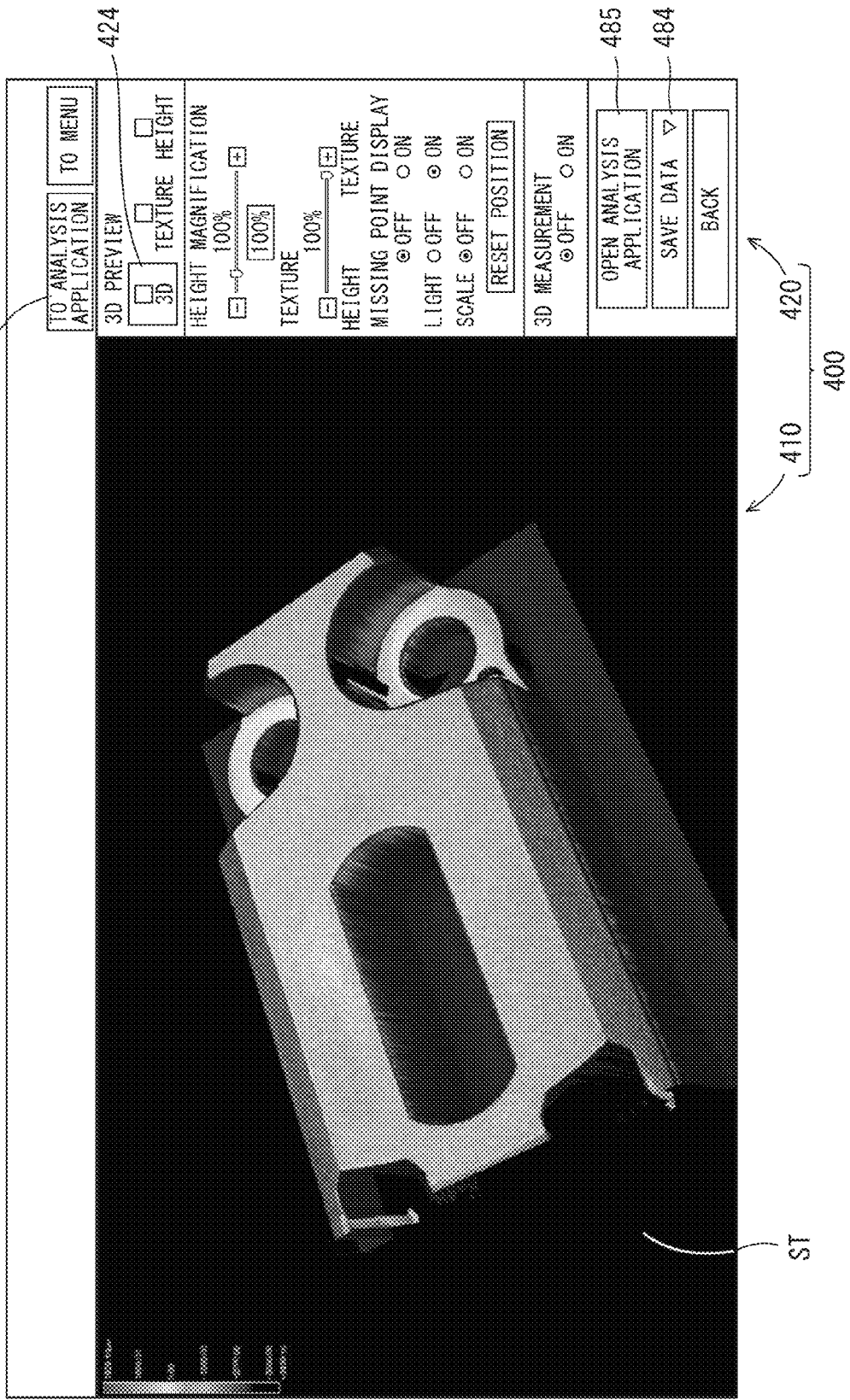
FIG. 25 is an image view showing a GUI screen for displaying a composite image by the measurement microscope device operation program.

When the condition setting before the measurement is completed as described above and the measurement is executed, a plurality of striped images for measurement are acquired in accordance with the condition, and based on these images, a three-dimensional composite image of the object is generated. Further, a texture image using the illumination light output section 130 is simultaneously acquired, and mapped onto the composite image. As shown in FIG. 25, data of this result is combined by use of the measurement microscope device operation program and displayed on the display section 400. In this state, the user can check a data acquirement status, e.g., whether a desired place has been clearly acquired, while changing a visual point by dragging the 3D data with the mouse or the like. After checking that the desired data has been acquired, the user can appropriately save this data, send the data to the three-dimensional image measurement program, and continue to perform an analysis, a dimensional measurement, and the like. For saving the data, for example, on the screen of FIG. 25, a "Save Data" button 484 is pressed. Further, for performing an analysis by means of the three-dimensional image measurement program, an "Open by Analysis Application" button 485 is pressed. Accordingly, the three-dimensional image measurement program is activated, and the data currently on display is read by the three-dimensional image measurement program. In addition, when the "To Analysis Application" button 450 provided in a toolbar is pressed, the three-dimensional image measurement program is activated, but in this case, the three-dimensional image measurement program is only activated, and the data is not automatically read. Hence the user manually selects desired data so as to be read. As described above, the "To Analysis Application" button 450 and the "Open by Analysis Application" button 485 are different in the presence or absence of data to be read at the time of activating the three-dimensional image measurement program.

Needless to say, height image data which has been previously saved without capturing the measurement image can be read by the three-dimensional image measurement program so as to be subjected to an analysis and a dimensional measurement in a similar manner to the above. In the present specification, a description "step of acquiring an image captured by the imaging unit" is used in the meaning of including not only the case of capturing a new image but also the case of reading an already captured image.

Furthermore, although the measurement microscope device operation program for capturing a measurement image to generate a height image and the three-dimensional image measurement program for performing an analysis, measurement, and the like on the height image are separate programs in this example, needless to say, these programs can be integrated.

(Measurement Unit 214)

The observation image (texture image) and the three-dimensional composite image of the object as thus obtained are subjected to a variety of analyses, dimensional measurements and the like by use of the three-dimensional image measurement program as one aspect of the measurement unit 214, and results thereof can be subjected to save, printing and the like in a dedicated report form, so as to obtain a final output as the purpose. Hereinafter, as examples of the function of the three-dimensional image measurement program which is executable in the measurement microscope device, there will be described a profile measurement, an average step measurement, a volume/area measurement, a plane measurement, a line roughness measurement, a surface roughness measurement, and a comparison measurement. These measurement processes are performed by the measurement unit 214. In the example of the measurement microscope device of FIG. 1, the CPU 210 also functions as the measurement unit 214 for performing measurement on the height image displayed on the display section 400. In addition, the measurement functions which will be hereinafter described are merely exemplary, and the present invention is not limited to analyses and measurement functions which can be performed using acquired data such as texture image data and composite image data, but other known functions can also be used as appropriate.

(Measurement Tool Specification Unit)

Further, the operation section in FIG. 1 functions as a measurement tool specification unit for specifying a position where the measurement unit performs measurement and a type of a measurement process. The measurement tool specification unit arranges one or more plane measurement tools on the height image and the observation image displayed on the display unit. The plane measurement tool arranged on the plane image specifies a measurement target region such as a rectangle or a circle on the image, to extract a measurement target element included in this measurement target region. For example, a line segment, a circle or the like in the measurement target region is extracted by edge detection or the like. Based on the extracted measurement target element, plane dimensions such as a distance between two points, a distance between straight lines, a length to a normal drawn to a straight line, or a radius or an area of a circular arc are computed by the measurement unit. This measurement tool has position information on a plane (e.g., XY-coordinate) in order to specify a position arranged on the image, and by saving the information as a below-mentioned template, the tool can call and reproduce the same position.

Further, the measurement tool specification unit arranges one or more height measurement tools on a profile graph displayed on the display unit. Here, the profile graph is an image showing a sectional shape of the height image or the composite image (detailed later), and the height measurement tool is arranged on the profile graph and specifies a position for measuring a height dimension. Specifically, the height measurement tool extracts the measurement target element which is specified as a measurement target region of a rectangular shape or a circle on the profile graph, and included in this measurement target region. Then, based on the extracted measurement target element such as a line segment or a circle, a specified measurement process, such as measurement of a difference in height, an inclined angle or the like between two specified points, is performed by the measurement unit. Differently from the plane measurement tool, this height measurement tool has not only position information on the XY-plane of the profile graph, but also information of a position in a frame shape set on the profile graph, namely, information of a position in the height direction. Therefore, at the time of saving as a template, the information of the height position is included and saved as well as the information in the plane direction as described above. This can lead to precise reproduction of the position of the height measurement tool in the stereoscopic shape, so as to perform a desired measurement process.

(Three-dimensional Image Measurement Program)

Figure 26:
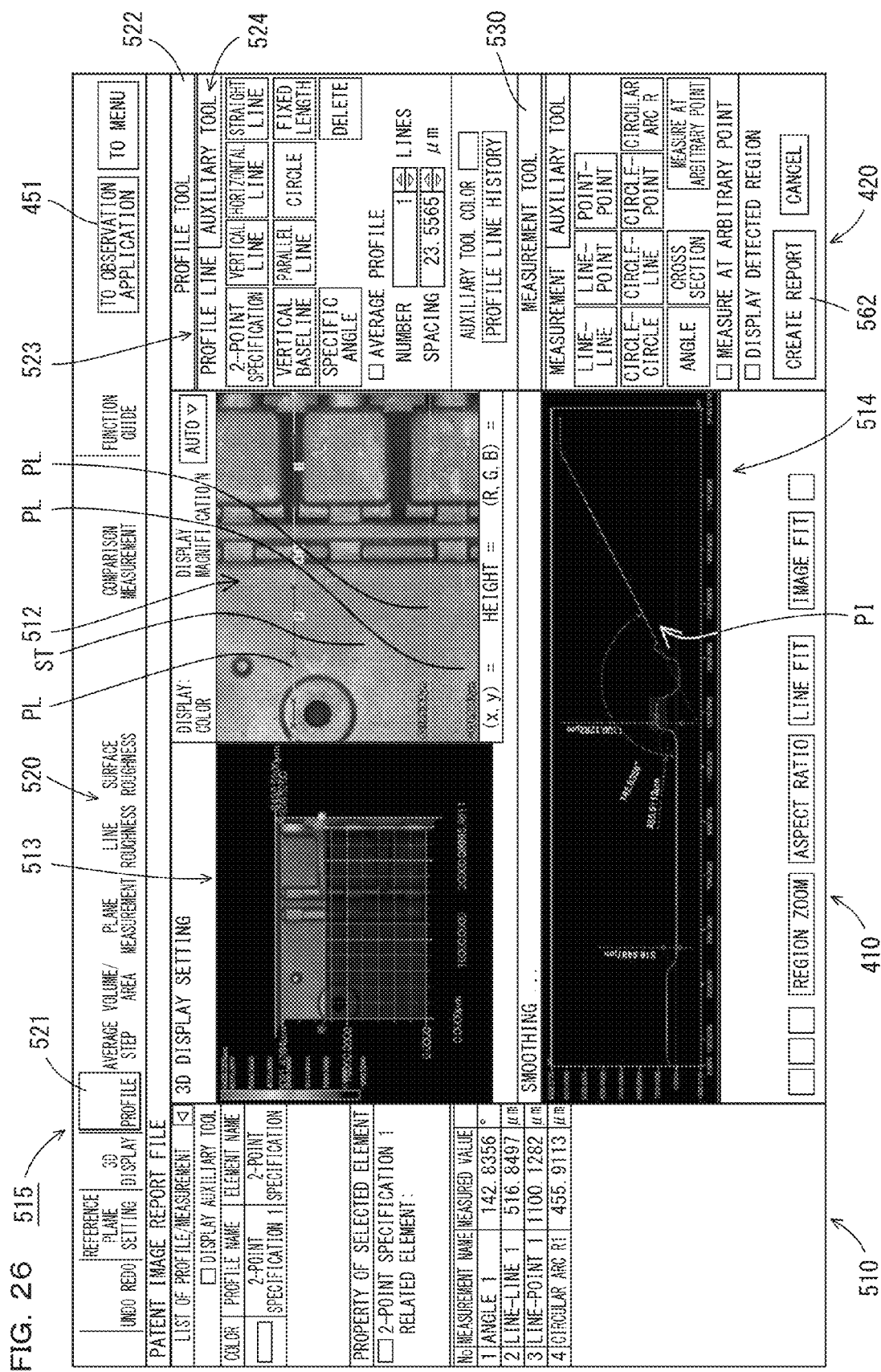
FIG. 26 is an image view showing a GUI screen of a profile measurement function of a three-dimensional image measurement program.

Examples of the GUI for the three-dimensional image measurement program are shown in FIGS. 26 to 36. The three-dimensional image measurement program shown in FIGS. 26 to 36 is provided with a variety of measurement functions. The image display region 410 and the operation region 420 are respectively provided at the center and at the right end of the screen. Further, a result display region 510 for displaying a result of measuring each profile line is provided at the left end of the screen. Moreover, a measurement function toolbar 520 is provided in the upper section of the screen, where a variety of buttons for executing measurement functions are arranged. By selecting a button indicating a desired measurement function out of these buttons, the screen can be switched to the screen for executing the corresponding measurement function. FIG. 26 shows an example where a "Profile" button 521 has been pressed from the measurement function toolbar 520.

(Profile Measurement Function)

In the three-dimensional image measurement program of FIG. 26, a profile measurement screen 515 is shown where the profile measurement function has been selected by pressing the "Profile" button 521 in the measurement function toolbar 520. The profile measurement function is a measurement function for measuring a height, a width, an angle a distance between circles, a circular arc, a sectional area, or the like with respect to a sectional shape line obtained by sectioning the composite image ST or the height image along a profile line PL as a measurement reference. In the example of FIG. 26, the image display region 410 is divided into three sections, where a measurement target image display region 512 for displaying the composite image ST, the observation image or the height image is provided in the upper right, a composite image display region 513 for displaying a composite image (stereoscopic shape data) is provided in the upper left, and a profile graph display region 514 for displaying a sectional shape (profile shape) is displayed in the lower section.

In the present specification, the profile line PL means a straight line specified mainly in the plane view of the image, and a profile graph PI means a curve shown mainly in the sectional view of the image and showing a contour of a cross section formed by sectioning along the profile line PL.

(Profile Line Arrangement Unit)

The measurement microscope device of FIG. 1 is provided with a profile line arrangement unit for setting the profile line PL as the measurement reference in an arbitrary position on the image. Specifically, in the operation region 420 of the three-dimensional image measurement program of FIG. 26, a profile tool 522 is provided as one aspect of the profile line arrangement unit in the upper section and a height measurement tool button 530 is provided in the lower section. In the profile tool 522, a profile line tool 523 and an auxiliary tool 524 can be selected as tools for setting the profile line PL on the composite image display region 512. The profile line tool 523 is provided with two-point specification, a vertical line, a horizontal line, a straight line, a vertical baseline, a parallel line, a circle, a fixed length, a specific angle, and a delete button. Using these, the profile line PL is set in an arbitrary position on the composite image ST on the composite image display region 512. When the profile line PL is set, the sectional shape formed by sectioning the object along this line is displayed in a graph form as a profile shape on the profile graph display region 514. For example, when the two-point specification is selected and the profile line PL is set on the composite image display region 512, the profile shape corresponding to this profile line PL is displayed on the profile graph display region 514. At this time, with the profile line PL being displayed also on the composite image display region 512, a cross section formed by sectioning along this profile line is displayed as the profile graph on the profile graph display region 514 along with the profile line on the composite image, to facilitate grasping of the positional relation as to which portion of the cross section is on display on one screen.

(Height Measurement Tool)

Further, a variety of measurements can be performed on the profile shape displayed on the profile graph display region 514 by use of the height measurement tool button 530. For example, respective distances of line-line, line-point, point-point, circle-circle, circle-line and circle-point can be measured and a circular arc R, an angle, a sectional area and the like can be computed. Note that the profile shape is not limited to being displayed on the profile graph display region 514, but it can also be superimposed and displayed on the measurement target image display region 512. As described above, the height measurement tool is arranged on the profile graph by use of the height measurement tool button 530, to thereby specify the position for measuring the height dimension. Specifically, when the user specifies a rectangular measurement target region on the profile graph by means of the mouse or the like, a measurement target element such as a line segment or a circle included in this measurement target region is extracted. A desired measurement process is then performed through use of the extracted measurement target element. The measurement process can be selected by the height measurement tool button 530 provided in the operation region 420.

The measurement target element is specified by the auxiliary tool 524. The auxiliary tool 524 is a tool for performing image processing such as edge extraction on an image to automatically detect a measurement target element as a selection reference. For example, it is capable of detecting a contour from the light and shade of an observation image, and detecting a cylinder, a sphere or the like from stereoscopic shape data to display an axial line and a central point thereof. The contour, the axial line and the central point can be reused at the time of arranging the profile tool.

(Average Step Measurement Function)

Figure 27:
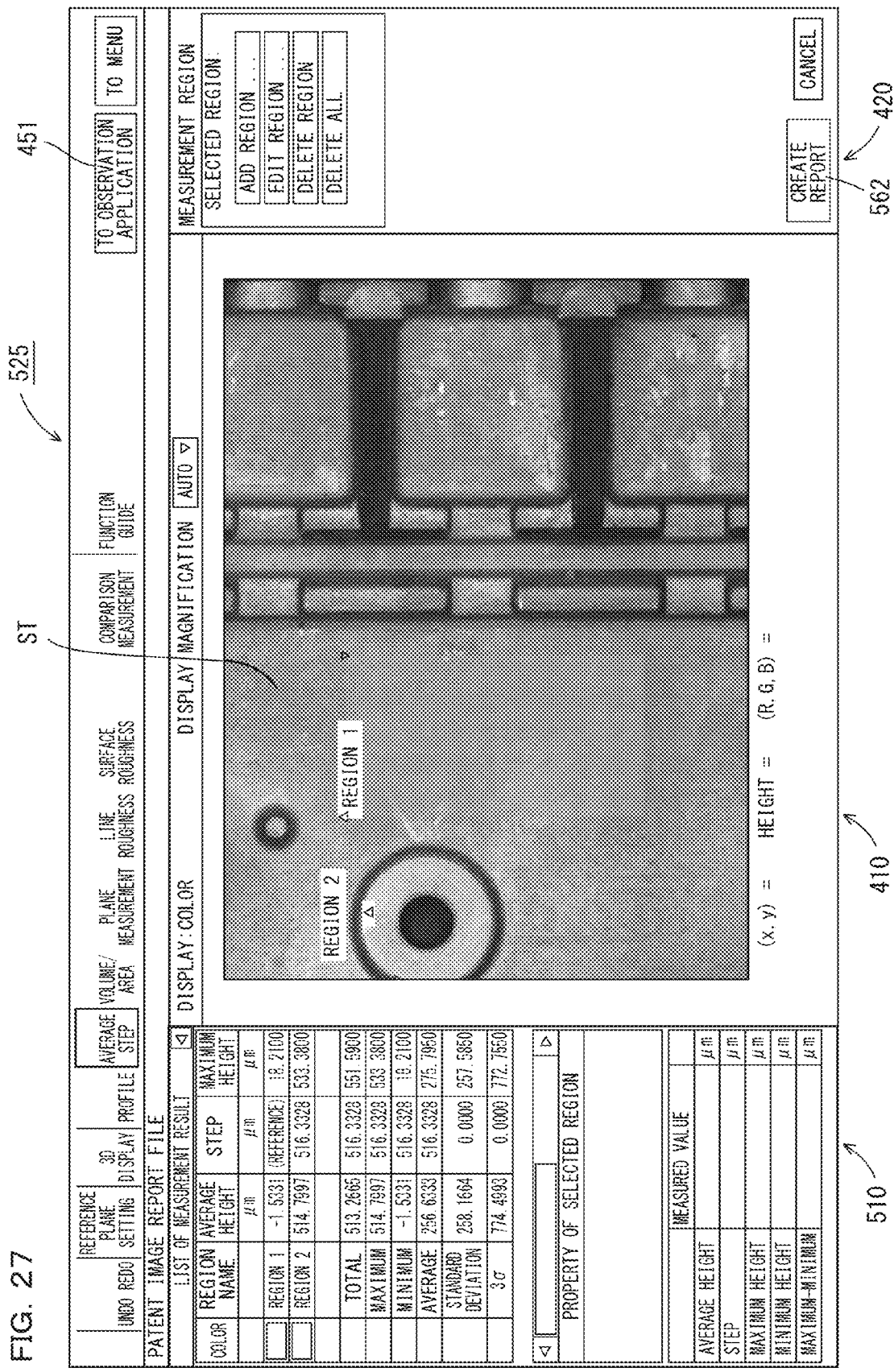
FIG. 27 is an image view showing a GUI screen of an average step measurement function.

FIG. 27 shows an example of an average step measurement screen 525 for performing an average step measurement function. The average step measurement function is a measurement function for specifying part or all of the composite image ST or the height image, obtaining an average height of that portion, and obtaining a difference in average height (average step) from another portion. In an example of FIG. 27, a height difference between an average height of a region 1 shown in blue and an average height of a region 2 shown in yellow is obtained and displayed on the result display region 510 in the left field.

(Volume/area Measurement Function)

Figure 28:
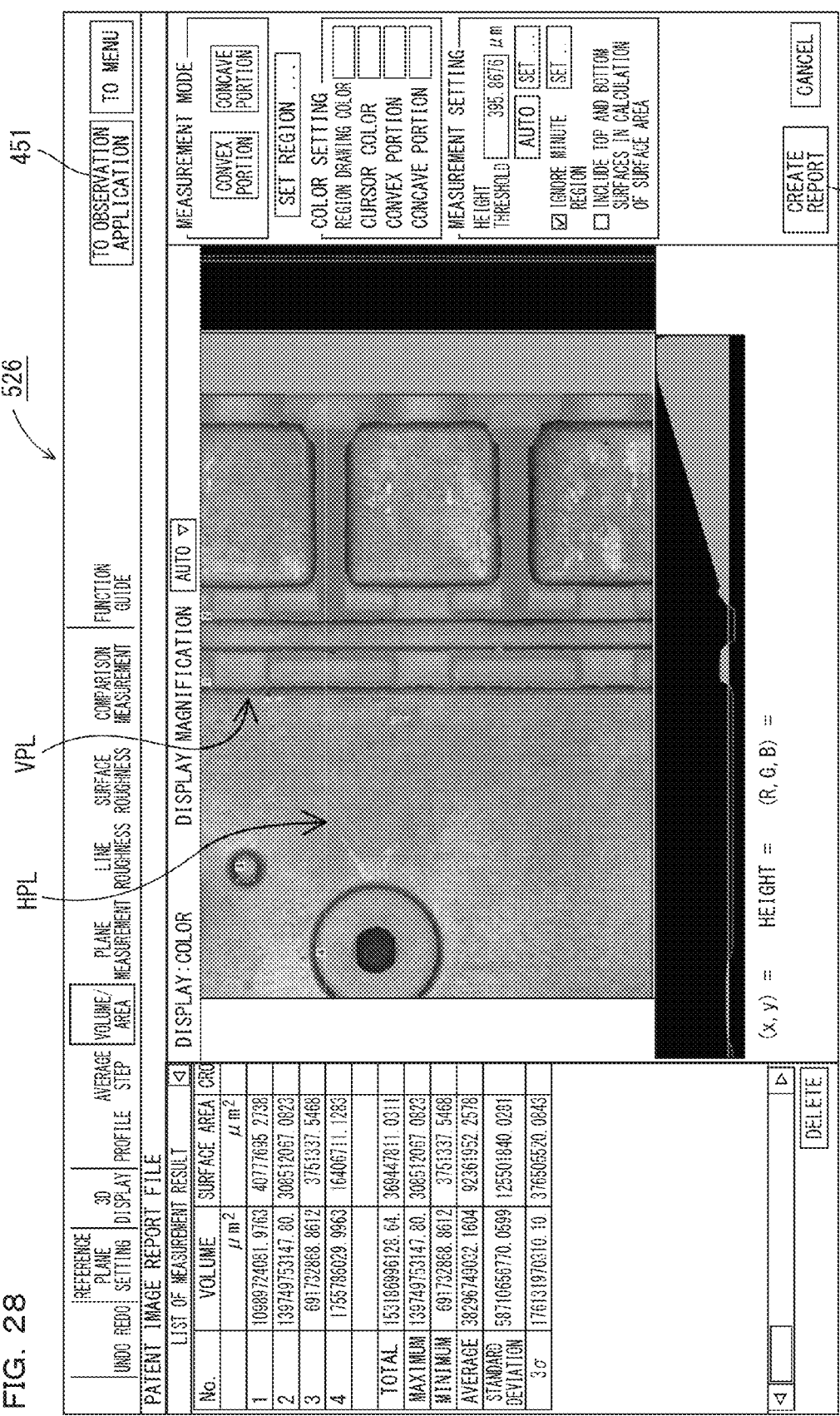
FIG. 28 is an image view showing a GUI screen of a volume/area measurement function.

FIG. 28 shows an example of a volume/area measurement screen 526 for performing a volume/area measurement function. The volume/area measurement function is a measurement function for measuring a volume, a surface area, a sectional area and the like of the uneven portion of the composite image ST. Here, a height threshold (or reference plane) is set with respect to the measured shape, and a volume or an area of a portion higher or lower than the threshold can be computed. Alternatively, by setting the threshold, only the specific portion can be measured or a minute region can be removed.

(Plane Measurement Function)

Figure 29:
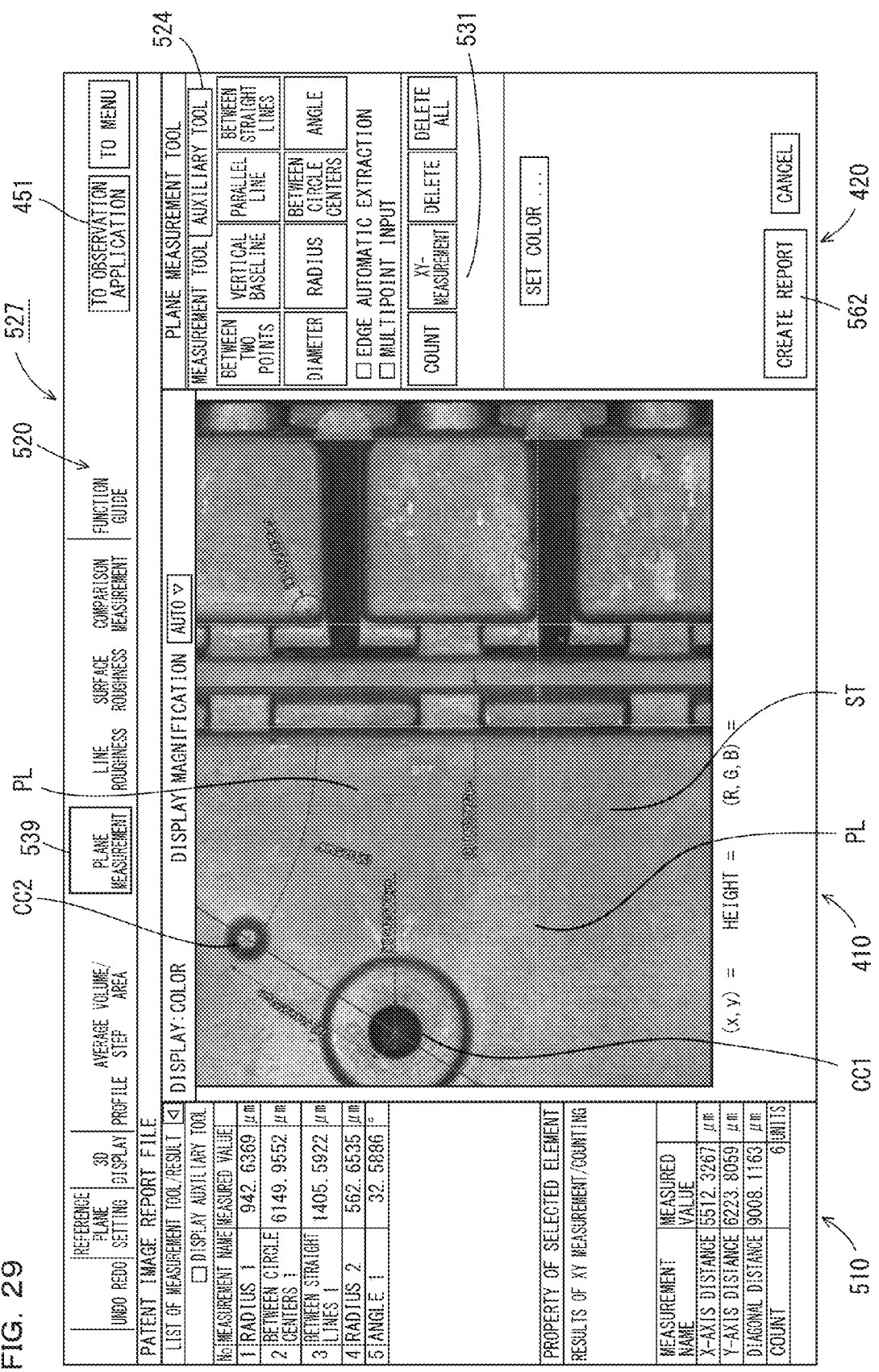
FIG. 29 is an image view showing a GUI screen of a plane measurement function.

When a "Plane Measurement" button 539 is pressed in the measurement function toolbar 520, a plane measurement screen 527 for executing a plane measurement function is displayed as shown in FIG. 29. The plane measurement function is a measurement function for measuring the shape on a two-dimensional XY-plane. Hence the present measurement function is used on the observation image as well as the composite image and the height image. On the plane measurement screen 527, a plane measurement tool button 531 for executing the plane measurement function is displayed on the operation region 420. The plane measurement tool button 531 is provided with buttons respectively for measurements of a distance of two-point, a vertical baseline, a parallel line, a vertical line, a circle diameter, a circle radius, a distance between circle centers and an angle, a number count, XY measurement, and the like. When each measurement button arranged in the plane measurement tool button 531 is selected, a corresponding measurement process can be performed.

(Auxiliary Tool 524)

In the example of FIG. 29, the measurement target element to serve as a reference of the measurement process is previously selected by use of the auxiliary tool 524. For example, a region is specified on the image display region 410, and a measurement target element such as a line segment or a circle included in this region is extracted by edge detection or the like. Specifically, the user specifies a rectangular measurement target region by means of the mouse or the like, and a measurement target element included in this measurement target region is automatically extracted and further approximated to a circular arc or a straight line. Here, measurement target elements CC1 and CC2 are extracted, and extracted circular arcs are approximated to circles. Further, respective central points of these measurement target elements CC1 and CC2 are computed and selected.

(Plane Measurement Tool)

Next, the tool is switched to the plane measurement tool, and the "2-Point" button is selected in the plane measurement tool button 531, to measure a distance between the central points of the measurement target elements CC1 and CC2. A measurement result is displayed on the result display region 510. Further, a plurality of measurement processes can be performed. A measurement result and a number are added to each measurement process on the image display region 410, and further, numbers corresponding thereto are also displayed on the result display region 510. In this example, "2. between two circle centers 1 6149.9552 µm" is displayed. As described above, providing a number to each measurement process facilitates understanding the correspondence between the image display region 410 and the result display region 510. Further, a display concerning each measurement process can be color-coded such that the same color shows the same measurement process.

As the foregoing auxiliary tool 524, using the edge extraction function for extracting a measurement target element on the image can lead to automatic detection of a shape edge and saving of the user's labor of manual specification. This can also suppress variations in specified position among users. In addition, it is possible in this function by using the height image to detect, for example, a line of intersection between planes and an axis of a cylinder, and also perform a plane measurement through use of these lines. As described above, it is possible to use the plane measurement which cannot be realized only by the observation image.

Moreover, the computing result as thus obtained can be superimposed and displayed on the image display region other than being displayed on the result display region 510. For example, a measurement result obtained by the plane measurement tool is superimposed and displayed on the height image or the observation image, while a measurement result obtained by the height measurement tool is superimposed and displayed on the profile graph. As described above, the height image and the profile graph are displayed while being compared with each other, and the measurement result is further superimposed and displayed, thereby allowing realization of an operation environment with further excellent visibility.

(Line Roughness Measurement Function)

Figure 30:
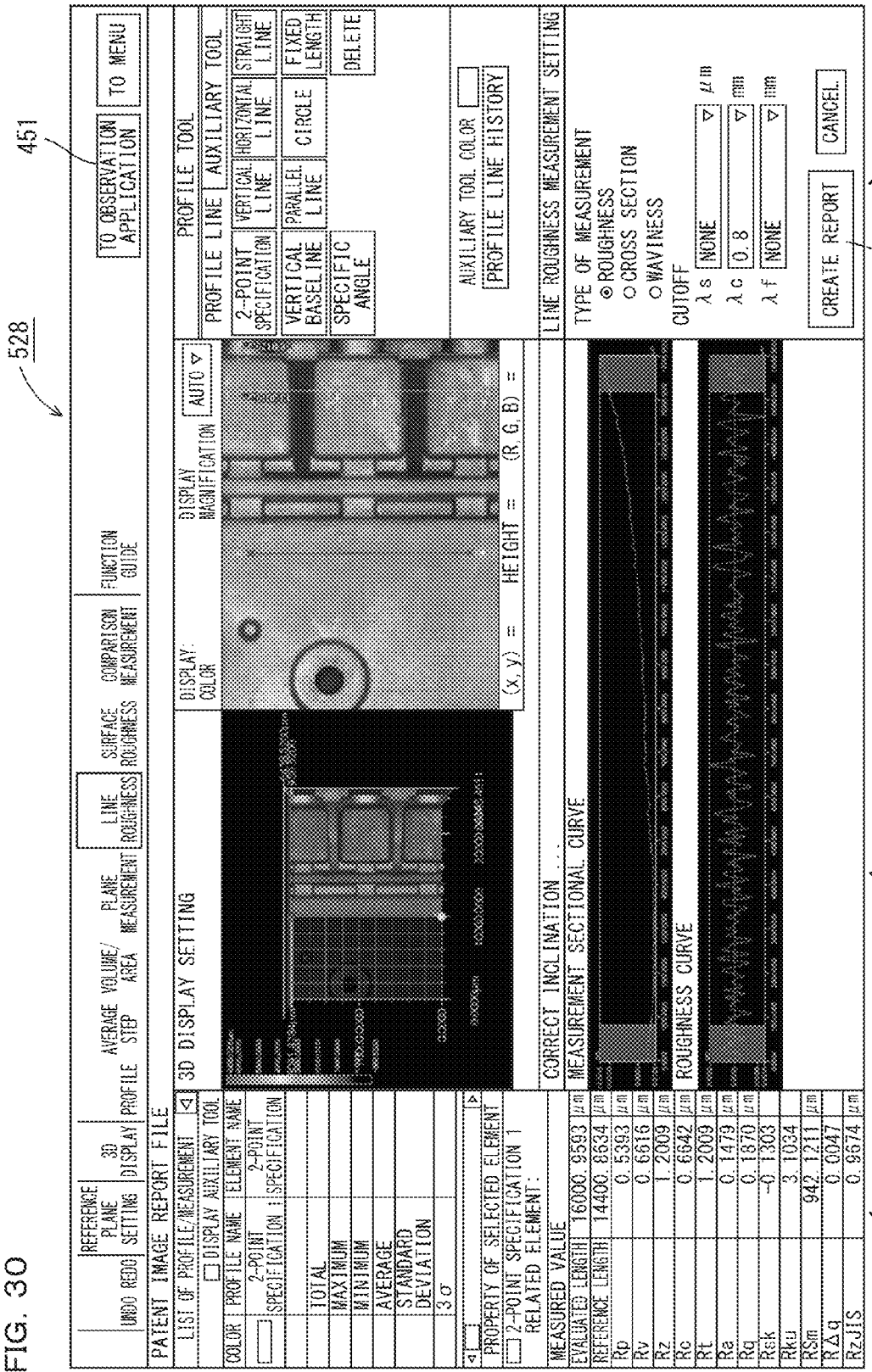
FIG. 30 is an image view showing a GUI screen of a line roughness measurement function.

Meanwhile, FIG. 30 shows an example of a line roughness measurement screen 528 for performing a line roughness measurement function. The line roughness measurement function is a measurement function for measuring a variety of line roughness parameters with respect to a sectional shape line obtained by drawing the profile line PL in an arbitrary position on the composite image ST or the height image and sectioning along this profile line PL. As for the line roughness parameter, for example, a parameter standardized by ISO4287:1997 (JIS B0601:2001) can be used.

(Surface Roughness Measurement Function)

Figure 31:
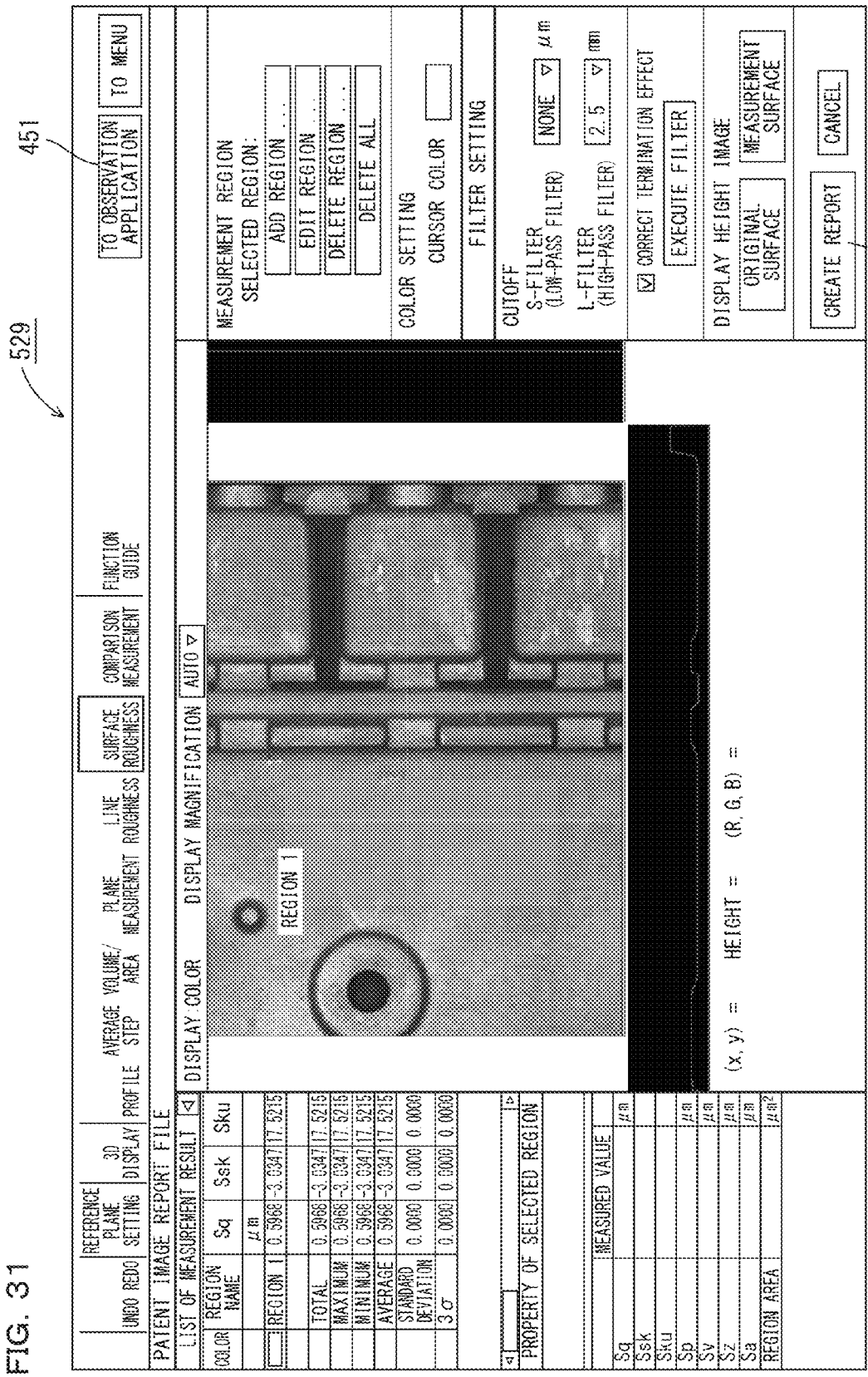
FIG. 31 is an image view showing a GUI screen of a surface roughness measurement function.

FIG. 31 shows an example of a surface roughness measurement screen 529 for performing a surface roughness measurement function. The surface roughness measurement function is a measurement function for measuring a surface properties, namely, a variety of surface roughness parameters, with respect to a region specified on the composite image ST or the height image. For the surface roughness parameter, for examples, a parameter standardized by ISO25178 can be employed.

(Comparison Measurement Function)

Figure 32:
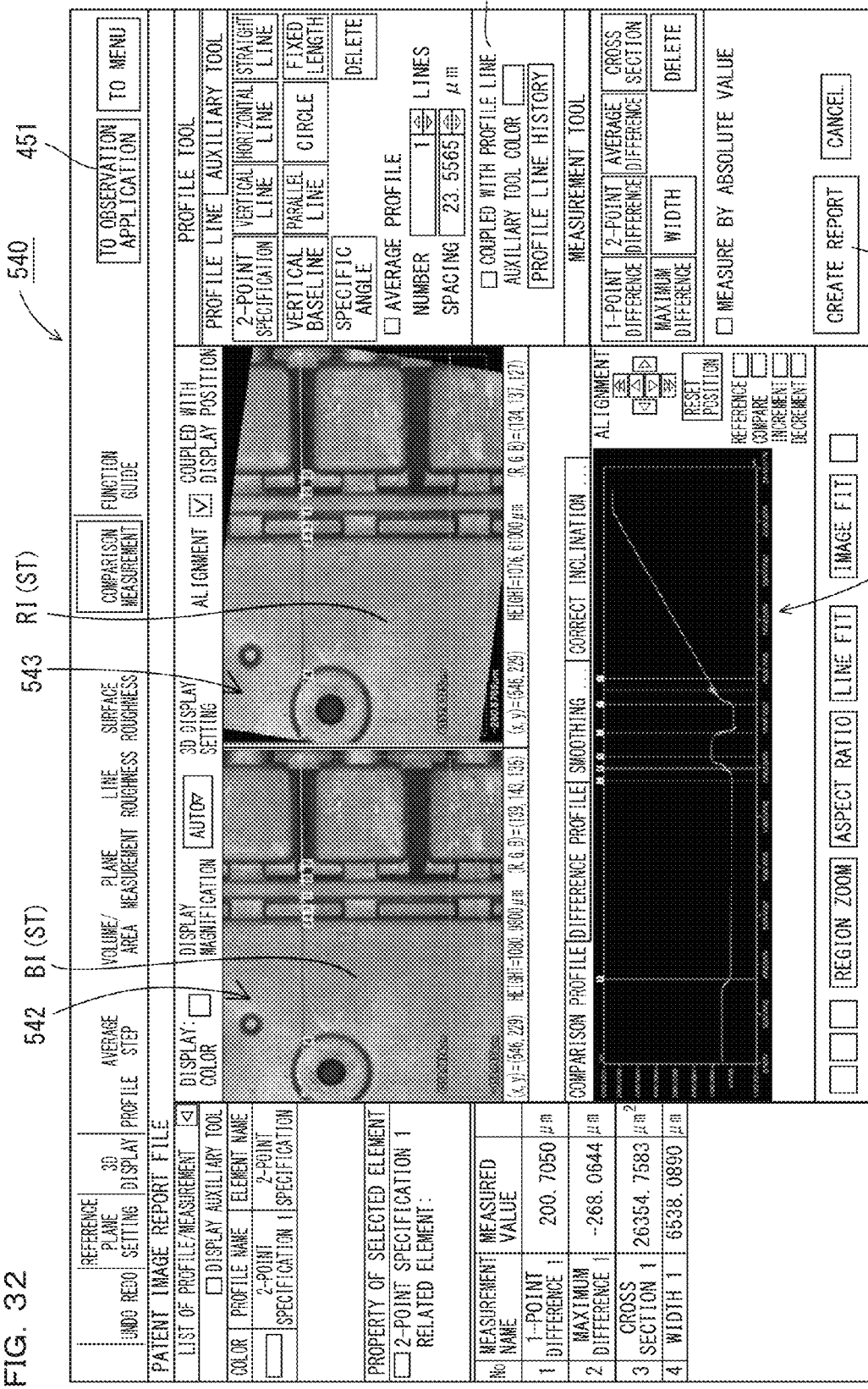
FIG. 32 is an image view showing a GUI screen of a comparison measurement function.

Further, FIG. 32 shows an example of a comparison measurement screen 540 for performing a comparison measurement function. The comparison measurement function is a measurement function of arranging two of the composite image ST, the height image or the observation image side by side and displaying those images, to perform a variety of measurements of a difference, sectional areas and the like while comparing sectional shape lines obtained by sectioning both data along the same line or different lines. Here, one of the two images to be compared is referred to as a comparison reference image BI of an object to serve as a comparison reference, and the other is referred to as a comparison target image RI to serve as a comparison target.

Further, in performing the comparison measurement, it is desirable to first align the comparison target image RI automatically to a position of the comparison reference image BI by pattern matching, edge detection or the like. This can facilitate comparison between corresponding areas. Performing such pattern matching or the like enables automatic alignment in the position in the XY-directions, the rotational displacement ($\theta$), the position in the height direction (Z-direction) and the like between the respective data of the comparison reference image BI and the comparison target image RI, thereby allowing comparison between the corresponding position. After the alignment, the profile line PL is drawn on the same position of each data, to thereby allow comparison in sectional shape line obtained by sectioning the same position, so as to clarify a minute difference in shapes.

As preparations for a variety of analyses and measurements as described above, there can be executed, by use of the three-dimensional image measurement program, image processing functions for applying a variety of filters (averaging, median, Gaussian, edge emphasis, etc.) to the observation image, the composite image and the height image, specifying a plane (reference plane) as a measurement reference, and removing/correcting plane distortion or a large plane shape of the composite image (plane shape correction). Although these preparations are not always required for an analysis and measurement on acquired data, they are preferably implemented in the case of performing an analysis and measurement with higher accuracy and better reproducibility.

Although the procedure for performing a variety of measurements has been described above based on the three-dimensional composite image formed by combining the height image and the observation image, it is possible in the present invention to perform measurement and an analysis not only on the composite image but also on the height image based on height information of the height image. Further, although the example has been described above where a new height image and observation image are acquired and subsequently subjected to the measurement, it goes without saying that the previously saved height image or the like can be read by the three-dimensional image measurement program and subjected to the measurement and analysis as described above.

(Reference Plane Specification Unit)

In order to perform alignment of the composite image and the height image by pattern matching or the like, it is necessary to previously set reference planes of the respective images. That is, the respective reference planes are set by means of composite image data and height image data to serve as comparison references and composite image data and height image data to serve as comparison targets, and pattern matching is performed presuming that these are common reference planes. The reference planes are specified by a reference plane specification unit.

Figure 33:
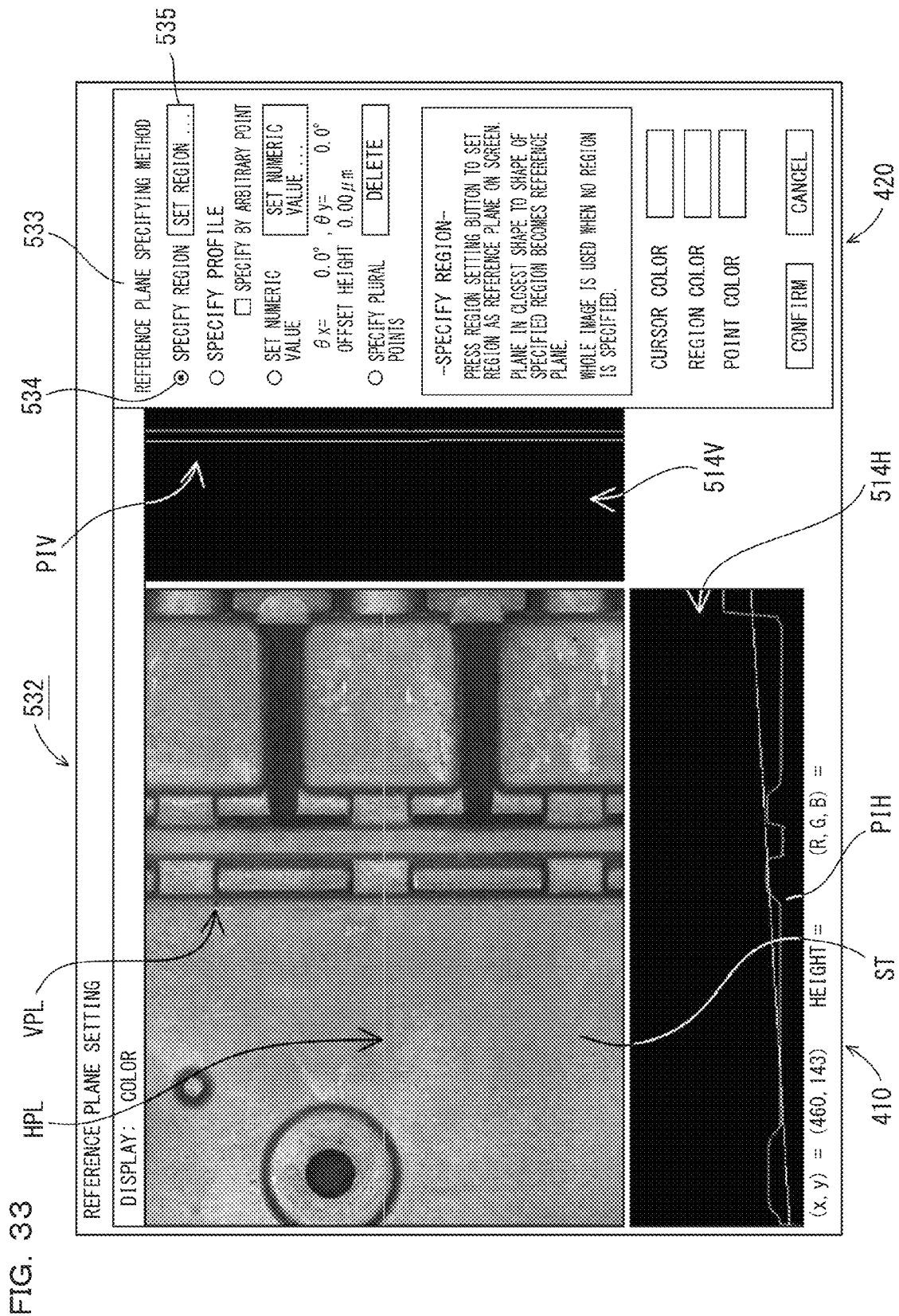
FIG. 33 is an image view showing a GUI for setting a reference place.
Figure 34:
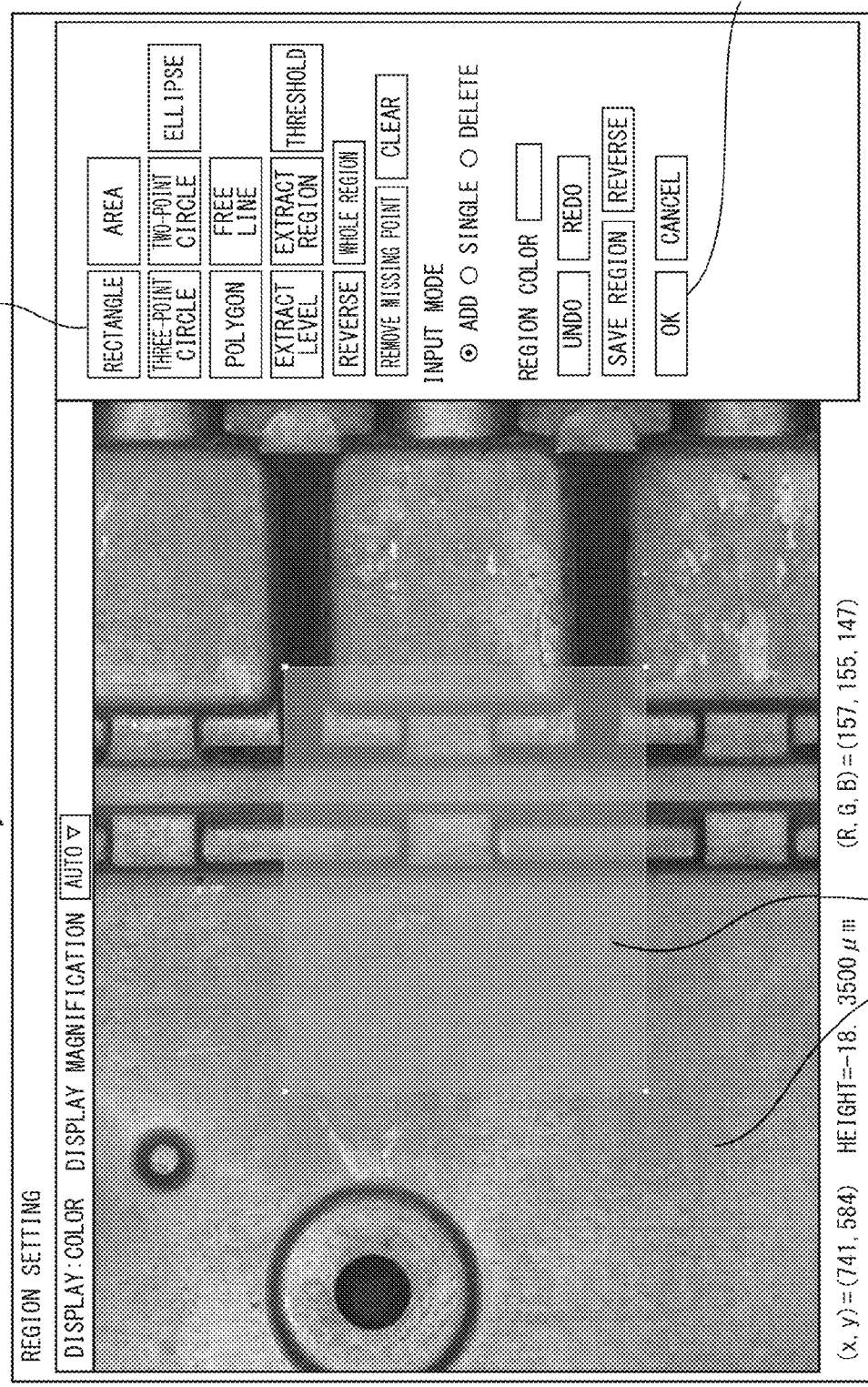
FIG. 34 is an image view showing a GUI for performing region setting in FIG. 33.

FIGS. 33 and 34 show one example of the reference plane specification unit. When setting of the reference plane is instructed in the three-dimensional image measurement program, a reference plane setting screen 532 of FIG. 33 is displayed. In this reference plane setting screen 532, an image display region 410 is provided in the upper left, and the composite image ST is displayed. Further, the profile line PL is arranged longitudinally and laterally in a cross shape on the composite image ST. A longitudinal profile graph PIV having a sectional shape along a longitudinal profile line VPL is displayed on a longitudinal profile graph display region 514V provided on the right side of the image display region 410, and a lateral profile graph PIH having a sectional shape along a lateral profile line HPL is displayed on a lateral profile graph display region 514H provided on the lower side of the image display region 410. When the profile line PL or the composite image ST is relatively moved, display contents of the profile graph display regions 514V and 514H are respectively updated to the profile graphs PIV and PIH in accordance with the profile line PL after the movement. Accordingly, the user selects as a reference plane a plane which is easy to bring into common and as flat as possible while checking the profile graphs PIV and PIH.

The reference plane is concretely specified from a reference plane specifying method field 533 provided in the operation region 420 on the right side of the reference plane setting screen 532 of FIG. 33. For example, when a region setting radio button 534 in the reference plane specifying method field 533 is selected and a "Specify Region" button 535 is pressed, a region setting screen 536 of FIG. 34 is displayed. The user specifies a region desired to be made a reference plane with respect to the composite image ST from the region setting screen 536. The specification method can be selected by a button provided in the operation region 420 on the right side of FIG. 34. For example, when a "Rectangle" button 537 is selected, a diagonal position is specified with the mouse to specify a rectangular region. Other than this, the region can be specified by an area, or by an arbitrary method using a three-point circle, a two-point circle, an ellipse, a polygon, a free line or the like. Moreover, the region can be automatically specified by image processing by use of a method such as level detection, region extraction, threshold setting or the like. When a region ROI1 to serve as the reference plane is specified as described above, an "OK" button 538 provided in the lower portion of the operation region 420 is pressed. This determines the specified region as the reference plane.

(Alignment According to Pattern Matching)

Next, as one aspect of automatic alignment, a detailed procedure for pattern matching will be described. Here, there will be described a procedure for acquiring a first composite image as the comparison reference image BI and a second composite image as the comparison target image RI, and moving and rotating the image by pattern matching so as to match the second composite image with the first composite image.

First, the first composite image is read which has the observation image (texture image) obtained by capturing the object and the height image having a value in the height direction (vertical direction to an imaging plane) as a pixel. Then, the first composite image is displayed on the display section 400.

Next, a first region for performing pattern matching is specified by the user on the first composite image. The observation image in the first region specified here is stored as an alignment image.

Next, the second composite image is read, and a position and an angle that match those of the alignment image are searched from the observation image of the second composite image. The second composite image is then affine-transformed such that the portion where the second composite image matches with the alignment image overlaps the portion where the alignment image of the first composite image has been taken out. This leads to alignment within a parallel plane to the imaging plane.

Further, alignment in the height direction is performed. Here, a second region is specified on the first composite image. Note that the second region may not be newly specified, and may be the same as the first region. Further, the alignment region can be specified not on the first composite image but on the second composite image.

Moreover, a difference between an average value of height data in the second region of the first composite image and an average value of height data in the second region of the second composite image after the alignment by pattern matching is obtained, and the height image of the second composite image is offset by the obtained difference such that the first composite image matches with the second composite image in the height direction. This leads to alignment in the height direction (vertical direction to the imaging plane).

After the second composite image has been read, the observation image of the second composite image may be displayed, a third region different from the first region may be specified on that image, and an image matching with the alignment image in the third region may be searched. In this case, the first measurement data and the second measurement data may be the same, and can be favorably used for the purpose of comparing shapes when almost the same shapes are in the same data, or for some other purpose. Further, when the shape measurement data has no observation image, pattern matching may be performed using the height image in place of the observation image. Moreover, the first region for performing pattern matching may be automatically decided from a luminance or a characteristic point of the observation image. Alternatively, when the data separately has a reliability image that represents reliability of measurement with respect to each pixel, the first region for performing pattern matching may be automatically decided from the reliability image. Moreover, the first region for performing pattern matching may be automatically decided from both the reliability image and the observation image. Additionally, in obtaining an average value of a height image in the third region for alignment in the height direction, only pixels with high measurement reliability in both the reliability image of the first composite image and the reliability image of the second composite image may be selected from those images, to obtain an average value.

(Method for Using Edge Detection)

In the above, the procedure for automatic alignment using pattern matching has been described. However, automatic alignment is not limited to pattern matching, but other methods can also be used as appropriate. As one example, an automatic positioning method using edge detection will be described below.

First, the first composite image is read which has the observation image (texture image) obtained by capturing the object and the height image having a value in the height direction (vertical direction to the imaging plane) as a pixel. Next, an image of the first composite image is displayed on the screen. The user then specifies one or more edge detection regions on the image. Edges are detected from the observation image in all the edge detection regions, and respective positions and angles are stored. Further, the second composite image is read, and edges are detected from the observation image in all the above specified edge detection regions. The second composite image is then affine-transformed to have a position and angle so as to maximize matching between the edge detected from the second composite image and the edge detected from the first composite image. This leads to alignment within a parallel plane to the imaging plane. Here, a first region for performing alignment in the height direction is specified on the image.

Next, a difference between an average value of height data in the first region of the first composite image and an average value of height data in the first region of the second composite image after the alignment by edge detection is obtained, and the height image of the second composite image is offset by the obtained difference such that the first composite image matches with the second composite image in the height direction. This leads to alignment in the height direction (vertical direction to the imaging plane). It should be noted that edge detectivity may be obtained in each edge detection region, and an edge with detectivity not larger than a certain value may not be used for alignment. Further, when the shape measurement data has no observation image, edge detection may be performed using the height image in place of the observation image. Moreover, the edge detection region may be automatically decided from a characteristic point of the observation image. Furthermore, in obtaining an average value of a height image in the third region for alignment in the height direction, only pixels with high measurement reliability in both the reliability image of the first composite image and the reliability image of the second composite image may be selected from those images, to obtain an average value.

In the above example, there has been described the procedure for taking the first composite image as the comparison reference image BI and the second composite image as the comparison target image RI, and moving and rotating the image by pattern matching or edge detection so as to match the second composite image with the first composite image. Needless to say, it is possible conversely to the above that the second composite image (comparison target image RI) side is fixed and the first composite image (comparison reference image BI) side is moved and rotated. It is also possible to use the height image and the observation image singly or in combination rather than using the composite image. Moreover, both the first composite image and the second composite image can be in the aspect of being obtained by reading previously captured composite image data by the three-dimensional image measurement program, other than being newly captured.

(Detail of Comparison Measurement)

As described above, performing alignment between the comparison reference image BI and the comparison target image RI can facilitate measurement of the corresponding area on the two images in the comparison measurement. A detail of the comparison measurement will be described herein based on FIG. 32 and the like. In a comparison measurement screen 540 shown in this figure, the image display region 410 for displaying the height image and the observation image is provided in the center. On the right side thereof, the operation region 420 for performing a variety of operations is provided, and on the left side thereof, the result display region 510 for displaying a measurement result is provided. Further, in the upper section of the image display region 410, a comparison reference image display region 542 for displaying the comparison reference image BI and a comparison target image display region 543 for displaying the comparison target image RI are respectively provided. In the lower section thereof, a profile graph display region 514 for displaying the profile graph PI corresponding to the profile line PL set in the image display region 410 is displayed. The example of FIG. 32 shows a state where the comparison target image RI on the right side has been aligned by the alignment unit 215 such that its posture matches with a posture of the comparison reference image BI on the left side.

(Magnification Coupling Function)

A magnification of an image displayed on the image display region 410 can be freely changed within the range of a magnification of the imaging unit 100 or performance of digital zooming. Further, the measurement microscope device shown in FIG. 1 is provided with the magnification coupling unit 216, and when a display magnification of one of the comparison reference image BI and the comparison target image RI is changed, a display magnification of the other image can be similarly changed along with the above change. Hence the two images can be constantly displayed with the same magnification while in the aligned state, which is useful in comparison observation. Further, the magnification coupling function can be switched on/off, and by bringing the function into the off state, magnification of each image can be individually set, to thereby facilitate switching between coupling and uncoupling according to the use.

(Display Position Coupling Function)

Moreover, a display position of an image displayed on the image display region 410 can be changed to an arbitrary position or posture. For example, the XY-plane can be moved to an arbitrary position by dragging a mouse cursor in the image display region 410. Further, as for the three-dimensional image such as the composite image ST or the height image, its posture and visual point can be changed by mouse-dragging. The measurement microscope device is also provided with the display position coupling unit 217. When a display position of one of the comparison reference image BI and the comparison target image RI is changed, the display position coupling unit 217 can make a display position of the other image automatically change along with the above change. Accordingly, even when the display position of one image is changed, the same area can be constantly displayed on the other image, which is useful in comparison observation. Further, the display position coupling function can also be switched on/off, and by bringing the function into the off state, the display position of each image can be individually set, to thereby facilitate switching between coupling and uncoupling according to the use.

(Transmittance Adjustment Function)

It is also possible to superimpose and display the comparison reference image BI and the comparison target image RI on the image display region 410. At this time, one or both images are translucently displayed and a transmittance adjustment function for changing a transmittance of the image is provided, thereby allowing either image to be displayed with emphasis, so as to facilitate visual checking of a difference between the images. Further, this can clarify not only the difference but also a displacement in the case of insufficient alignment, to contribute to manual fine adjustment in alignment.

(Line Coupling Switching Function)

Further, in the comparison measurement, the profile lines PL drawn on the respective data of the comparison reference and the comparison target can be switched between the coupling state of being arranged in the same position and the uncoupling state of being locatable in different positions. As one aspect of a line coupling switching unit for switching between coupling and uncoupling or synchronization and non-synchronization, a "Profile Line Coupling" field 544 disposed in the middle section of the operation region 420 is provided in the comparison measurement screen 540 of FIG. 32. The profile lines PL are coupled by placing a check mark in this "Profile Line Coupling" field 544, and are uncoupled by clearing the check mark.

Figure 35:
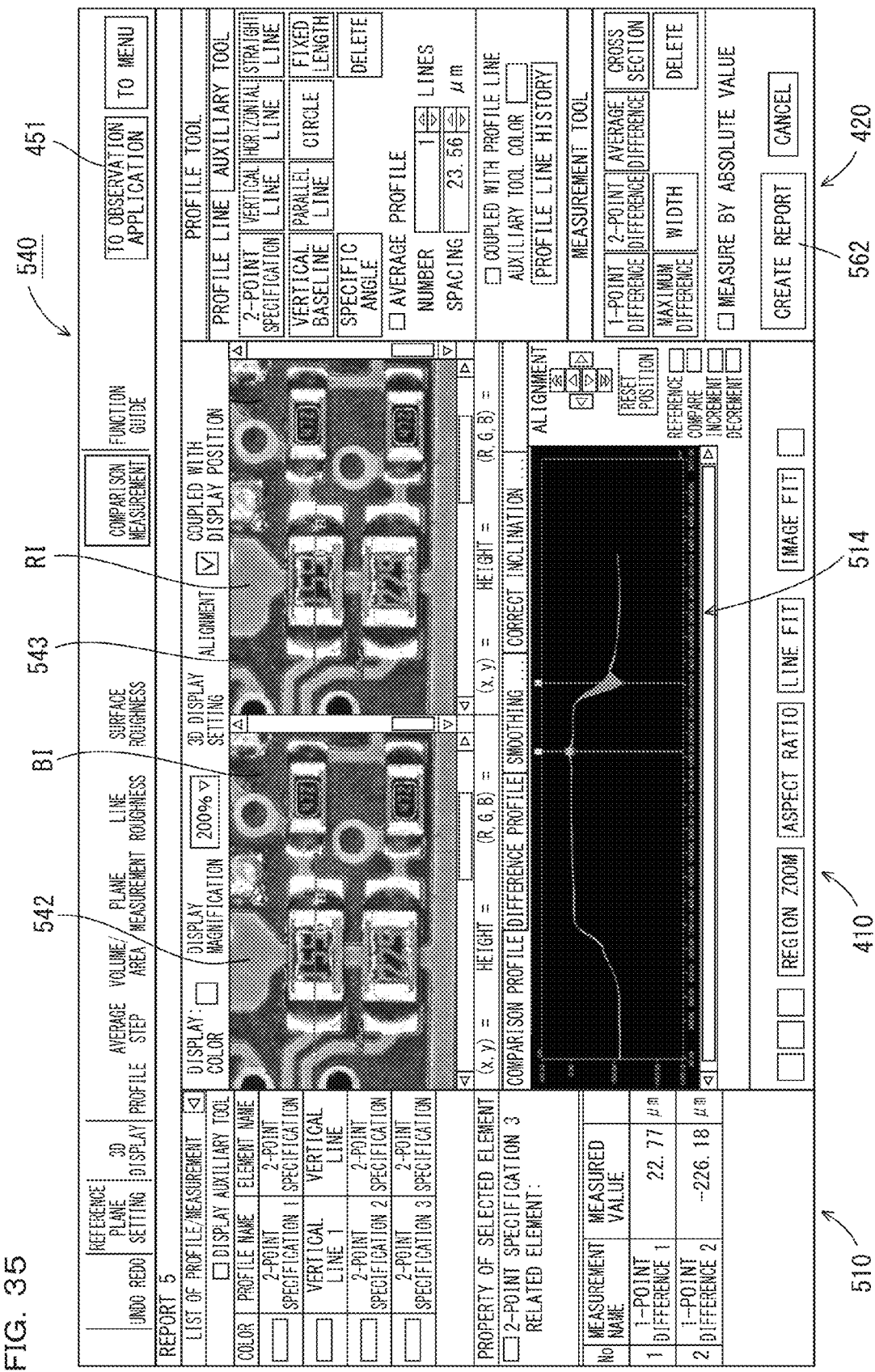
FIG. 35 is an image view showing a GUI screen of the comparison measurement function where profile lines are coupled with each other.
Figure 36:
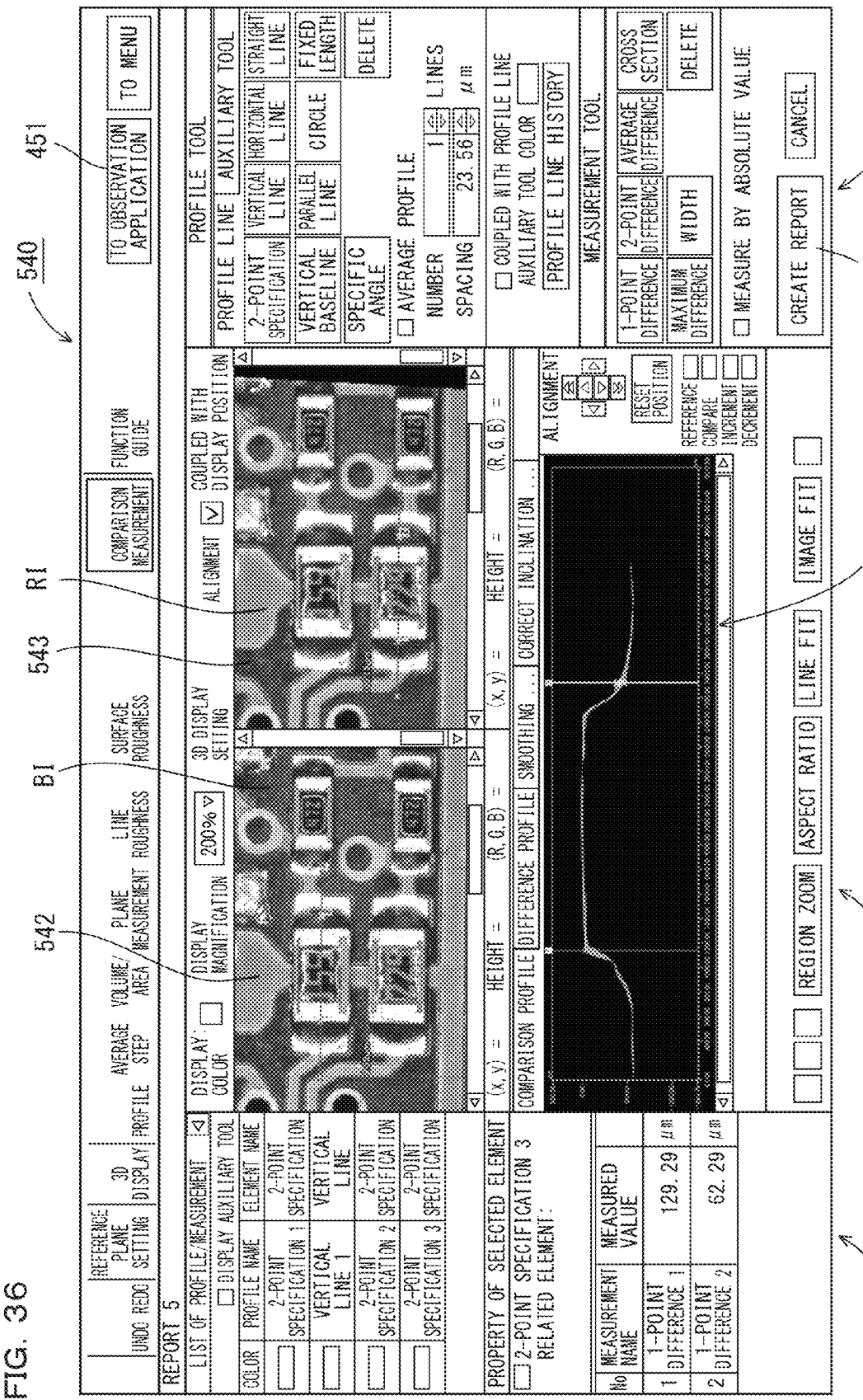
FIG. 36 is an image view showing a GUI screen of the comparison measurement function where the profile lines uncoupled with each other.

FIG. 35 shows an example of the comparison measurement screen 540 where the profile lines PL are coupled with each other, and FIG. 36 shows an example of the comparison measurement screen 540 where the profile lines PL are uncoupled with each other. When the line coupling switching function is turned on to make the profile lines PL coupled, the respective data of the comparison reference image and the comparison target image are previously aligned by the alignment unit 215 by pattern matching or the like, thus allowing comparison of sectional shapes between the corresponding areas. For example, in the profile graph display region 514 of FIG. 35, by superimposing and displaying profile graphs obtained respectively in the comparison reference image BI and the comparison target image RI, a difference therebetween can be made distinct. On the other hand, when the line coupling switching function is turned off to make the profile lines uncoupled, for example, in a case where the same pattern shape repeatedly appears on the data, different positions are individually specified on the respective data of the comparison reference image BI and the comparison target image RI, thereby allowing comparison of cross sections between the different portions.

It goes without saying that in the comparison measurement, other than capturing both the comparison reference image and the comparison target image, it is also possible to previously capture and save one image or both images and use this image at the time of the comparison measurement by reading it by the three-dimensional image measurement program.

In the present specification, the comparison reference image and the comparison target image are used in the meaning of including the height image, the observation image, or the three-dimensional composite image formed by combining the height image and the observation image.

(Profile Graph Coloring Function)

Figure 37:
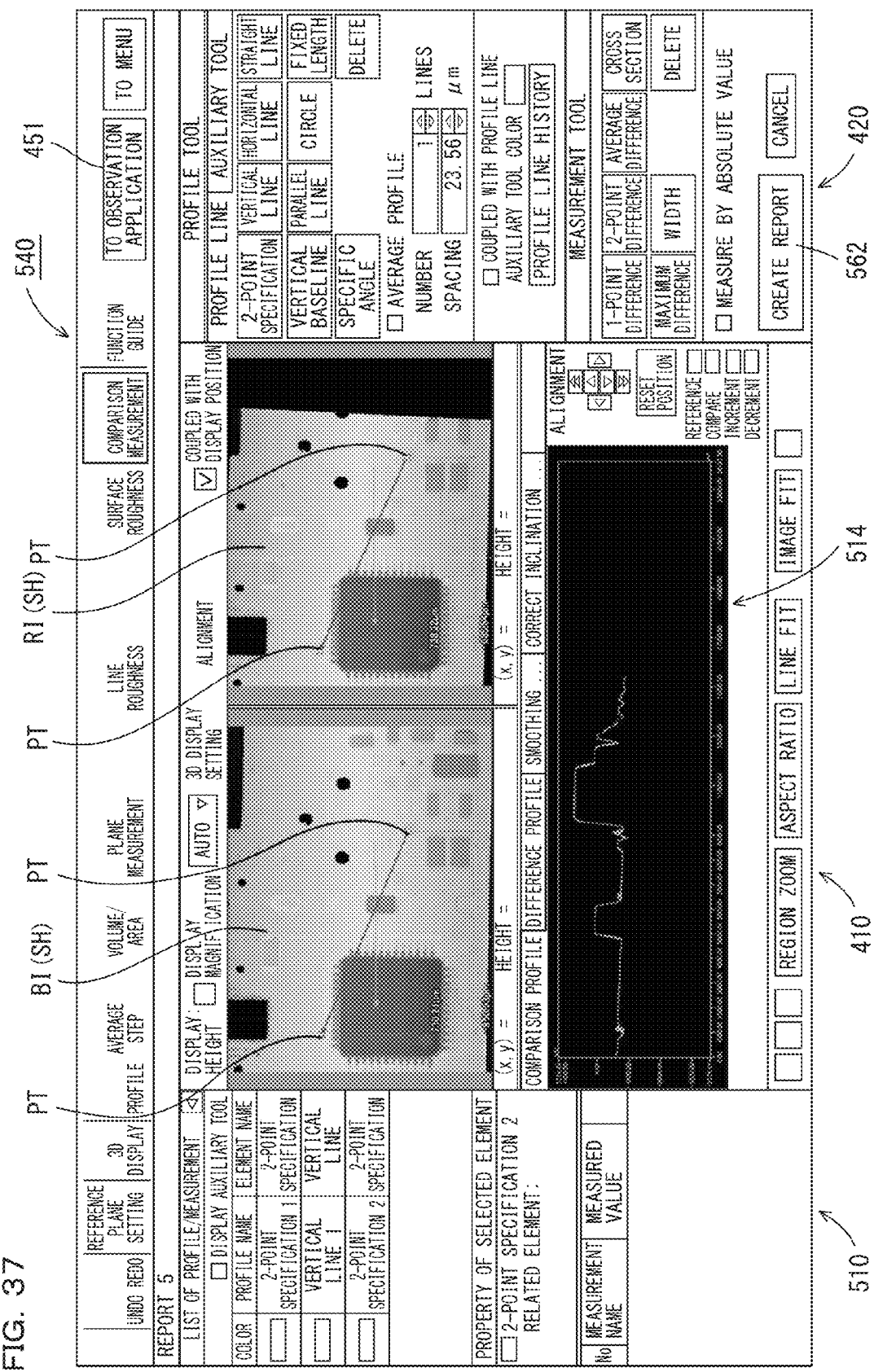
FIG. 37 is an image view showing a GUI of the comparison measurement.

Further, in the comparison measurement, as described above, the three-dimensional height image and composite image can be stereoscopically displayed. For example, as shown in FIG. 37, in the image display region 410, a height image SH as the comparison reference image BI is displayed on the left side and a height image SH as the comparison target image RI is displayed on the right side in a contour form color-coded with respect to each certain height. The comparison target image RI has been aligned with the same posture as the comparison reference image BI by the automatic alignment function, and displayed as arranged side by side therewith. In this state, the line coupling switching unit is turned on, to arrange the profile line PL in the common position. Further, the profile graphs PI of the comparison reference image BI and the comparison target image RI are superimposed and displayed on the profile graph display region 514 provided on the lower section side in the image display region 410. At this time, it is preferable to display the respective profile graphs PI in different aspects so that the comparison reference image BI and the comparison target image RI can be distinguished. In the example of FIG. 37, the profile graph PI of the comparison reference image BI is displayed in light blue and that of the comparison target image RI is displayed in yellow by means of the profile graph coloring function as described above. It is thereby possible to check a difference between the profile graphs PI.

(Difference Highlight Function)

A difference region can also be colored so as to facilitate visual grasping of the difference. Such a difference highlight function automatically computes a difference region, and highlights the region in a different aspect from the other regions. Further, among the differences, differences in increment and decrement can be highlighted in different aspects. In the example of FIG. 37, with the comparison reference image BI taken as a reference, the increment and the decrement are respectively colored and displayed in red and purple.

(Profile Plane Display Function)

Figure 38:
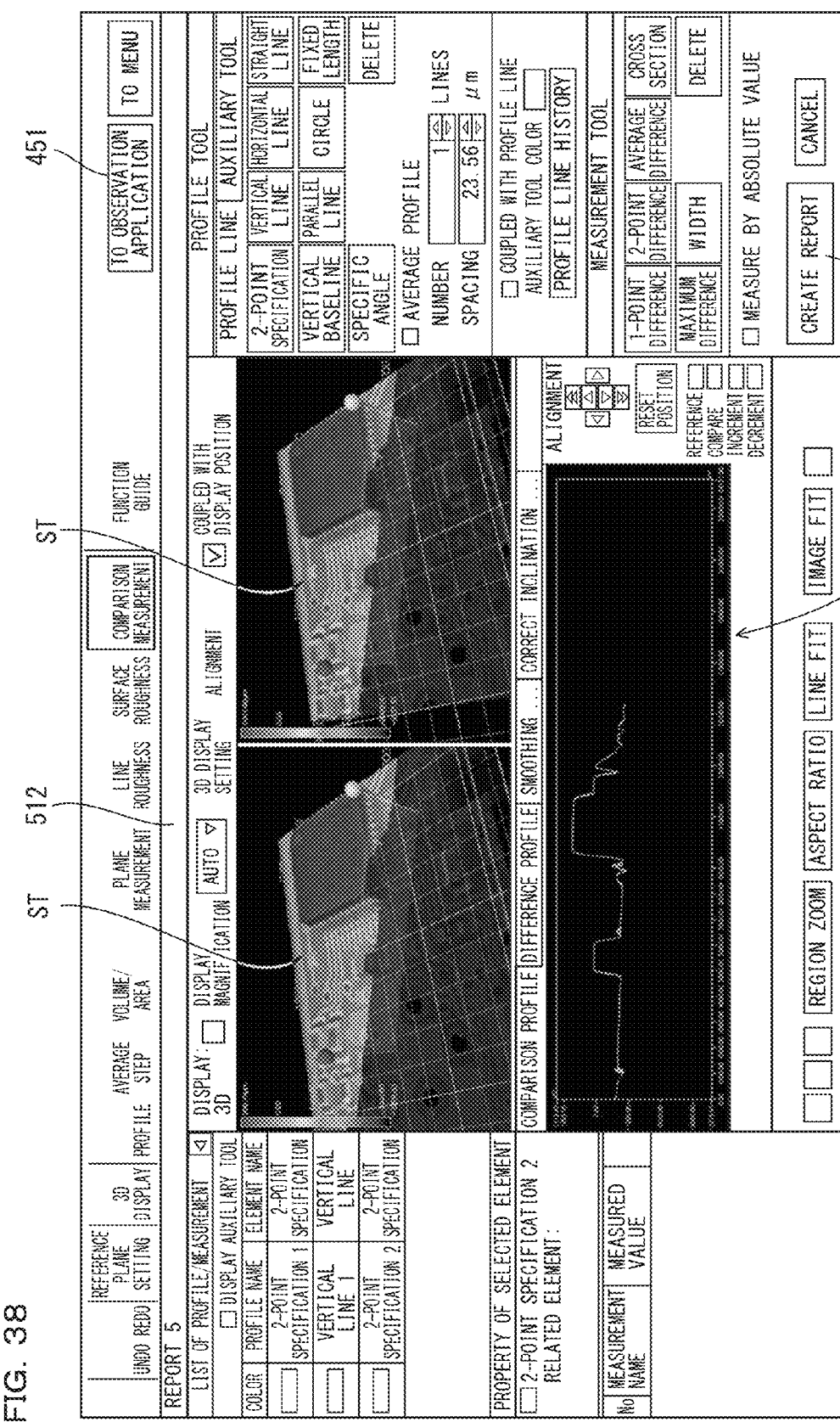
FIG. 38 is an image view showing a state where a height image of FIG. 37 has been switched to a composite image.

It is also possible to switch the display of the image display region 410 from the height image SH to the composite image ST. FIG. 38 shows a state where the height image SH of FIG. 37 has been switched to the composite image ST. The composite image ST can be displayed as rotated to have an arbitrary posture or angle. Further, at this time, a contour shape of the cross section obtained by sectioning the composite image ST along the profile line PL can be stereoscopically displayed. Such a profile plane display function enables the state of the cross section to be more visibly displayed not by simply superimposing and displaying the profile shape along the profile line PL on the height image display region 513 as shown in FIG. 37, but by directly displaying the profile shape along the profile line PL as the cross section on the composite image display region 512 as shown in FIG. 38. In the example of FIG. 38, the profile shape along the profile line PL which has been set in FIG. 37 is displayed with a posture easy to view by rotating the composite image ST. As described above, it is possible to change the display of the three-dimensional image data to one having an arbitrary posture or angle, so as to facilitate checking and grasping of the profile shape from a variety of postures in its checking operation.

It is also possible to extend or reduce the profile line PL by dragging one of points PT displayed at both ends of the profile line PL, or change the profile line PL to an arbitrary position on the composite image display region 512 (or on the height image display region 513 of FIG. 37). In accordance with the change in profile line PL, display contents of the profile graph PI on the profile graph display region 514 in the lower section are updated in real time. Further, the measurement result on the result display region 510 provided on the left side of the image display region 410 is similarly updated. Moreover, when the line coupling switching unit has been turned on, in accordance with a change in profile line PL of one composite image ST (or height image), the position of the profile line PL on the other composite image ST or the like is also changed along with the above change. In addition, although the example has been shown above where the composite images ST or the height images are displayed on the right and left in the image display region 410, the present invention is not necessarily limited to this aspect. Types of images in an arbitrary combination can be displayed, e.g., the composite image may be displayed on one side and the height image or the observation image may be displayed on the other side.

(Procedure for Comparison Measurement)

Figure 39:
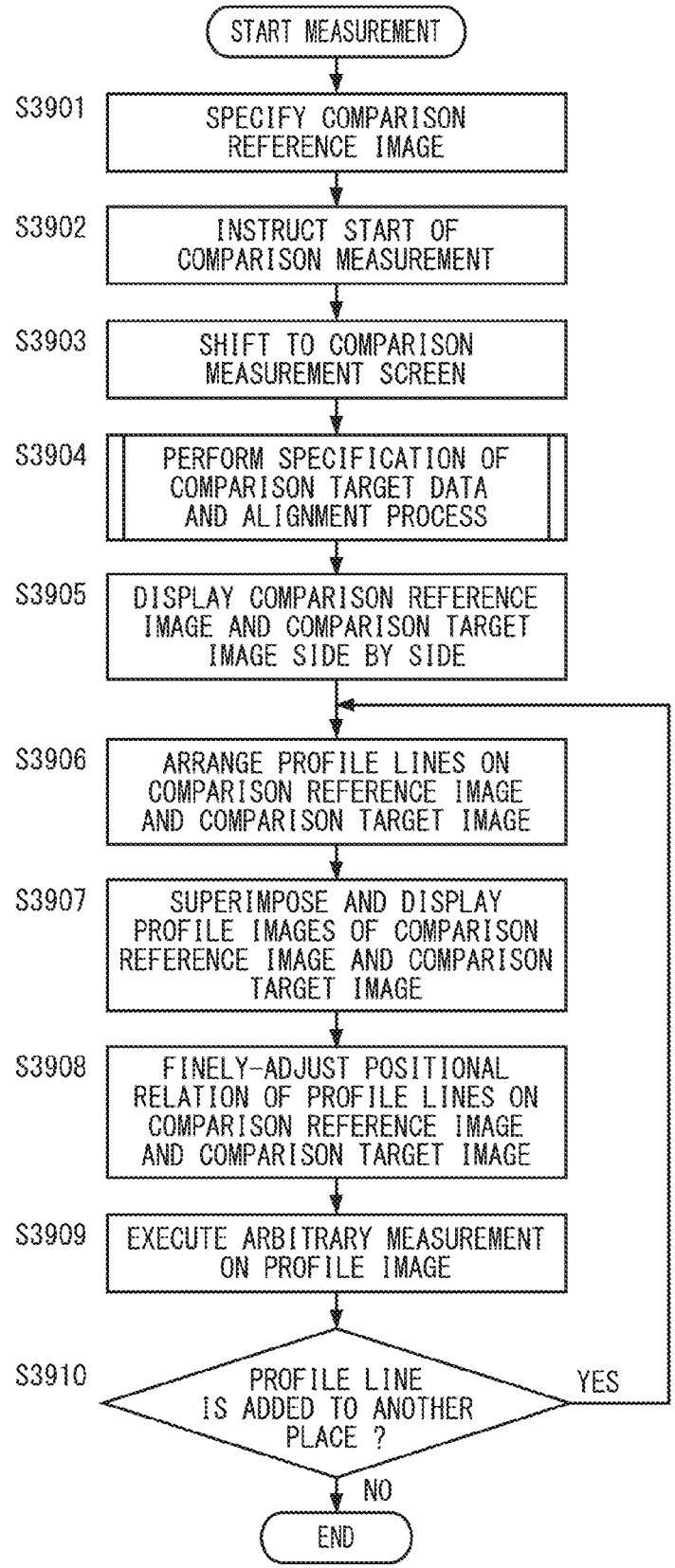
FIG. 39 is a flowchart showing a procedure for performing the comparison measurement.

Here, as one example of the procedure for performing the comparison measurement, a procedure for performing measurement based on the profile graph PI is shown in a flowchart of FIG. 39. It is assumed here that the three-dimensional image measurement program has been previously activated. First, the comparison reference image BI is specified in step S3901. Here, the user specifies and opens a file of composite image data to serve as a comparison reference. Next, the start of a comparison measurement is instructed in step S3902. For example, a "Comparison Measurement" button 607 is pressed in a function guide 606 for the three-dimensional image measurement program shown in FIG. 46. Thereby, the screen is shifted to the comparison measurement screen (step S3903). That is, the three-dimensional image measurement program shown in FIG. 32 or the like is activated. In addition, it is possible to return to the measurement microscope device operation program by pressing a "To Observation Application" button 451 provided in a toolbar of the three-dimensional image measurement program.

Next, in step S3904, the comparison target image RI is specified and the alignment process is performed thereon. Here, previously captured and saved comparison target image data is read. Alternatively, the comparison target image captured by the measurement microscope device operation program may be transferred to the three-dimensional image measurement program. For example, when the "Open Analysis Application" button 485 shown in FIG. 25 is pressed after the measurement of the comparison target image by the foregoing measurement microscope device, the data currently on display can be transmitted to the three-dimensional image measurement program and then specified as the comparison target image RI.

In next step S3905, the comparison reference image BI and the comparison target image RI are arranged side by side and displayed on the image display region 410. Then, in step S3906, the profile line PL is arranged on the comparison reference image BI or the comparison target image RI. Further, in step S3907, the profile graphs PI of the comparison reference image BI and the comparison target image RI are superimposed and displayed on the profile graph display region 514. Next, in step S3908, the positional relation between the profile graphs PI of the comparison reference image BI and the comparison target image RI are fine-adjusted as necessary. Then, in step S3909, an arbitrary measurement is executed on the profile graph PI. Finally in step S3910, it is determined whether or not to add the profile line PL to another position. In the case of no addition, the comparison measurement is completed, and in the case of the addition, the process returns to step S3906 to repeat the process. The comparison measurement is performed as described above.

Figure 40:
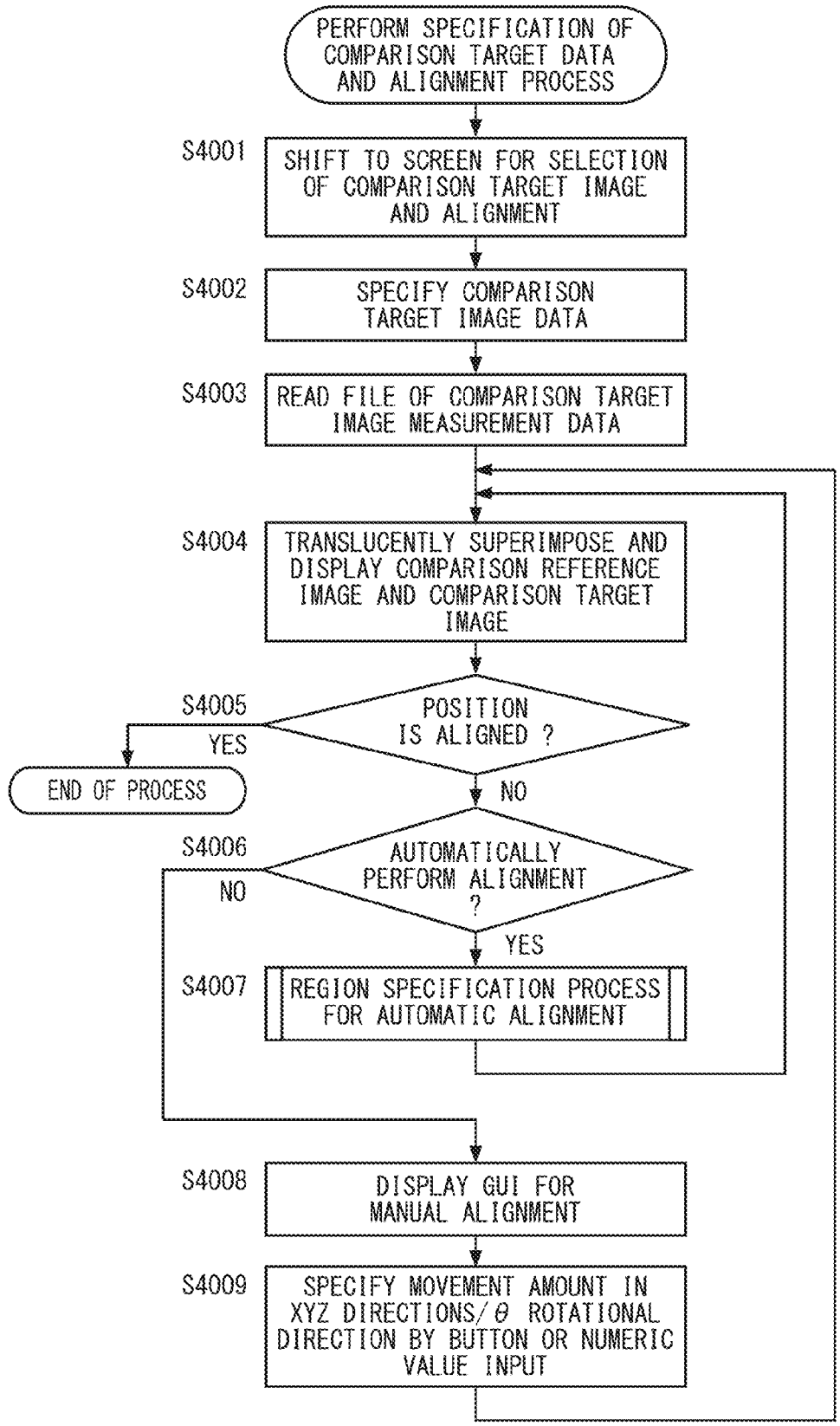
FIG. 40 is a flowchart showing details of specification of a comparison target image of FIG. 39 and an alignment process thereon.

Moreover, a detail of the step of specifying the comparison target image RI and performing the alignment process in step S3904 of FIG. 39 is shown in a flowchart of FIG. 40. First, the screen is shifted to the screen for selecting the comparison target image RI and performing alignment (step S4001). Then, from this screen, comparison target image data is specified (step S4002). Thereby, the comparison target image data is read into the three-dimensional image measurement program (step S4003). Next, the observation images of the comparison reference image BI and the comparison target image RI are superimposed and displayed on the image display region 410 (step S4004). When the images are aligned, the alignment process is completed, and when they are not aligned, whether or not alignment will be automatically performed is selected (step S4006). In the case of manually performing alignment, the process proceeds to step S4008, and in the case of automatically performing alignment, a predetermined region specification process for executing automatic alignment is performed in step S4007, and then the process returns to step S4004. On the other hand, in the case of manually performing alignment, a GUI screen for manual alignment is displayed in step S4008 (step S4008). Then, the user specifies movement amount in each of the XYZ-directions and the θ-direction by means of a numeric value or a button operation (step S4009). After it has been completed, the process returns to step S4004 in the same manner as above. As described above, the specification of the comparison target image RI and the alignment are executed.

Figure 41:
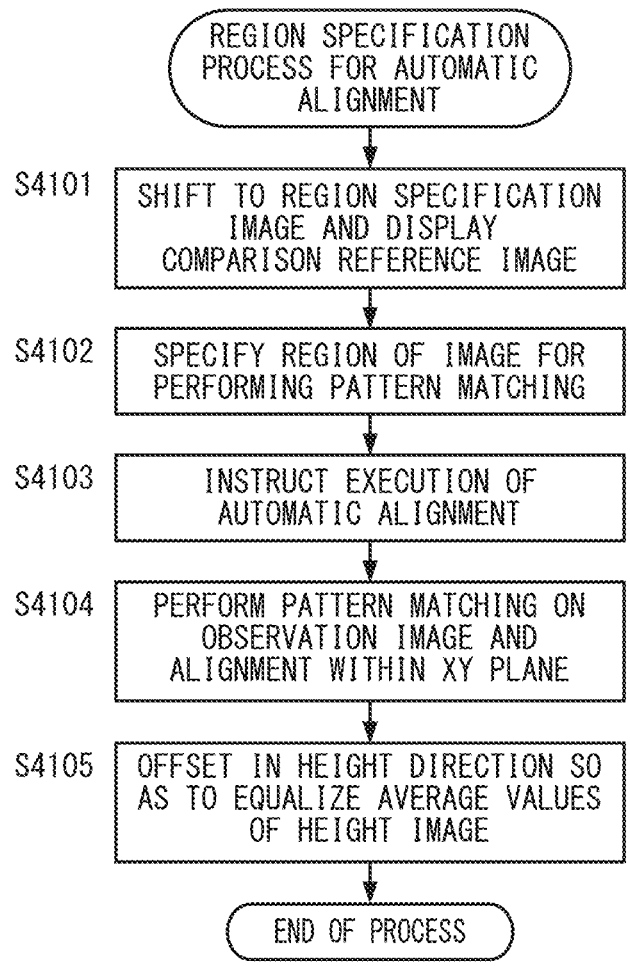
FIG. 41 is a flowchart showing a detail of a region specification process for the automatic alignment in FIG. 40.

Further, a detail of the region specification process for automatic alignment in step S4007 of FIG. 40 is shown in a flowchart of FIG. 41. In this example shown is an example of automatic alignment by pattern matching. First, the screen is shifted to a region specification screen, and the comparison reference image BI is displayed (step S4101). Next, a region for performing pattern matching is specified on the comparison reference image BI (step S4102), and execution of automatic alignment is instructed (step S4103). Accordingly, pattern matching is performed by the three-dimensional image measurement program using the observation image, and alignment is performed with respect to the XY-directions and the rotational angle θ (step S4104). Next, in order to equalize average values of the height image in the height direction, an offset movement is made in the height direction (step S4105). As described above, the region specification process for automatic alignment is performed.

(Template)

Next, a template generation function will be described. With increase in accuracy and complexity required in manufacturing, there are recently more cases where simply enlarging and observing a state of an object such as a component, saving an image and performing a variety of two-dimensional dimensional measurements are not enough. Only for the purpose of performing a simple observation or a two-dimensional dimensional measurement, a stereo microscope through which a user looks an object with the eyes has hitherto been often used, but in recent years, a so-called digital microscope has come to be often used, in which an image of the object is captured by a camera instead of the eyes and the image is displayed on the display section 400 so as to be subjected to efficient observation, saving and dimensional measurement.

On the other hand, in the case where only performing the two-dimensional dimensional measurement is not enough, a variety of three-dimensional measurement devices of a contact type or a non-contact type have been proposed, put to practical use, and actually in use. However, operation methods for those devices are relatively difficult as compared with those for the microscope and the digital microscope, and not a few of them require the user to have a certain level of skill. To a user not familiar with the three-dimensional measurement, it is important how easily and precisely operations are performed from acquiring a composite image of the object and performing an intended analysis and dimensional measurement to create a report as a final output. In particular, in the case of measuring the same type of object a plurality of times, it is further important to be able to precisely repeat the same measurement.

In view of such a background, there is provided a template generation function which records as "Template Data" the flow of acquiring data and performing an analysis and a dimensional measurement to create a report, which has been once executed, and performs automatic reproduction. It is thereby possible to eliminate an error due to a manual operation to a minimum while greatly reducing labor in the case of measuring the same type of object a plurality of times, so as to easily and repeatedly perform a precise analysis. The measurement microscope device provided with such a template generation function will be described based on the block diagram of FIG. 1.

(Template Generation Unit 218)

The control unit 200 shown in FIG. 1 is provided with the working memory 230 as a temporary saved region, the CPU 210 and the storage device 240, as described above. The working memory 230 functions as a temporary saved region for temporarily saving the measurement-image imaging condition which has been set at the time of capturing the measurement image by the imaging unit 100, with respect to the height image. A RAM or the like can be favorably used for such a working memory 230. Further, the CPU 210 functions as the template generation unit 218 for saving as a template a measurement-image imaging condition held into the working memory 230. Moreover, the storage device 240 functions as the template storage unit for saving the template generated by the template generation unit 218.

The template generation unit saves, as a template, the plane measurement tool and the height measurement tool specified by the measurement tool specification unit, the alignment image registered by the aligned image registration unit and the relative position information stored in the relative position storage unit.

The operation of saving the template generated by the template generation unit 218 in the template storage unit is performed by, for example, the user inputting an instruction to save the template with desired timing. For example, when the template saving command is executed by pressing a "Save As Template" button from the screen of the measurement microscope device operation program or the three-dimensional image measurement program or by some other means, a dialog for saving the template is displayed and saved under a desired name. Alternatively, the control unit 200 can automatically save the template with predetermined timing in a temporary or permanent manner. For example, in each certain period of time, an operation up to then can be temporarily registered as the template, or can be saved as data under a template file name of the date and time of the saving timing or the like into the storage device 240 as the template storage unit.

In order for the template generation unit 218 to generate the template, for example, the measurement-image imaging condition at the time of capturing the measurement image is previously held into the working memory 230 as a temporary saved region. Then, when a command to save the template is issued, the template generation unit 218 reads the measurement-image imaging condition saved in the working memory at that time, to generate the template and save it into the storage device 240. For example, when the user desires to save as the template the height image SH of the object which is currently on display in the display section 400 and presses the "Save As Template" button, the measurement-image imaging condition at the time of capturing the measurement image which is the basis of the height image SH is generated as the template and saved. When the user desires to acquire a height image of a similar object based on the same measurement-image imaging condition at a later date, the user selects the saved template by use of the below-mentioned template calling unit 219. This can lead the measurement microscope device to be automatically set on the measurement-image imaging condition saved in the selected template, and hence the user can acquire the measurement image on the same condition.

Further, at the time of saving the template, the relative positions of the plane measurement tool and the height measurement tool are saved with the alignment image taken as the reference. That is, the relative position storage unit stores relative position information in the plane direction of a plane measurement tool with respect to an alignment image and relative position information of a plane direction and a height direction of height measurement tool with respect to an alignment image. Accordingly, with the position of the alignment image used as a clue, the relative position information of the measurement target region where measurement process has been performed or the measurement target element extracted in the measurement target region can also be reproduced with respect to a newly input image. Although the method for reproducing the relative positions of the plane measurement tool and the height measurement tool is described with the alignment image taken as a reference, the method for specifying the positions of the plane measurement tool and the height measurement tool is not limited to this method. For example, by using a position of an element, which has been detected in accordance with a reference specified by the height measurement tool, the position itself as a reference, a position of another height measurement tool or plane measurement tool can be reproduced.

(Template Calling Unit 219)

The template calling unit 219 can also be provided. The template calling unit 219 is a unit for prompting the user to select a desired template from one or more templates saved in the template storage unit. Further, the template calling unit decides arrangement positions of the plane measurement tool and the height measurement tool in the plane direction by performing alignment in the plane direction on the newly acquired height image by means of the alignment image saved in the selected template, or decides an arrangement position of the height measurement tool in the height direction by performing alignment in the height direction by means of the alignment image. When the template is selected by the template calling unit 219, it is possible to set the measurement light projecting unit on the measurement-image imaging condition included in the selected template. With such a configuration, when the height image is acquired, the measurement-image imaging condition can be saved as the template rather than saving the height image and the measurement image themselves, and can be called and used at the time of next acquirement, thereby extremely facilitating the operation for setting the same measurement-image imaging condition.

(Measurement-image Imaging Condition)

The template generation unit 218 holds the measurement-image imaging condition as the template. Examples of the measurement-image imaging condition may include the use or non-use of one of the first measurement light projecting unit and the second measurement light projecting unit, or both units, the brightness of the measurement image and the posture (e.g., the XYZ-coordinate, rotational angle and inclined angle of the stage 140) of the object at the time of capturing the object by the measurement light projecting unit. By previously registering all or part of these conditions as the template by the template generation unit 218, this can be called and reused at the time of measuring another object at a later date, thereby reducing troublesome labor to set the measurement-image imaging condition each time. In particular, there is no need for storing or taking note of each specific measurement-image imaging parameter constituting the measurement-image imaging condition, nor a need for individually resetting each parameter while referencing thereto, and it is possible to avoid a setting error and precisely reproduce the condition at the time of previously capturing the measurement image, so as to greatly contribute to improvement in reliability due to labor saving and prevention of a measurement error. In particular, since it is configured that the direction of illumination light in capturing the observation image and a conventional large-sized height image has been decided to a certain degree or illumination is applied to the images from all directions, even when the imaging condition of the illumination light is not found, capturing a similar image is not so difficult. As opposed to this, as for the height image acquired based on triangulation, an impression of the obtained height image greatly varies depending on the condition of the measurement light. For this reason, in an attempt to capture a height image with a similar visibility by relying only on the obtained height image at a later date, it is extremely difficult to set the measurement-image imaging condition. In particular, it is extremely important to previously save the condition regarding the direction and the angle of the measurement light projecting unit, such as a difference between the first measurement light projecting unit and the second measurement light projecting unit (namely, the direction in which the measurement light is projected) and the posture of the object. On the other hand, at the time of capturing, the user searches for the optimum imaging condition through trial and error while changing the condition in a variety of manners in order to obtain a desired image, whereby it becomes necessary to take note for recording the imaging condition every time the imaging condition is changed, and further the operation becomes extremely complicated due to a variety of items required to be recorded such as the angle and the light amount of the measurement light and the XYZ-coordinate, the rotational angle and the inclined angle of the stage 140. Further, an error may occur when taking notes, or the operation of saving and managing the notes for measurement at a later date also becomes troublesome. In order to eliminate such complexity, an imaging condition of a measurement image obtained at that time with timing specified by the user is automatically written and saved as a parameter, thereby allowing extreme simplification of such operations.

(Observation-image Imaging Condition)

Further, the template generation unit 218 can include not only the measurement-image imaging condition but also the observation-image imaging condition in the template. That is, the observation-image imaging condition at the time of capturing the observation image of the object by the imaging unit 100, the object being the same object as that on the measurement-image imaging condition regarding the height image saved as the template, may be included in the same template. In such a manner, not only the measurement-image imaging condition but also the observation-image imaging condition with respect to the observation image of the same object can also be stored, to thereby seek further saving labor in the measurement operation using both the observation image and the height image.

Examples of such an observation-image imaging condition may, for example, include a light amount of the illumination light, a focal position and a type of the illumination light at the time of capturing the object by the observation illumination light source. This enables repeated measurements on the observation-image imaging conditions which are easily made coincident. Further, the three-dimensional composite image formed by pasting the observation image as the texture image to the surface of the height image can also be precisely reproduced in accordance with the imaging condition saved in the template.

(Measurement Condition)

Additionally, in the template generation unit 218, the information saved in the template is not limited to the imaging condition, but can also include measurement conditions regarding a variety of measurements performed on the acquired height image and observation image or the composite image of these images. Hence it is possible not only to acquire the height image but also to store the measurement process performed on the height image, so as to seek further labor saving in the measurement operation. In particular, making the measurement reproducible after three-dimensional alignment has been automatically performed on the height image gives an advantage of eliminating the complicated troublesome alignment and adjustment operation and extremely facilitating the measurement operation.

Also in this case, similarly to the above, at the time of performing the measurement process by the measurement unit 214 on the height image of the object which is displayed on the display section 400, the measurement condition regarding each measurement process is temporarily held in the working memory, while the template generation unit 218 receives a command to save the template and saves as the template the measurement condition held in the working memory. Further, by saving the imaging condition and the measurement condition in the same template, a series of operations from imaging the object to measuring can be automated, and significant labor saving can thus be expected. For example, after the height image and the composite image ST displayed on the display section 400 are subjected to a variety of measurements by the measurement unit 214, those images are saved as the template, whereby it is possible to save as the template the operations performed up to that point, namely, conditions for acquirement of the height image and the observation image, specifications of the item of the measurement performed on each image and the position and the region for performing this measurement, and the like. Hence it is possible to automate the setting of the imaging condition to the measurement condition for the image with completely the same conditions.

The measurement conditions saved in the template are conditions in a variety of measurement processes that can be performed by the measurement unit 214. Examples of the measurement process executable by the measurement unit 214 may include: a profile measurement for measuring any of a height, a width, an angle, a distance between circles, a circular arc and a sectional area with respect to a sectional shape line obtained by sectioning along a specified line; an average step measurement for measuring a difference in average height between a specified region and another region; a volume/area measurement for measuring a volume or an area of a specified region; a plane measurement for measuring a distance between specified positions, an angle, a circle diameter, a circle radius or a distance between circle centers and measuring a number count; a line roughness measurement for measuring a parameter of line roughness with respect to a sectional shape line obtained by sectioning along a specified line; a surface roughness measurement for measuring a parameter of surface roughness with respect to a specified region; and a comparison measurement for comparing sectional shape lines obtained by sectioning along lines specified with respect to two or more images to measure a difference or sectional areas. Positions and conditions specified in performing these measurements can be saved as the measurement conditions in the template. Further, information of a variety of image processing (filters) and reference plane setting which are implemented as preparation for a variety of measurements described above can also be saved together in the template. As described above, the measurement operation for the height image having height information can be automated, thereby further contributing to labor saving in the measurement operation. For example, it becomes possible to automatically perform such a process as computing of a difference in height or an inclined angle between two predetermined positions specified on the object and an area or a volume of a specified region.

(Template Image)

Further, not only the imaging condition but also the measurement image obtained on this imaging condition and the height image, the observation image or the composite image generated based on this measurement image can be associated as the template image. Then, at the time of selecting the template by the template calling unit 219, the template image associated with each template is displayed as a thumbnail, whereby it is possible to facilitate selection of a desired template with the image used as a clue. In particular, when a large number of templates are saved, it is possible to facilitate visual grasping of a desired template among a plurality of templates.

At the time of saving the template generated by the template generation unit 218 in the template storage unit, the measurement image or the height image which is the basis of the template and captured on the measurement-image imaging condition specified by the template, or the observation image captured on the observation-image imaging condition, is associated as the template image. Further, the template calling unit 219 desirably constitutes template images, respectively associated with a plurality of templates, in a listable manner. Accordingly, since the height image or the like which is the basis of the template is displayed at the time of selecting the template, the template can be selected with this height image used as a clue, thereby facilitating performance of the operation for selecting a desired template particularly in the case of registering a large number of templates. By previously storing the parameters regarding imaging and measurements in the template as described above, it is possible to easily and precisely reproduce the measurement-image imaging condition regarding the height image on the same condition.

(Report Creation Function)

The report creation unit 222 can also be provided. The report creation unit 222 automatically creates a report displaying a measurement result of the measurement process, performed on the height image by the measurement unit 214, along with the height image. Moreover, the template generation unit 218 can include a report creation condition for creating a report by the report creation unit 222 in the template. Hence a predetermined measurement process is executed as the template and the result of the measurement process is displayed as the report, thereby providing a measurement environment also excellent in listability of the measurement result. FIG. 42 shows one example of the created reports. Such a report RP can be printed and saved as data other than being displayed on the display section 400.

(Reduced Image of Report)

Further, a reduced image of the report can be used as an index for selecting the template in place of the template image. For example, the template calling unit 219 can list as a thumbnail a reduced image obtained by reducing the report included in each template with respect to one or more templates. Then, the user is made to select the thumbnail and can thus select the template corresponding to this thumbnail report. Accordingly, at the time of selecting any of a plurality of templates from the template calling unit 219, a desired template can be selected using the reduced image of the report as a clue, whereby characteristics of each template are visually displayed to the user to facilitate selection.

Figure 43:
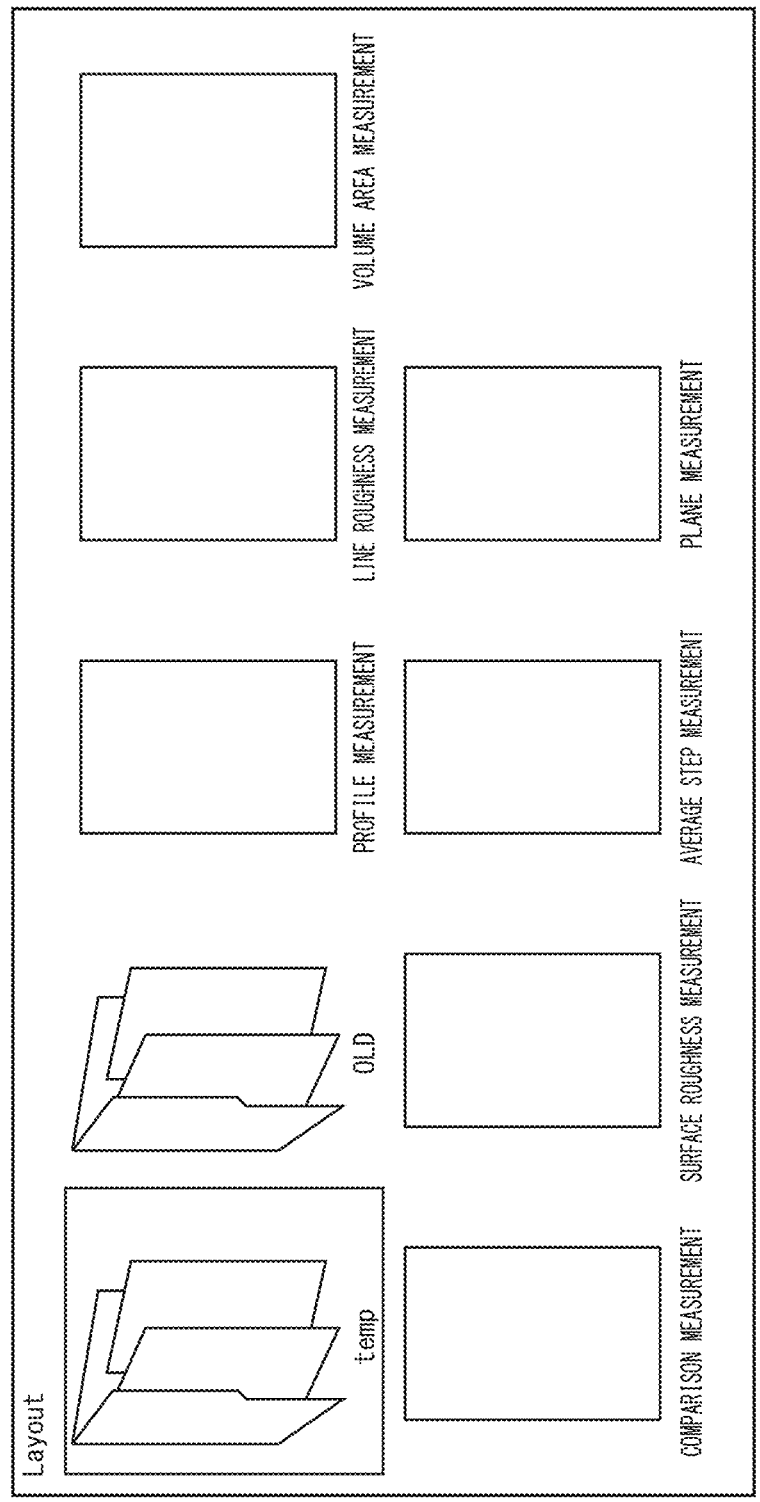
FIG. 43 is an image view showing a dialog screen indicative of one example of a template calling unit.

One example of the template calling unit 219 is shown in an image view of FIG. 43. In this example, a reduced image of a report registered in each template is displayed as a thumbnail in a template calling screen 550. This allows the user to visually check the state of measurement performed in the past, and thus easily search for a template desired to be selected. Moreover, the template image may be used as the thumbnail in place of the reduced image of the report as described above.

(Aligned Image Registration Unit 223)

Further, the three-dimensional image measurement program can also be provided with the aligned image registration unit 223. The aligned image registration unit 223 is a material for registering as an alignment image a predetermined region in a template, which is the basis of a template generated by the template generation unit 218, at the time of saving this template in the template storage unit. This enables specification of a position corresponding to the position saved in the template on an image newly inputted at the time of using the template.

When the template is selected by the template calling unit 219, pattern matching is performed using the alignment image registered in this template with respect to the inputted image, and the input image is aligned with the same position as at the time of generating this template. Hence it is possible to automatically adjust the position of the inputted image, so as to perform measurement in the same position as at the time of generating the template.

Moreover, the aligned image registration unit 223 preferably sets a region where the alignment image is registered in the case of the template image being the observation image and a region where the alignment image is registered in the case of the template image being the height image respectively as different regions. In this manner, at the time of registering the alignment image, a region appropriate for each alignment can be specified on each of the two-dimensional observation image and the three-dimensional height image, thereby allowing improvement in accuracy at the time of performing template matching.

For example, for two-dimensional alignment, a region having a characteristic plane shape, such as a region having a complicated shape is set, so as to be advantageous in pattern matching based on the shape. On the other hand, for three-dimensional alignment, conversely to the above, a region only having a flat surface is set, to thereby improve the accuracy in height detection, and it is thus possible to improve the accuracy in alignment in the height direction. Naturally, the same position on the observation image and the height image may be registered as the alignment image.

In this case, there is obtained an advantage of simplifying the user's operation.

(Template Search Function)

Further, the template search unit 224 can also be provided. The template search unit 224 is a material for searching a template consistent with or approximate to a predetermined condition out of a plurality of templates saved in the template storage unit. This can facilitate searching for a desired template in accordance with a search condition particularly when a large number of templates are registered.

The template search unit 224 can also be added with a function of extracting candidates for selection of the templates matching with the condition or sorting search results so as to facilitate selection of the desired template out of a plurality of templates. For example, the template search unit 224 searches an image similar to the inputted image out of the template images associated respectively with the registered templates, and extracts as a candidate template a template associated with the template image similar to the inputted image. In such a manner, based on the height image itself, a template registered with respect to a similar height image can be automatically searched, to give an advantage of particularly facilitating the operation of extracting a desired template out of a large number of templates. The template selection candidate presenting function and the sort function as described above can facilitate search and use of a desired template particularly in the case of saving a large number of templates.

(Procedure for Creating Report)

Figure 44:
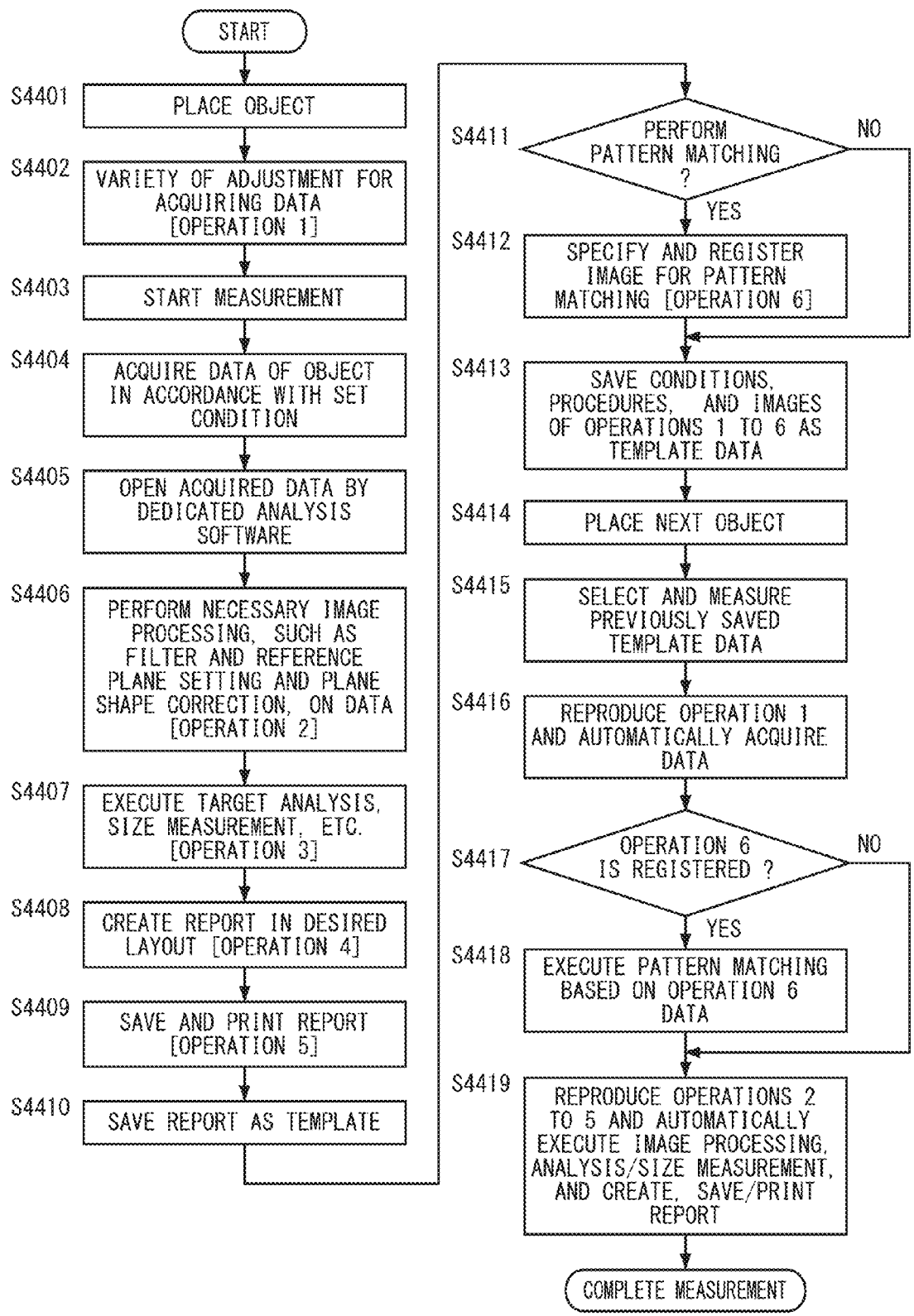
FIG. 44 is a flowchart showing a procedure for reproduction by creating a template.

Based on a flowchart of FIG. 44, there will hereinafter be described a procedure for performing an analysis, a dimensional measurement and the like on the height image, creating and outputting a report that collectively includes results of these analyses and measurements, and recording such operations to make them reproducible. First, an observation image, a height image and composite image data are acquired. For example, the height image is acquired by the procedure shown in FIG. 18 described above. Alternatively, a previously acquired height image is read by the three-dimensional image measurement program. Here, a new height image is captured.

First, the object is placed on the stage 140 in step S4401, and further, a variety of adjustments regarding data acquirement are performed in step S4402. In this example, after the object is brought into focus, the setting of the brightness of illumination and data acquisition condition, and the like are performed (operation 1).

Thereafter, the measurement is started in step S4403. Here, the "Measurement" button 430 is pressed in the measurement microscope device operation program of FIG. 3 or the like, to obtain data. Next, data of the object is acquired in accordance with the set condition in step S4404. Further, in step S4405, the acquired data is opened by the three-dimensional image measurement program. This operation may be manually performed by the user, or automatically performed by means of the measurement microscope device.

Figure 49:
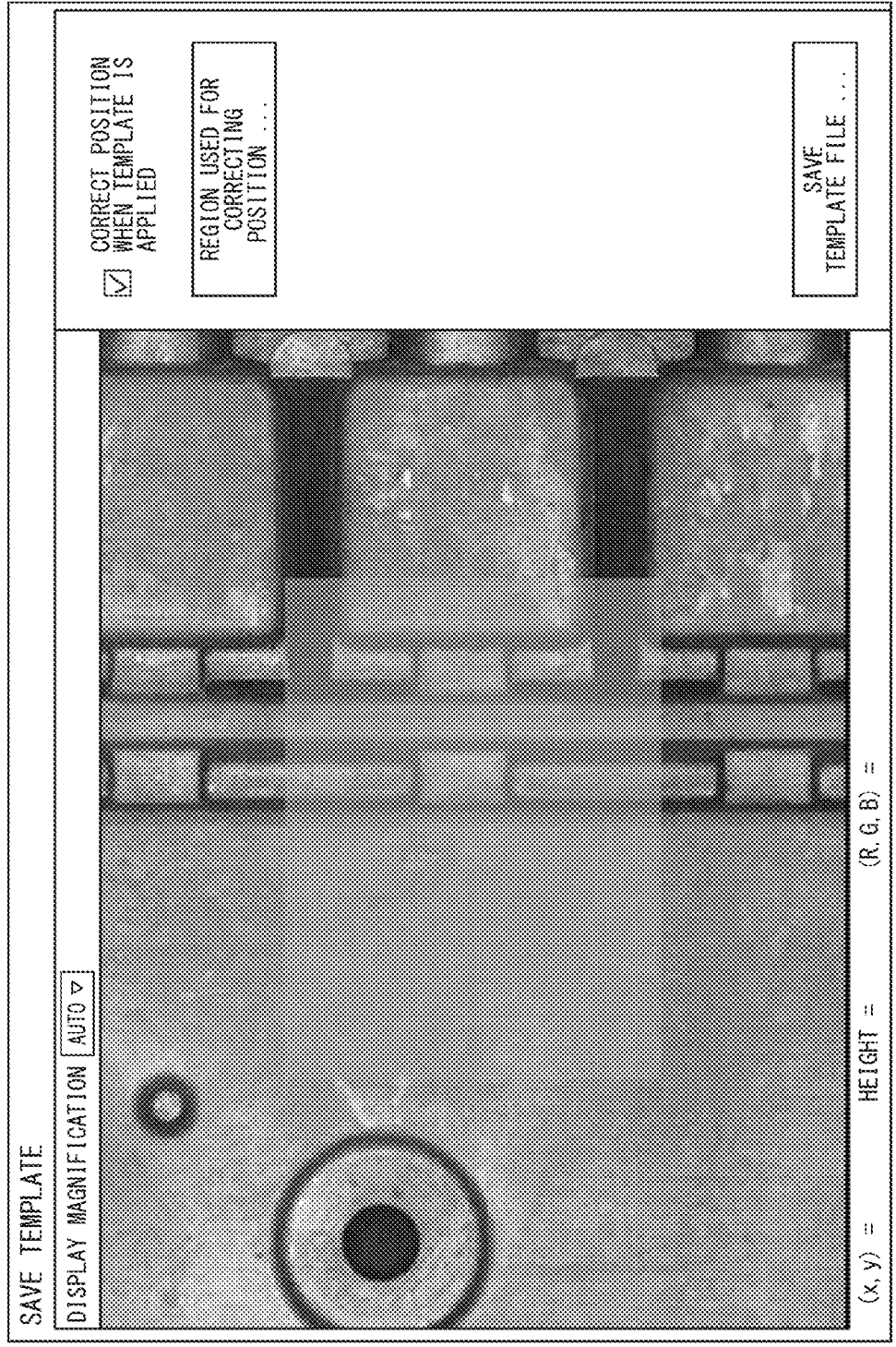
FIG. 49 is an image view showing a GUI screen of a template saving check screen.

Subsequently, in step S4406, necessary image processing, such as filtering, reference plane setting, surface shape correction and the like, is performed on the data (operation 2). Further, in step S4407, a target analysis, dimensional measurement and the like are executed (operation 3). Then, in step S4408, a report is created in a desired layout (operation 4). Subsequently, in step S4409, the report is saved and/or printed (operation 5). Furthermore in step S4410, the report is saved as a "Template" (FIG. 49 described later).

Further, in step S4411, the user is prompted to determine whether or not to perform pattern matching. In the case of performing pattern matching, the process proceeds to step S4412, where an alignment image for use in pattern matching is specified and registered (operation 6). On the other hand, in the case of not performing it, the process jumps to step S4413 not through step S4412. Next, in step S4413, the conditions, the procedures and the images of the operations 1 to 6 are saved as template data.

Subsequently, the next object is placed in step S4414. Then, in step S4415, the template data which has been previously saved is selected, and a measurement button is pressed. Further, in step S4416, the operation 1 is reproduced to automatically acquire data. Moreover, in step S4417, the user is prompted to determine whether or not the operation 6 has been registered, and when it has not, the process jumps to step S4419. On the other hand, when it has been registered, pattern matching is executed based on the operation 6 data in step S4418. Further, in step S4419, the operations 2 to 5 are reproduced to automatically execute image processing, analysis/dimensional measurement, report creation and storage/printing.

Here, the acquired data is opened by the three-dimensional image measurement program and necessary analysis and dimensional measurement are executed, to create a report and perform saving, printing and the like on the report. For performing the operations up to this point, it is not particularly necessary to be aware of recording and creating the template data. The user may only acquire data desired to be acquired, and analyze and measure the data as usual.

Subsequently, the created report is newly saved as a template. Here, when the "Save As Template" button is pressed, the measurement microscope device makes the user to specify as an alignment image a specific portion of the observation image data as necessary, and thereafter creates data which collectively includes not the composite image or a variety of measurement results themselves but operation procedures such as on what condition the data has been acquired, what kind of image processing, analysis and dimensional measurement have been performed on the obtained data. The measurement microscope device puts this created data and the pattern matching image together and saves it as "Template Data".

When the template data as thus saved is selected and the measurement button is pressed with the same type of the object placed on the stage 140, the measurement microscope device automatically executes acquirement of data, image processing, an analysis, a dimensional measurement and report creation, while sequentially reproducing a variety of conditions recorded in the template data.

Hereinafter, each operation will be individually described in detail. In order to acquire the composite image and the observation image of the object, parameters such as the imaging conditions (camera exposure time, illumination brightness, lens magnification and the like) and modes (high-accuracy/high-speed switching, both-sides/left/right-side light projection, light projection pattern at the time of acquiring data, etc.) which are set by the user or automatically set by the measurement microscope device, are stored as data (hereinafter referred to as "measurement parameter data") (operation 1). It is desirable to include this data in the measurement data of the object which have already been acquired (a set of data including the composite image and the observation image), to make it treatable as one measurement data. This is because necessary measurement related information (measurement parameter data) can be linked to the object without the user being particularly aware of it. Note that, when part or all of the XYZθ stage has been automated, a position and an angle of each stage may be together stored as part of the measurement parameter data to be reproduced by the template.

(Front Cover Image of Report)

Figure 45:
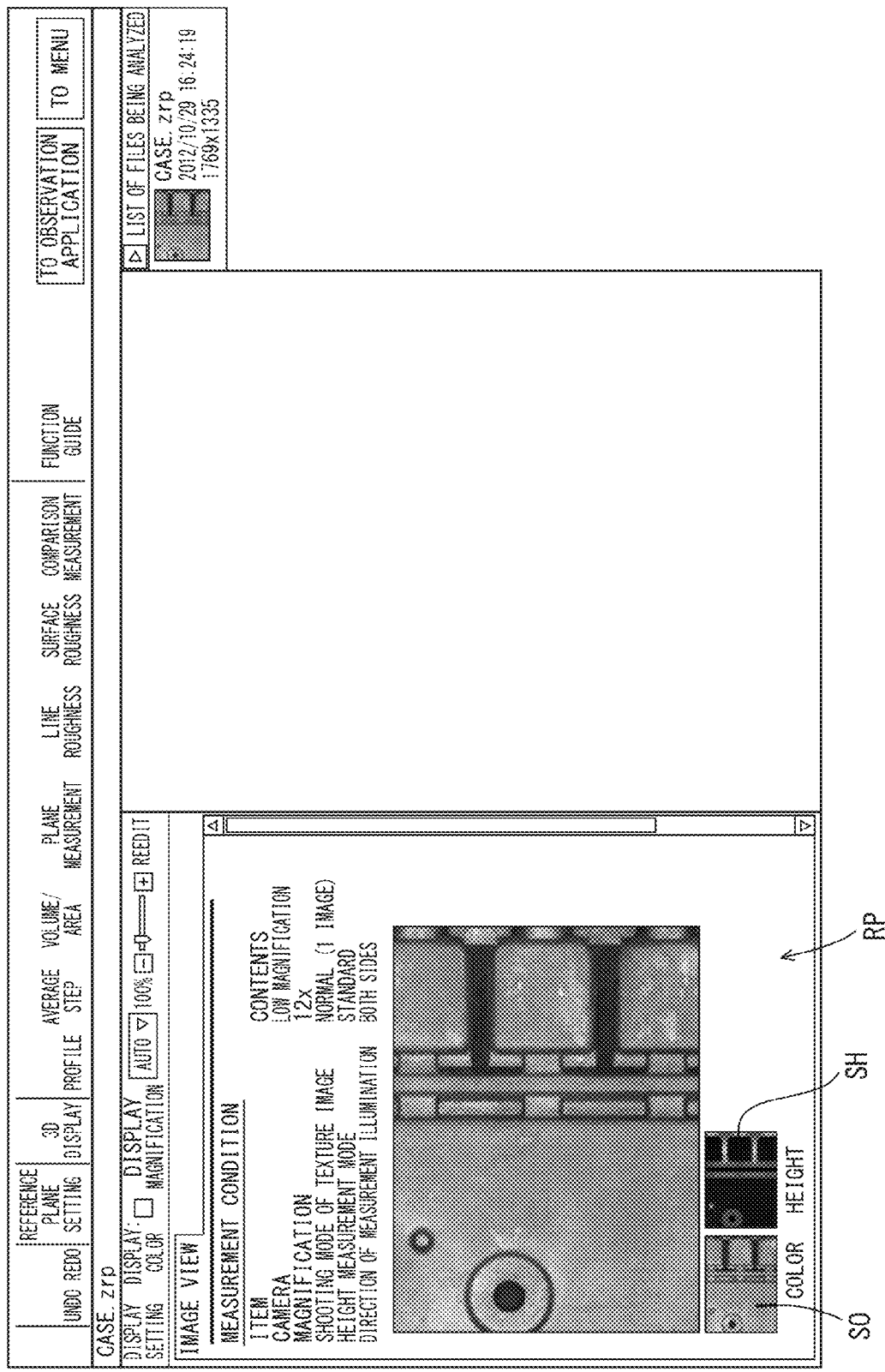
FIG. 45 is an image view showing a GUI screen indicative of a state where measurement data is open.

When the measurement data of the object including the measurement parameter data is opened by the three-dimensional image measurement program, it is displayed as a report preparation state (front cover of the report) where the observation image SO and the height image SH are arranged as shown in FIG. 45.

(Function Guide 606)

Figure 46:
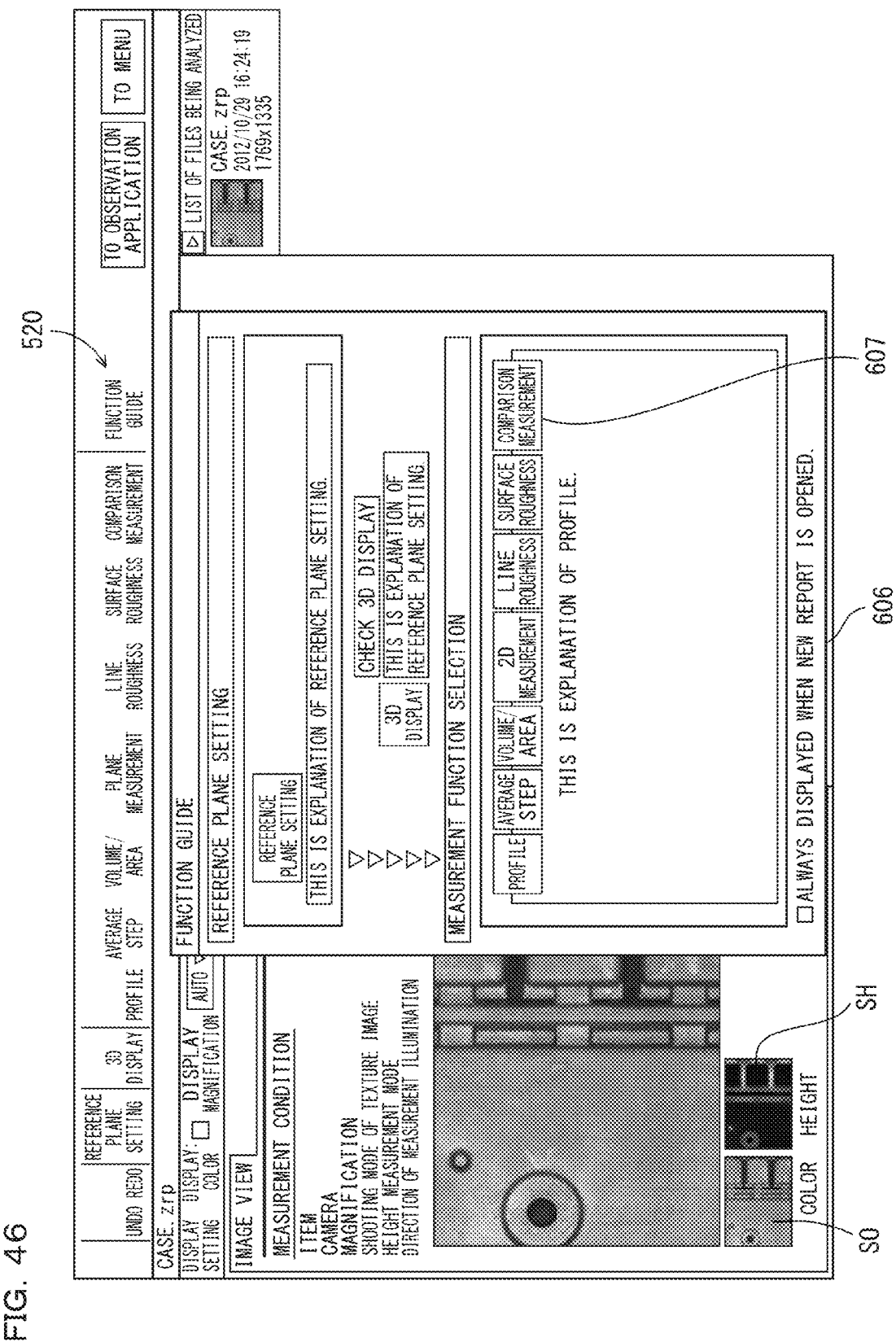
FIG. 46 is an image view showing a GUI screen of a function guide.

Further, at the time of opening the file, the function guide 606 showing the operation flow may be simultaneously displayed for allowing the user unfamiliar with the operations to perform necessary operations. FIG. 46 shows one example of the function guide 606 as described above. A screen of the function guide 606 can be called from a toolbar 520 by pressing a "Function Guide" button. In this function guide 606, a reference plane setting field for setting the reference plane is provided in the upper section, a 3D display checking field is provided in the middle section, and a measurement function selection field for selecting the measurement function is provided in the lower section. Further, a flowchart can be displayed as necessary. It should be noted that this function guide 606 can be made switchable between display and non-display as necessary.

When the file is opened, it is subjected to a variety of necessary image processing prior to an analysis and a dimensional measurement. For example, an average filter or a median filter for removing a fine noise is executed, to specify a plane to serve as a measurement reference, and reference plane setting for correcting data is then executed such that the inclination of the specified plane becomes zero. When not the shape of the object itself but a minute distortion, roughness or the like of the object surface is desired to be measured, a large distortion or curvature of the whole object may obstruct the measurement, and hence a plane shape correction (planarization of a spherical surface, a cylindrical surface or a two-dimensional curved surface) may be executed. All procedures for these image processing, including the order in which a series of processes have been performed are stored as image processing parameter data (operation 2). At this time, images before and after the processing do not need to be stored.

(Example of Report Creation)

Figure 47:
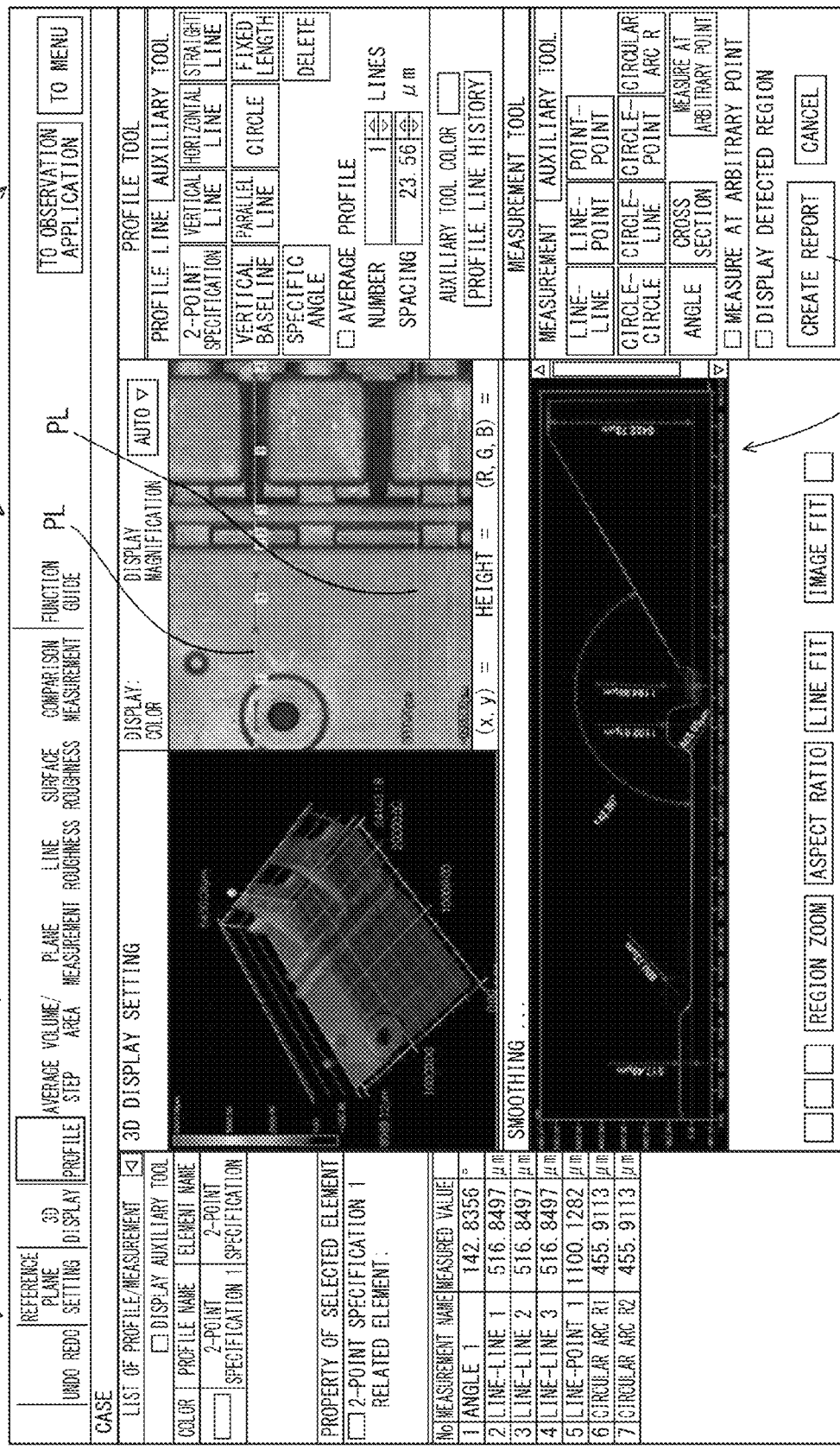
FIG. 47 is an image view showing another example of the profile measurement screen.
Figure 48:
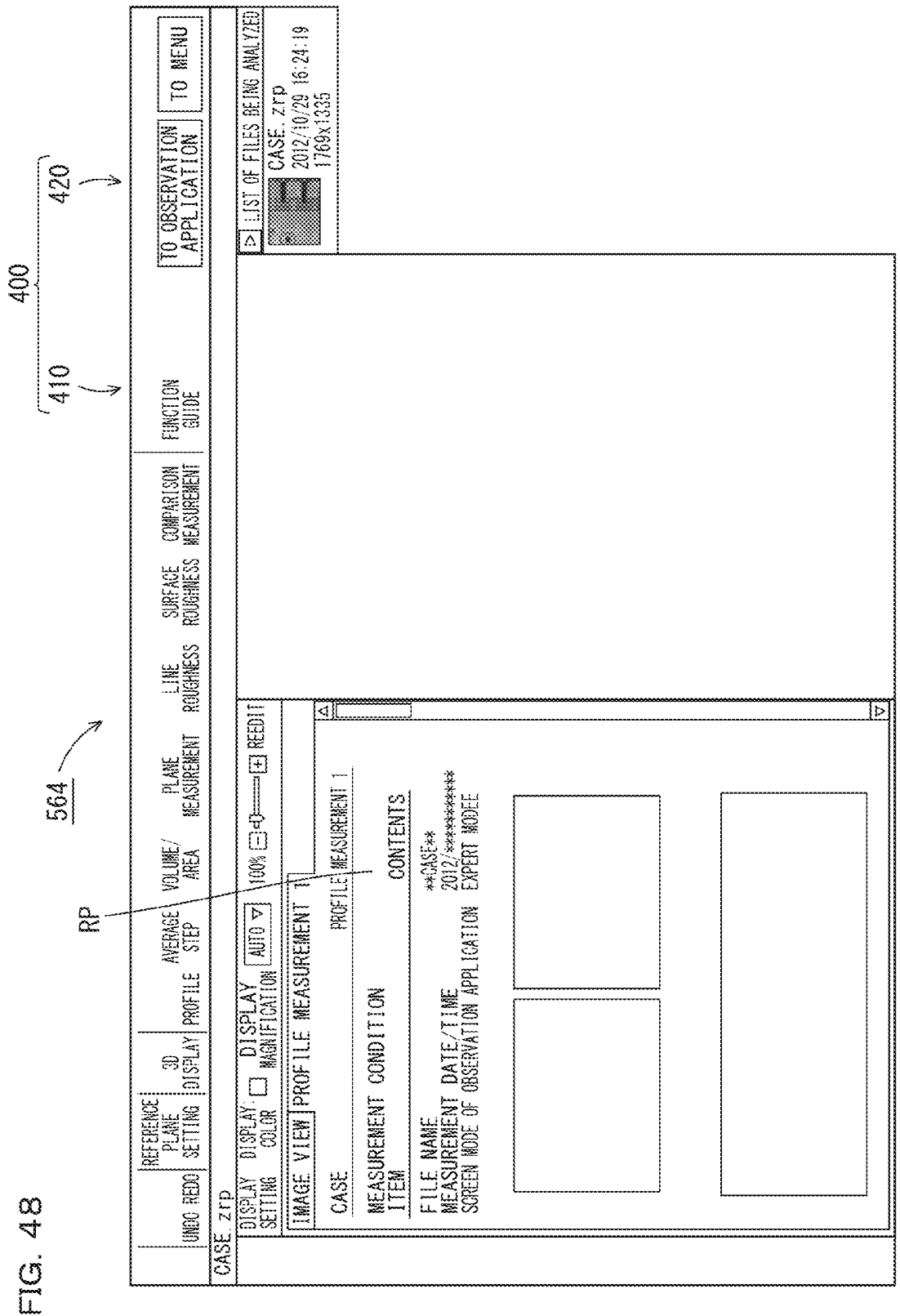
FIG. 48 is an image view showing a GUI screen of a profile measurement result report screen.

After the necessary image processing has been completed, a desired analysis and dimensional measurement are executed on the measurement data of the object. Here, the comparison measurement screen 540 for performing the profile measurement is shown in FIG. 47. In FIG. 47, an angle, a radius, a width, a height and the like are measured along the profile line PL set on the image display region 410, and displayed on the profile graph display region 514 and the result display region 510. After completion of the measurement desired by the user, the report is created. Here, by pressing a "Report Creation" button 562 provided in the lower section of the operation region 420, a report page where measurement results are laid out altogether is automatically created as shown in a profile measurement result report screen 564 shown in FIG. 48. At this time, also as for these analysis and dimensional measurement, all procedures, at which positions and how and what kind of analysis and measurement, have been executed are stored as analysis measurement parameter data into the storage device 240 (operation 3).

When the user is not satisfied with a layout of the automatically generated report, the user can freely change the layout, add a comment or display measurement-related information. The measurement-related information refers, for example, to part or all of the measurement parameter data stored in the operation 1. The report changed by the user, including contents of arrangement information of where, how and what is arranged, a comments and the like, is stored as report layout data (operation 4).

The completed report is obtained as a final output by being saved in a dedicated file format, printed, or the like. The operation of finally saving the report in the file or printing is stored as output process data (operation 5).

In the state where the report file as thus completed is open, this report is saved as the template. For example, when a file menu is selected from the screen of FIG. 48 and "Save As Template" is selected, a template saving check screen 566 for checking whether or not to execute pattern matching at the time of executing the template is displayed as shown in FIG. 49. When the alignment image is herein set with respect to the measurement data of the object, an image of that portion is stored as the alignment image (operation 6).

(Alignment Image)

By registering the alignment image at the time of saving the template as described above, at the time of applying this template, it is possible to perform alignment through use of a template matching image for alignment. That is, at the time of applying the template to another measurement data, a displacement in the image of the measurement data is corrected by template matching by use of the template matching image for alignment. Such automatic correction of the data position can match the measurement data with completely the same position as at the time of creating the template, so as to allow measurement to be performed in the same procedure as that for the saved template.

Note that the template matching image for alignment is arbitrarily registered. For example, in the case of constantly arranging the object in the same position on the stage by use of a jig or the like, the alignment operation is unnecessary, which can eliminate the need for registering the template matching image for alignment and the need for performing the pattern matching operation.

(Saving of Template Data)

As described above, saving a series of operations performed by the user, as to the operations of acquiring the height image, measuring the acquired height image or the composite image and the like, can facilitate repetition of a similar operation even on a different object, so as to seek significant labor saving. For example, an example of creating data which collectively includes the conditions and various types of data regarding the operations 1 to 6 described above, and naming and saving it under the name of template data will be described based on the template saving check screen 566 of FIG. 49. Since the operations up to this point except for the operation 6 are completed only by performing the operations of the normal measurement to the analysis and dimensional measurement without making the user aware of creating the template data, the user does not need to learn a specific operation. Further, for example, when the operation 2 is unnecessary out of the operations 1 to 6, it is not needed carrying out, and when the operation 5 is not needed storing as the template, it may be omitted. When pattern matching is unnecessary at the time of applying the template, the operation 6 can also be omitted. As the template data, only those stored in the operations 1 to 6 may be reproduced. A dialog for checking whether or not to store the operations 1 to 6 may be displayed at the time of performing each of the operations, or all the operations may be automatically saved at the time of operations thereof, and whether or not to select each data to be reproduced may be made selectable at the time of storing the data as the template.

(Sorting Out of Template Data)

It is also possible to make the conditions and parameters which are saved in the template include not only the height image but also an imaging condition for a two-dimensional observation image captured by use of an optical imaging system. It is thereby possible to capture the height image and the observation image, and further capture the composite image based on these images, on the same condition.

On the other hand, the conditions and parameters saved in the template can be narrowed. For example, as for capturing the observation image, instead of storing the focus position and the brightness (the light amount or the exposure time of the illumination light output section), auto focusing can be set for focusing and the brightness can be set to be automatically adjusted so as to acquire the observation image without saving these conditions.

(Calling of Template Data)

Next, reproduction of the measurement to the analysis and the dimensional measurement by use of the template data will be described. The same type of the object as the object used for creating the template is placed on the stage 140. When the XYZθ stage is manually operated, the user adjusts the focus on and the observation position and the angle of the object. When the alignment image is stored in the operation 6 at the time of creating the template, the observation position and the angle may be roughly adjusted at this time. When part or all of the XYZθ stage is electrically operated and the position and the angle of the stage have been stored in the operation 1, the user does not need to adjust the position and the angle of the stage here.

When the object is appropriately arranged on the stage, the template data desired to be applied is selected, and then the measurement button is pressed. Here, as described above, when the position and the angle of the XYZθ stage is electrically stored, the stage position is automatically reproduced. At this time, if the alignment image has been stored in the operation 6, the position and the angle of the XYZθ stage may further be moved from the position and the angle stored in the operation 1 based on that image, to finally adjust the stage so as to have the same observation position and angle as at the time of creating the template. When the final adjustment of the stage is performed, completely the same state as at the time of creating the template can be reproduced, including an orientation of the shadow and a position of diffused reflection which are unavoidable in the measurement using triangulation, thereby allowing repetition of the measurement in more coincident conditions. Naturally, such a final adjustment of the stage may not be performed, but alignment may be executed by pattern matching after acquirement of the measurement data. Which operation is to be performed may be automatically determined based on the degrees of difference in position and posture between the template image and the object placed on the stage, or the like, or may be made selectable by the user.

As described above, the imaging condition of the operation 1 is reproduced and the measurement data of the object is automatically acquired after automatic movement of the stage in the case of the stage being the electric stage which is electrically movable, and immediately after pressing of the measurement button in the case of the stage being the manual stage.

Upon completion of acquiring data, the data is automatically transmitted as it is to a dedicated three-dimensional image measurement program, and is opened thereby. When the template is applied to automatically analyze the data, the operation of the function guide 606 shown in FIG. 46 described above disturbs the motion, and hence it is desirably not displayed even when an automatically displayed checkbox is checked.

When the alignment image is not registered in the operation 6 at the time of creating the template, a variety of image processing and the analysis/dimensional measurement are executed while the operations 2 to 5 are sequentially reproduced after the data is opened, and the operations up to the report creation is automatically completed.

On the other hand, when the alignment image has been registered, before reproduction of the operation 2, first the registered alignment image is compared with the observation image of the measured object, and the measurement data of the object is moved and rotated in accordance with the position and the angle of the alignment image, to perform alignment. At this time, the position information of a variety of analyses/dimensional measurements stored not on the measurement data side but in the template may be moved and rotated in accordance with the measurement data. After alignment of the measurement data of the object with the alignment image has been completed, the variety of image processing and the analysis/dimensional measurement are executed while the operations 2 to 5 are sequentially reproduced, and the operation up to the report creation is automatically completed.

Other than making the region for performing two-dimensional alignment the same as the region for performing three-dimensional alignment, those regions can be specified not as the same region but as different regions. For example, the region for two-dimensional alignment may be a characteristic area, whereas the region for three-dimensional alignment may be a smooth plane. As described above, the two-dimensional alignment is not applied as it is to the three-dimensional alignment and the areas suitable for the respective positional corrections are used, thereby allowing more precise alignment. Further, the alignment image can be automatically set other than specifying a desired region by the user. For example, the alignment image may be set as a whole image, or a characteristic portion may be automatically extracted and set as the alignment image.

As described above, once the user performs desired analysis/dimensional measurement on a specific object, the user can make the measurement microscope device automatically execute the same data acquirement and analysis/dimensional measurement on the same type of the object from the second time on. As a result, there is no need for storing the last-time measurement position and measurement condition by taking note or the like by the user, and there is no influence exerted by a storage error, variations depending on the user, and the like, hence it is possible to repeatedly execute the simple and stable three-dimensional measurement.

In particular, the imaging condition of the measurement image which is required for acquiring the height image is unique to triangulation, and for example, at the time of performing striped projection based on triangulation, the light amount greatly varies depending on the direction of the illumination light. Accordingly, in the case of comparing a similar object with the object as the reference, the measurement images vary unless those are captured on the same condition, which makes the precise measurement difficult. Therefore, storing the condition at the time of capturing so as to allow calling and reproduction thereof as described above can facilitate reproduction of acquirement of a height image of a different object on the same condition, so as to seek labor saving in the imaging operation as well as to improvement in measurement accuracy.

As described above, performing the comparison measurement requires not only the comparison reference image data of the object, but also the comparison target image data. Accordingly, in the case of reproducing the comparison measurement by means of the template, the measurement data of the comparison target image RI itself needs to be included in the analysis measurement parameter data which is included in the template data. When measurement data of a non-defective product sample or a masterpiece of the same type of the object has been previously selected as the measurement data of the comparison target, a comparison between the object and the non-defective product sample or the masterpiece can be performed in sequence by automatically executing image capturing and a comparison measurement by means of the template. Since this comparison is not merely a visual comparison as a two-dimensional image, but a comparison between three-dimensional shapes, it is possible to execute more precise comparison measurement by making use of height information such as determination of gentle swelling and distortion of the flat surface portion and a missing and a foreign matter, which are difficult to determine on the two-dimensional image.

As described above, automatic execution of the measurement to the analysis/dimensional measurement by use of the template eliminates an error due to a manual operation to a minimum while greatly reducing labor in the case of measuring the same type of object a plurality of times, so as to allow repeated analysis in a precise and simple manner. Particularly, precise reproduction of the imaging condition for acquiring data of the object has an influence on all subsequent analyses and dimensional measurements, and is thus highly important. Differently from the microscope and the digital microscope for normal two-dimensional observation and measurement, the imaging condition of the device for measuring a three-dimensional shape, particularly by using triangulation (having unique measurement characteristics), such as the measurement microscope device, is difficult to reproduce visually and intuitively, and it can thus be said that, when the once set condition can be stored as linked to data measured at that time, it is highly useful for stable measurement of the three-dimensional shape. Since the template data is easier to manage when linked to the measurement data of the original object, for example, when the template data is saved, the image or the measurement screen of the object may be included as a thumbnail to a file icon displayed on the PC. Further, part of the file name of the template data may be automatically included with a name of the executed measurement function or an abbreviated name indicating that function. In such a manner, the template data becomes more convenient and easier to handle.

(Detail of Image Connection Mode)

Moreover, the measurement microscope device operation program is provided with an image connection function of connecting a plurality of images captured in different positions to generate a connected image indicating a wider connected region. The image connecting unit 225 specifies a predetermined region of the object as a connected region, and divides this connected region into a plurality of sub regions. With respect to the respective sub regions as thus set, height images for connection and observation images for connection which include a connection margin are respectively captured by the imaging unit 100. The obtained plurality of height images for connection and observation images for connection are then connected, to generate a connected image showing the connected region. It is thereby possible to connect images with narrow visual fields which are captured with high accuracy, to obtain an image with a wider visual field.

The image connecting unit 225 previously specifies the number of images for connection needed to be connected for generating the connected image, and a size of each image for connection. As one example, a start point and an end point of the connected region are specified. For example, with respect to a rectangular connected region, by taking an upper-left apex as a starting point and a lower-right apex located on a diagonal line as an end point, a desired region of the object displayed on the image display region 410 is specified by use of the pointing device such as the mouse. It goes without saying that the number of objects is not limited to one, but the connected region can be set so as to include a plurality of workpieces displayed on the image display region.

Figure 50:
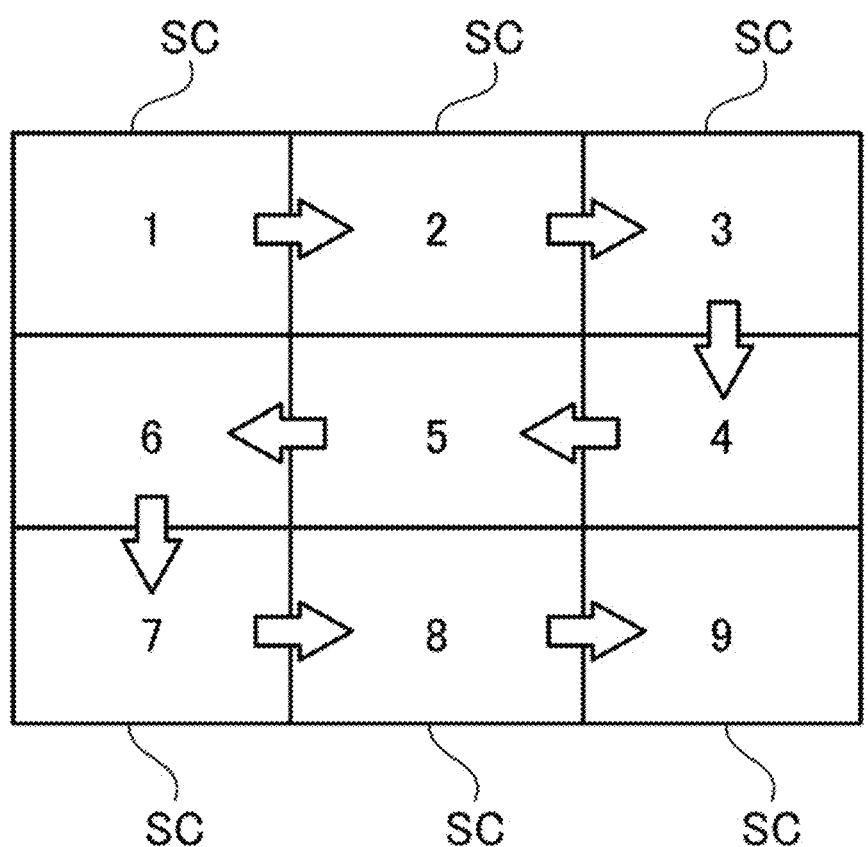
FIG. 50 is a schematic diagram showing an example of dividing a connected region into sub regions.

Further, the method for specifying the connected region is not limited to this method, but other methods can also be applied as appropriate. For example, there may be used a method of specifying the starting point of the connected region and specifying longitudinal and lateral lengths of the connected region with the position of the starting point taken as a reference. The length may be specified by being selected out of predetermined alternatives other than being inputted with a numeric value. As still another method, there can also be employed a method of specifying the starting point of the connected region and how many images for connection are to be arranged longitudinally and laterally with the position of the starting point taken as the reference. Moreover, it is also possible to specify the order in which the images for connection are to be captured in a state where the connected region has been divided into a plurality of sub regions. Alternatively, in accordance with the set connected regions, the imaging number and the imaging order of the images for connection may be automatically decided, or the imaging number and the imaging order thereof may be set as fixed values. In addition, for facilitating connection between the images for connection, an amount of margins for overlapping can be set such that the adjacent images for connection partially overlap with each other. As one example, as shown in FIG. 50, a rectangular connected region is divided into nine regions, and those regions are sequentially captured from upper left on each row (e.g. direction from left to right on the first row). When capturing is completed on this row, it moves to the next row and then is performed in the opposite direction (direction from right to left in the example of FIG. 50) to the last row. In such a manner, the images SP for connection direction on each row are sequentially captured. Further, a margin is arbitrarily adjusted by the user. In addition, the specification of the connected region is not necessarily performed in advance. The images can also be connected by the user capturing the image for connection in a desired position while displaying the image being captured. The method of capturing the image in the desired position while freely moving the stage as described above is referred to as dynamic image connection.

Further, before the connection, the plurality of images for connection are preferably moved or rotated for alignment by the alignment unit 215 so as to have the same posture. The alignment unit 215 automatically matches the postures of the respective images for connection by pattern matching or the like as described above. Further, the postures of the respective images may be manually adjusted, or may be fine-adjusted after automatic alignment. As described above, the alignment unit 215 can realize either automatic alignment or manual alignment. Note that alignment can be omitted in the case of not requiring the alignment such as the case of the images being captured with the same posture or the case of the object being fixed by the jig.

Moreover, at the time of capturing each image for connection, a measurement error region, where a measurement result by at least one of the first measurement light projecting unit and the second measurement light projecting unit is error, is superimposed and displayed by the measurement error region display unit 212 in a state where the height image for connection formed by projecting the measurement light in the predetermined pattern is displayed on the display section 400, whereby it is possible to prompt the user to reset the measurement-image imaging condition. In each connected image, the user operates the measurement-image imaging condition setting unit with respect to the height image for connection that is displayed by the measurement error region display unit 212 when the measurement error region is generated, to adjust the measurement-image imaging condition to a reimaging condition. Since the height image for connection formed by projecting the measurement light in the predetermined pattern is an image before the height is measured, the measurement error region displayed on the display section 400 at this time is a region estimated from the acquired measurement image. Accordingly, a plurality of images each having high accuracy but a narrow imageable visual field are captured while these images are connected, whereby it is possible to obtain an image with a wide visual field and high accuracy. In particular, by changing the imaging condition of the height image not used as the texture image rather than the observation image used as a texture image, it is possible to avoid a state where the appearance of the connected image changes significantly with respect to each area, while eliminating the measurement error region, so as to obtain a high quality connected image.

It can be configured that the measurement error region display unit 212 can display an area having been insufficiently measured without measuring the height in a state where the measurement image formed by projecting the measurement light in the predetermined pattern is displayed on the image display region 410. For example, by performing image processing in real time, it is possible to display a portion where the height cannot be measured well due to a shadow, penetration, an insufficient light amount or a saturated point, without measuring the height of the measurement image. Accordingly, the user can change the imaging condition so as to measure a desired place, and then perform measurement. Further, as described above, the measurement error region display unit 212 emphasizes the measurement error region by coloring, filling-in with black, adding hatching, flashing or the like, to visually distinguish the region from the other region. Further, the measurement error region can be made invisible to make the image displayed as a partially cracked image. Such an invisible display is included in the distinguishing process performed by the measurement error region display unit.

Alternatively, after the height of the height image has been measured, it may be checked by the measurement error region display unit 212. In this case, after the height has been measured, the area having been insufficiently measured can be determined and displayed by the measurement error region display unit 212, whereby the user can check the region failed to be measured and thereafter change the imaging condition and perform a remeasurement only when the desired region has not been properly measured.

(Image Connection Function)

The image connection function is used for connecting images by use of the measurement microscope device operation program. An example of the measurement microscope device operation program provided with the image connection function is shown in an image view of FIG. 51. On a GUI screen of the measurement microscope device operation program shown in this figure, a "Connection Mode" selection field 570 is provided as one aspect of the image connection function in the lower section of the operation region 420. When a checkbox of the "Connection Mode" selection field 570 is checked, the image connection mode is selected, and as described later, while the stage 140 is moved in the XY plane, the observation image and the height image are successively captured and generated, which can then be connected so as to be coupled as one connected image. Further, by checking off the checkbox of the "Connection Mode" selection field 570, the image connection mode can be turned off.

(Manual Image Connection)

There are two methods for connecting images: a method in which the user manually captures a variety of images for connection and superimposes and connects these images, and a method in which a plurality of images for connection are automatically captured and then connected. Further, as described above, "full-auto" and "cancel full-auto (semi-auto)" in the simple mode and the application mode are present as the imaging condition setting modes. Here, the procedure for manually connecting images in the case of selecting the full-auto mode in the simple mode will be described based on a flowchart of FIG. 52 and GUI screens of FIGS. 51 to 68.

(Manual Image Connection Procedure in Full-auto Mode)

First, the XY-position of the stage 140 is initialized in step S5201. Next, the object is arranged on the stage 140 in step S5202. Here, the stage 140 is arranged in a position such that it can be moved in the widest range at the time of connection.

Moreover, a display magnification in the image display region 410 is decided in step S5203. For setting the magnification, "High Magnification Camera" or "Low Magnification Camera" is selected in a "Magnification Switch" field provided in the upper section of FIG. 51, and further, a desired magnification is selected from dropdown boxes in a "Magnification" field. Note that the magnification can be specified with a numeric value or successively changed with a scroll button of the mouse.

Figure 51:
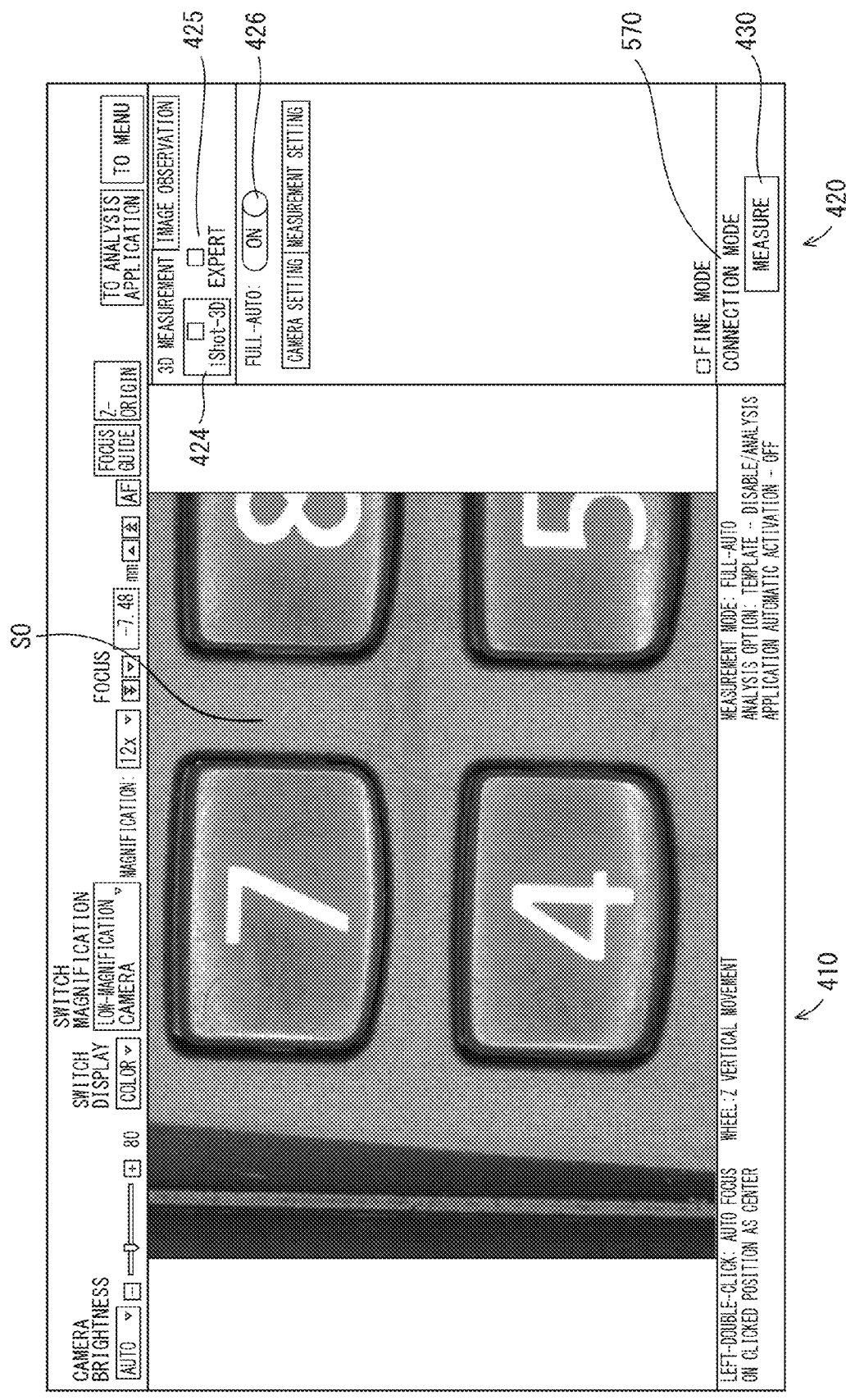
FIG. 51 is an image view showing a GUI for turning on/off an image connection mode.
Figure 52:
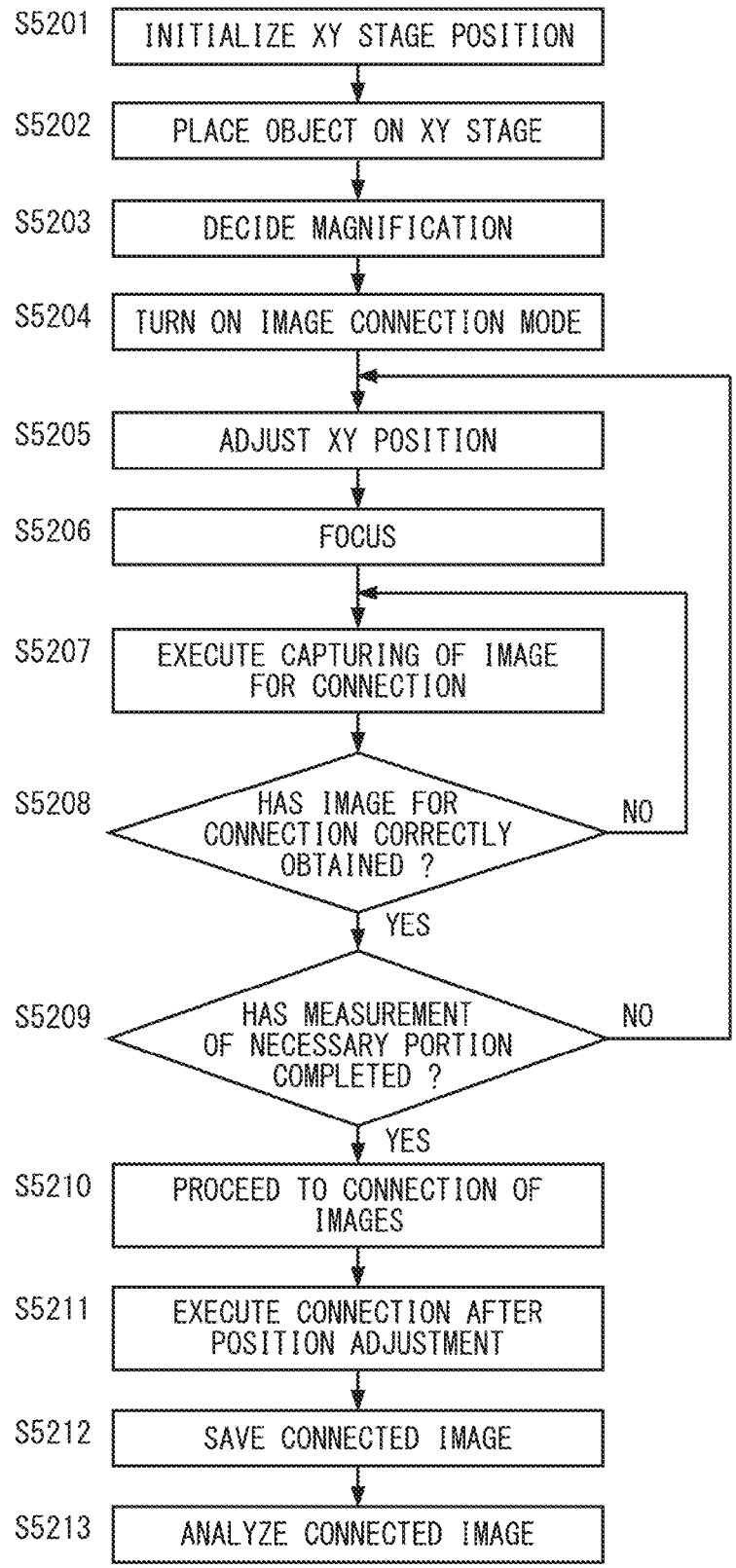
FIG. 52 is a flowchart showing a procedure for performing manual image connection in a full-auto mode.
Figure 53:
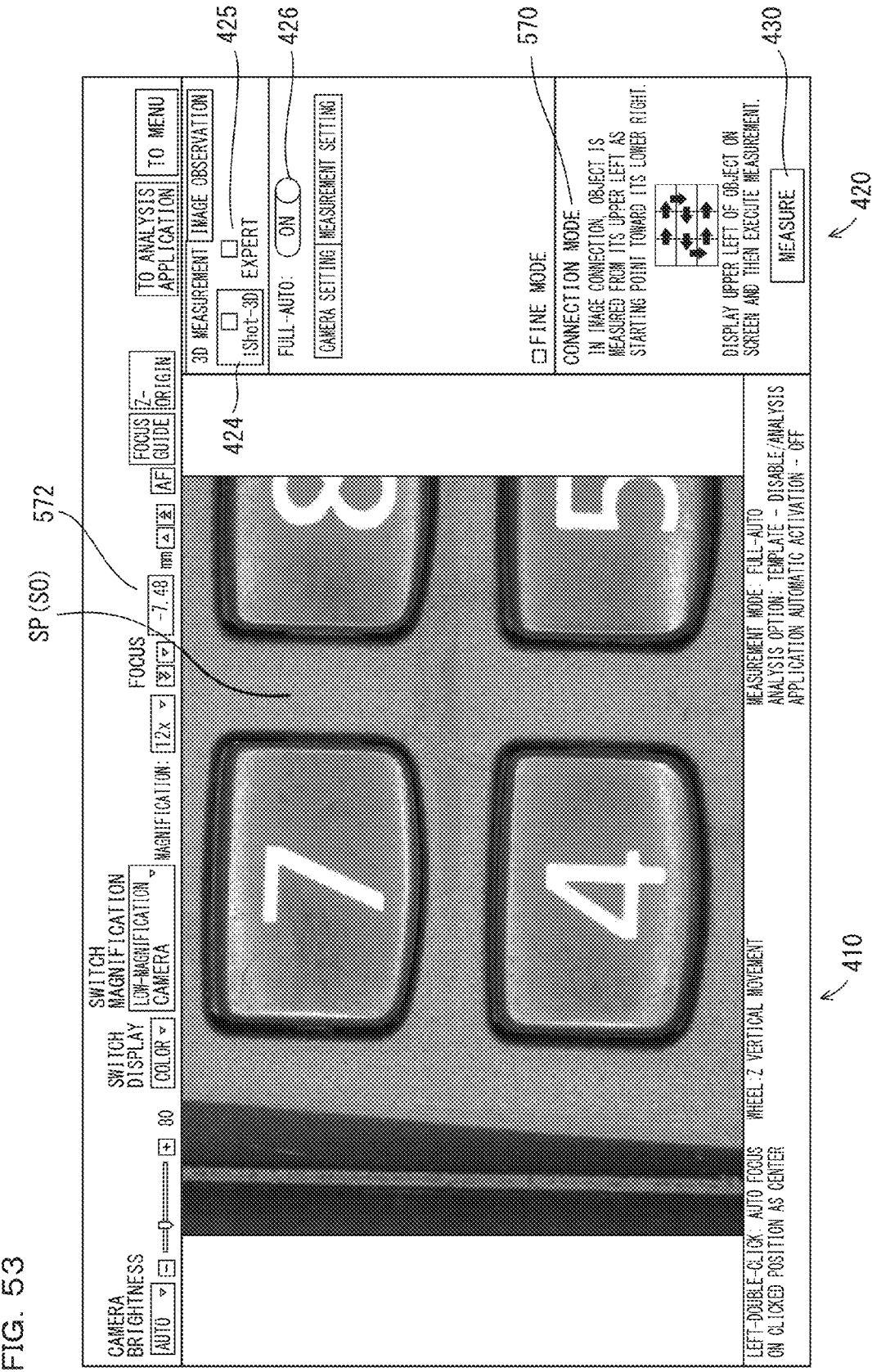
FIG. 53 is an image view showing a state where the image connection mode has been started from FIG. 51.

Then, the mode is switched to the image connection mode in step S5204. Here, the display magnification of the observation image displayed on the image display region 410 on the screen of FIG. 51 is set, and thereafter the checkbox in the "Connection Mode" selection field 570 is checked. The image connection mode is then started, and the screen is shifted to that shown in FIG. 53. In the lower section of the operation region 420 on this screen, a guidance showing the image connection operation status is displayed. Here, similarly to FIG. 50, a state where the connected region of the connected image desired to be generated has been divided and an image where the order of the image for connection to be captured is indicated by arrows are displayed, and the position (upper left as the first image in the example of FIG. 53) of the image for connection intended to be currently captured is highlighted and displayed. Thereby, the user can visually check the position of the connected image currently intended to be captured and the number of remaining connected images that should be captured in the future, the current operation status and the like. In this state, the user manually adjusts the XY-position of the stage 140 (step S5205) to bring it into focus (step S5206). Adjustment of the focus is performed in a "Focus" field 572 provided in the upper section of FIG. 53. In this example, by a left-double-click operation of the mouse, auto focusing is executed with the clicked position at the center. Note that this process can be omitted in the case of automatically executing auto focusing. Further, in the full-auto mode, the image displayed on the image display region 410 cannot be switched, but is fixed to the display of the observation image SO as the image SP for connection. Accordingly, the stage position and the focus are all adjusted using the observation image.

Figure 54:
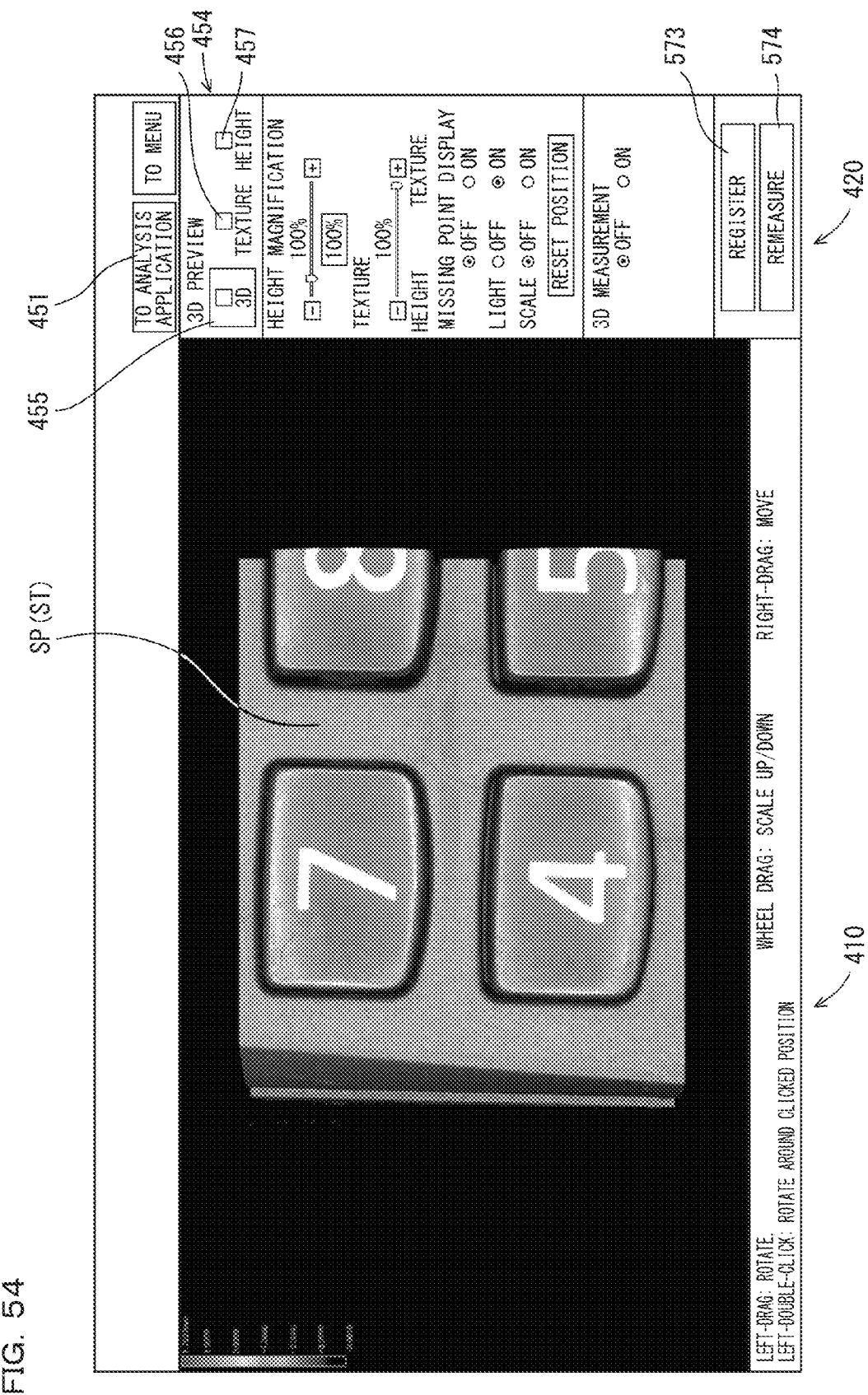
FIG. 54 is an image view displaying a composite image as an image for connection.
Figure 55:
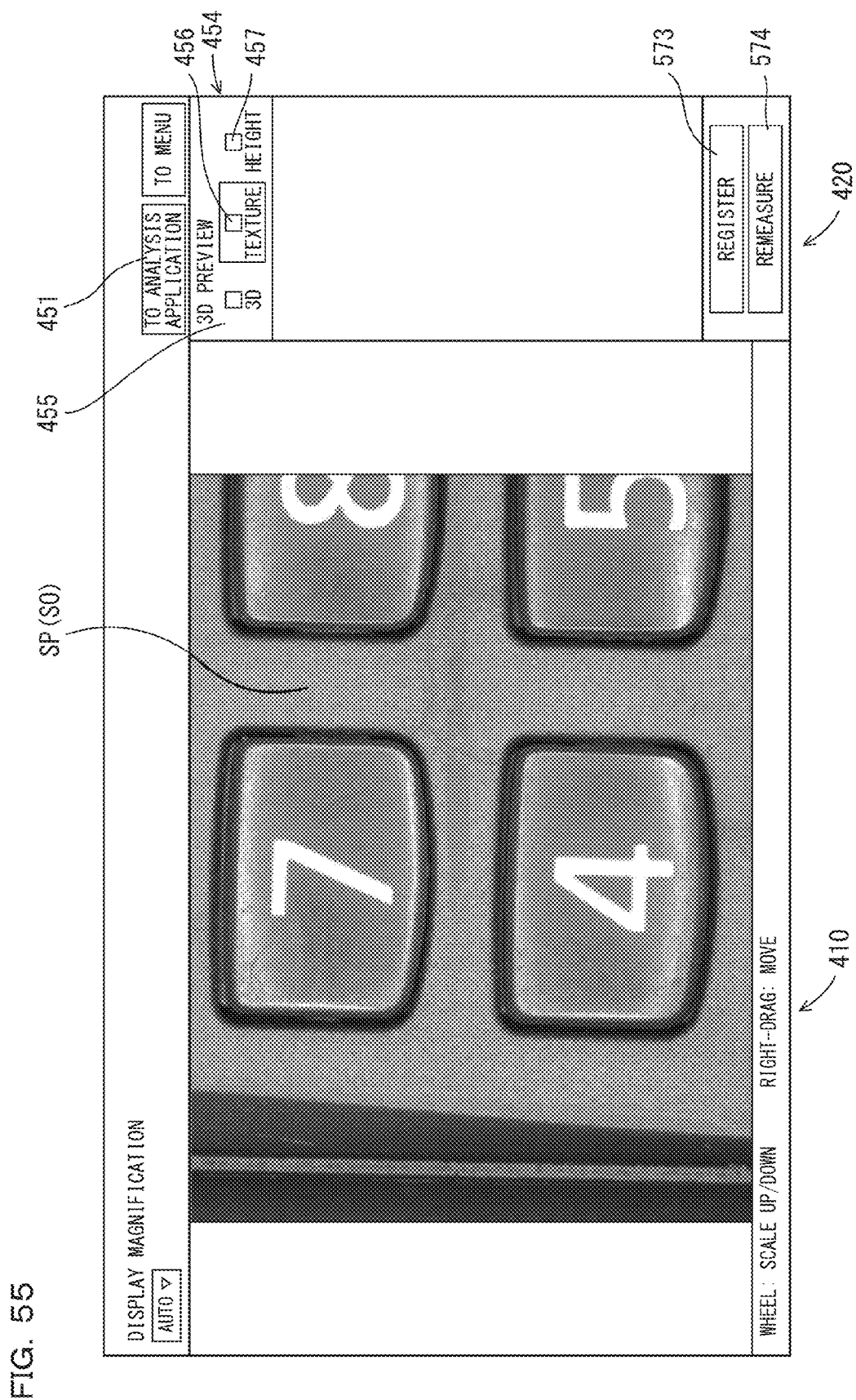
FIG. 55 is an image view displaying an observation image of the image for connection of FIG. 54.
Figure 56:
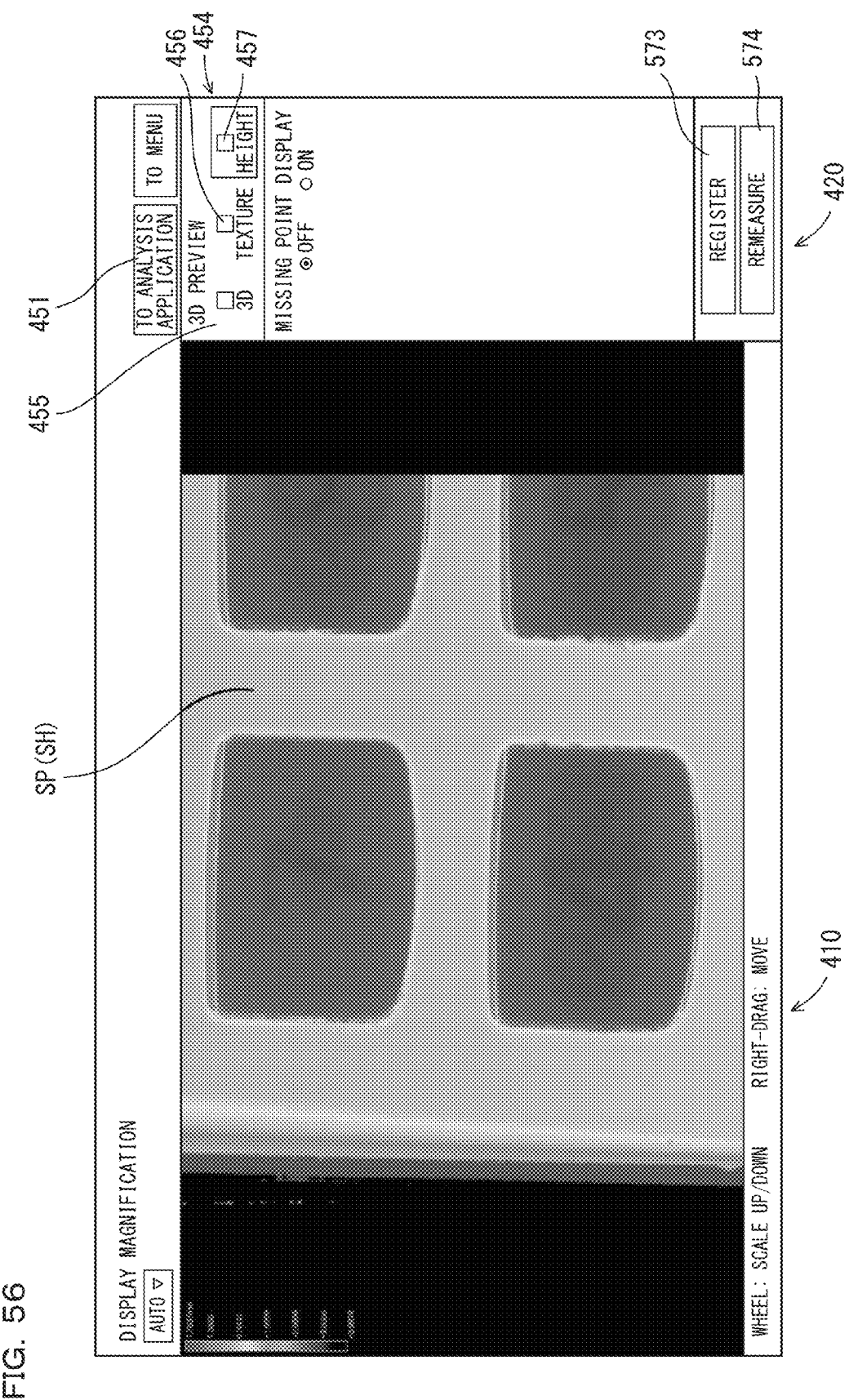
FIG. 56 is an image view displaying a height image of the image for connection of FIG. 54.
Figure 57:
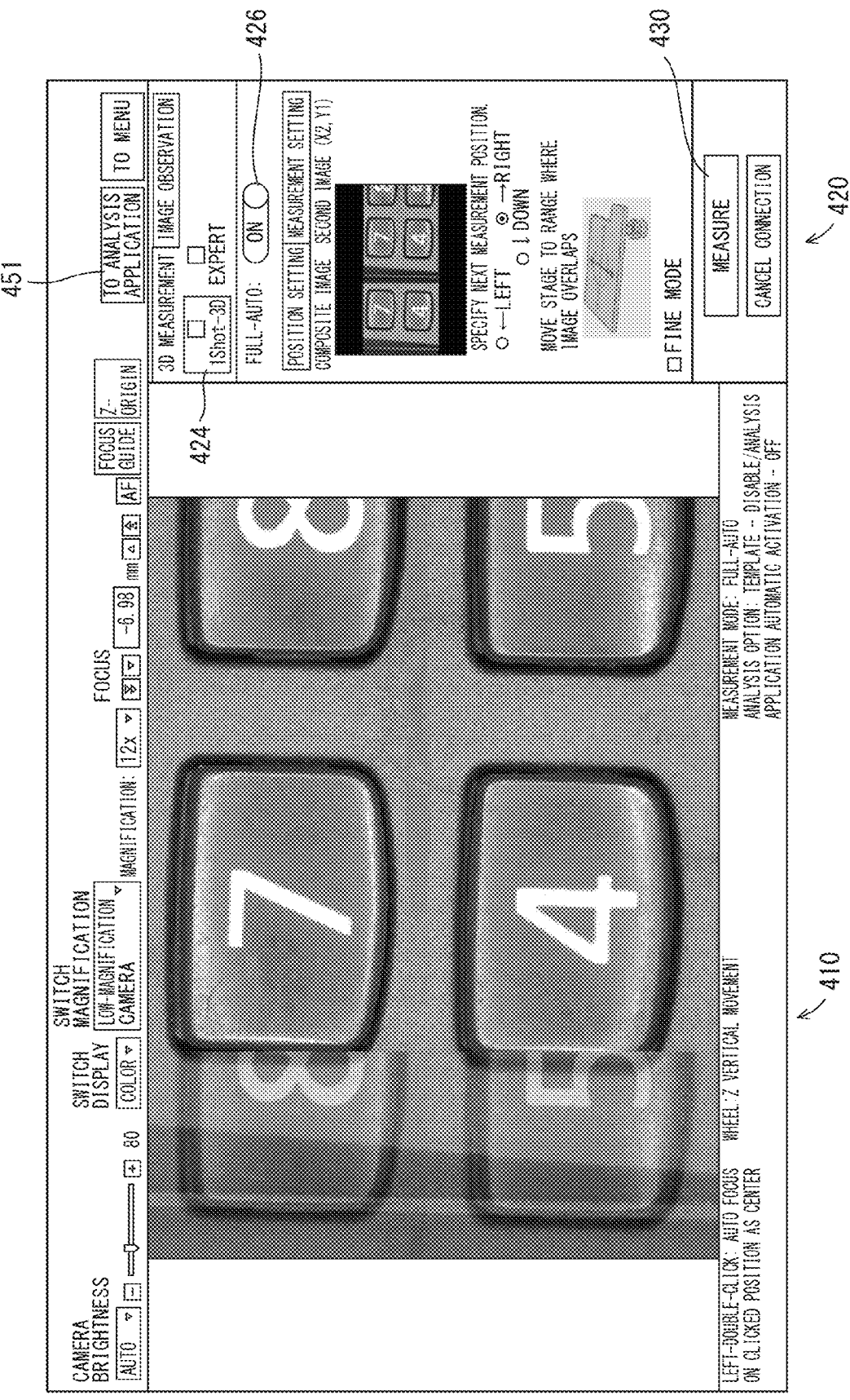
FIG. 57 is an image view showing a state where the image for connection is intended to be superimposed.

When the stage position and the focus are decided in such a manner, capturing is performed in step S5207. Here, by pressing the "Measurement" button 430 on the screen of FIG. 53, the observation image is captured, the height image is acquired, and further the composite image ST formed by combining the height image and the observation image as the texture image is generated. Here, as shown in FIG. 54, the composite image ST as the image SP for connection is displayed on the image display region 410, and the "3D" button 455 of the image display switching unit 454 provided in the operation region 420 is selected. When a "Texture" button 456 is pressed in this state, the screen is switched to that shown in FIG. 55, and the observation image is displayed on the image display region 410. Similarly, when a "Height" button 457 is pressed in the image display switching unit 454, the display of the image display region 410 is switched to a contour-like display of the height image SH, as shown in FIG. 56. As described above, the user checks each image obtained by the image display switching unit 454 as necessary, to check that the image for connection has been obtained (step S5208). When there is no problem with the obtained image, a "Register" button 573 provided in the lower section of the operation region 420 is pressed to save the obtained image for connection. When there is a problem, the process returns to step S5207, to redo capturing. Here, when a "Remeasurement" button 574 is pressed, saving of the image is canceled, and the screen returns to the image capturing screen.

Figure 58:
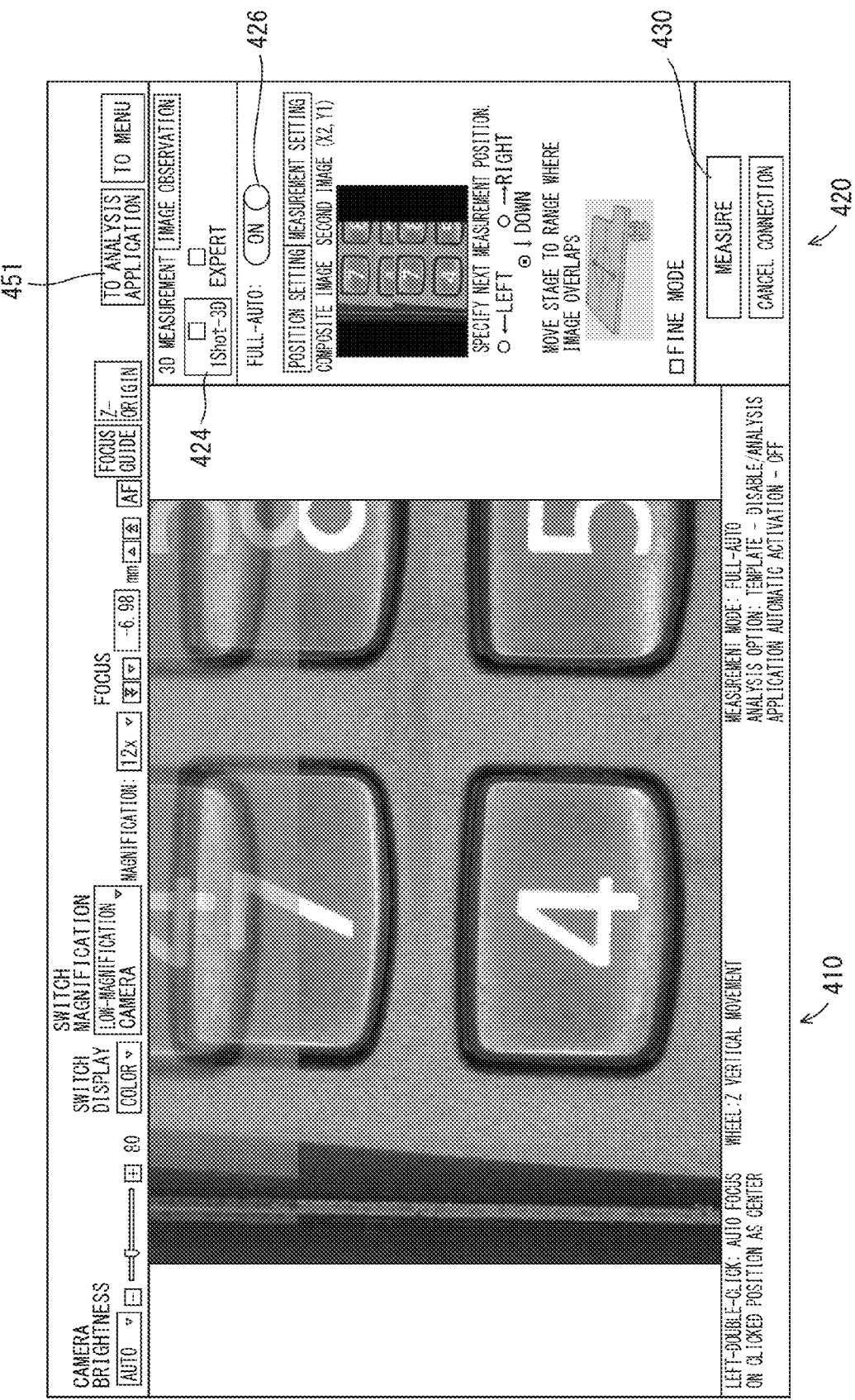
FIG. 58 is an image view showing another state where the image for connection is intended to be superimposed.
Figure 59:
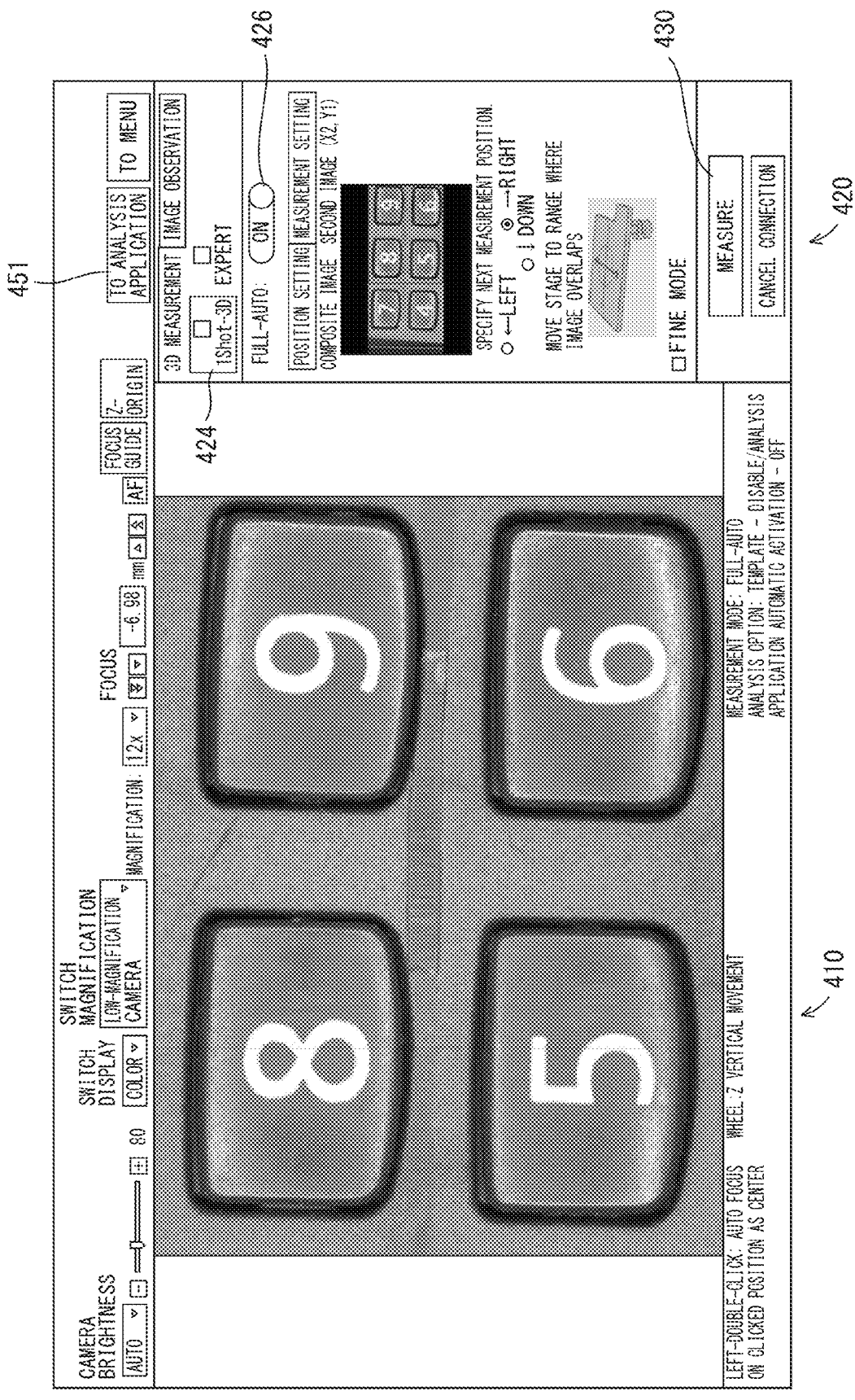
FIG. 59 is an image view showing a state where the image for connection has been superimposed.

When there is no problem in step S5208, the process proceeds to step S5209, where it is determined whether or not all the number of images for connection required for generation of the connected image have been acquired, and when they have not been acquired yet, the process returns to step S5205, where the XY-position of the stage 140 is adjusted for obtaining the next image for connection. Here, the screen is switched to that shown in FIG. 57, and the user is prompted to move the stage 140 as preparation for acquiring a second image for connection. In the middle section of the operation region 420, the observation image of the captured first image for connection is displayed and the position of the observation image currently on display is displayed by a red frame. Further, in the image display region 410, the observation image of the captured first image for connection is displayed, and the current observation image is superimposed and displayed thereon. At this time, a transmittance of either image is preferably changed in order to check how the image is superimposed. In this example, the captured image for connection is translucently displayed. In this state, the user manually operates the stage 140, and performs alignment while referencing to the image display region 410 such that the image continues to the captured image for connection at a boundary portion (FIG. 58). Then, as shown in FIG. 59, the position of the stage 140 is adjusted such that the captured image for connection and the image under adjustment are continued at the boundary portion while a margin is taken such that those images partially overlap (step S5206), and the "Measurement" button 430 is pressed to execute capturing (step S5207).

Figure 60:
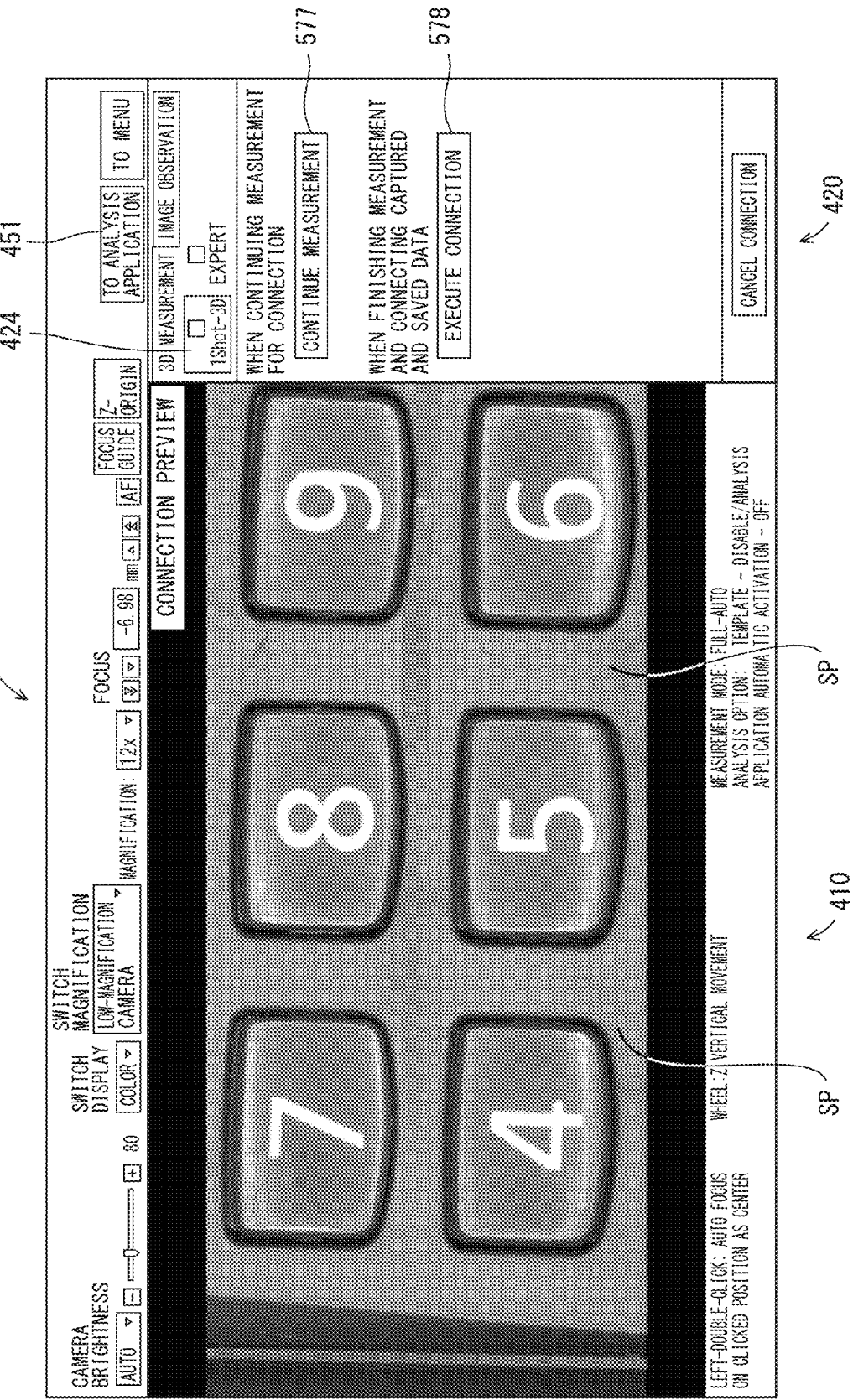
FIG. 60 is an image view showing one example of a connected preview screen.

Then, in step S5208, the obtained image is checked again, and when there is no problem, the process proceeds to step S5209, where it is again determined whether or not all the required images for connection have been captured. Here, as on a connection preview screen 576 as shown in FIG. 60, the obtained images for connection are superimposed, and displayed in a virtually connected state. In the case of continuing the measurement, a "Continue Measurement" button 577 is pressed, to proceed to an imaging screen for the next image for connection (step S5205). On the other hand, in the case of stopping acquiring the image for connection and performing image connection, an "Execute Connection" button 578 is pressed (step S5210).

Figure 61:
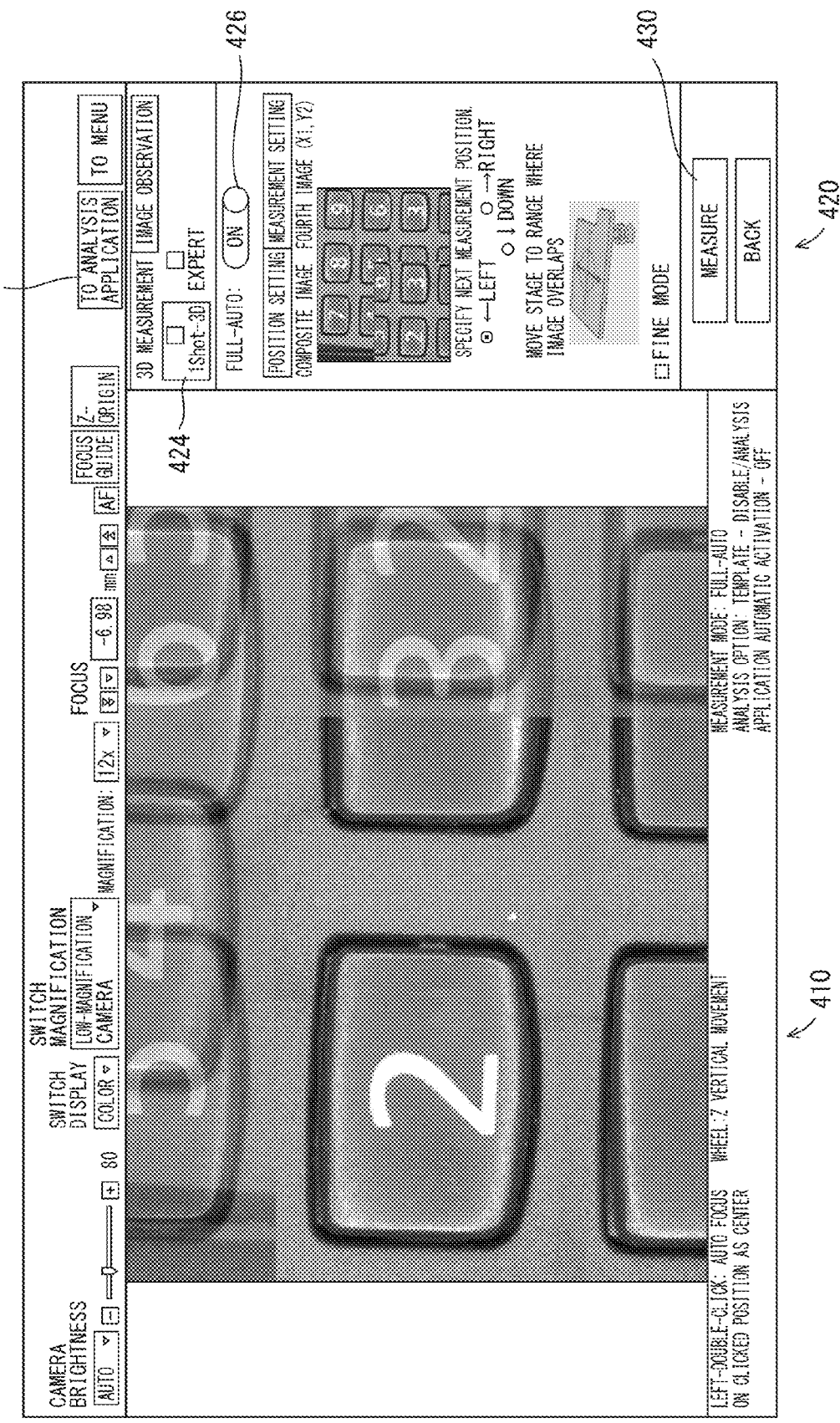
FIG. 61 is an image view showing the state of moving the stage in order to capture a fourth image for connection.
Figure 62:
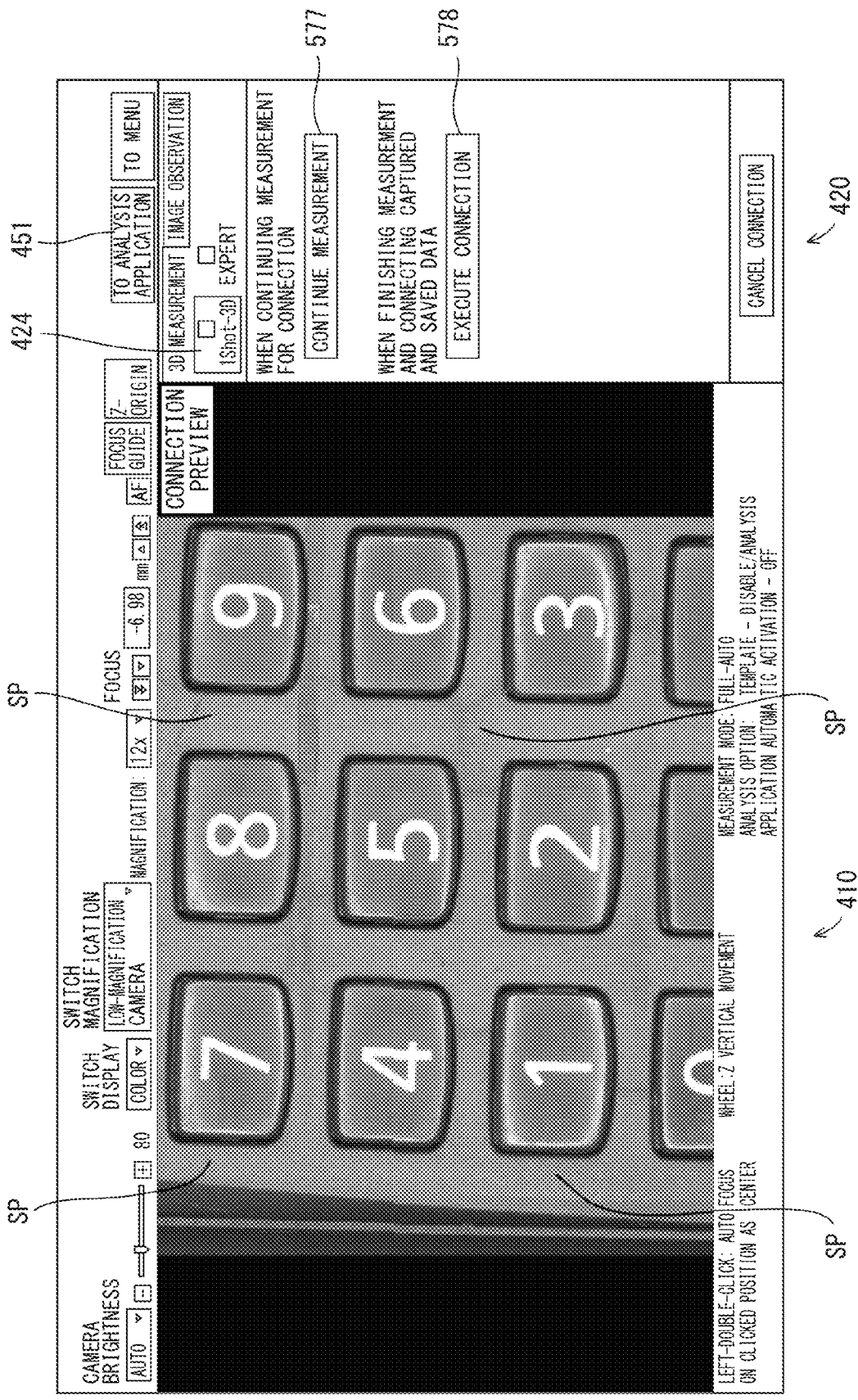
FIG. 62 is an image view showing another example of a connected preview screen.
Figure 63:
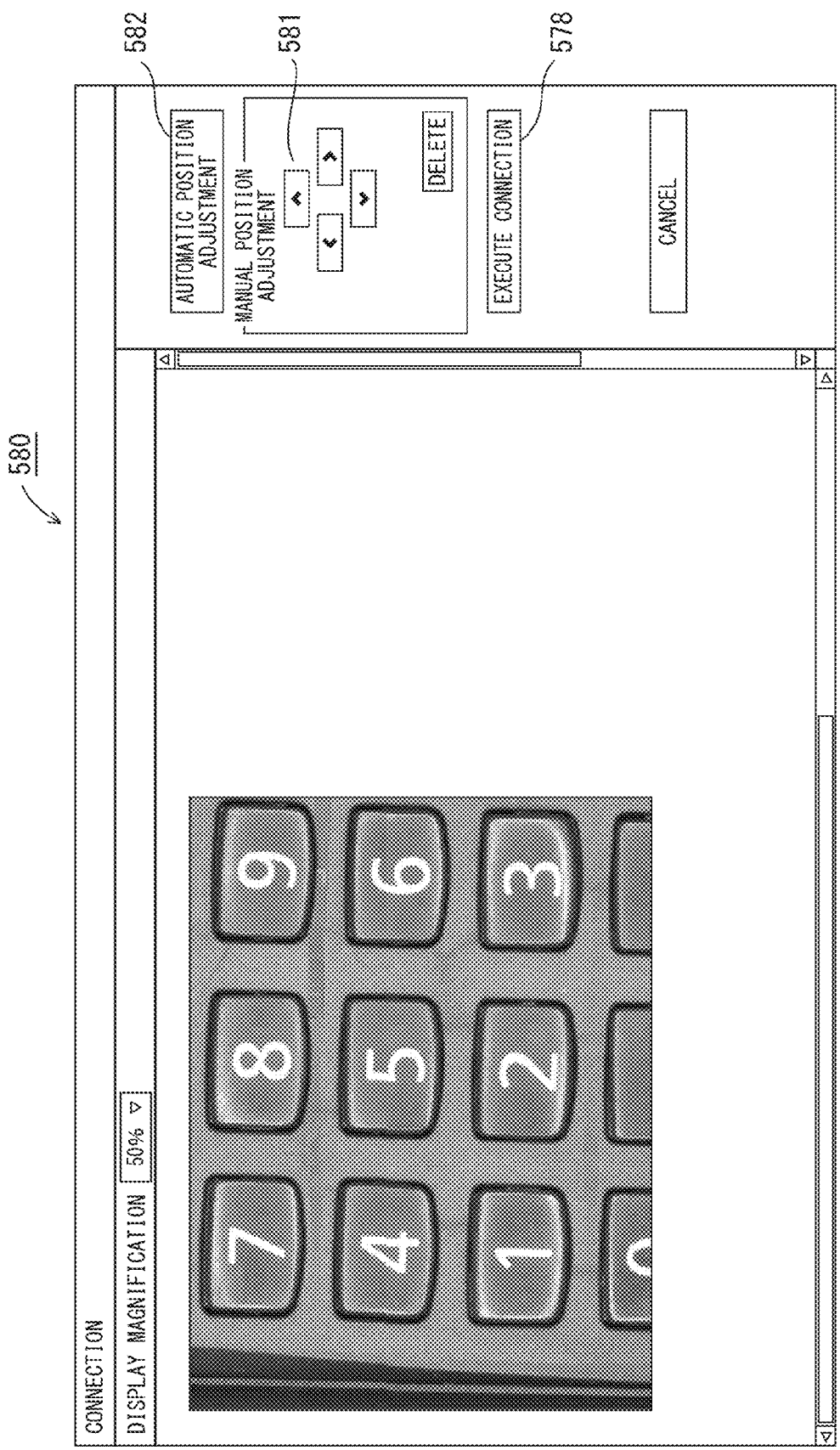
FIG. 63 is an image view showing the state of adjusting the position of the image for connection.

As described above, the images for connection are sequentially captured. As one example of an intermediate process, FIG. 61 shows a state where the fourth image for connection is captured. When capturing of all the images for connection is completed in such a manner, the process proceeds from step S5209 to step S5210, and an operation for connecting the images for connection is performed. Here, the "Execute Connection" button 578 is pressed on the connection preview screen 576 shown in FIG. 62 where capturing of the ninth image for connection has been completed.

Figure 64:
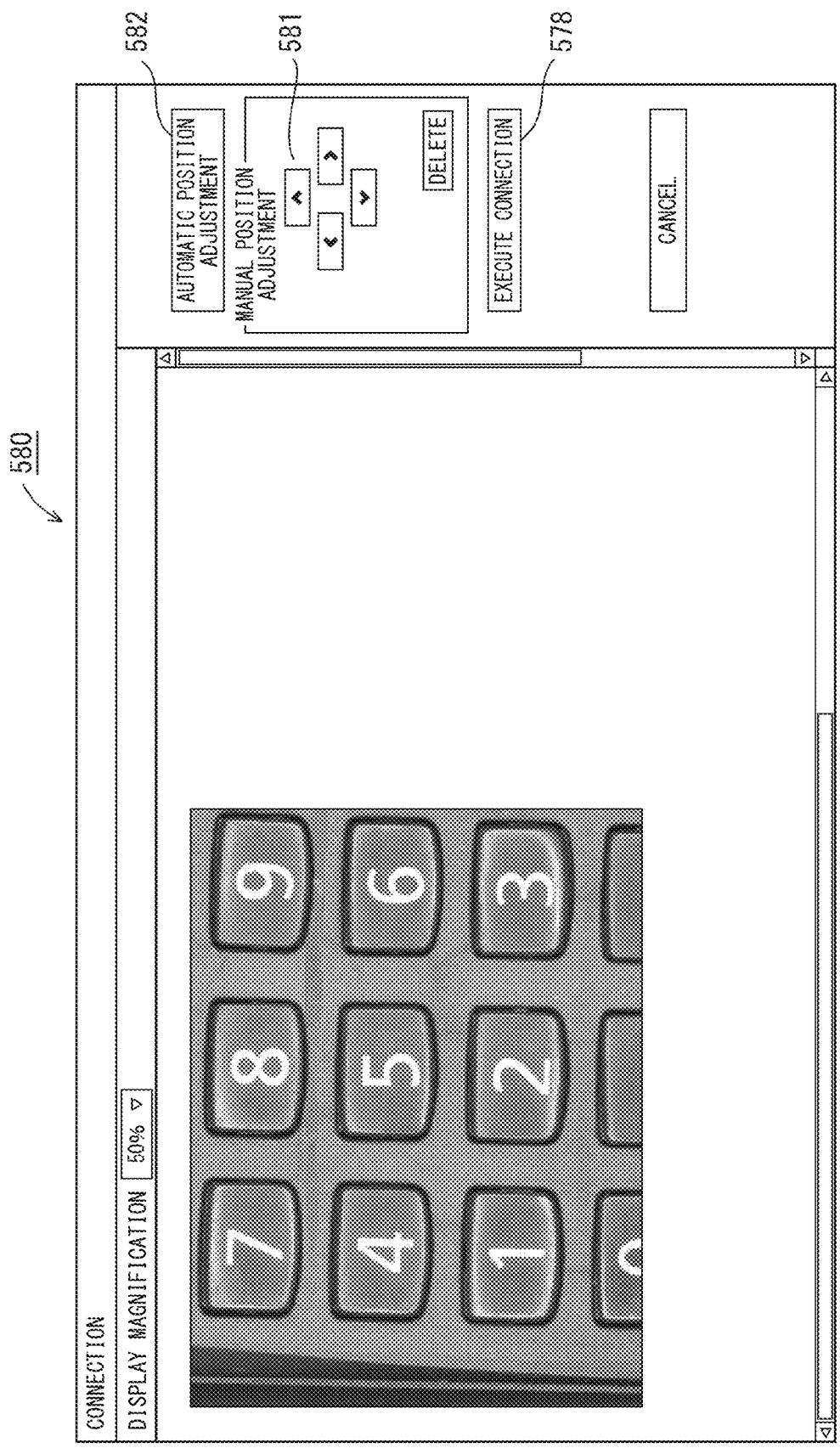
FIG. 64 is an image view showing a result of executing an automatic position adjustment function from the state of FIG. 63.
Figure 65:
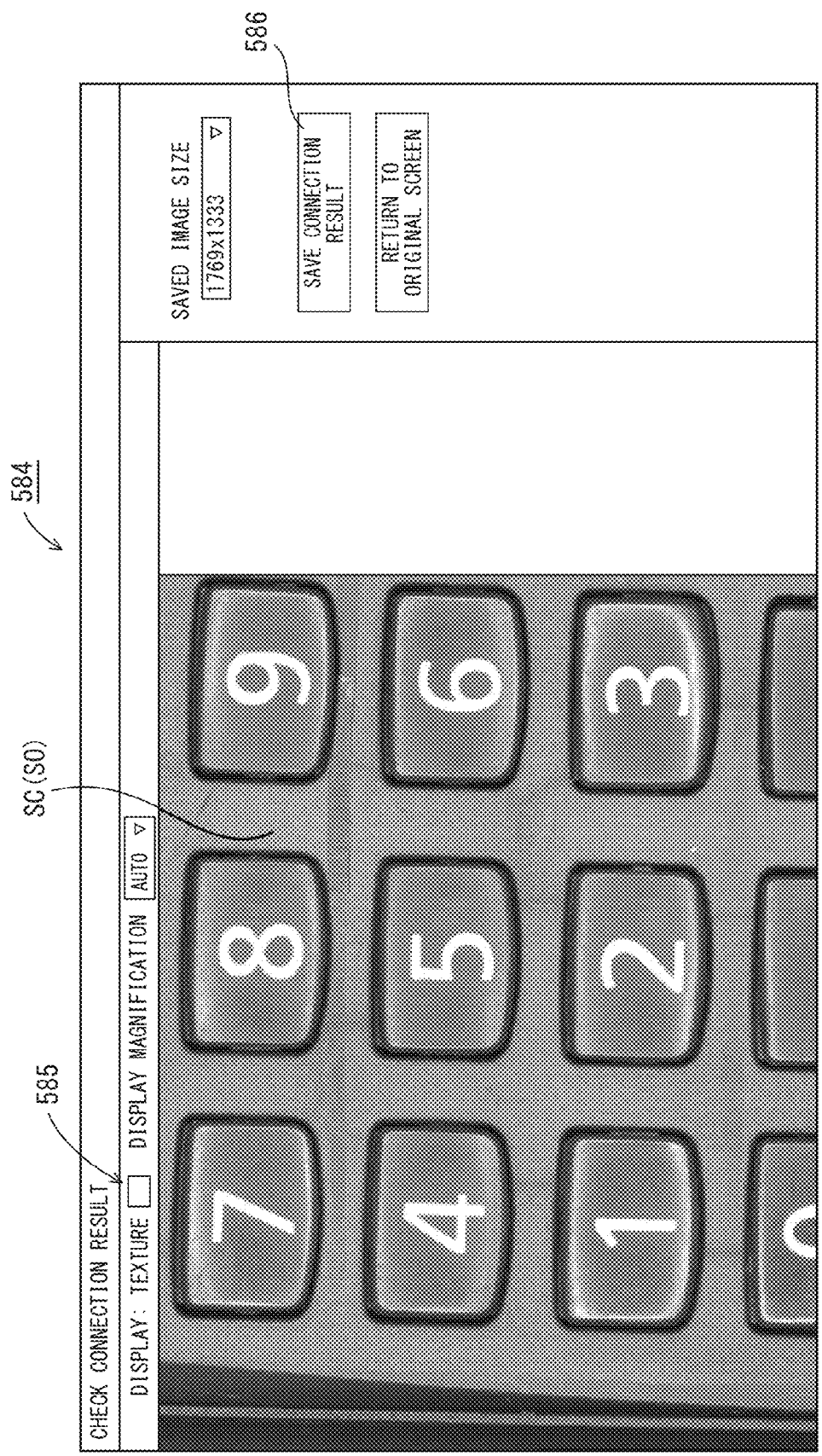
FIG. 65 is an image view showing an observation image on a connection result check screen.
Figure 66:
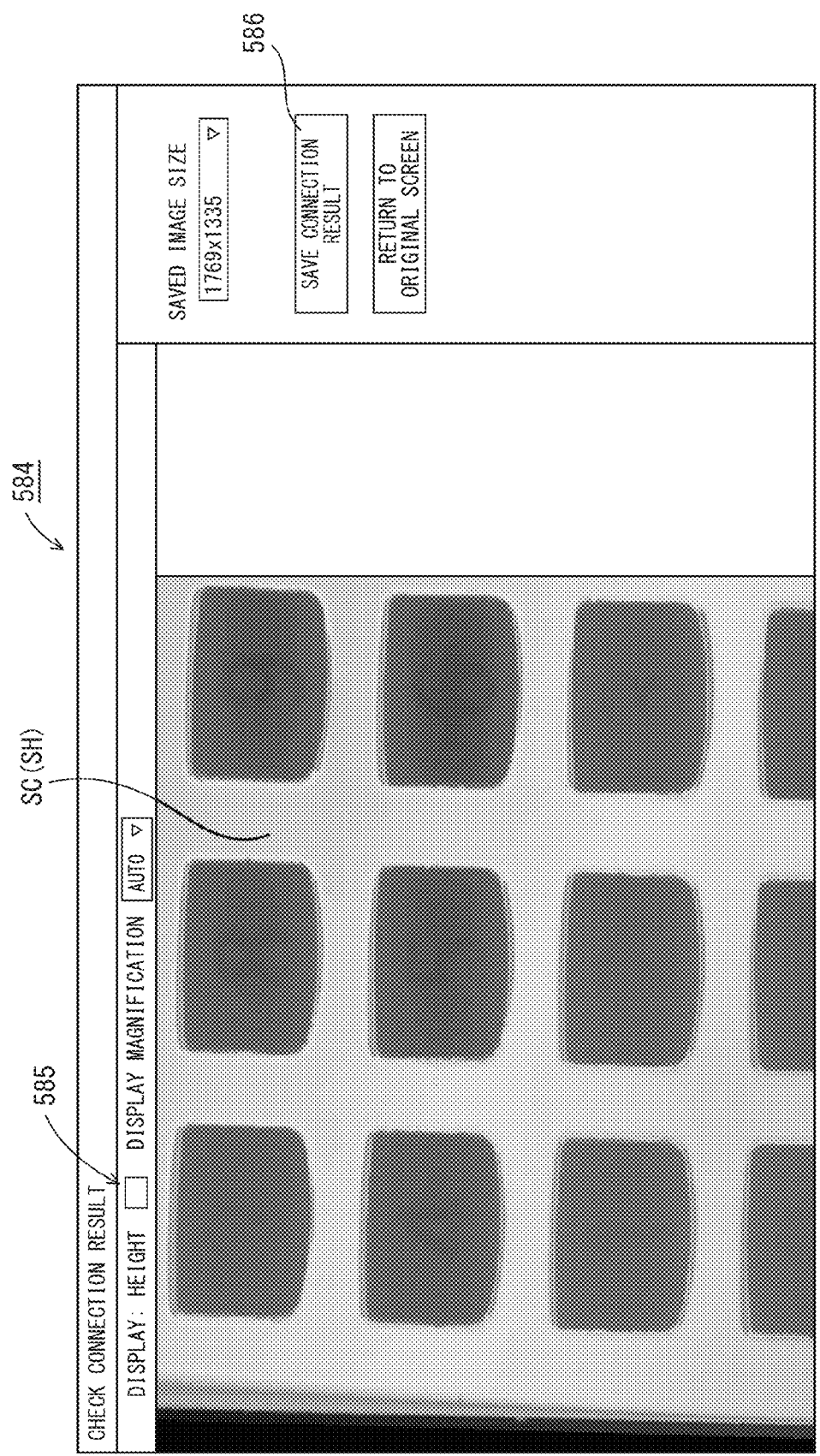
FIG. 66 is an image view showing an example where the screen has been switched from the connection result check screen of FIG. 65 to a height image.

Next, in step S5211, the position adjustment is automatically or manually performed on the images for connection, to execute connection. Here, an arbitrary image for connection is selected from a connection check screen 580 of FIG. 63, to manually adjust its position. Here, the position of the selected image for connection is fine-adjusted using an arrow button 581 provided in the operation region 420. Further, the position may be adjusted by directly dragging with the mouse on the image display region 410. Further, when an "Automatic Position Adjustment" button 582 provided in the upper section of the operation region 420 is pressed, the position of the image for connection is automatically adjusted by image processing. FIG. 64 shows a result of executing the automatic position adjustment function. The position adjustment operations up to this point are all performed using the observation image. In other words, only adjustment within the plane in the XY-directions is performed, and alignment in the height direction is not performed.

When the position adjustment is completed as described above, the "Execute Connection" button 578 is pressed and one connected image connecting the images for connection is generated. That is, connection of the observation images in the XY-plane and connection of the height images or the composite images in the XY-plane and the height direction (Z-axis direction) are performed. Consequently, in an example of a connection result check screen 584 shown in FIG. 65, the obtained connected image SC is displayed on the image display region 410. Further, an image switching icon 585 provided in the toolbar is selected, thereby allowing switching of the display of the observation image SO shown in FIG. 65 to the display of the height image SH shown in FIG. 66.

Figure 67:
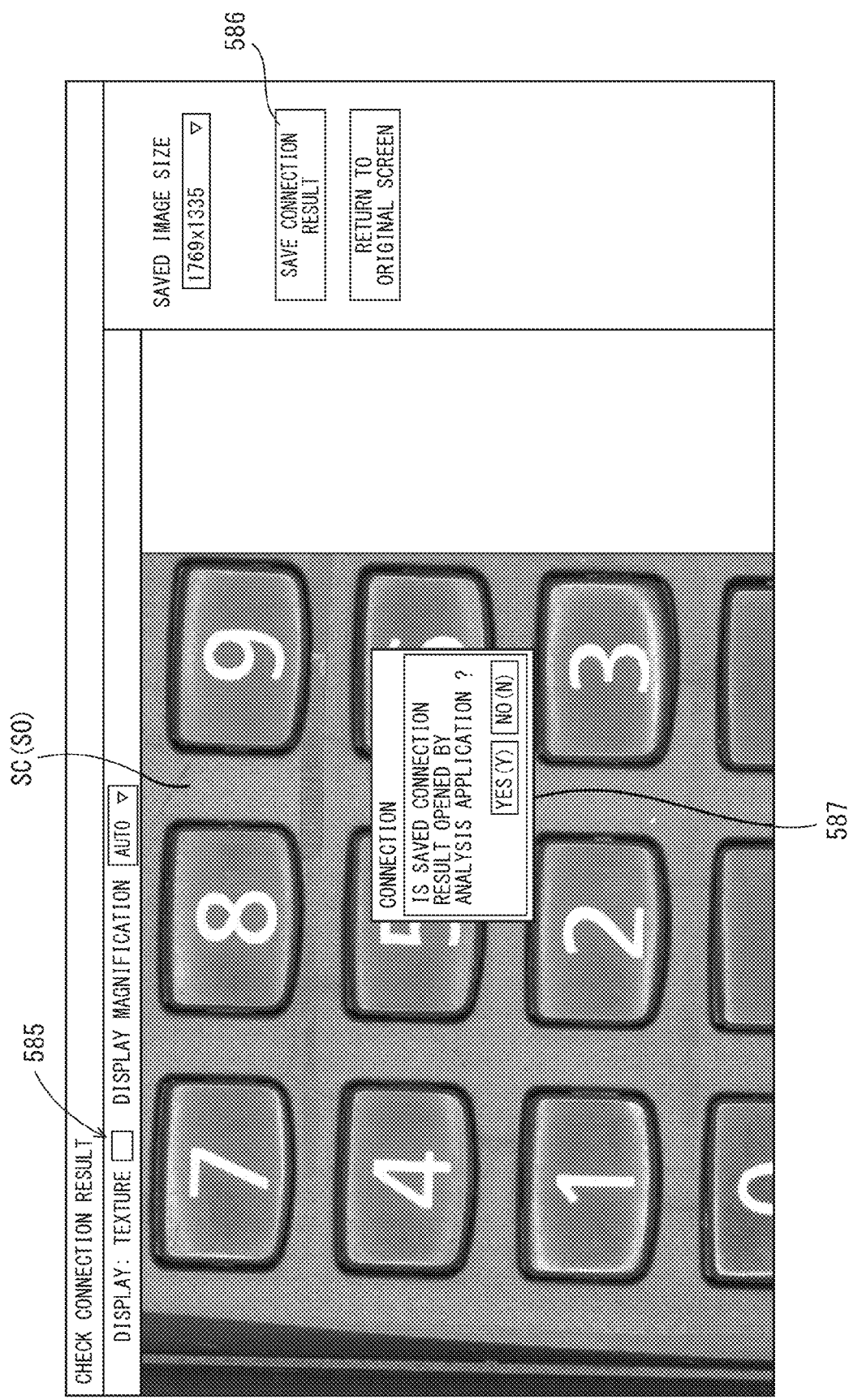
FIG. 67 is an image view showing a dialog of whether or not the connection result will be opened by an analysis application.
Figure 68:
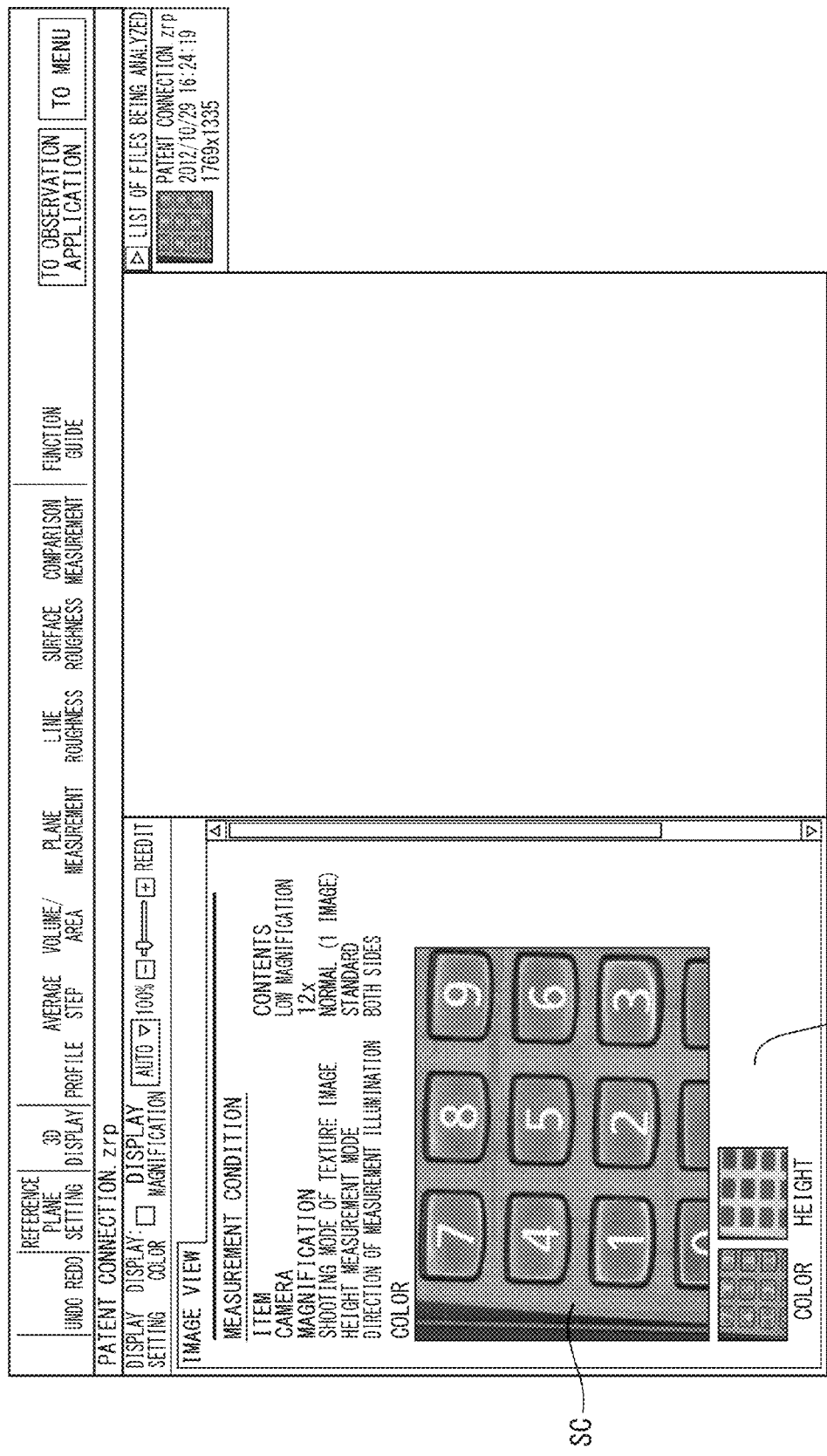
FIG. 68 is an image view showing a state where a connected image generating operation has been opened as a report.

Then, in step S5212, the connected image SC may be saved as necessary. Here, a "Save Connection Result" button 586 is pressed from the screens of FIG. 65, 66 or the like, to save a data file of the connected image SC into the storage device 240 such as a hard disk. Then, in step S5213, measurement is performed on the connected image SC as necessary. Here, when the "Save Connection Result" button 586 is pressed to save the connected image SC, a confirmation dialog 587 is automatically displayed and a selection is prompted by being asked, "Is saved connection result opened by analysis application?" or the like, as shown in FIG. 67. When "Yes" is selected on this screen, the three-dimensional image measurement program is activated as the analysis application, while the saved connected image data is automatically read, to allow the measurement operation to be performed on the connected image SC. A report can also be created regarding such a generation operation for the connected image SC as shown on the profile measurement result report screen 564 of FIG. 68. The connected image SC is displayed on the created report RT. Further, a series of operations for the image connection can be saved as the template. As described above, a connected image larger than the imageable visual field can be generated with high accuracy.

(Image Connection Operation in Semi-auto, Application Mode)

Figure 69:
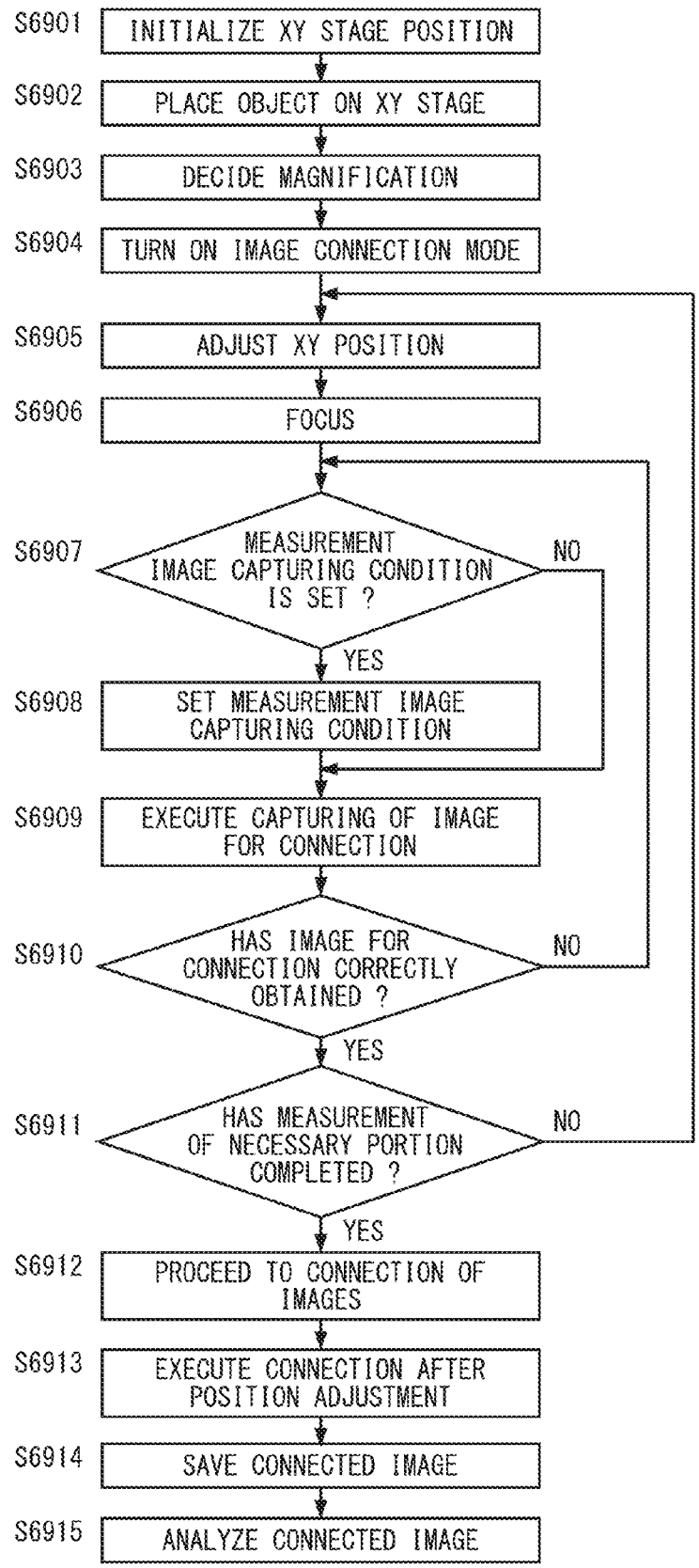
FIG. 69 is a flowchart showing a procedure for performing manual image connection in a semi-auto mode or the application mode.
Figure 70:
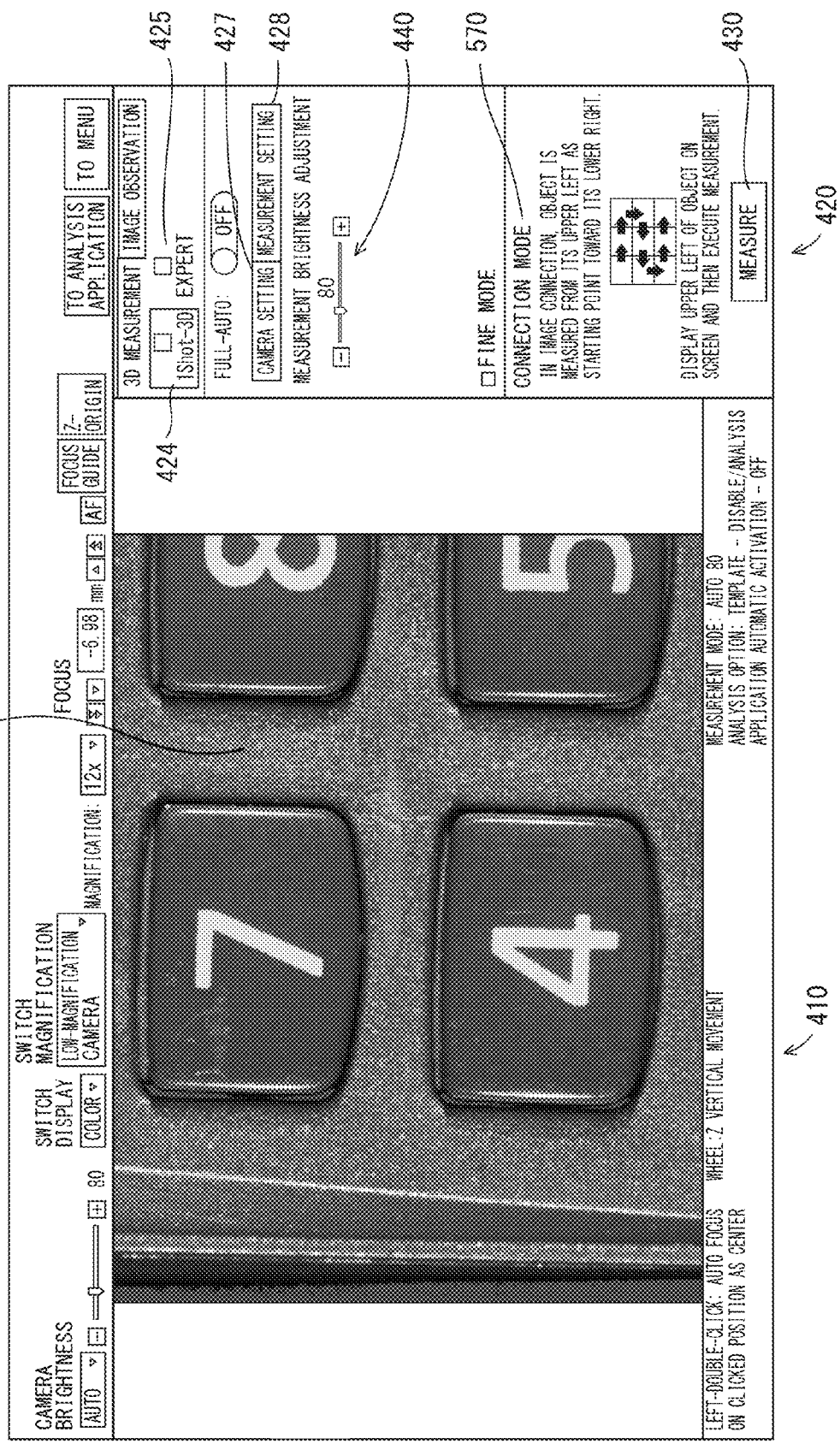
FIG. 70 is an image view showing an example of a measurement-image imaging condition setting screen in the semi-auto image connection mode.

In the above example, the procedure for the image connection operation in the full-auto mode has been described. In the present embodiment, however, the operation can be executed in the full-auto canceled (semi-auto) mode in the simple mode other than the full-auto mode, and can also be executed in the application mode. This state will be described based on a flowchart of FIG. 69 and GUI screen examples of FIGS. 70 to 74. Note that a detailed description of a similar operation to that for the foregoing full-auto image connection will be omitted. First, the XY-position of the stage 140 is initialized in step S6901, and next, the object is arranged on the stage 140 in step S6902. Subsequently, in S6903, the display magnification in the image display region 410 is decided. The procedure up to this point is the same as the example of the foregoing full-auto mode.

Then, the mode is switched to the image connection mode in step S6904. Similarly to the modes other than the full-auto mode, when the checkbox in the "Connection Mode" selection field 570 is checked, the image connection mode is started. Also similarly to the above, a guidance showing the image connection operation status is displayed on the lower section of the operation region 420. In this state, the XY-position of the stage 140 is manually adjusted (step S6905) to bring it into focus (step S6906).

Figure 71:
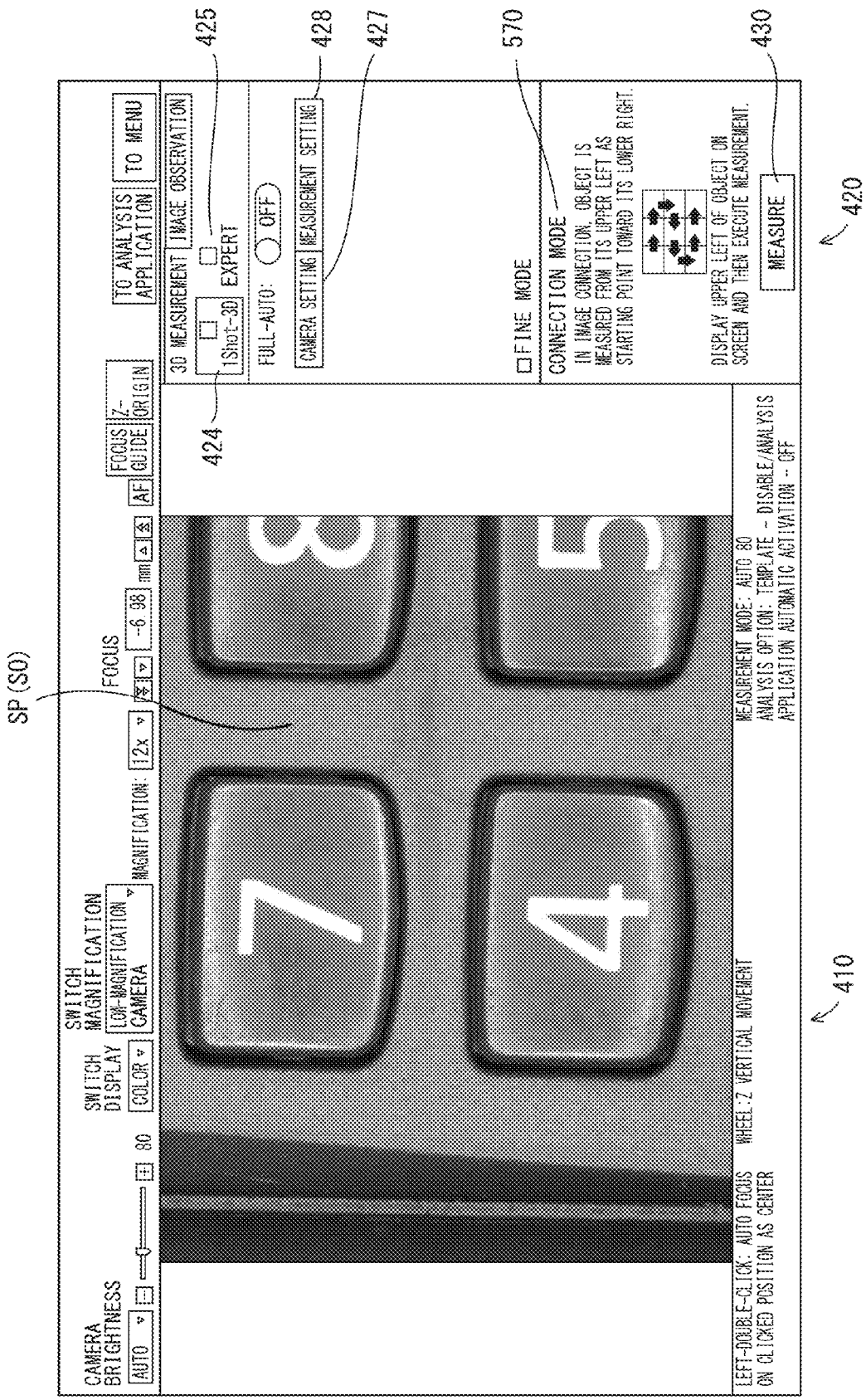
FIG. 71 is an image view showing an example of an observation-image imaging condition setting screen in the semi-auto image connection mode.

Moreover, in step S6907, it can be determined whether or not to set the measurement-image imaging condition. In the case of not setting the condition, the process jumps to step S699, and in the case of setting the condition, the process proceeds to step S698, where the measurement-image imaging condition is set on the measurement-image imaging condition setting screen 441 shown in FIGS. 70 and 72. Here, in the case of the semi-auto mode, the brightness of the measurement image SM can be adjusted as one of the measurement-image imaging conditions. In the example of the measurement-image imaging condition setting screen 441 shown in FIG. 70, the brightness of the measurement image SM can be adjusted by adjusting a slide bar in the "Measurement Brightness Adjustment" field 440. For adjusting the brightness, adjustment of the exposure time or the light amount of the measurement light projecting unit, and the like can be employed. It should be noted that in the semi-auto mode, by switching between the "Observation Image" button 427 and the "Measurement Image" button 428 as the image switching unit, the image displayed on the image display region 410 can be switched between the observation image SO and the measurement image SM. However, regarding the observation image SO, the observation-image imaging condition cannot be adjusted as shown in FIG. 71.

On the other hand, in the application mode, on top of the brightness of the measurement image, a larger number of measurement-image imaging parameters can be adjusted. As one example, as shown in the operation region 420 on the right side of the measurement-image imaging condition setting screen 441 of FIG. 72, the measurement mode can be changed in the "Measurement Mode" selection field 472, an e-preview in each measurement mode is performed, or the measurement direction of the measurement light can be changed from the "Measurement Direction" selection field 470. For example, when the "e-Preview" button 471 is pressed, the e-preview is executed to switch the screen to an e-preview screen 473 of FIG. 73, and the measurement image SM in accordance with the measurement mode is simply displayed as in FIG. 24 and the like. When any measurement mode is selected by a radio button in an e-preview measurement mode selection field 477 provided in the e-preview setting field 474, an e-preview image corresponding to the selected measurement mode is displayed in a green frame in the image display region 410, to show the correspondence. Further, the type of the measurement mode is displayed in a text in the lower right of each e-preview image.

Figure 72:
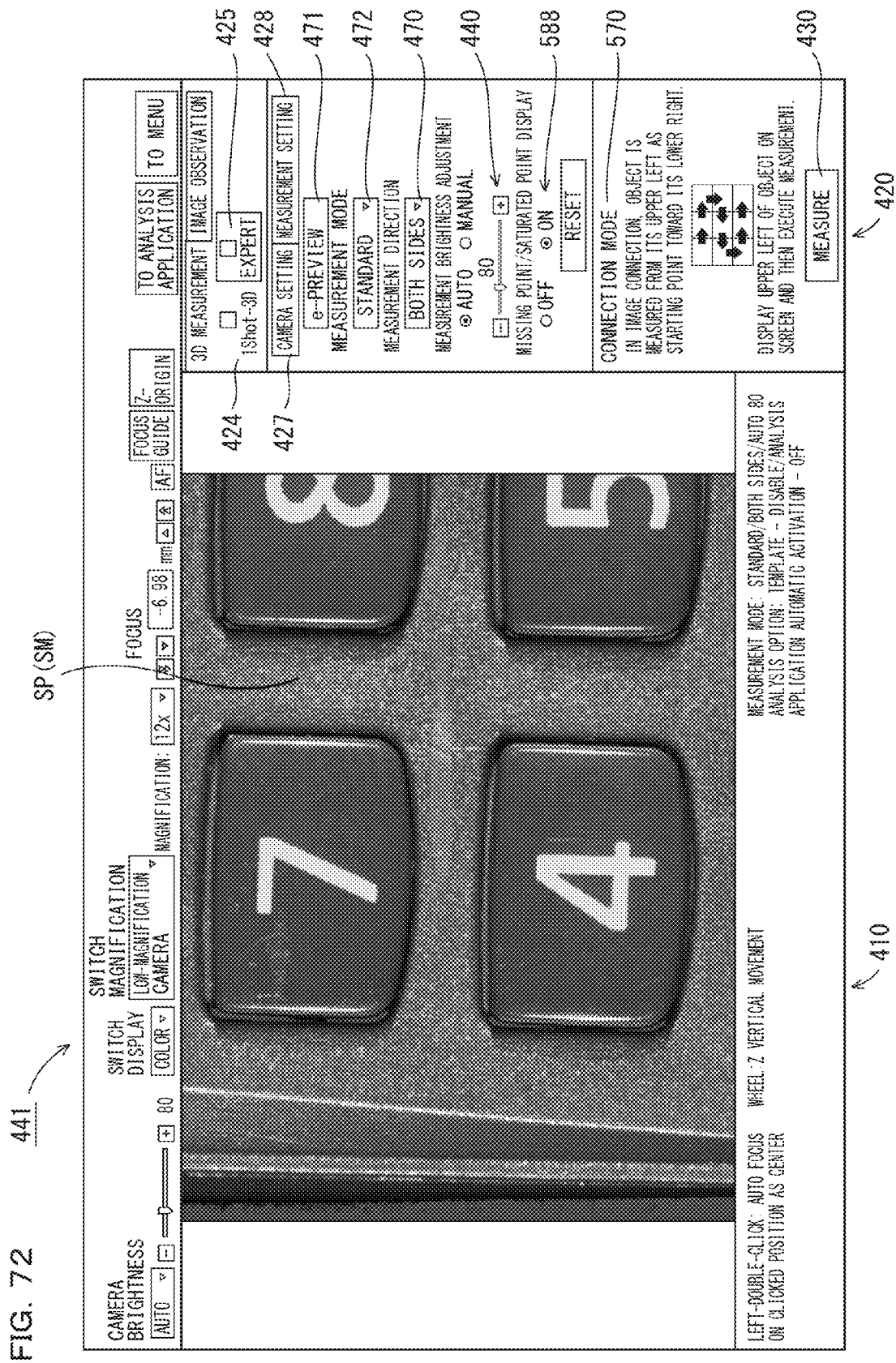
FIG. 72 is an image view showing an example of the measurement-image imaging condition setting screen in the application-mode image connection mode.
Figure 73:
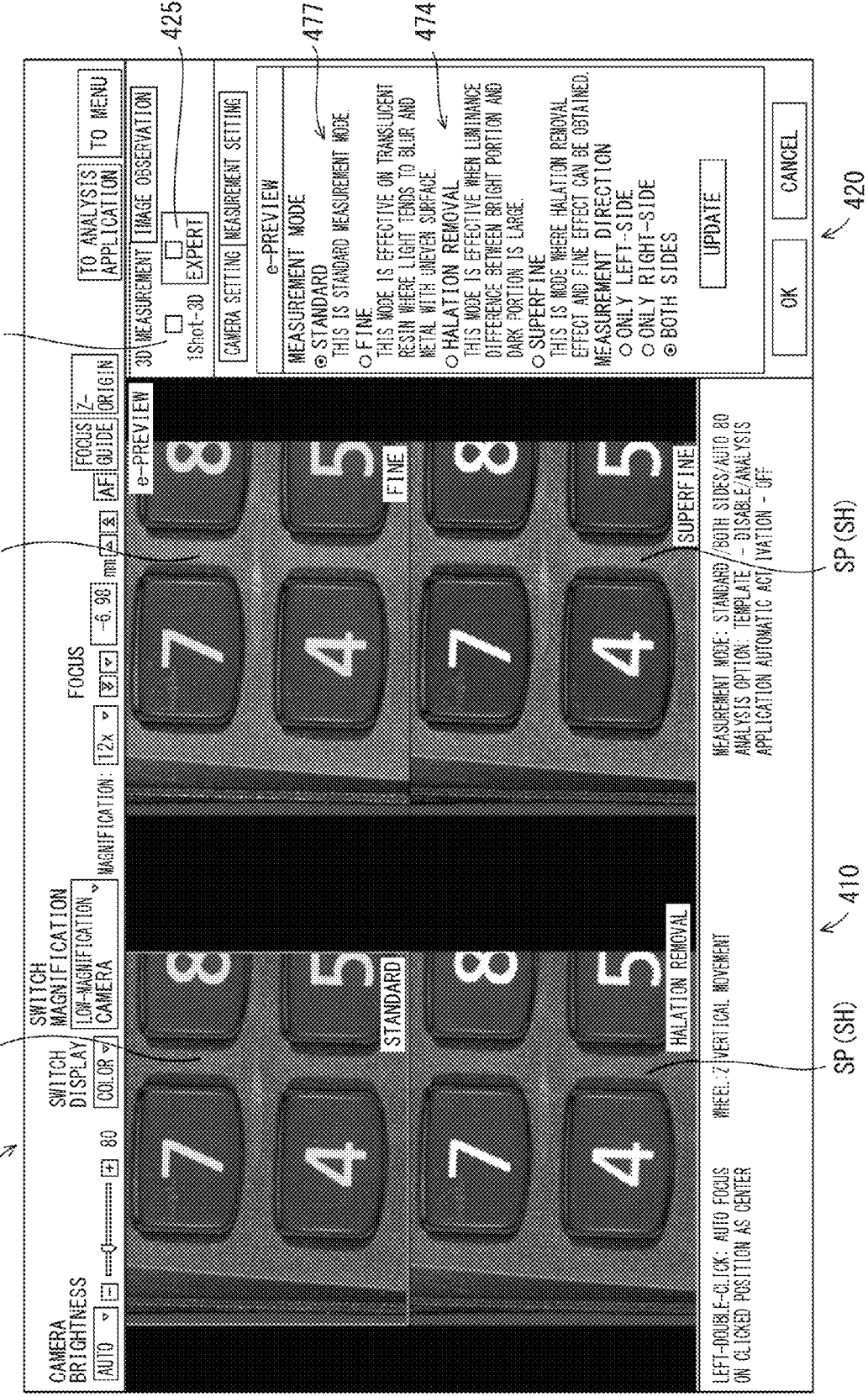
FIG. 73 is an image view showing a state where an e-preview has been performed in FIG. 72.

Further, on the measurement-image imaging condition setting screen 441 of FIG. 72, the adjustment of the brightness of the measurement image SM can also be switched between manual adjustment and automatic adjustment. In addition, the display or non-display of the measurement error region in the image display region 410 can be switched by turning-on/off of a "Missing Point/Saturated Point Display" field 588 as one aspect of the measurement error region display unit 212.

Figure 74:
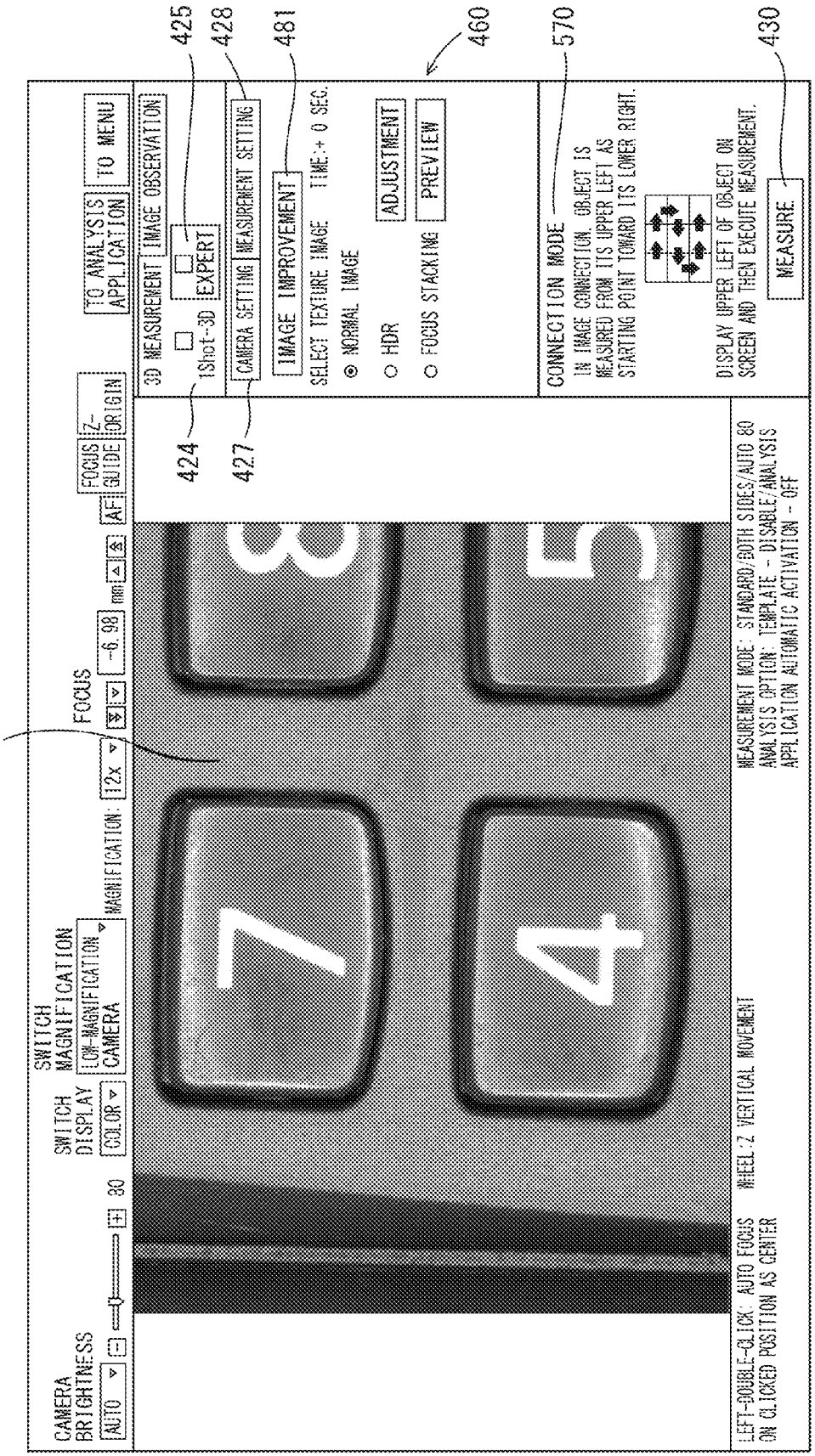
FIG. 74 is an image view showing an example of an observation-image imaging condition setting screen in the application-mode image connection mode.

Further, in the application mode, the imaging condition for the observation image can also be changed as well as that for the measurement image. Specifically, as shown in FIG. 74, when the button is switched from the "Measurement Image" button 428 to the "Observation Image" button 427, a variety of buttons are displayed on the operation region 420 differently from FIGS. 53 and 71. In this example, an "Image Improvement" button 481, a texture image selection unit 460, and the like are displayed. In the texture image selection unit 460, a normal image, an HDR image or a focus stacking image is selected from the "Texture Image Selection" field as the texture image to be pasted at the time of generating the composite image ST. As described above, when the "Image Improvement" button 481 is pressed, the image improvement panel 480 as shown in FIG. 14 is displayed, where an edge emphasis, an offset, a gamma correction, a white balance and the like can be adjusted. In such a manner, a variety of filters such as gamma correction and edge emphasis can be used as parameters for image improvement, namely, image quality improvement.

When such a measurement-image imaging condition is set as described above, the process proceeds to step S699, to execute capturing. Here, by pressing the "Measurement" button 430 on the measurement-image imaging condition setting screen 441 of FIG. 70, 72 or the like, the observation image and the measurement image are captured, the height image is generated, and further the composite image ST formed by combining the height image and the observation image as the texture image is generated. Hereinafter, since the composite image ST is displayed on the image display region 410 as in the full-auto mode, the user checks that the image for connection has been properly obtained (step S6910), and saves the image for connection when there is no problem with the obtained image, or returns the process to step S6907 to redo capturing when there is a problem. When there is no problem in step S6910, the process proceeds to step S6911, where it is determined whether or not all the images for connection which are required for generation of the connected image have been acquired, and when they have not, the process returns to step S6905, to repeat the above operation. When all the images for connection have been acquired, the process proceeds to step S6912, to perform the operation for connecting the images for connection. Next, in step S6913, the position adjustment is automatically or manually performed on the images for connection, to execute connection. The connected image is then saved as necessary in step S6914, and the connected image is measured as necessary in step S6915. As described above, the connected image is generated while the measurement-image imaging condition is adjusted as necessary.

Note that part of the processes in the above-described procedure can be omitted or replaced as necessary. For example, the initialization of the stage position may be omitted. Further, the magnification may be decided after turning-on of the image connection mode, or after the adjustment of the XY-position, or after the focus adjustment.

(Automatic Image Connection)

Figure 75:
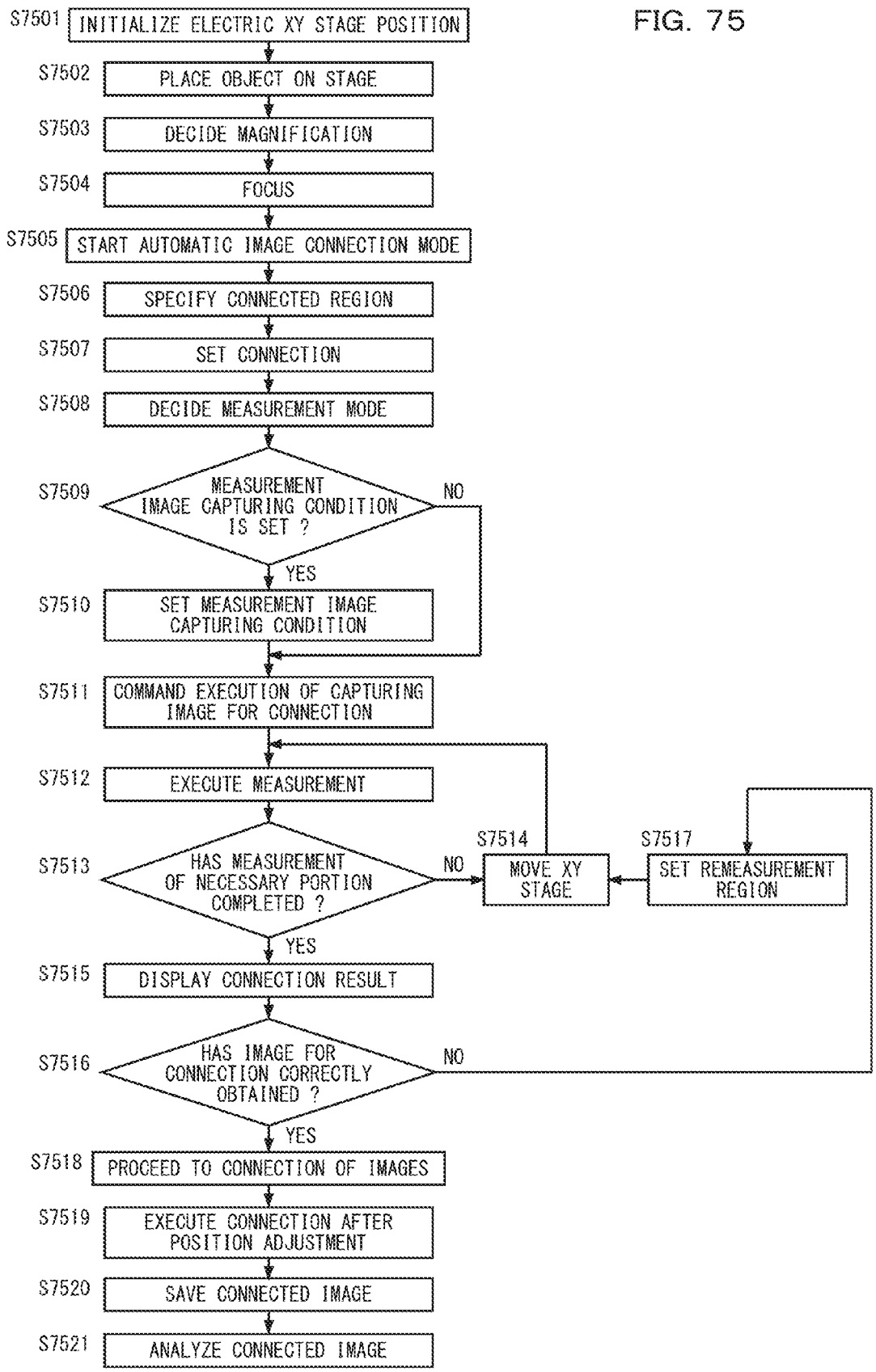
FIG. 75 is a flowchart showing a procedure for performing automatic image connection.

In the above, there has been described the procedure for manually capturing a plurality of images for connection and connecting the images. On the other hand, in the present invention, it is possible to automatically capture a plurality of images for connection and connect the images. In this case, the stage 140 is made movable not manually but automatically, and the moving operation for the stage 140 is also automated. Hereinafter, the procedure for automatically performing the image connection will be described based on a flowchart of FIG. 75 and GUI screens of FIGS. 76 to 83. Note that a detailed description of a similar operation to that for the foregoing manual image connection will be omitted. Further, similarly to the manual image connection, the automatic image connection can be executed in any of the full-auto mode, the semi-auto mode and the application mode, but the application mode will be described.

First, a position of an electric XY stage is initialized in step S7501. Next, the object is placed on the stage in step S7502. Further, a display magnification is decided in step S7503. Moreover, a focus is adjusted in step S7504.

Figure 76:
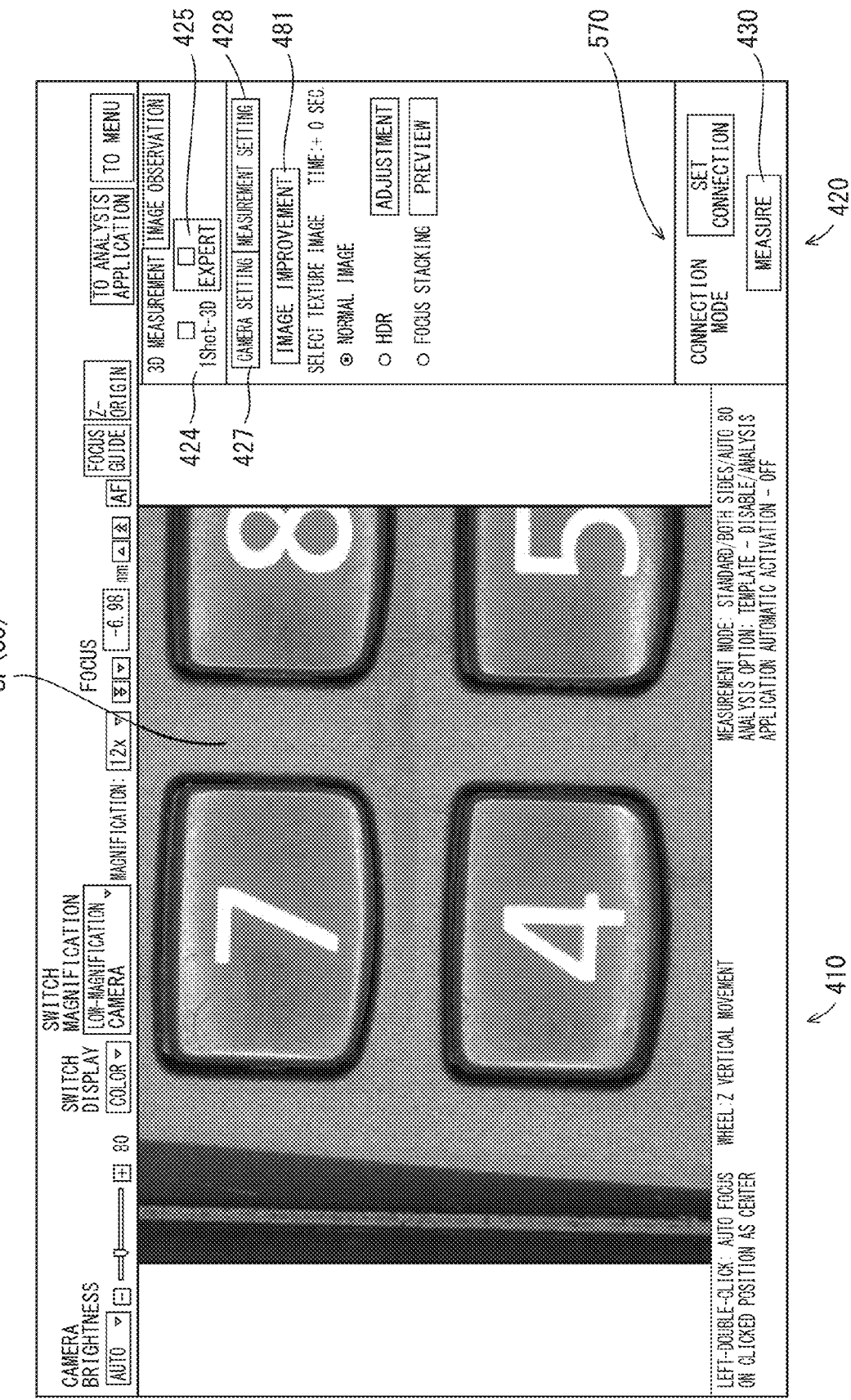
FIG. 76 is an image view showing an example of an observation-image imaging condition setting screen in an automatic image connection mode.
Figure 77:
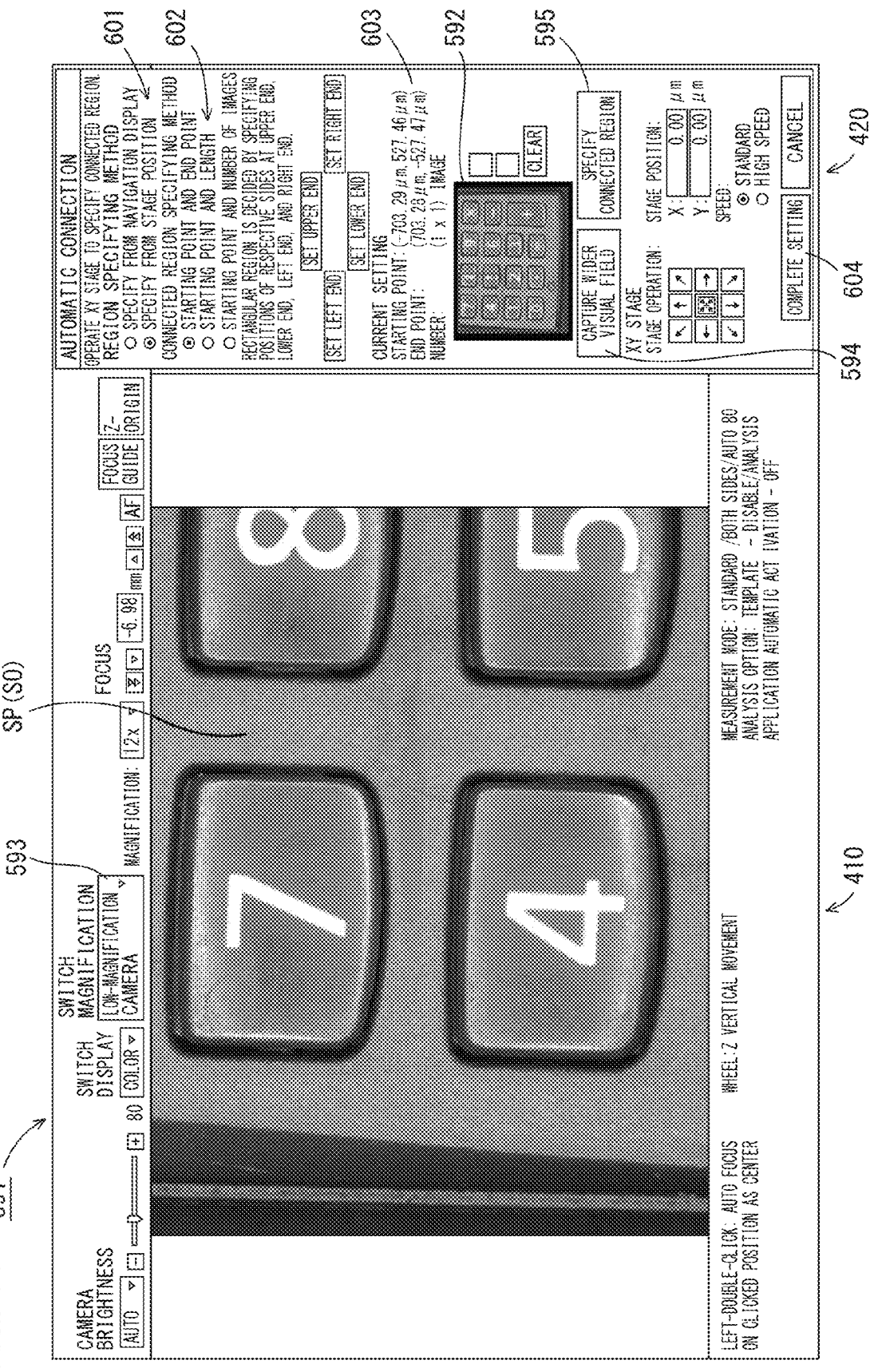
FIG. 77 is an image view showing an automatic image connection setting screen.

The automatic image connection mode is then started in step S7505. Here, as shown in FIG. 76, when the checkbox in the "Connection Mode" selection field 570 is checked in the lower section of the operation region 420 in the application mode, the image connection mode is started. Then, an automatic connection setting screen 591 for setting the automatic image connection, shown in FIG. 77, is opened. In the automatic connection setting screen 591, a connected region for performing the automatic image connection is specified (step S7506). In the example of FIG. 77, a wide-range image display field 592 is provided in the middle section of the operation region 420, and the connected image desired to be generated can be reduced and displayed. A wide-range image is acquired by switching the camera to a low magnification camera in a "Magnification Switch" field 593, and capturing the observation image with a low magnification. Further, a wide-range image with a different visual field can further be acquired by pressing a "Capture Wider Visual Field" button 594.

Figure 78:
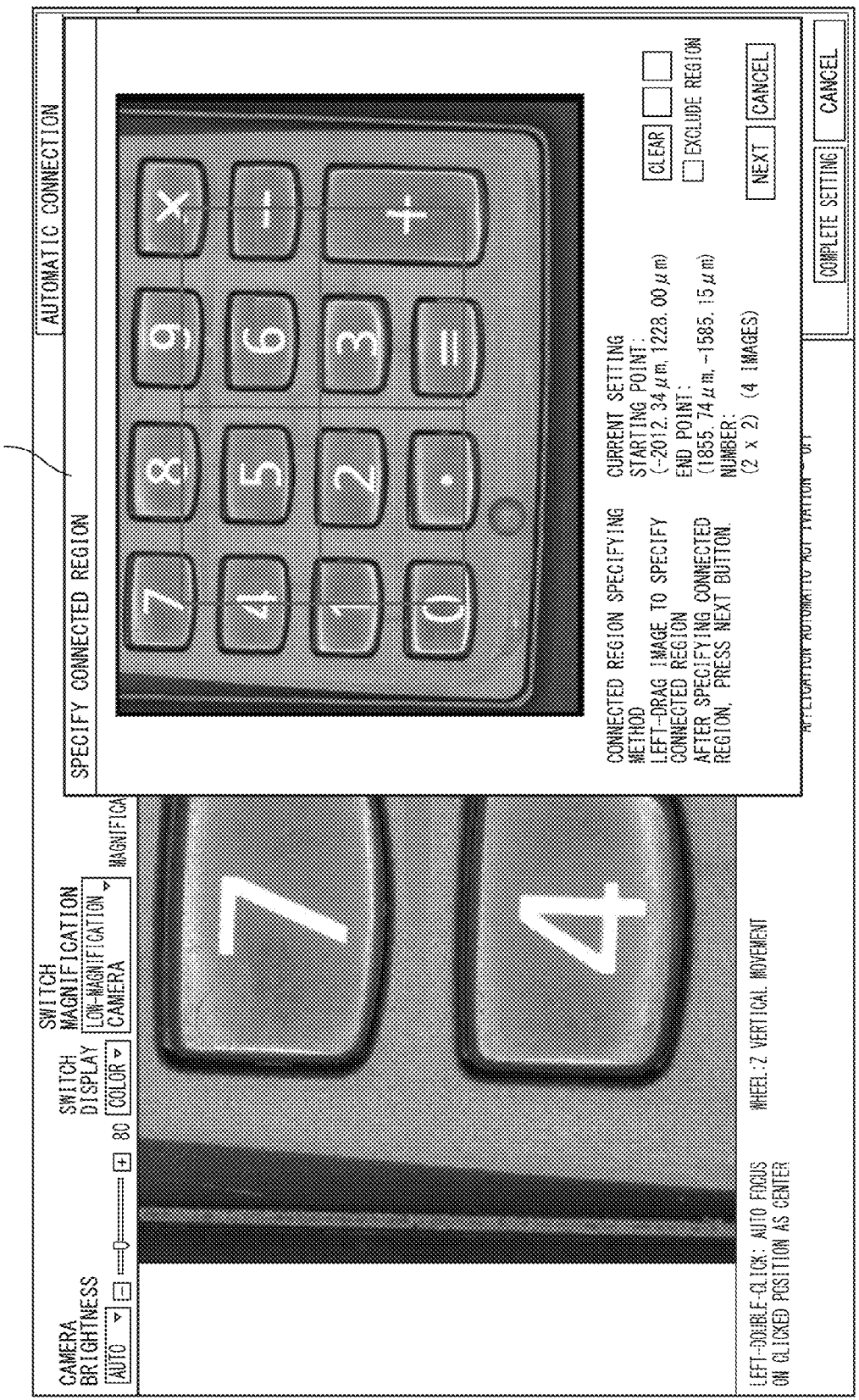
FIG. 78 is an image view showing one example of a connected region specification screen.
Figure 79:
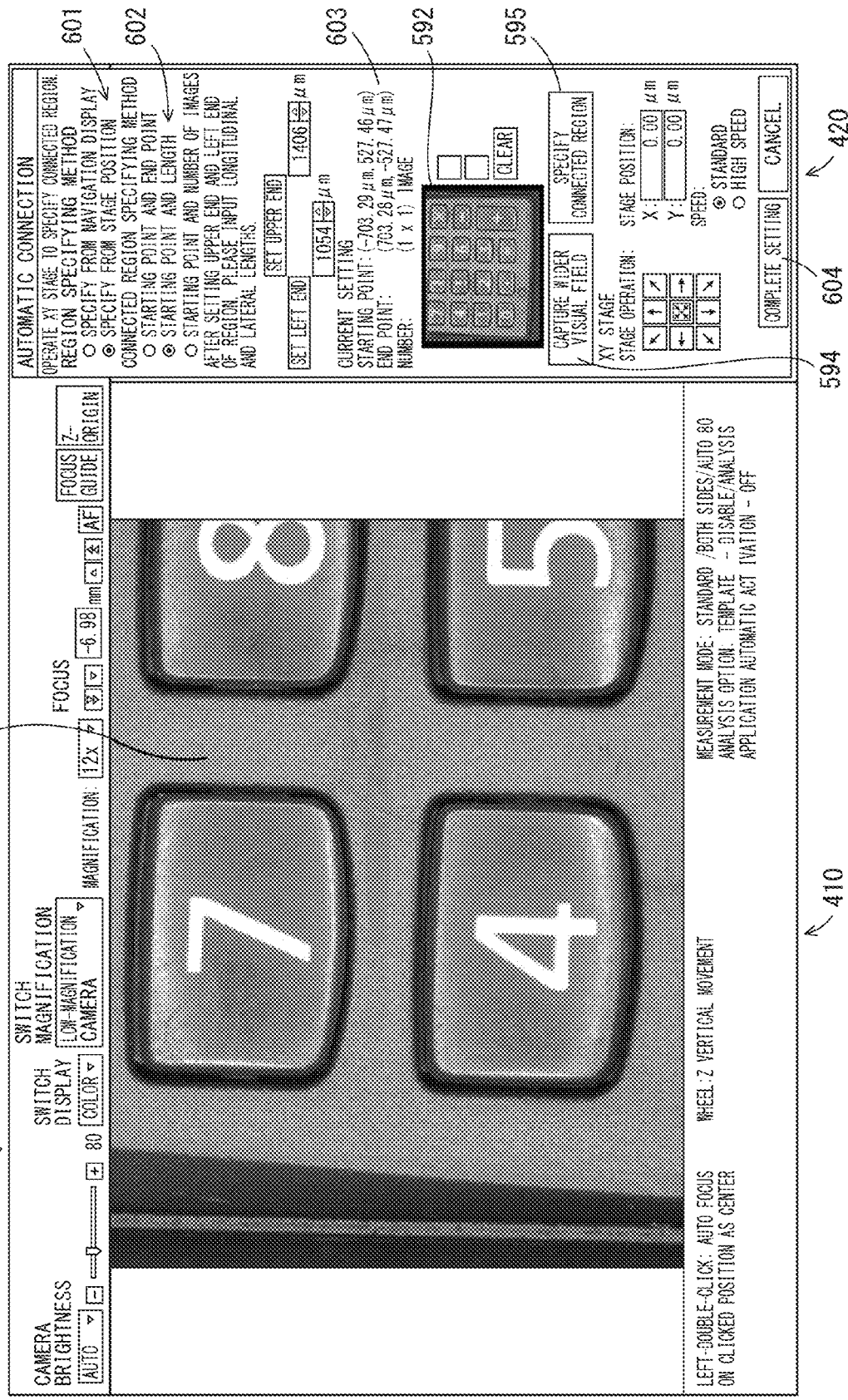
FIG. 79 is an image view showing a state where "Starting Point and Length" has been selected in a "Connected Region Specifying Method" field.
Figure 80:
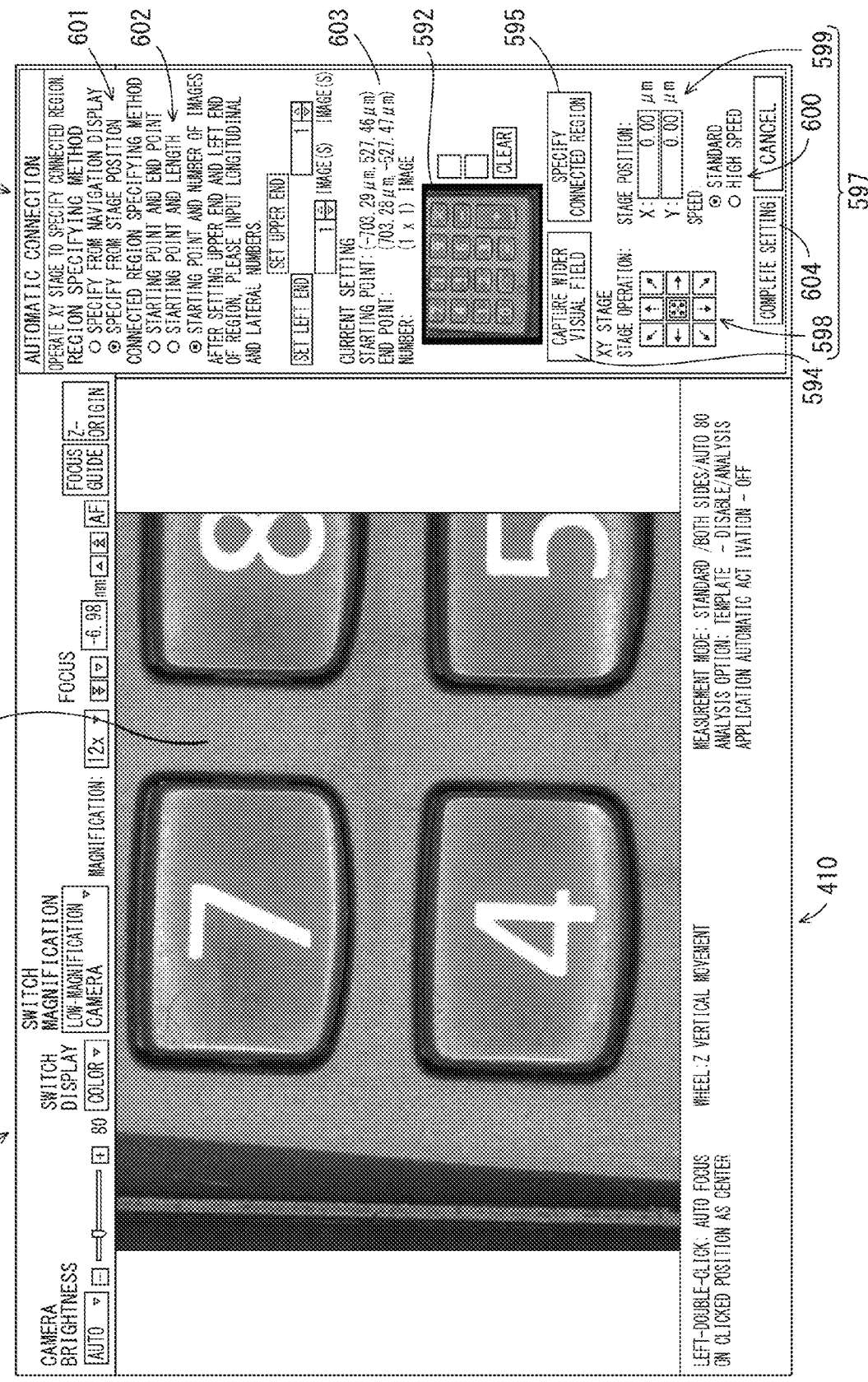
FIG. 80 is an image view showing a state where a "Starting Point and Number of Images" has been selected in the "Connected Region Specifying Method" field.

Moreover, when a "Specify Connected Region" button 595 is pressed, a connected region specification screen 596 of FIG. 78 is displayed. On the connected region specification screen 596, the connected region is specified on the observation image displayed on the image display region 410. This example shows a state where a setting has been made so as to capture a total of four (2×2) images for connection.

Moreover, when a "Specify Connected Region" button 595 is pressed, a connected region specification screen 596 of FIG. 78 is displayed. On the connected region specification screen 596, the connected region is specified on the observation image displayed on the image display region 410. This example shows a state where a setting has been made so as to capture a total of four (2×2) images for connection.

Further, a stage set field 597 for setting a stage motion is provided in the lower section of the operation region 420 on the automatic connection setting screen 591. In the stage set field 597, a button provided in a "Stage Operation" field 598 on the left side is operated, thereby allowing movement of the stage in the XY-directions. Further, in a "Stage Position" field 599 on the right side, an XY-coordinate of the stage is displayed, and when a numeric value is directly inputted in this field, the stage can be moved to a specified coordinate position. Moreover, from a "Speed" field 600, a movement speed of the stage can be switched to standard or high-speed.

A connected region specifying method is selected from the automatic connection setting screen 591 of FIG. 77. First in a "Region Specifying Method" field 601, it is selected whether to "Specify from Navigation Display" or "Specify from Stage Position" by means of the radio button. Here, "Specify from Stage Position" is selected. Thereby, the connected region is set with the position of the stage taken as a reference.

Next, in a "Connected Region Specifying Method" field 602, any of "Starting Point and End Point", "Starting Point and Length", "Starting Point and Number of Images" is selected. As shown in FIG. 77, when "Starting Point and End Point" is selected in the "Connected Region Specifying Method" field 602, positions corresponding to the starting point and the end point in the connected region are respectively specified. Above, below, right and left of the connected region are defined by respectively specifying apex positions of respective sides from an "Set Upper End" button, a "Set Lower End" button, a "Set Right End" button and a "Set Left End" button. Further, based on the current setting contents, coordinate positions of the starting point and the end point and the required number of images for connection are displayed on a "Current Setting" field 603. Moreover, a region for a first image for connection based on the current setting is displayed in a frame form in a state where the target connected image is displayed on the wide-range image display field 592. The user can set the connected region while referring to the size of the frame form in the wide-range image display field 592.

When "Starting Point and Length" is selected in the "Connected Region Specifying Method" field 602, the starting point and the lengths of the longitudinal and lateral sides of the rectangular connected region are specified. Here, in FIG. 79, the apex position in the upper left of the connected region is specified by the "Set Upper End" button and the "Set Left End" button, while the lengths in the longitudinal and lateral directions are respectively specified with numeric values. Further, similarly to FIG. 77, the image and setting contents of the connected region as thus specified are displayed on the wide-range image display field 592 and the "Current Setting" field 603, and when the contents are changed, they are reflected in real time in the setting after the change.

Further, when "Starting Point and Number of Images" is selected in the "Connected Region Specifying Method" field 602, the starting point and the number of images for connection are specified, the images being to be longitudinally and laterally arranged with the starting point taken as the reference. Here, in FIG. 80, the apex position in the upper left of the connected region is specified by the "Set Upper End" button and the "Set Left End" button, while the number of images for connection in the longitudinal and lateral directions are respectively specified by numeric values. Further, similarly to FIG. 77 and the like, the image and setting contents of the connected region as thus specified are displayed on the wide-range image display field 592 and the "Current Setting" field 603, and they are reflected in real time.

When specification of the connected region is completed as described above, a "Complete Setting" button 604 provided in the lower section of the operation region 420 in FIG. 77 or the like is pressed (step S7507). Next, the measurement mode is decided in step S7508. The measurement mode includes the standard measurement mode, the fine measurement mode, the halation removal measurement mode, the superfine measurement mode and the like as described above, and the user is made to select any of the measurement modes. Further, a default measurement mode can be previously specified, and in this case, this step can be omitted. Subsequently, the user is made to select whether or not to set the measurement-image imaging condition in step S7509, and the process is jumped to step S7511 in the case of not setting the condition, and proceeds to step S7510 in the case of setting the measurement-image imaging condition. As for a detail thereof, a similar method to that in step S698 of FIG. 69 described above can be used. Then, the user is made to instruct capturing of the image for connection in step S7511. Subsequently, the focus is adjusted by auto focusing in step S7512, and then capturing is executed. Next, in step S7513, it is determined on the measurement microscope device operation program side whether or not capturing of all the images for connection has been completed. When it is completed, the process proceeds to step S7515. When it is not completed, the process proceeds to step S7514, where the stage is automatically moved to an imaging position for capturing the next image for connection, and the process returns to step S7512, where capturing of the image for connection is repeated.

Figure 81:
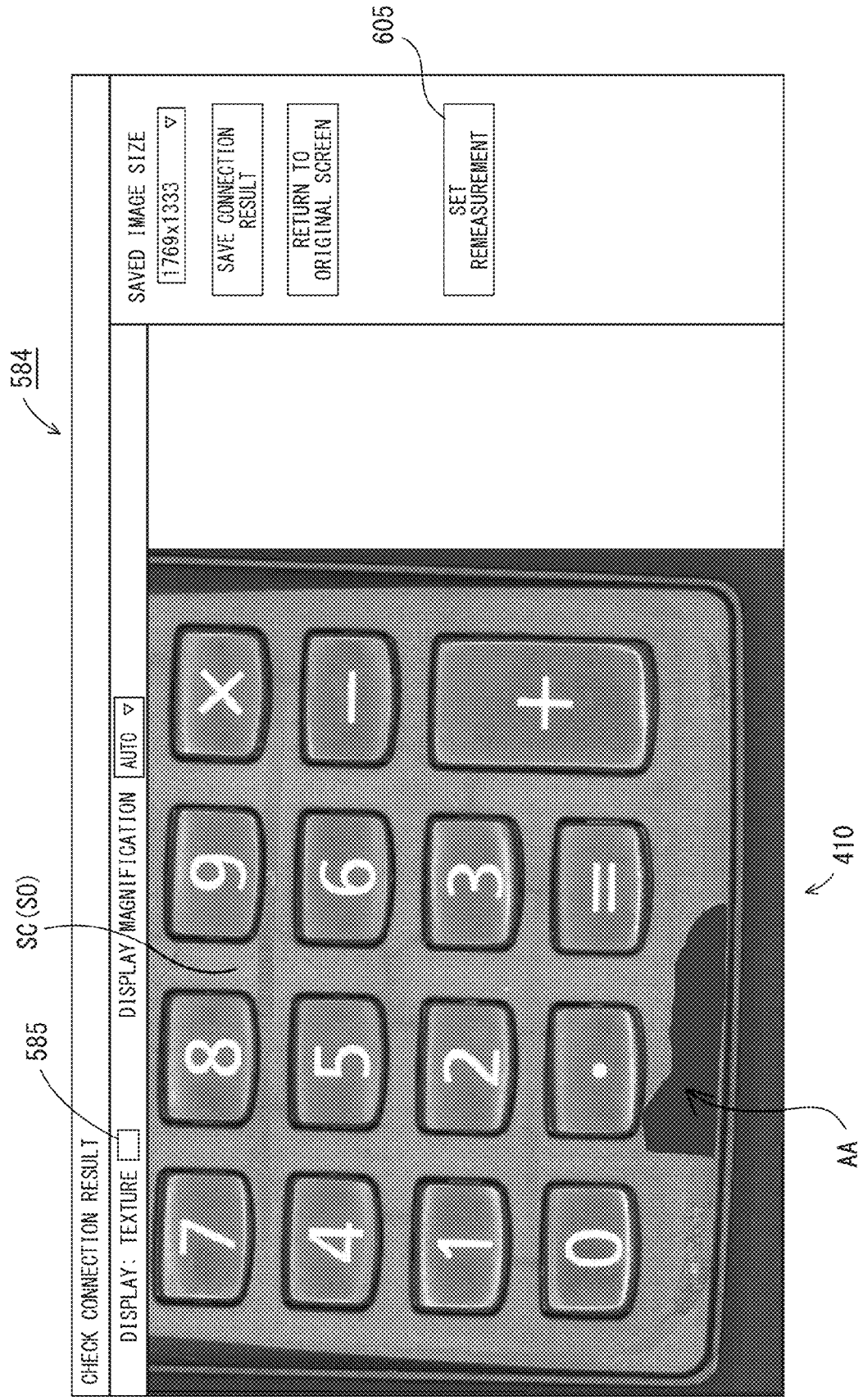
FIG. 81 is an image view showing another example of the connection result check screen.
Figure 82:
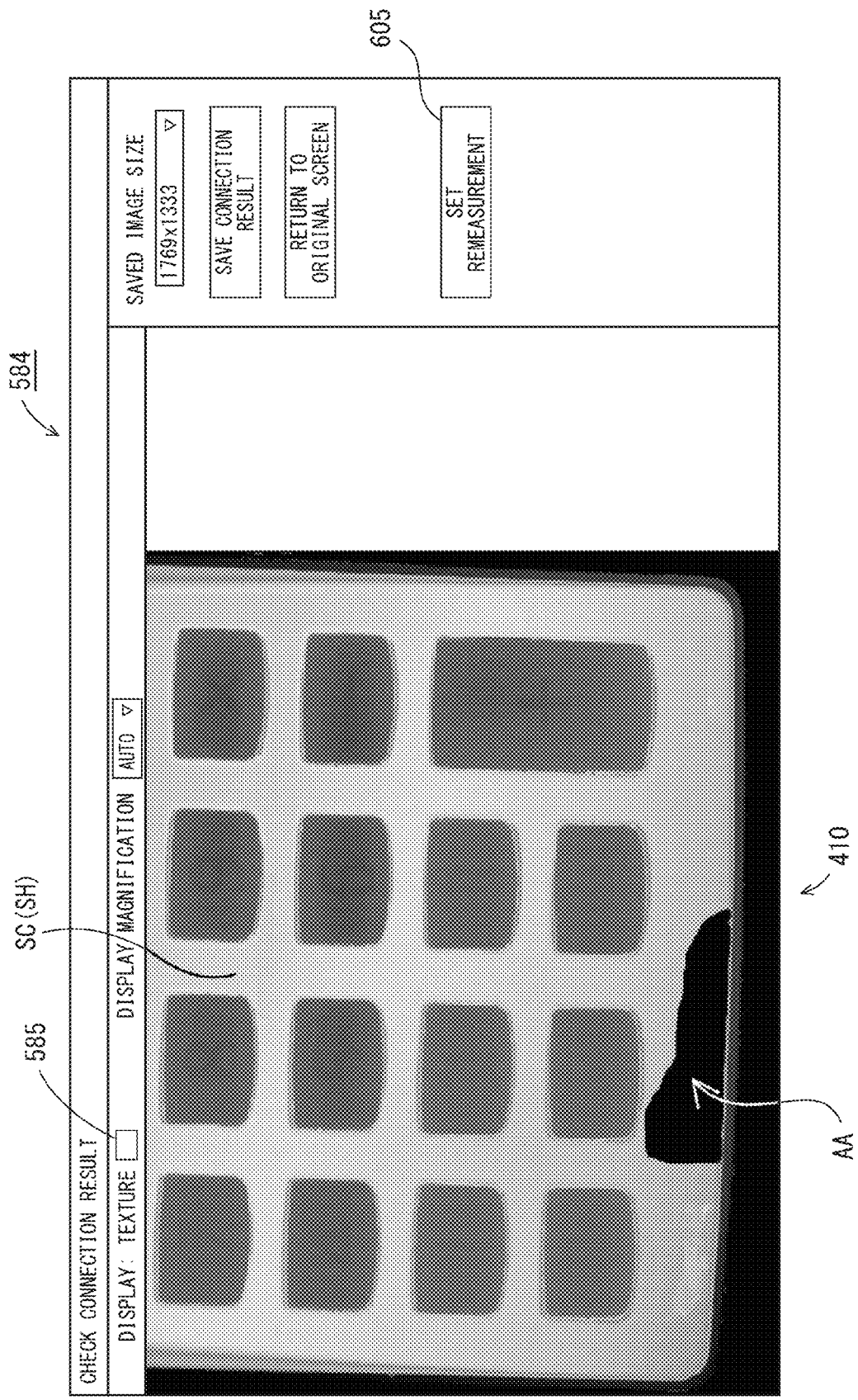
FIG. 82 is an image view showing an example of switching FIG. 81 to a height image.

Then, when capturing of all the images for connection is completed, the process proceeds from step S7513 to step S7515, and a connection result is displayed. FIG. 81 shows an example of a connection result check screen 584. FIG. 81 displays the observation image SO, and similarly to FIG. 65 and the like, the display can be switched to the height image SH as shown in FIG. 82 by selecting the image switching icon 585 in the toolbar. Then, in step S7516, it is checked whether or not the image for connection has been properly obtained, and when it is not obtained, the process jumps to step S7517, where a remeasurement region is set.

(Recovery Mode)
(Remeasurement Region Setting Unit 226)

Figure 83:
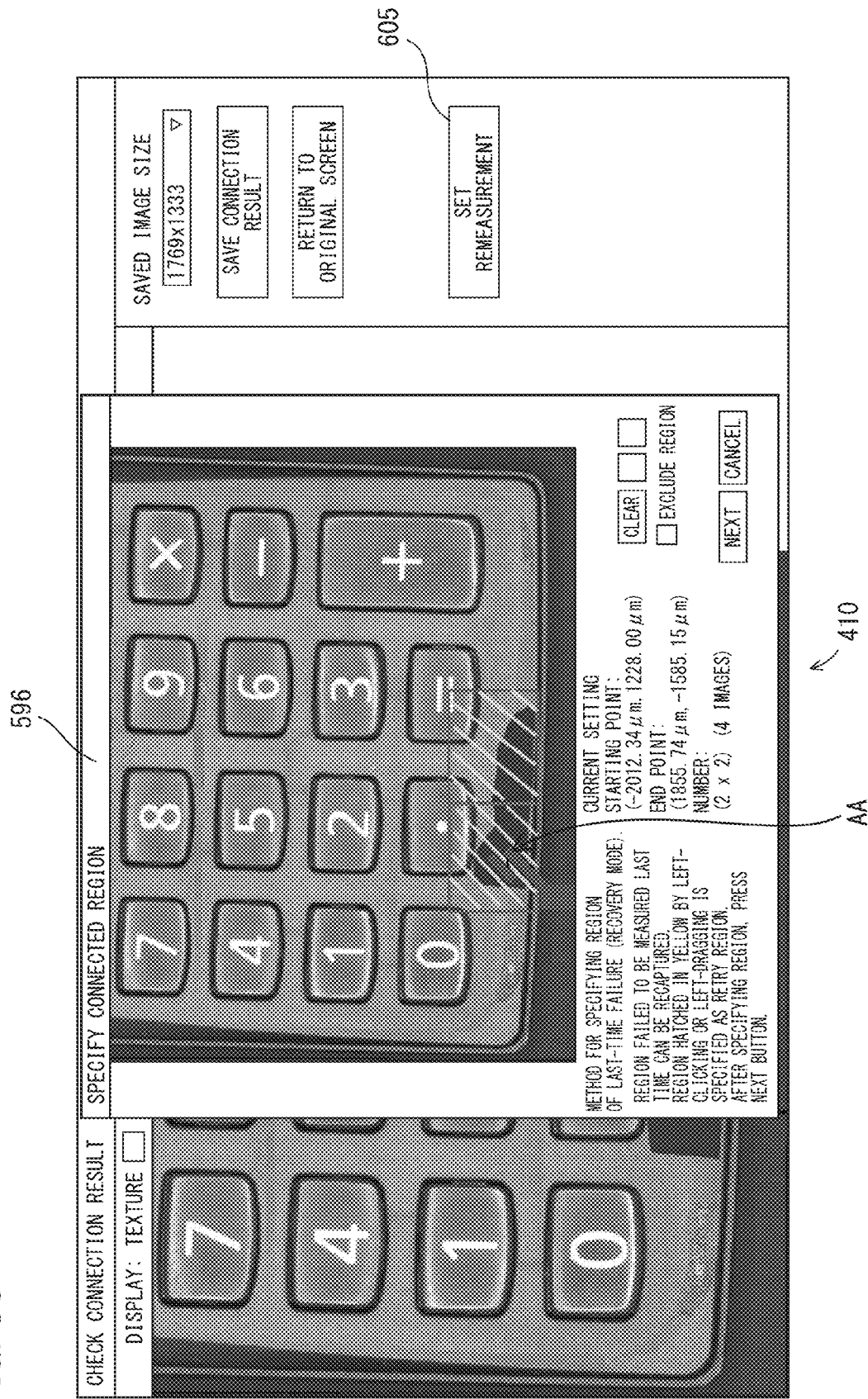
FIG. 83 is an image view showing a connected region specification screen.
Figure 84:
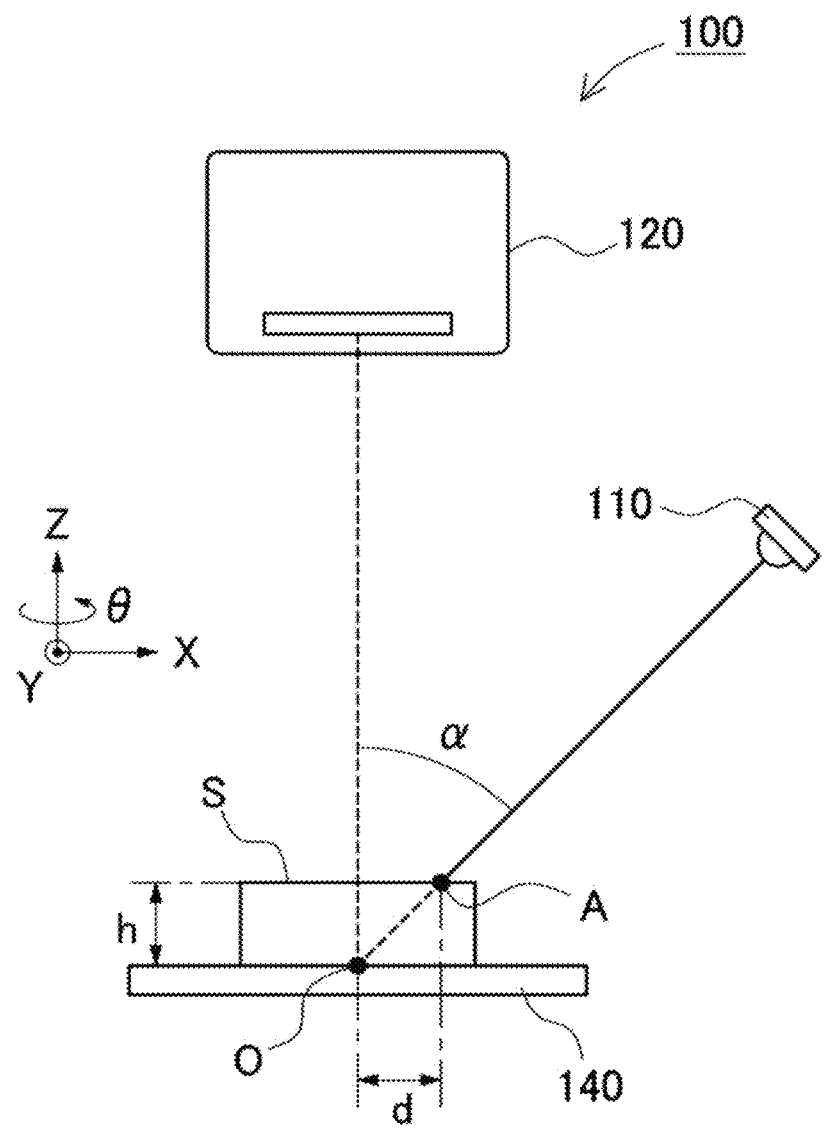
FIG. 84 is a view for explaining a principle of a triangulation method.

It can be considered that acquirement of the height image of the image for connection may partially fail in the automatic image connection. In this case, there is provided a recovery mode for changing the measurement-image imaging condition to perform recapturing on all or part of capturing of the images for connection failed to be captured. The recovery mode is executed by the remeasurement region setting unit 226. Further, in the measurement microscope device operation program, as one aspect of the remeasurement region setting unit 226, a remeasurement region setting function is realized on a measurement result check screen shown in FIG. 81. In this example, a measurement error region AA where the height image could not be properly acquired is superimposed on the observation image and indicated in red by the measurement error region display unit 212, and the state of the object being partially missing can be checked. When a "Set Remeasurement" button 605 provided in the middle section of the operation region 420 is pressed on this screen, the recovery mode is turned on, and the connected region specification screen 596 is displayed as shown in FIG. 83. On the connected region specification screen 596, the measurement error region is automatically detected, while a remeasurement region for capturing an additional image for connection including this measurement error region is automatically computed, which is superimposed and displayed on the display region. In this example, the remeasurement region is surrounded in a frame shape, while being hatched so as to be highlighted. Further, when the remeasurement region cannot be covered by one imaging operation, it is captured a plurality of times, and then connected. In the example of FIG. 83, it is displayed in the frame form that two additional images for connection are to be captured. Further, the remeasurement region setting function is also provided with a guidance function for explaining the user about the recovery mode being on and an operation needed to be performed. In this example, the following message is displayed: "Method for specifying region of last-time failure (recovery mode). Region failed to be measured last time can be recaptured. Region hatched in yellow by left-clicking or left-dragging is specified as retry region. When specifying region, press next button." In accordance with the message, the user adjusts the size and the position of the remeasurement region as necessary, and thereafter, when the user presses a "Next" button, the stage is moved to the specified position (step S7514), and an additional image for connection is recaptured (steps S7512 to 7513). At this time, as necessary, the measurement-image imaging condition setting screen 441 is displayed, where the condition can be adjusted to the reimaging condition for reducing the measurement error region. Similarly to the above, when all the additional images for connection are captured, the process proceeds to step S7515 to display a connection result, and it is checked whether or not the image for connection has been properly obtained in step S7516. When it has not been properly obtained, the process again returns to step S7517, to execute the recovery mode. On the other hand, when all the images for connection have been properly acquired, the process proceeds to step S7518, and the operation for connecting the images for connection is performed. Further, in step S7519, the position of the image for connection is automatically or manually adjusted, to execute connection. The connected image is saved as necessary in step S7520, and the connected image is measured as necessary in step S7521. As described above, the connected image can be automatically generated.

A measurement microscope device, an image generating method, a measurement microscope device operation program, and a computer-readable recording medium according to the present invention can be preferably applied to an inspection device and a digitizer which use the triangulation principle.

What is claimed is:

1. A measurement microscope device comprising:
   a first measurement light projecting unit configured to irradiate an object with first measurement light from a first direction, the unit being a measurement light projecting unit for projecting measurement light as predetermined pattern structured illumination to the object from an oblique direction;
   an observation illumination light source for generating illumination light when capturing an observation image;
   an imaging unit for acquiring measurement light projected by the first measurement light projecting unit and reflected by the object to capture a plurality of striped images, and using the observation illumination light source to capture an observation image having texture information;
   a height image acquiring unit for acquiring a height image having height information based on the plurality of striped images;
   a stage on which the object is placed;
   a display unit for displaying the height image or the observation image;
   a measurement unit for performing measurement on the height image displayed on the display unit;
   an image connecting unit configured to, by moving the stage and capturing a different region including a connection margin by the imaging unit, acquire a plurality of height images for connection and observation images for connection, and connect the obtained plurality of height images for connection and observation images for connection to generate a connected image;
   a measurement error region display unit configured to superimpose and display a measurement error region, where a result of measurement of the height is error, on an image of the object corresponding to each region to be connected by the image connecting unit; and
   a measurement-image imaging condition setting unit for adjusting an imaging condition for a striped image required for generation of the height image to reduce the measurement error region in a state where the measurement error region is displayed.

2. The measurement microscope device according to claim 1, wherein
   the connected image or the image for connection is a three-dimensional composite image formed by combining an observation image captured using the observation illumination light source and a height image captured using the measurement light projecting unit.

3. The measurement microscope device according to claim 1, wherein
   the image connecting unit specifies a predetermined region of the object as a connected region to divide the connected region into a plurality of sub regions, while respectively capturing by the imaging unit a height image for connection and an observation image for connection including the connection margin with respect to each of the sub regions, and connects the obtained plurality of height images for connection and observation images for connection, to generate a connected image showing the connected region.

4. The measurement microscope device according to claim 1, further comprising:
a second measurement light projecting unit, as the measurement light projecting unit, configured to irradiate the object with second measurement light from a second direction different from the first direction, wherein
the imaging conditions set by the measurement-image imaging condition setting unit include a measurement direction indicating a direction of the measurement light and brightness of a measurement image.

5. The measurement microscope device according to claim 4, wherein
the measurement error region display unit is configured to superimpose and display a measurement error region, where a result of measurement of the height by at least one of the first measurement light projecting unit and the second measurement light projecting unit is error in a state where the height image for connection formed by projecting the measurement light in the predetermined pattern is displayed on the display unit.

6. The measurement microscope device according to claim 1, wherein the imaging conditions for the plurality of observation images for connection are held uniform.

7. The measurement microscope device according to claim 1, wherein the stage is configured to be manually movable.

8. The measurement microscope device according to claim 1, further comprising a stage driving unit for automatically driving the stage.

9. The measurement microscope device according to claim 8, wherein
an automatic image connection mode is executable in which the image connecting unit moves the stage by the stage driving unit, and automatically captures a plurality of height images for connection and observation images for connection, to generate a connected image.

10. The measurement microscope device according to claim 9, wherein
when the measurement error region is included in any of the images for connection captured in the automatic image connection mode, a recovery mode for changing the measurement-image imaging condition and recapturing all or part of the images for connection is executable.

11. The measurement microscope device according to claim 3, wherein the image connecting unit is configured to specify a starting point and an end point of the connected region in order to divide the connected region into a plurality of sub regions.

12. The measurement microscope device according to claim 3, wherein the image connecting unit is configured to specify a starting point of the connected region and a longitudinal length and a lateral length of the connected region in order to divide the connected region into a plurality of sub regions.

13. The measurement microscope device according to claim 1, wherein the image connecting unit is configured to specify a starting point of the connected region and the numbers of observation images for connection and height images for connection in order to divide the connected region into a plurality of sub regions.

14. The measurement microscope device according to claim 1, wherein the measurement error region display unit is configured to display an area with insufficient measurement light without measuring the height in a state where the measurement image formed by projecting the measurement light in the predetermined pattern is displayed on the display unit.

15. The measurement microscope device according to claim 1, wherein the measurement error region display unit is configured to distinguish and display an area with insufficient measurement light by implementing measurement on the height in a state where the measurement image formed by projecting the measurement light in the predetermined pattern is displayed on the display unit.

16. The measurement microscope device according to claim 1, wherein
the measurement-image imaging condition is adjusted in a state where the measurement error region is displayed by the measurement error region display unit on the observation image or the measurement image displayed on the display unit, and
in a state where a height image acquired on the adjusted measurement-image imaging condition is further displayed on the display unit, the measurement error region is displayed by the measurement error region display unit on the height image, and the measurement-image imaging condition is readjusted, to generate the height image again.

17. An image generating method using a measurement microscope device which includes
a first measurement light projecting unit configured to irradiate an object with first measurement light from a first direction, the unit being a measurement light projecting unit for projecting measurement light as predetermined pattern structured illumination to the object from an oblique direction,
an observation illumination light source for generating illumination light when capturing an observation image,
an imaging unit for acquiring measurement light projected by the first measurement light projecting unit and reflected by the object to capture a plurality of striped images, and using the observation illumination light source to capture an observation image having texture information,
a height image acquiring unit for acquiring a height image having height information based on the plurality of striped images,
a stage on which the object is placed,
a display unit for displaying the height image or the observation image, and
a measurement unit for performing measurement on the height image displayed on the display unit,
the method comprising the steps of:
moving the stage and capturing a different region including a connection margin by the imaging unit to acquire a height image for connection and an observation image for connection;
superimposing and displaying a measurement error region, where a result of measurement of the height is error, on an image of the object corresponding to each region for connecting the height images for connection to one another;
prompting, as necessary, adjustment of an imaging condition to an imaging condition that reduces the measurement error region in a state where the measurement error region is displayed;
acquiring a height image for connection and an observation image for connection on the set imaging condition; and
connecting the obtained plurality of height images for connection and observation images for connection to generate a connected image.

18. A non-transitory computer readable medium that stores a program for a measurement microscope device which includes

- a first measurement light projecting unit configured to irradiate an object with first measurement light from a first direction, the unit being a measurement light projecting unit for projecting measurement light as predetermined pattern structured illumination to the object from an oblique direction,
- an observation illumination light source for generating illumination light when capturing an observation image,
- an imaging unit for acquiring measurement light projected by the first measurement light projecting unit and reflected by the object to capture a plurality of striped images, and using the observation illumination light source to capture an observation image having texture information,
- a height image acquiring unit for acquiring a height image having height information based on the plurality of striped images, and
- a stage on which the object is placed, wherein when executed, the program performs:

- a display function for displaying the height image or the observation image;
- a measurement function for performing measurement on the height image displayed by the display function;
- an image connection function of moving the stage and capturing a different region including a connection margin by the imaging unit to acquire a height image for connection and an observation image for connection, and connecting the obtained plurality of height images for connection and observation images for connection to generate a connected image;
- a measurement error region display function of superimposing and displaying a measurement error region, where a result of measurement of the height is error, on an image of the object corresponding to each region for connecting the height images for connection to one another; and
- a function of prompting, as necessary, adjustment of an imaging condition to an imaging condition that reduces the measurement error region in a state where the measurement error region is displayed by the measurement error region display function.

* * * * *